US012323786B2

(12) United States Patent
Stringer et al.

(10) Patent No.: US 12,323,786 B2
(45) Date of Patent: Jun. 3, 2025

(54) SYSTEMS AND METHODS FOR SPATIAL AUDIO RENDERING

(71) Applicant: SYNG, Inc., Marina del Ray, CA (US)

(72) Inventors: Christopher John Stringer, Venice, CA (US); Afrooz Family, Los Angeles, CA (US); Fabian Renn-Giles, West Drayton (GB); David Narajowski, San Jose, CA (US); Joshua Phillip Song, Los Angeles, CA (US); John Moreland, Torrance, CA (US); Pooja Patel, San Jose, CA (US); Pere Aizcorbe Arrocha, Santa Monica, CA (US); Nicholas Knudson, Venice, CA (US); Nathan Hoyt, Venice, CA (US); Marc Carino, Venice, CA (US); Mark Rakes, Venice, CA (US); Ryan Mihelich, Venice, CA (US); Matthew Brown, Brooklyn, NY (US); Bas Ording, San Francisco, CA (US); Robert Tilton, Los Angeles, CA (US); Jay Sterling Coggin, Brooklyn, NY (US); Lasse Vetter, Venice, CA (US); Christos Kyriakakis, Venice, CA (US); Matthew Robbetts, Venice, CA (US); Matthias Kronlachner, Venice, CA (US); Yuan-Yi Fan, Sherman Oaks, CA (US)

(73) Assignee: SYNG, Inc., Marina del Ray, CA (US)

( * ) Notice: Subject to any disclaimer, the term of this patent is extended or adjusted under 35 U.S.C. 154(b) by 0 days.

(21) Appl. No.: 18/339,969

(22) Filed: Jun. 22, 2023

(65) Prior Publication Data

US 2024/0107258 A1 Mar. 28, 2024

Related U.S. Application Data

(63) Continuation of application No. 17/456,878, filed on Nov. 29, 2021, now Pat. No. 11,722,833, which is a (Continued)

(51) Int. Cl.
*H04S 7/00* (2006.01)
*H04S 5/00* (2006.01)

(52) U.S. Cl.
CPC .............. *H04S 7/305* (2013.01); *H04S 5/005* (2013.01); *H04S 7/302* (2013.01)

(58) Field of Classification Search
None
See application file for complete search history.

(56) References Cited

U.S. PATENT DOCUMENTS

| | | |
|---|---|---|
| 5,757,927 A | 5/1998 | Gerzon et al. |
| 8,107,631 B2 | 1/2012 | Merimaa et al. |

(Continued)

FOREIGN PATENT DOCUMENTS

| | | |
|---|---|---|
| CN | 104604257 A | 5/2015 |
| CN | 113853803 A | 12/2021 |

(Continued)

OTHER PUBLICATIONS

Extended European Search Report for European Application No. 20783235.3, Search completed Jan. 18, 2023, Mailed Jan. 26, 2023, 9 Pgs.

(Continued)

*Primary Examiner* — Kenny H Truong
(74) *Attorney, Agent, or Firm* — KPPB LLP

(57) ABSTRACT

Systems and methods for rendering spatial audio in accordance with embodiments of the invention are illustrated. One embodiment includes a spatial audio system, including a primary network connected speaker, including a plurality (Continued)

of sets of drivers, where each set of drivers is oriented in a different direction, a processor system, memory containing an audio player application, wherein the audio player application configures the processor system to obtain an audio source stream from an audio source via the network interface, spatially encode the audio source, decode the spatially encoded audio source to obtain driver inputs for the individual drivers in the plurality of sets of drivers, where the driver inputs cause the drivers to generate directional audio.

20 Claims, 95 Drawing Sheets

Related U.S. Application Data continuation of application No. 17/003,957, filed on Aug. 26, 2020, now Pat. No. 11,190,899, which is a continuation of application No. 16/839,021, filed on Apr. 2, 2020, now Pat. No. 11,206,504.

(60) Provisional application No. 62/935,034, filed on Nov. 13, 2019, provisional application No. 62/878,696, filed on Jul. 25, 2019, provisional application No. 62/828,357, filed on Apr. 2, 2019.

(56) References Cited

U.S. PATENT DOCUMENTS

| | | | | |
|---|---|---|---|---|
| 9,942,686 | B1 | 4/2018 | Family et al. | |
| 10,425,733 | B1 | 9/2019 | Choisel et al. | |
| 10,609,484 | B2 | 3/2020 | Family et al. | |
| 11,190,899 | B2 | 11/2021 | Stringer et al. | |
| 11,206,504 | B2 | 12/2021 | Stringer et al. | |
| 11,399,255 | B2 | 7/2022 | Johnson et al. | |
| 11,722,833 | B2 | 8/2023 | Stringer et al. | |
| 12,003,927 | B2 | 6/2024 | Revelli et al. | |
| 2002/0146134 | A1 | 10/2002 | Gierl et al. | |
| 2007/0025559 | A1 | 2/2007 | Mihelich et al. | |
| 2007/0160225 | A1 | 7/2007 | Seydoux | |
| 2011/0069856 | A1 | 3/2011 | Blore et al. | |
| 2011/0081024 | A1 | 4/2011 | Soulodre | |
| 2014/0119581 | A1 | 5/2014 | Tsingos et al. | |
| 2014/0133683 | A1 | 5/2014 | Robinson et al. | |
| 2014/0219455 | A1 | 8/2014 | Peters et al. | |
| 2015/0222994 | A1 | 8/2015 | Soulodre | |
| 2015/0245157 | A1 | 8/2015 | Seefeldt | |
| 2015/0350804 | A1 | 12/2015 | Crockett et al. | |
| 2016/0021476 | A1 | 1/2016 | Robinson et al. | |
| 2016/0021481 | A1 | 1/2016 | Johnson et al. | |
| 2017/0125030 | A1 | 5/2017 | Koppens et al. | |
| 2017/0223447 | A1 | 8/2017 | Johnson et al. | |
| 2017/0238090 | A1 | 8/2017 | Johnson et al. | |
| 2017/0264995 | A1 | 9/2017 | Lippitt et al. | |
| 2017/0325043 | A1 | 11/2017 | Jot et al. | |
| 2017/0374465 | A1 | 12/2017 | Family et al. | |
| 2018/0098171 | A1 | 4/2018 | Family et al. | |
| 2018/0098172 | A1 | 4/2018 | Family et al. | |
| 2018/0352325 | A1 | 12/2018 | Family et al. | |
| 2018/0352331 | A1 | 12/2018 | Kriegel et al. | |
| 2018/0352334 | A1 | 12/2018 | Family et al. | |
| 2019/0014434 | A1 | 1/2019 | Johnson et al. | |
| 2019/0208347 | A1 | 7/2019 | Baker et al. | |
| 2019/0222931 | A1 | 7/2019 | Kriegel et al. | |
| 2019/0253801 | A1 | 8/2019 | Arteaga et al. | |
| 2019/0297424 | A1 | 9/2019 | O'Brien et al. | |
| 2019/0356985 | A1* | 11/2019 | Milne | H04R 5/04 |
| 2020/0007987 | A1 | 1/2020 | Woo et al. | |
| 2020/0367009 | A1 | 11/2020 | Family et al. | |
| 2020/0396560 | A1 | 12/2020 | Family et al. | |
| 2021/0168552 | A1 | 6/2021 | Walther et al. | |
| 2022/0159404 | A1 | 5/2022 | Stringer et al. | |
| 2023/0370796 | A1 | 11/2023 | Vetter et al. | |
| 2024/0015459 | A1 | 1/2024 | Franco | |
| 2024/0056758 | A1 | 2/2024 | Kronlachner | |
| 2024/0129681 | A1 | 4/2024 | Munoz et al. | |

FOREIGN PATENT DOCUMENTS

| | | | |
|---|---|---|---|
| EP | 3949438 | A1 | 2/2022 |
| JP | 2022528138 | A | 6/2022 |
| KR | 10-2021-0148238 | A | 12/2021 |
| WO | 2017118552 | A1 | 7/2017 |
| WO | 2020206177 | A1 | 10/2020 |
| WO | 2021021707 | A1 | 2/2021 |
| WO | 2023087031 | A2 | 5/2023 |
| WO | 2023087031 | A3 | 11/2023 |

OTHER PUBLICATIONS

International Preliminary Report on Patentability for International Application PCT/US2020/026471, issued Sep. 28, 2021, Mailed Oct. 14, 2021, 14 Pgs.

International Search Report and Written Opinion for International Application No. PCT/US2020/026471, Search completed Jun. 26, 2020, Mailed Aug. 19, 2020, 26 Pgs.

"Audiorama 9000 User Manual", Grundig, 2008, 68 pgs.

"Backwards-compatible object audio carriage using Enhance AC-3", European Telecommunications Standards Institute, Technical Specification, (ETSI TS) 103 420, Oct. 2018, 83 pgs.

"Das Grundig Audiorama-Programm", Radiomuseaum.org: Grundig (Radio-Vertrieb, RVF, Radiowerke) Audiorama 7000 HiFi, 1975, 2 pgs.

"Grundig Audiorama 7000", hifi wiki, Retrieved from: https://www.hifi-wiki.de/index.php/Grundig_Audiorama_7000, Printed Feb. 12, 2021, Last edited Mar. 11, 2019, 3 pgs.

"Grundig Audiorama 9000 Spherical Speaker System", DesignisthisBLOG, Jan. 29, 2013, 6 pgs.

"Harmonic Design 2019 Catalogue", Harmonic Design, 2019, 27 pgs.

Arnold, "Ambisonic Audio and Virtual Reality", Mat Arnold Sound Design, Retrieved from: http://matarnoldaudio.com/vr-audio/ambisonic-audio-and-virtual-reality/, Jun. 14, 2018, Accessed: Aug. 16, 2019, 7 pgs.

Arteaga, "Introduction to Ambisonics", Audio 3D—Grau en Enginyeria de Sistemes Audiovisuals, Universitat Pompeu Fabra, Lecture Notes, Jun. 2015, 25 pgs.

Benjamin et al., "Localization in Horizontal-Only Ambisonic Systems", Presented at the 121st Convention, Audio Engineering Society, San Francisco, CA, USA, Oct. 8, 2006, 13 pgs.

Buffoni, "Ambisonics as an Intermediate Spatial Representation (for VR)", Audiokinetic Blog, Retrieved from: https://blog.audiokinetic.com/ambisonics-as-an-intermediate-spatial-representation-for-vr/ on Jul. 16, 2021, 6 pgs.

Cook et al., "N>>2: Multi-speaker Display Systems for Virtual Reality and Spatial Audio Projection", Proceedings of the 5th International Conference on Auditory Display, Nov. 1-4, 1998, 5 pgs.

Fazi, "Sound Field Reproduction", PHD Thesis, University of Southampton, Feb. 2010, 312 pgs, presented in 4 parts.

Gerzon, "General Metatheory of Auditory Localisation", Presented at the 92nd Convention, Audio Engineering Society, Vienna, No. 3306, Mar. 24-27, 1992, 64 pgs.

Gerzon, "Periphony: With-Height Sound Reproduction", Journal of the Audio Engineering Society, vol. 21, No. 1, Feb. 1973, 7 pgs.

Guldenschuh, "Transaural Beamforming", Diploma Thesis, Graz University of Technology, Sep. 2009, 77 pgs.

Habets, "Room Impulse Response Generator", Technische Universiteit Eindhoven, Tech. Rep., Sep. 20, 2010, 21 pgs.

Heller et al., "The Ambisonic Decoder Toolbox: Extensions for Partial-Coverage Loudspeaker Arrays", Linux Audio Conference, May 2014, 9 pgs.

Hollerweger, "An Introduction to Higher Order Ambisonic", Oct. 2008, 13 pgs.

Kolundzija, "Spatial Acoustic Signal Processing", Thesis, Ecole Polytechnique Federale de Lausanne, Jan. 16, 2012, 182 pgs.

(56) References Cited

OTHER PUBLICATIONS

Kostadinov et al., "Evaluation of distance based amplitude panning for spatial audio", Proceedings of the IEEE International Conference on Acoustics, Speech, and Signal Processing (ICASSP), 2010, pp. 285-288.
Lossius et al., "DBAP—Distance-Based Amplitude Panning", Proceedings of the International Computer Music Association, Montreal, Canada, Aug. 16-21, 2009, pp. 489-492.
Lossius et al., "DBAP—Distance-Based Amplitude Panning", Revision of the Proceedings of the International Computer Music Conference, Montreal, Canada, Aug. 16-21, 2009 on Apr. 14, 2011, 4 pgs.
Malham et al., "3-D Sound Spatialization using Ambisonic Techniques", Computer Music Journal, vol. 19, No. 4, 1995, pp. 58-70.
Noisternig et al., "3D Binaural Sound Reproduction using a Virtual Ambisonic Approach", VECIMS 2003—International Symposium on Virtual Environments, Human-Computer Interfaces, and Measurement Systems, Lugann, Switzerland, Jul. 27-29, 2003, pp. 174-178.
Pasqual et al., "A Comparative Study of Platonic Solid Loudspeakers as Directivity Controlled Sound Sources", Proceedings of the 2nd International Symposium on Ambisonics and Spherical Acoustics, Paris, France, May 6-7, 2010, 6 pgs.
Peng et al., "On the optimization of a mixed speaker array in an enclosed space using the virtual-speaker weighting method", Mechanical Systems and Signal Processing, vol. 102, Mar. 1, 2018, pp. 214-229.
Peters et al., "Towards a Spatial Sound Description Interchange Format (SpatDIF)", Canadian Acoustics, vol. 35, No. 3, Sep. 2007, pp. 64-65.
Poletti et al., "Sound-field reproduction systems using fixed-directivity loudspeakers", The Journal of the Acoustical Society of America, vol. 127, No. 6, Jun. 2010, pp. 3590-3601.
Pulkki, "Virtual Sound Source Positioning Using Vector Base Amplitude Panning", Journal of the Audio Engineering Society, vol. 45, No. 6, Jun. 1997, pp. 456-466.
Szoke et al., "Building and Evaluation of a Real Room Impulse Response Dataset", Journal of Selected Topics in Signal Processing, Nov. 2018, 14 pgs.
Trone, "Carbon Fiber Subwoofer Enclosure", Senior Project Paper, California Polytechnic State University, Industrial and Manufacturing Engineering Department, Dec. 2010, 44 pgs.
Yue et al., "3-D Ambisonics Experience for Virtual Reality", Stanford University, 2017, 7 pgs.
Zotter et al., "All-Round Ambisonic Panning and Decoding", Journal of the Audio Engineering Society, vol. 60, No. 13, Oct. 2012, pp. 807-820.
Zotter et al., "The Virtual T-Design Ambisonics-Rig Using VBAP", Proceedings of the 1st EAA—EuroRegio Congress on Sound and Vibration, Ljubljana, Slovenia, Sep. 15-18, 2010, 4 pgs.
International Search Report and Written Opinion for International Application No. PCT/US2022/079902, Search completed Aug. 30, 2023, Mailed Sep. 29, 2023, 15 Pgs.

* cited by examiner

UNLOCKED

LOCKED

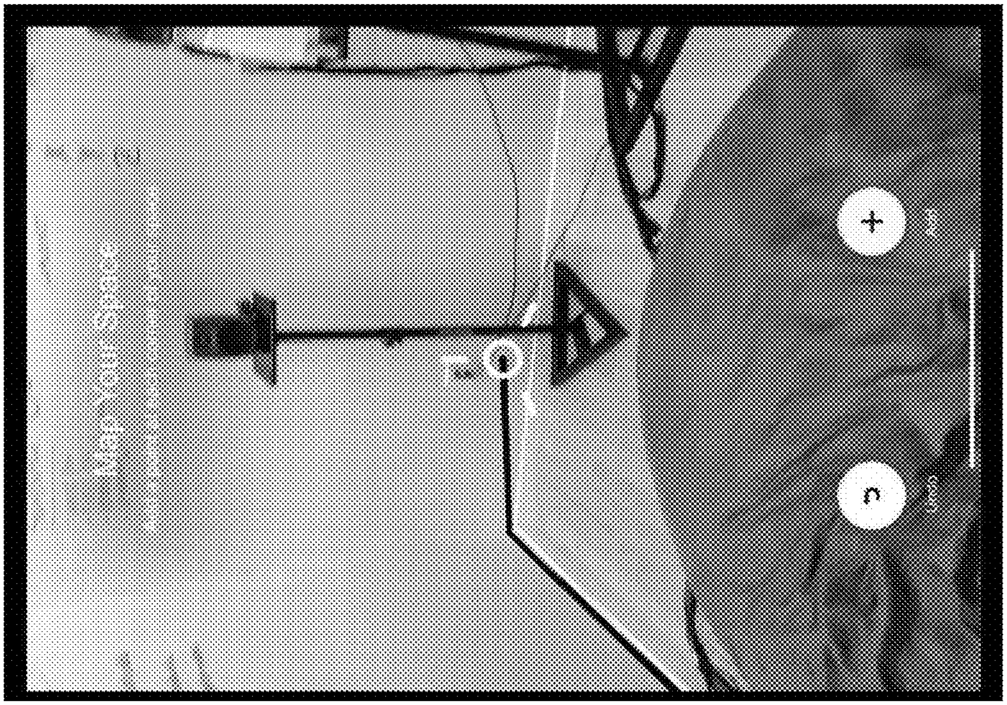
FIG. 41
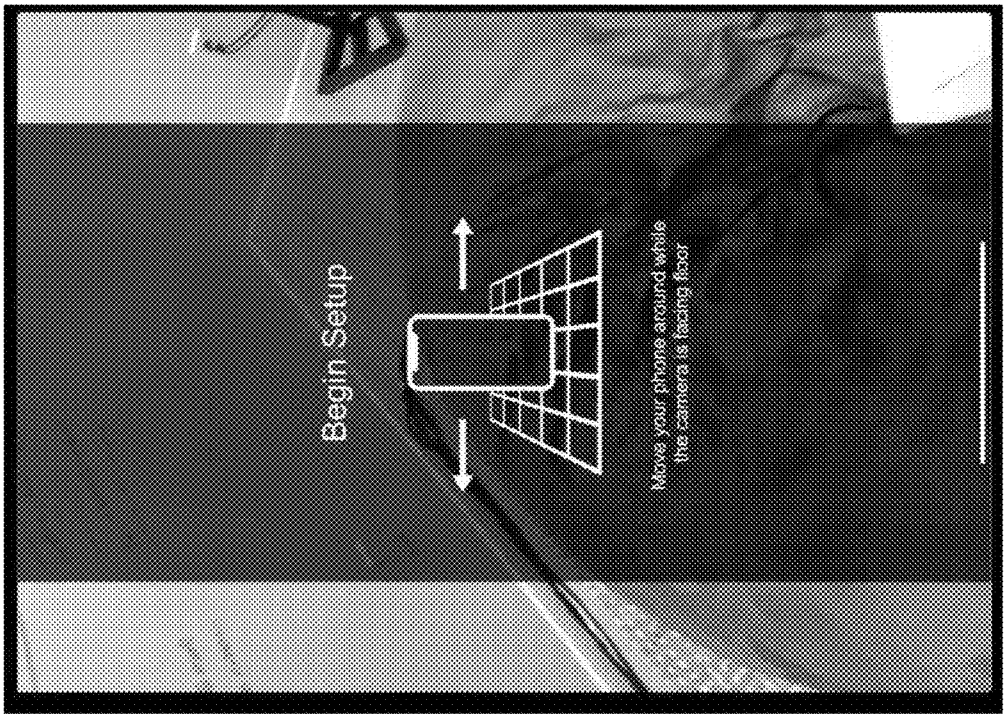

SYSTEMS AND METHODS FOR SPATIAL AUDIO RENDERING

CROSS-REFERENCE TO RELATED APPLICATIONS

The current application is a continuation of U.S. patent application Ser. No. 17/456,878 titled "Systems and Methods for Spatial Audio Rendering" filed Nov. 29, 2021, which is a continuation of U.S. patent application Ser. No. 17/003,957 titled "Systems and Methods for Spatial Audio Rendering" filed Aug. 26, 2020 and issued on Nov. 30, 2021 as U.S. Pat. No. 11,190,899, which is a continuation of U.S. patent application Ser. No. 16/839,021 titled "Systems and Methods for Spatial Audio Rendering" filed Apr. 2, 2020 and issued on Dec. 21, 2021 as U.S. Pat. No. 11,206,504, which claims the benefit of and priority under 35 U.S.C. § 119(e) to U.S. Provisional Patent Application No. 62/828,357 titled "System and Architecture for Spatial Audio Control and Reproduction" filed Apr. 2, 2019, U.S. Provisional Patent Application No. 62/878,696 titled "Method and Apparatus for Spatial Multimedia Source Management" filed Jul. 25, 2019, and U.S. Provisional Patent Application No. 62/935,034 titled "Systems and Methods for Spatial Audio Rendering" filed Nov. 13, 2019, the disclosures of which are hereby incorporated by reference in their entirety.

FIELD OF THE INVENTION

The present invention generally relates to spatial audio rendering techniques, namely systems and methods for rendering spatial audio using spatial audio reproduction techniques and/or modal beamforming speaker arrays.

BACKGROUND

Loudspeakers, colloquially "speakers," are devices that convert an electrical audio input signal or audio signal into a corresponding sound. Speakers are typically housed in an enclosure which may contain multiple speaker drivers. In this case, the enclosure containing multiple individual speaker drivers may itself be referred to as a speaker, and the individual speaker drivers inside can then be referred to as "drivers." Drivers that output high frequency audio are often referred to as "tweeters." Drivers that output mid-range frequency audio can be referred to as "mids" or "mid-range drivers." Drivers that output low frequency audio can be referred to as "woofers." When describing the frequency of sound, these three bands are commonly referred to as "highs," "mids," and "lows." In some cases, lows are also referred to as "bass."

Audio tracks are often mixed for a particular speaker arrangement. The most basic recordings are meant for reproduction on one speaker, a format which is now called "mono." Mono recordings have a single audio channel. Stereophonic audio, colloquially "stereo," is a method of sound reproduction that creates an illusion of multi-directional audible perspective by having a known, two speaker arrangement coupled with an audio signal recorded and encoded for stereo reproduction. Stereo encodings contain a left channel and right channel, and assume that the ideal listener is at a particular point equidistant from a left speaker and a right speaker. However, stereo provides a limited spatial effect because typically only two front firing speakers are used. Stereo using fewer or greater than two loudspeakers can result in suboptimal rendering due to either down mixing or up mixing artifacts respectively.

Immersive formats now exist that require a much larger number of speakers and associated audio channels to try and correct the limitations of stereo. These higher channel count formats are often referred to as "surround sound." There are many different speaker configurations associated with these formats such as, but not limited to, 5.1, 7.1, 7.1.4, 10.2, 11.1, and 22.2. However, a problem with these formats is that they require a large number of speakers to be configured correctly, and to be placed in prescribed locations. If the speakers are offset from their ideal locations, the audio rendering/reproduction can degrade significantly. In addition, systems that employ a large number of speakers often do not utilize all of the speakers when rendering channel-based surround sound audio encoded for fewer speakers.

SUMMARY OF THE INVENTION

Audio recording and reproduction technology has consistently striven for a higher fidelity experience. The ability to reproduce sound as if the listener were in the room with the musicians has been a key promise that the industry has attempted to fulfill. However, to date, the highest fidelity spatially accurate reproductions have come at the cost of large speaker arrays that must be arranged in a particular orientation with respect to the ideal listener location. Systems and methods described herein can ameliorate these problems and provide additional functionality by applying spatial audio reproduction principals to spatial audio rendering.

Systems and methods for rendering spatial audio in accordance with embodiments of the invention are illustrated. One embodiment includes a spatial audio system, including a primary network connected speaker, including a plurality of sets of drivers, where each set of drivers is oriented in a different direction, a processor system, memory containing an audio player application, wherein the audio player application configures the processor system to obtain an audio source stream from an audio source via the network interface, spatially encode the audio source, decode the spatially encoded audio source to obtain driver inputs for the individual drivers in the plurality of sets of drivers, where the driver inputs cause the drivers to generate directional audio.

In another embodiment, the primary network connected speaker includes three sets of drivers, where each set of drivers includes a mid-frequency driver and a tweeter.

In a further embodiment, the primary network connected speaker further includes three horns in a circular arrangement, where each horn is fed by a set of a mid-frequency driver and a tweeter.

In still another embodiment, the primary network connected speaker further includes a pair of opposing subwoofer drivers mounted perpendicular to the circular arrangement of the three horns.

In a still further embodiment, the driver inputs cause the drivers to generate directional audio using modal beamforming.

In yet another embodiment, the audio source is a channel-based audio source, and the audio player application configures the processor system to spatially encode the channel-based audio source by generating a plurality of spatial audio objects based upon the channel-based audio source, where each spatial audio object is assigned a location and has an associated audio signal, and encoding a spatial audio representation of the plurality of spatial audio objects.

In a yet further embodiment, the audio player application configures the processor system to decode the spatially encoded audio source to obtain driver inputs for the individual drivers in the plurality of sets of drivers by decoding the spatial audio representation of the plurality of spatial audio objects to obtain audio inputs for a plurality of virtual speakers, and decode the audio input for at least one of the plurality of virtual speakers to obtain driver inputs for the individual drivers in the plurality of sets of drivers.

In another additional embodiment, the audio player application configures the processor system to decode an audio input for at least one of the plurality of virtual speakers to obtain driver inputs for the individual drivers in the plurality of sets of drivers by encoding a spatial audio representation of at least one of the plurality of virtual speakers based upon the location of the primary network connected speaker, and decoding the spatial audio representation of at least one of the plurality of virtual speakers to obtain driver inputs for the individual drivers in the plurality of sets of drivers.

In a further additional embodiment, the audio player application configures the processor system to decode an audio input for at least one of the plurality of virtual speakers to obtain driver inputs for the individual drivers in the plurality of sets of drivers using a filter for each set of drivers.

In another embodiment again, the audio player application configures the processor system to decoding the spatial audio representation of the plurality of spatial audio objects to obtain audio inputs for a plurality of virtual speakers by decoding the spatial audio representation of the plurality of spatial audio objects to obtain a set of direct audio inputs for the plurality of virtual speakers, and decoding the spatial audio representation of the plurality of spatial audio objects to obtain a set of diffuse audio inputs for the plurality of virtual speakers.

In a further embodiment again, the plurality of virtual speakers includes at least 8 virtual speakers arranged in a ring.

In still yet another embodiment, the audio player application configures the processor system to spatially encode the audio source into at least one spatial representation selected from the group consisting of: a first order ambisonic representation; a higher order ambisonic representation; Vector Based Amplitude Panning (VBAP) representation; Distance Based Amplitude Panning (DBAP) representation; and K Nearest Neighbors Panning representation.

In a still yet further embodiment, each of the plurality of spatial audio objects corresponds to a channel of the channel-based audio source.

In still another additional embodiment, a number of spatial audio objects that is greater than the number of channels of the channel-based audio source is obtained using upmixing of the channel-based audio source.

In a still further additional embodiment, the plurality of spatial audio objects includes direct spatial audio objects and diffuse spatial audio objects.

In still another embodiment again, the audio player application configures the processor system to assign predetermined locations to the plurality of spatial audio objects based upon a layout determined by the number of channels of the channel-based audio source.

In a still further embodiment again, the audio player application configures the processor system to assign a location to a spatial audio object based upon user input.

In yet another additional embodiment, the audio player application configures the processor system to assign a location to a spatial audio object that changes over time programmatically.

In a yet further additional embodiment, the spatial audio system further includes at least one secondary network connected speaker, wherein the audio player application of the primary network connected speaker further configures the processor system to decode the spatially encoded audio source to obtain a set of audio streams for each of the at least one secondary network connected speakers based upon a layout of the primary and at least one secondary network connected speaker, and transmit the set of audio streams for each of the at least one secondary network connected speaker to each of the at least one secondary network connected speaker, and each of the at least one secondary network connected speaker includes a plurality of sets of drivers, where each set of drivers is oriented in a different direction, a processor system, memory containing a secondary audio player application, wherein the secondary audio player application configures the processor system to receive a set of audio streams from the primary network connected speaker, where the set of audio streams includes a separate audio stream for each of the plurality of sets of drivers, obtain driver inputs for the individual drivers in the plurality of sets of drivers based upon the received set of audio streams, where the driver inputs cause the drivers to generate directional audio.

In yet another embodiment again, each of the primary network connected speaker and the at least one secondary network connected speaker includes at least one microphone, and the audio player application of the primary network connected speaker further configures the processor system to determine the layout of the primary and at least one secondary network connected speaker using audio ranging.

In a yet further embodiment again, the primary network connected speaker and the at least one secondary speaker includes at least one of two network connected speakers arranged in a horizontal line, three network connected speakers arrange as a triangle on a horizontal plane, and three network connected speakers arrange as a triangle on a horizontal plane with a fourth network connected speaker positioned above the horizontal plane.

In another embodiment, a network connected speaker includes three horns in a circular arrangement, where each horn is fed by a set of a mid-frequency driver and a tweeter, at least one sub-woofer driver mounted perpendicular to the circular arrangement of the three horns, a processor system, memory containing an audio player application, a network interface, wherein the audio player application configures the processor system to obtain an audio source stream from an audio source via the network interface and generate driver inputs.

In a further embodiment, the at least one sub-woofer driver includes a pair of opposing sub-woofer drivers.

In still another embodiment, the sub-woofer drivers each include a diaphragm constructed from a material comprising a triaxial carbon fiber weaver.

In a still further embodiment, the driver inputs cause the drivers to generate directional audio using modal beamforming.

In another embodiment, a method of rendering spatial audio from an audio source includes receiving an audio source stream from an audio source at a processor configured by an audio player application, spatially encoding the audio source using the processor configured by the audio player application, and decoding the spatially encoded audio source to obtain driver inputs for individual drivers in a plurality of sets of drivers using at least the processor configured by the audio player application, where each of the plurality of sets of drivers is oriented in a different direction, and the driver inputs cause the drivers to generate directional audio, and rendering spatial audio using the plurality of sets of drivers.

In a further embodiment, several of the plurality of sets of drivers are contained within a primary network connected playback device that includes the processor configured by the audio player application, the remainder of the plurality of sets of drivers are contained within at least one secondary network connected playback device, and each of the at least one secondary network connected playback device is in network communication with the primary connected playback device.

In still another embodiment, decoding the spatially encoded audio source to obtain driver inputs for individual drivers in a plurality of sets of drivers further includes decoding the spatially encoded audio source to obtain driver inputs for individual drivers of the primary network connected playback device using the processor configured by the audio player application, decoding the spatially encoded audio source to obtain audio streams for each of the sets of drivers of each of the at least one secondary network connected playback device using the processor configured by the audio player application, transmitting the set of audio streams for each of the at least one secondary network connected speaker to each of the at least one secondary network connected speaker, and each of the at least one secondary network connected speaker generating driver inputs for its individual drivers based upon a received set of audio streams.

In a still further embodiment, the audio source is a channel-based audio source, and spatially encoding the audio source further includes generating a plurality of spatial audio objects based upon the channel-based audio source, where each spatial audio object is assigned a location and has an associated audio signal, and encoding a spatial audio representation of the plurality of spatial audio objects.

In yet another embodiment, decoding the spatially encoded audio source to obtain driver inputs for individual drivers in a plurality of sets of drivers further includes decoding the spatial audio representation of the plurality of spatial audio objects to obtain audio inputs for a plurality of virtual speakers, and decoding the audio inputs of the plurality of virtual speakers to obtain driver inputs for the individual drivers in the plurality of sets of drivers.

In a yet further embodiment, decoding the audio inputs of the plurality of virtual speakers to obtain driver inputs for the individual drivers in the plurality of sets of drivers further includes encoding a spatial audio representation of at least one of the plurality of virtual speakers based upon the location of the primary network connected speaker, and decoding the spatial audio representation of at least one of the plurality of virtual speakers to obtain driver inputs for the individual drivers in the plurality of sets of drivers.

In another additional embodiment, decoding the audio inputs of the plurality of virtual speakers to obtain driver inputs for the individual drivers in the plurality of sets of drivers further includes using a filter for each set of drivers.

In a further additional embodiment, decoding the spatial audio representation of the plurality of spatial audio objects to obtain audio inputs for a plurality of virtual speakers further includes decoding the spatial audio representation of the plurality of spatial audio objects to obtain a set of direct audio inputs for the plurality of virtual speakers, and decoding the spatial audio representation of the plurality of spatial audio objects to obtain a set of diffuse audio inputs for the plurality of virtual speakers.

In another embodiment again, the plurality of virtual speakers includes at least 8 virtual speakers arranged in a ring.

In a further embodiment again, spatially encoding the audio source includes spatially encoding the audio source into at least one spatial representation selected from the group consisting of a first order ambisonic representation, a higher order ambisonic representation, Vector Based Amplitude Panning (VBAP) representation, Distance Based Amplitude Panning (DBAP) representation, and K Nearest Neighbors Panning representation.

In another embodiment, a spatial audio system includes a primary network connected speaker configured to obtain an audio stream comprising at least one audio signal, obtain location data describing the physical location of the primary network connected speaker, transform the at least one audio signal into a spatial representation, transform the spatial representation based on a virtual speaker layout, generate a separate audio signal for each horn of the primary network connected speaker, and playback the separate audio signals corresponding to the horns of the primary network connected speaker using at least one driver for each horn.

In a further embodiment, the spatial audio system further includes at least one secondary network connected speaker, and the primary network connected speaker is further configured to obtain location data describing the physical location of the at least one secondary network connected speaker, generate a separate audio signal for each horn of the at least one secondary network connected speaker, and transmit the separate audio signals to the at least one secondary network connected speaker associated with the horn for each separate audio signal.

In still another embodiment, the primary network connected speaker is a super primary network connected speaker, and the super primary network connected speaker is further configured to transmit the audio stream to a second primary network connected speaker.

In a still further embodiment, the primary network connected speaker is capable of establishing a wireless network joinable by other network connected speakers.

In yet another embodiment, the primary network connected speaker is controllable by a control device.

In a yet further embodiment, the control device is a smart phone.

In another additional embodiment, the primary network connected speaker is capable of generating a mel spectrogram of the audio signal, and transmitting the mel spectrogram as metadata to a visualization device for use in visualizing the audio signal as a visualization helix.

In a further additional embodiment, the generated separate audio signals can be used to directly drive a driver.

In another embodiment again, the virtual speaker layout includes a ring of virtual speakers.

In a further embodiment again, the ring of virtual speakers includes at least eight virtual speakers.

In still yet another embodiment, virtual speakers in the virtual speaker layout are regularly spaced.

In another embodiment, a spatial audio system includes a first network connected speaker at a first location, and a second network connected speaker at a second location, where the first network connected speaker and the second network connected speaker are configured to synchronously render audio signals such that at least one sound object is rendered at a location different than the first location and the second location based on driver signals generated by the first modal beamforming speaker.

In a further embodiment, the spatial audio system further includes a third network connected speaker at a third location configured to synchronously render audio signals with the first and second network connected speakers.

In still another embodiment, the spatial audio system further includes a fourth network connected speaker at a fourth location configured to synchronously render audio signals with the first, second, and third network connected speakers, and the fourth location is at a higher altitude than the first, second, and third locations.

In a still further embodiment, the first, second, third and fourth locations are all within a room, and the fourth modal beamforming speaker is connected to a ceiling of the room.

In another embodiment, a spatial audio system includes a primary network connected speaker capable of obtaining an audio stream comprising at least one audio signal obtaining location data describing the physical location of the primary network connected speaker, transforming the at least one audio signal into a spatial representation, transforming the spatial representation based on a virtual speaker layout, generating a separate primary audio signal for each horn of the primary network connected speaker, generating a separate secondary audio signal for each horn of a plurality of secondary network connected speakers, transmitting each separate secondary audio signal to the secondary network connected speaker comprising the respective horn, and playing back the primary separate audio signals corresponding to the horns of the primary network connected speaker using at least one driver for each horn in a synchronized fashion with the plurality of secondary network connected speakers.

In another embodiment, a method of rendering spatial audio includes obtaining an audio signal encoded in a first format using a primary network connected speaker, transforming the audio signal into a spatial representation using the primary network connected speaker, generating a plurality of driver signals based on the spatial representation using the primary network connected speaker, where each driver signal corresponds to at least one driver coupled with a horn, and rendering spatial audio using the plurality of driver signals and the corresponding at least one driver.

In a further embodiment, the method further includes transmitting a portion of the plurality of driver signals to at least one secondary network connected speaker, and rendering the spatial audio using the primary network connected speaker and the at least one secondary network connected speaker in a synchronized fashion.

In still another embodiment, the method further includes generating a mel spectrogram of the audio signal, and transmitting the mel spectrogram as metadata to a visualization device for use in visualizing the audio signal as a visualization helix.

In a still further embodiment, the generating of the plurality of driver signals is based on a virtual speaker layout.

In yet another embodiment, the virtual speaker layout includes a ring of virtual speakers.

In a yet further embodiment, the ring of virtual speakers includes at least eight virtual speakers.

In another additional embodiment, virtual speakers in the virtual speaker layout are regularly spaced.

In a further additional embodiment, the primary network connected speaker is a super primary network connected speaker, and the method further includes transmitting the audio signal to a second primary network connected speaker, transforming the audio signal into a second spatial representation using the second primary network connected speaker, generating a second plurality of driver signals based on the second spatial representation using the second primary network connected speaker, where each driver signal corresponds to at least one driver coupled with a horn, and rendering spatial audio using the plurality of driver signals and the corresponding at least one driver.

In another embodiment again, the second spatial representation is identical to the first spatial representation.

In a further embodiment again, generating a plurality of driver signals based on the spatial representation further includes using a virtual speaker layout.

In still yet another embodiment, the virtual speaker layout includes a ring of virtual speakers.

In a still yet further embodiment, the ring of virtual speakers includes at least eight virtual speakers.

In still another additional embodiment, virtual speakers in the virtual speaker layout are regularly spaced.

In another embodiment, a network connected speaker includes a plurality of horns, where each of the three horns is fitted with a plurality of drivers, and a pair of opposing, coaxial woofers, where the three pluralities of drivers are capable of rendering spatial audio.

In a further embodiment, each plurality of drivers includes a tweeter and a mid.

In still another embodiment, the tweeter and mid are configured to be coaxial and to fire in the same direction.

In a still further embodiment, the tweeter is located over the mid relative to the center of the modal beamforming speaker.

In yet another embodiment, one of the pair of woofers includes a channel through the center of the woofer.

In a yet further embodiment, the woofers include diaphragms that are constructed from a triaxial carbon fiber weave.

In another additional embodiment, the plurality of horns are coplanar, and wherein a first woofer in the pair of woofers is configured to fire perpendicularly to the plane of horns in a positive direction, and a second woofer in the pair of woofers is configured to fire perpendicularly to the plane of horns in a negative direction.

In a further additional embodiment, the plurality of horns are configured in a ring.

In another embodiment again, the plurality of horns includes three horns.

In a further embodiment again, the plurality of horns are regularly spaced.

In still yet another embodiment, the horns form a single component.

In a still yet further embodiment, the plurality of horns forms a seal between two covers.

In still another additional embodiment, at least one back volume for the plurality of drivers is contained between the three horns.

In a still further additional embodiment, the network connected speaker further includes a stem configured to be connected to a stand.

In still another embodiment again, the stem and stand are configured to be connected using a bayonet locking system.

In a still further embodiment again, the stem includes a ring capable of providing playback control signals to the network connected speaker.

In yet another additional embodiment, the network connected speaker is configured to be hung from a ceiling.

In another embodiment, a horn array for a loudspeaker includes a unibody ring molded such that the ring forms a plurality of horns while maintaining radial symmetry.

In a further embodiment, the horn array is manufactured using 3-D printing.

In still another embodiment, the plurality of horns includes 3 horns offset at 120 degrees.

In another embodiment, an audio visualization method includes obtaining an audio signal, generating a mel spectrogram from the audio signal, plotting the mel spectrogram on a helix, such that the point on each turn of the helix offset by one pitch reflect the same musical note in their respective octave, and warping the helix structure based on amplitude such that the volume of each note is visualized by an outward bending of the helix.

In a further embodiment, the helix is visualized from a from above.

In still another embodiment, the helix is colored.

In a still further embodiment, each turn of the helix is colored using a range of colors which is repeated for each turn of the helix.

In yet another embodiment, the color saturation decreases for each turn of the helix.

In a yet further embodiment, the color transparency decreases for each turn of the helix.

In another additional embodiment, the helix structure leaves a trail towards the axis of the helix when warped.

In another embodiment, a method of constructing a network connected speaker includes constructing a plurality of outward facing horns in a ring, fitting a plurality of drivers to each outward facing horn, and fitting a coaxial pair of opposite facing woofers such that one woofer is above the ring and one woofer is below the ring.

In a further embodiment, constructing a plurality of outward facing horns in a ring further includes fabricating the plurality of outward facing horns as a single component.

In still another embodiment, the plurality of outward facing horns are constructed using additive manufacturing.

In a still further embodiment, the construction method further includes placing a rod through the center of a diaphragm of one of the woofers.

In yet another embodiment, a woofer is constructed with a double surround to accommodate a rod through the center of a diaphragm on the woofer.

In a yet further embodiment, each woofer includes a diaphragm made of a triaxial carbon fiber weave.

In another additional embodiment, the construction method further includes fitting a first cover over the top of the ring and fitting a second cover over the bottom of the ring such that the plurality of drivers are within a volume created by the ring, the first cover, and the second cover.

In a further additional embodiment, each horn is associated with a unique tweeter and a unique mid in the plurality of drivers.

In another embodiment again, the construction method further includes placing at least one microphone between each horn on the ring.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 41 illustrates an example UI for configuration operations in accordance with an embodiment of the invention.

DETAILED DESCRIPTION

Figure 1A:
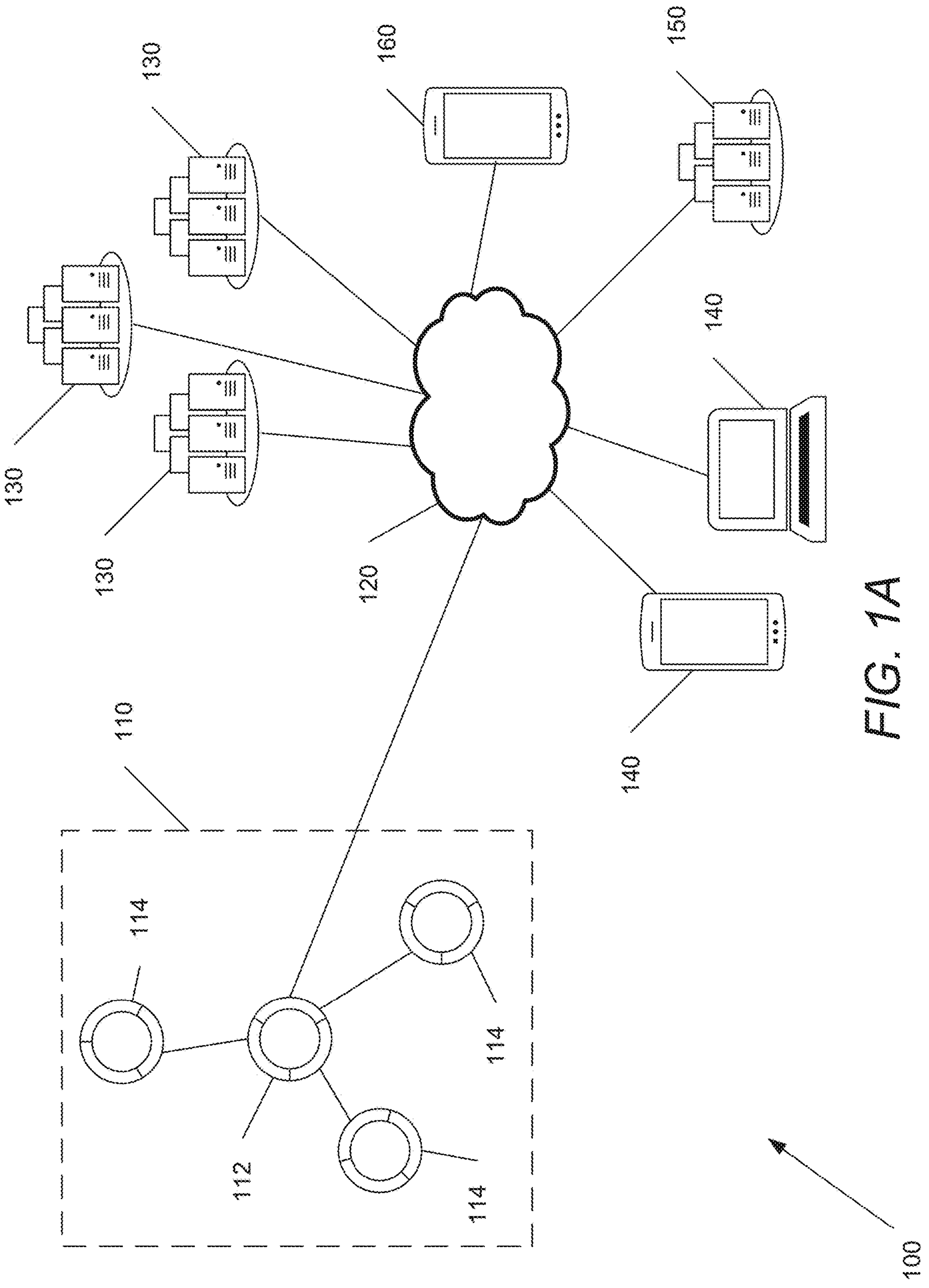
FIG. 1A is an example system diagram for a spatial audio system in accordance with an embodiment of the invention.

Turning now to the drawings, systems and methods for spatial audio rendering are illustrated. Spatial audio systems in accordance with many embodiments of the invention include one or more network connected speakers that can be referred to as "cells". In several embodiments, the spatial audio system is able to receive an arbitrary audio source as an input and render spatial audio in a manner determined based upon the specific number and placement of cells in a space. In this way, audio sources that are encoded assuming a specific number and/or placement of speakers (e.g. channel-based surround sound audio formats) can be re-encoded so that the audio reproduction is decoupled from speaker layout. The re-encoded audio can then be rendered in a manner that is specific to the particular number and layout of cells available to the spatial audio system to render the sound field. In a number of embodiments, the quality of the spatial audio is enhanced through the use of directional audio via active directivity control. In many embodiments, spatial audio systems employ cells that include arrays of drivers that enable the generation of directional audio using techniques including (but not limited to) modal beamforming. In this way, spatial audio systems that can render a variety of spatial audio formats can be constructed using only a single cell and enhanced (potentially due to the acquisition over time) with additional cells.

As noted above, a limitation of typical channel-based surround sound audio systems is the requirement for a specific number of speakers and prescribed placement of those speakers. Spatial audio reproduction techniques such as (but not limited to) ambisonic techniques, Vector Based Amplitude Panning (VBAP) techniques, Distance Based Amplitude Panning (DBAP) techniques, and k-Nearest-Neighbors panning (KNN panning) techniques were developed to provide a speaker-layout independent audio format that could address the limitations of channel based audio. The use of ambisonics as a sound field reproduction technique was initially described in Gerzon, M. A., 1973. Periphony: With-height sound reproduction. *Journal of the Audio Engineering Society,* 21(1), pp. 2-10. Ambisonics enable representation of sound fields using spherical harmonics. First order ambisonics refers to the representation of a sound field using first order spherical harmonics. The set of signals generated by a typical first-order ambisonic encoding are often referred to as "B-format" signals and include components labelled W for the sound pressure at a particular origin location, X for the front-minus-back sound pressure gradient, Y for the left-minus-right sound pressure gradient, and Z for the up-minus-down sound pressure gradient. A key feature of the B-format is that it is a speaker-independent representation of a sound field. Ambisonic encodings are characterized in that they reflect source directions in a manner that is independent of speaker placement.

Conventional spatial audio reproduction systems are generally limited by similar constraints as channel-based surround sound audio systems in that these spatial audio reproduction systems often require a large number of speakers with specific speaker placements. For example, rendering of spatial audio from an ambisonic representation of a sound field ideally involves the use of a group of loudspeakers arranged uniformly around the listener on a circle or on the surface of a sphere. When speakers are placed in this manner, an ambisonic decoder can generate audio input signals for each speaker that will recreate the desired sound field using a linear combination of the B-format signals.

Systems and methods in accordance with many embodiments of the invention enable the generation of sound fields using an arbitrary number and/or placement of cells by encoding one or more audio sources into a spatial audio representation such as (but not limited to) an ambisonic representation, a VBAP representation, a VBAP representation, a DBAP representation and/or a kNN panning representation. In several embodiments, the spatial audio system decodes an audio source in a manner that creates a number of spatial audio objects. Where the audio source is a channel-based audio source, each channel can be assigned to a spatial audio object that is placed by the spatial audio system in a desired surround sound speaker layout. When the audio source is a set of master recordings, then the spatial audio system can assign each track with a separate spatial audio object that can be placed in 3D space based upon a band performance layout template. In many embodiments, the user can modify the placement of the spatial audio objects through any of a number of user input modalities. Once the placement of the audio objects is determined, a spatial encoding (e.g. an ambisonic encoding) of the audio objects can be created.

In various embodiments, spatial audio systems employ a hierarchy of primary cells and secondary cells. In many embodiments, primary cells are responsible for generating spatial encodings and subsequently decoding the spatial audio into a separate stream (or set of streams) for secondary cells that it governs. To do this, primary cells can use an audio source to obtain a set of spatial audio objects and then can obtain a spatial representation of the audio object, and then decode the spatial representation of each audio object based upon a layout of cells. The primary cell can then re-encode the information based on the location and orientation of each secondary cell that it governs, and can unicast the encoded audio streams to their respective secondary cells. The secondary cells in turn can render their received audio stream to generate driver inputs.

In a number of embodiments, the spatial encodings are performed within a nested architecture involving encoding the spatial objects into ambisonic representations. In many embodiments, the spatial encodings performed within the nested architecture utilize higher order ambisonics (e.g. sound field representation), a VBAP representation, a DBAP representation and/or a kNN panning representation. As can readily be appreciated, any of a variety of spatial audio encoding techniques can be utilized within a nested architecture as appropriate to the requirements of specific applications in accordance with various embodiments of the invention. Furthermore, the specific manner in which spatial representations of audio objects are decoded to provide audio signals to individual cells can depend upon factors including (but not limited to) the number of audio objects, the number of virtual speakers (where the nested architecture utilizes virtual speakers) and/or the number of cells.

In several embodiments, the spatial audio system can determine the spatial relationships between the cells using a variety of ranging techniques including (but not limited to) acoustic ranging and visual mapping using a camera that is part of a user device that can communicate with the spatial audio system. In many embodiments, the cells include microphone arrays and can determine both orientation and spacing. Once the spatial relationship between the cells is known, spatial audio systems in accordance with a number of embodiments of the invention can utilize the cell layout to configure its nested encoding architecture. In numerous embodiments, cells can map their physical environment which can further be used in the encoding and/or decoding of spatial audio. For example, cells can generate room impulse responses to map their environment. For example, the room impulse responses could be used to find the distance to walls, floor, and/or ceiling as well as to identify and/or correct the acoustical problems created by the room. As can readily be appreciated, any of a variety of techniques can be utilized to generate room impulses responses and/or map environments for use in spatial audio rendering as appropriate to the requirements of specific applications in accordance with various embodiments of the invention.

As noted above, spatial audio systems can employ cells that utilize techniques including (but not limited to) modal beamforming to generate directional audio. In many embodiments, a primary cell can utilize information concerning the spatial relationships between itself and its governed secondary cells, to generate audio streams designed for playback on each specific cell. The primary cell can unicast a separate audio stream for each set of drivers of each secondary cell that it governs in order to coordinate spatial audio playback. As can be appreciated, the number of transmitted channels can be modified based on the number of drivers and horns of a cell (e.g. 3.1, 5, etc.). Given the spatial control of the audio, any number of different conventional surround sound speaker layouts (or indeed any arbitrary speaker layout) can be rendered using a number of cells that is significantly smaller than the number of conventional speakers that would be required to produce a similar sound field using conventional spatial audio rendering. Furthermore, upmixing and/or downmixing of channels of an audio source can be utilized to render a number of audio objects that may be different than the number of source channels.

In a variety of embodiments, cells can be utilized to provide the auditory sensation of being "immersed" in sound, for example, as if the user was at the focal point of a stereo audio system regardless of their location relative to the cells. In many embodiments, the sound field produced by the spatial audio system can be enhanced to spread sound energy more evenly within a space through the use of cells that are capable of rendering diffuse sound. In a number of embodiments, cells can generate diffuse audio by rendering directional audio in a way that controls the perceived ratio of direct to reverberant sound. As can readily be appreciated the specific manner in which spatial audio systems generate diffuse audio can be dependent upon the room acoustics of the space occupied by the spatial audio system and the requirements of a specific application.

In a number of embodiments, cells that can generate spatial audio include arrays of drivers. In many embodiments, an array of drivers is distributed around a horizontal ring. In several embodiments, the cell can also include additional drivers such as (but not limited to) two opposite facing woofers oriented on a vertical axis. In certain embodiments, a horizontal ring of drivers can include three sets of horizontally aligned drivers, where each set is includes a mid driver and a tweeter, referred to herein as a "halo." In several embodiments, each set of a mid driver and a tweeter feeds a horn and a circular horn arrangement can be used to enhance directionality. While the particular form of the horns can be subject to the particular drivers used, the horn structure is referred to herein as a "halo". In many embodiments, this driver arrangement in combination with the halo can enable audio beam steering using modal beamforming. As can readily be appreciated any of a variety of cells can be utilized within spatial audio systems in accordance with various embodiments of the invention including cells having different numbers and types of drivers, cells having different placement of drivers such as (but not limited to) a tetrahedral configuration of drivers, cells that are capable of both horizontal and vertical beamforming, and/or cells that are incapable of producing directional audio.

Indeed, many embodiments of the invention include cells that do not include a woofer, mid driver, and/or tweeter. In various embodiments, a smaller form factor cell can be packaged to fit into a lightbulb socket. In numerous embodiments, larger cells with multiple halos can be constructed. Primary cells can negotiate generating audio streams for secondary cells that have different acoustic properties and/or driver/horn configurations. For example, a larger cell with two halos may need 6 channels of audio.

In addition, spatial audio systems in accordance with various embodiments of the invention can be implemented in any of a variety of environments including (but not limited to) indoor spaces, outdoor spaces, and the interior of vehicles such as (but not limited to) passenger automobiles. In several embodiments, the spatial audio system can be utilized as a composition tool and/or a performance instrument. As can readily be appreciated, the construction, placement, and/or use of spatial audio systems in accordance with many embodiments of the invention can be determined based upon the requirements of a specific application.

In order to do away with cumbersome wiring requirements, in numerous embodiments, cells are capable of wireless communication with other cells in order to coordinate rendering of sound fields. While media can be obtained from local sources, in a variety of embodiments, cells are capable of connecting to networks to obtain media content and other relevant data. In many embodiments, a network connected source input device can be used to directly connect to devices that provide media content for playback. Further, cells can create their own networks to reduce traffic-based latency during communication. In order to establish a network, cells can establish a hierarchy amongst themselves in order to streamline communication and processing tasks.

When a spatial audio system includes a single cell that can generate directional audio, the encoding and decoding processes associated with the nested architecture of the spatial audio system that produce audio inputs for the cell's drivers can be performed by the processing system of the single cell. When a spatial audio system utilizes multiple cells to produce a sound field, the processing associated with decoding one or more audio sources, spatially encoding the decoded audio source(s), and decoding the spatial audio and re-encoding it for each cell in an area is typically handled by a primary cell. The primary cell can then unicast the individual audio signals to each governed secondary cell. In a number of embodiments, a cell can act as a super primary cell coordinating synchronized playback of audio sources by multiple sets of cells that each include a primary cell.

However, in some embodiments, the primary cell provides audio signals for virtual speakers to governed secondary cells and spatial layout metadata to one or more secondary cells. In several embodiments, the spatial layout metadata can include information including (but not limited to) spatial relationships between cells, spatial relationships between cells and one or more audio objects, spatial relationships between one or more cells and one or more virtual speaker locations, and/or information regarding room acoustics. As can readily be appreciated, the specific spatial layout metadata provided by the primary cell is largely determined by the requirements of specific spatial audio system implementations. The processing system of a secondary cell can use the received audio signals and the spatial layout metadata to produce audio inputs for the secondary cell's drivers.

In many embodiments, rendering of sound fields by spatial audio systems can be controlled using any of a number of different input modalities including touch interfaces on individual cells, voice commands detected by one or more microphones incorporated within a cell and/or another device configured to communicate with the spatial audio system, and/or application software executing on a mobile device, personal computer, and/or other form of consumer electronic device. In many embodiments, the user interfaces enable selection of audio sources and identification of cells utilized to render a sound field from the selected audio source(s). User interfaces provided by spatial audio systems in accordance with many embodiments of the invention can also enable a user to control placement of spatial audio objects. For example, a user interface can be provided on a mobile device that enables the user to place audio channels from a channel-based surround sound audio source within a space. In another example, the user interface may enable placement of audio objects corresponding to different musicians and/or instruments within a space.

The ability of spatial audio systems in accordance with many embodiments of the invention to enable audio objects to be moved within a space enables the spatial audio system to render a sound field in a manner that tracks a user. By way of example, audio can be rendered in a manner that tracks the head pose of a user wearing a virtual reality, mixed reality, or augmented reality headset. In addition, spatial audio can be rendered in a manner that tracks the orientation of a tablet computer being used to view video content. In many embodiments, movement of spatial audio objects is achieved by panning a spatial representation of the audio source generated by the spatial audio system in a manner that is dependent upon a tracked user/object. As can readily be appreciated, the simplicity with which a spatial audio system can move audio objects can enable a host of immersive audio experiences for users. Indeed, audio objects can further be associated with visualizations that directly reflect the audio signal. Further, audio objects can be placed in a virtual "sound space" and assigned characters, objects, or intelligence to create an interactive scene that gets rendered as a sound field. Primary cells can process audio signals to provide metadata for use in visualization to a device used to provide the visualization.

While many features of spatial audio systems and the cells that can be utilized to implement them are introduced above, the following discussion provides an in-depth exploration of manner in which spatial audio systems can be implemented and the processes they can utilize to render sound fields from a variety of audio sources using an arbitrary number and placement of cells. Much of the discussion that follows references the use of ambisonic representations of audio objects in the generation of sound fields by spatial audio systems. However, spatial audio systems should be understood as not being limited to use of ambisonic representations. Ambisonic representations are described simply as an example of a spatial audio representation that can be utilized within a spatial audio system in accordance with many embodiments of the invention. It should be appreciated that any of a variety of spatial audio representations can be utilized in the generation of sound fields using spatial audio systems implemented in accordance with various embodiments of the invention including (but not limited to) VBAP representations, DBAP representations, and/or higher ambisonic representations (e.g. sound field representations).

Section 1: Spatial Audio Systems

Spatial audio systems are systems that utilize arrangements of one or more cells to render spatial audio for a given space. Cells can be placed in any of a variety of arbitrary arrangements in any number of different spaces, including (but not limited to) indoor and outdoor spaces. While some cell arrangements are more advantageous than others, spatial audio systems described herein can function with high fidelity despite imperfect cell placement. In addition, spatial audio systems in accordance with many embodiments of the invention can render spatial audio using a particular cell arrangement despite the fact that the number and/or placement of cells may not correspond with assumptions concerning the number and placement of speakers utilized in the encoding of the original audio source. In many embodiments, cells can map their surroundings and/or determine their relative positions to each other in order to configure their playback to accommodate for imperfect placement. In numerous embodiments, cells can communicate wirelessly, and, in many embodiments, create their own ad hoc wireless networks. In various embodiments, cells can connect to external systems to acquire audio for playback. Connections to external systems can also be used for any number of alternative functions, including, but not limited to, controlling internet of things (IoT) devices, access digital assistants, playback control devices, and/or any other functionality as appropriate to the requirements of specific applications in accordance with various embodiments of the invention.

Figure 1B:
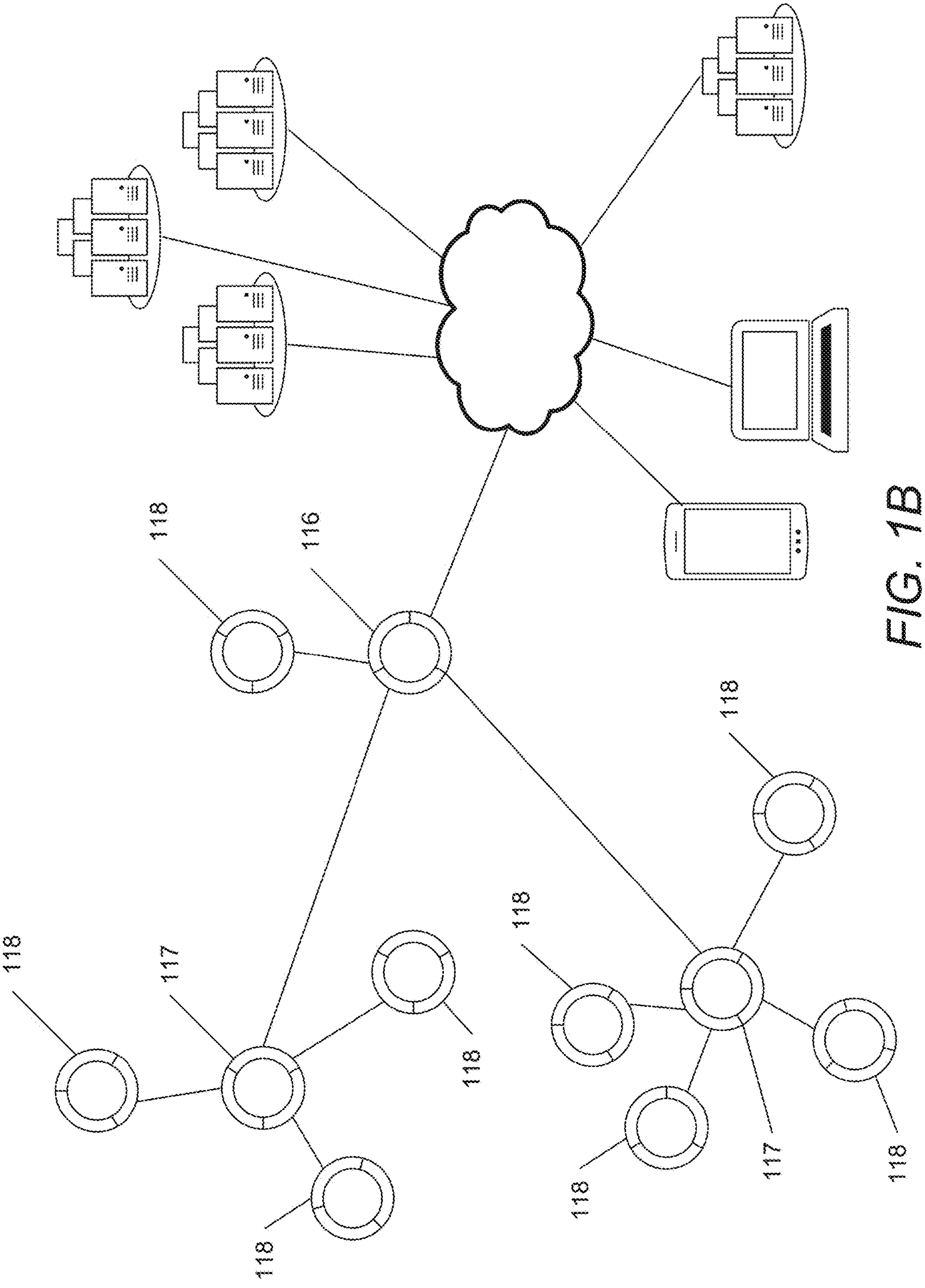
FIG. 1B is an example system diagram for a spatial audio system in accordance with an embodiment of the invention.

An example spatial audio system in accordance with an embodiment of the invention is illustrated in FIG. 1A. Spatial audio system 100 includes a set of cells 110. The set of cells in the illustrated embodiment includes a primary cell 112, and secondary cells 114. However, in many embodiments, the number of "primary" and "secondary" cells is dynamic and depends on the current number of cells added to the system and/or the manner in which the user has configured the spatial audio system. In many embodiments, a primary cell connects to a network 120 to connect to other devices. In numerous embodiments, the network is the internet, and the connection is facilitated via a router. In some embodiments, a cell contains a router and the capability to directly connect to the internet via a wired and/or wireless port. Primary cells can create ad hoc wireless networks to connect to other cells in order to reduce the overall amount of traffic being passed through a router and/or over the network 120. In some embodiments, when a large number of cells are connected to the system, a "super primary" cell can be designated which coordinates operation of a number of primary cells and/or handles the traffic over the network 120. In many embodiments, the super primary cell can disseminate information via its own ad hoc network to various primary cells, which then in turn disseminate relevant information to secondary cells. The network over which a primary cell communicates with a secondary cell can be the same and/or a different ad hoc network as the one established by a super primary cell. An example system utilizing a super primary cell 116 in accordance with an embodiment of the invention is illustrated in FIG. 1B. The super primary cell communicates with primary cells 117 which in turn govern their respective secondary cells 118. Note that super primary cells can govern their own secondary cells. However, in some embodiments, cells may be located too far apart to establish an ad hoc network, but may be able to connect to existing network 120 via alternate means. In this situation, primary cells and/or super primary cells may communicate directly via the network 120. It should be appreciated that a super primary cell can act as a primary cell with respect to a particular subset of cells within a spatial audio system.

Referring again to FIG. 1A, the network 120 can be any form of network, as noted above, including, but not limited to, the internet, a local area network, a wide area network, and/or any other type of network as appropriate to the requirements of specific applications in accordance with various embodiments of the invention. Furthermore, the network can be made of more than one network type utilizing wired connections, wireless connections, or a combination thereof. Similarly, the ad hoc network established by the cells can be any type of wired and/or wireless network, or any combination thereof. Communication between cells can be established using any number of wireless communication methodologies including, but not limited to, wireless local area networking technologies (WLAN), e.g. WiFi, Ethernet, Bluetooth, LTE, 5G NR, and/or any other wireless communication technology as appropriate to the requirements of specific applications in accordance with various embodiments of the invention.

The set of cells can obtain media data from media servers 130 via the network. In numerous embodiments, the media servers are controlled by 3<sup>rd</sup> parties that provide media streaming services such as, but not limited to: Netflix, Inc. of Los Gatos, California; Spotify Technology S.A. of Stockholm, Sweden; Apple Inc. of Cupertino, California; Hulu, LLC of Los Angeles, California; and/or any other media streaming service provider as appropriate to the requirements of specific applications in accordance with various embodiments of the invention. In numerous embodiments, cells can obtain media data from local media devices 140, including, but not limited to, cellphones, televisions, computers, tablets, network attached storage (NAS) devices and/or any other device capable of media output. Media can be obtained from media devices via the network, or, in numerous embodiments, be directly obtained by a cell via a direct connection. The direct connection can be a wired connection through an input/output (I/O) interface, and/or wirelessly using any of a number of wireless communication technologies.

The illustrated spatial audio system 100 can also (but does not necessarily need to) include a cell control server 150. In many embodiments, connections between media servers of various music services and cells within a spatial audio system are handled by individual cells. In several embodiments, cell control servers can assist with establishing connections between cells and media servers. For example, cell control servers may assist with authentication of user accounts with various 3<sup>rd</sup> party services providers. In a variety of embodiments, cells can offload processing of certain data to the cell control server. For example, mapping a room based on acoustic ranging may be sped up by providing the data to a cell control server which can in turn provide back to the cells a map of the room and/or other acoustic model information including (but not limited to) a virtual speaker layout. In numerous embodiments, cell control servers are used to remotely control cells, such as, but not limited to, directing cells to playback a particular piece of media content, changing volume, changing which cells are currently being utilized to playback a particular piece of media content, and/or changing the location of spatial audio objects in the area. However, cell control servers can perform any number of different control tasks that modify cell operation as appropriate to the requirements of specific applications in accordance with various embodiments of the invention. The manner in which different types of user interfaces can be provided for spatial audio systems in accordance with various embodiments of the invention are discussed further below.

In many embodiments, the spatial audio system 100 further includes a cell control device 160. Cell control devices can be any device capable of directly or indirectly controlling cells, including, but not limited to, cellphones, televisions, computers, tablets, and/or any other computing device as appropriate to the requirements of specific applications in accordance with various embodiments of the invention. In numerous embodiments, cell control devices can send commands to a cell control server which in turn sends the commands to the cells. For example, a mobile phone can communicate with a cell control server by connecting to the internet via a cellular network. The cell control server can authenticate a software application executing on the mobile phone. In addition, the cell control server can establish a secure connection to a set of cells which it can pass instructions to from the mobile phone. In this way, secure remote control of cells is possible. However, in numerous embodiments, the cell control device can directly connect to the cell via either the network, the ad hoc network, or via a direct peer-to-peer connection with a cell in order to provide instructions. In many embodiments, cell control devices can also operate as media devices. However, it is important to note that a control server is not a necessary component of a spatial audio system. In numerous embodiments, cells can manage their own control by directly receiving comments (e.g. through physical input on a cell, or via a networked device) and propagate those commands to other cells.

Figure 1C:
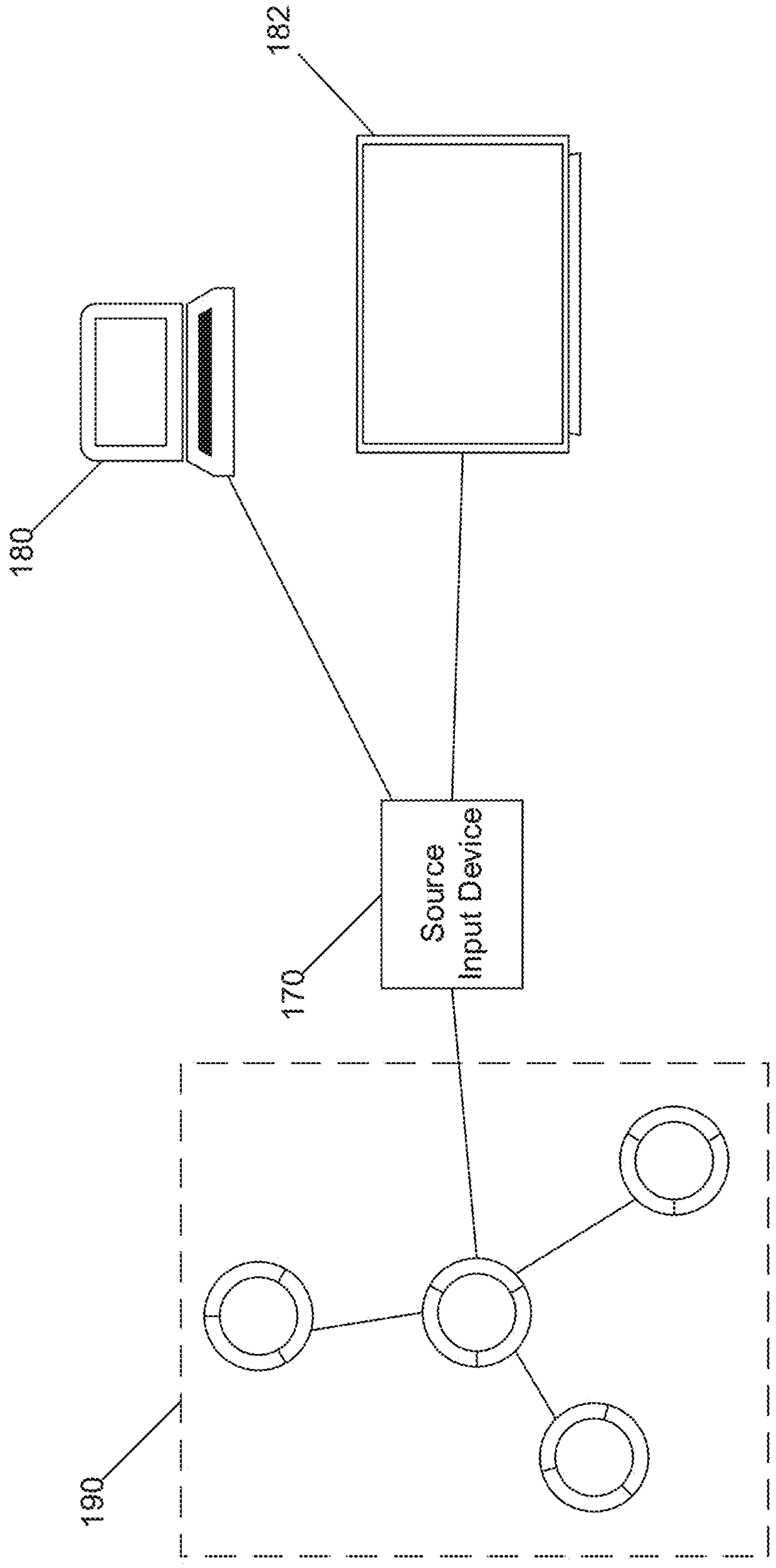
FIG. 1C is an example system diagram for a spatial audio system including a source input device in accordance with an embodiment of the invention.

Further, in numerous embodiments, network connected source input devices can be included in spatial audio systems to collect and coordinate media inputs. For example, a source input device may connect to a television, a computer, a media server, or any number of media devices. In numerous embodiments, source input devices have wired connections to these media devices to reduce lag. A spatial audio system that includes a source input device in accordance with an embodiment of the invention is illustrated in FIG. 1C. The source input device 170 gathers audio data and any other relevant metadata from media devices like a computer 180 and/or a television 182, and unicasts the audio data and relevant metadata to a primary in a cluster of cells 190. However, it is important to note that source input devices can also act as a primary or super primary cell in some configurations. Further, any number of different devices can connect to source input devices, and they are not restricted to communicating with only one cluster of cells. In fact, source input devices can connect to any number of different cells as appropriate to the requirements of specific applications of embodiments of the invention.

While particular spatial audio systems are described above with respect to FIGS. 1A and 1B, any number of different spatial audio system configurations can be utilized including (but not limited to) configurations without connections to third party media servers, configurations that utilize different types of network communications, configurations in which a spatial audio system only utilizes cells and control devices with a local connection (e.g. not connected to the internet), and/or any other type of configuration as appropriate to the requirements of specific applications in accordance with various embodiments of the invention. A number of different spatial layouts of sets of cells are discussed below. As can readily be appreciated, a feature of systems and methods in accordance with various embodiments of the invention is that they are not limited to specific spatial layouts of cells. Accordingly, the specific spatial layouts described below are provided simply to illustrative the flexible manner in which spatial audio systems in accordance with many embodiments of the invention can render a given spatial audio source in a manner appropriate to the specific number and layout of cells that a user has placed within a space.

Section 2: Cell Spatial Layouts

An advantage of cells over conventional speaker arrangements is their ability to form a spatial audio system that can render spatial audio in a manner that accommodates the specific number and placement of the cells within the space. In many embodiments, cells can locate each other and/or map their surroundings in order to determine an appropriate method for reproducing spatial audio. In some embodiments, cells can generate suggested alternative arrangements via user interfaces that could improve the perceived quality of rendered sound fields. For example, a user interface rendered on a mobile phone could provide feedback regarding placement and/or orientation of cells within a particular space. As the number of cells increases, in general the spatial resolution capable of reproduction by the cells increases. However, depending on the space, a threshold may be met where any additional cell will not, or only slightly increase, the spatial resolution.

Many different layouts are possible, and cells can adapt to any number of different configurations. A variety of different example layouts are discussed below. Following the discussion of the different layouts and the experiences they yield, a discussion of the manner in which sound fields can be created using cells is found below in Section 3.

Figure 2A:
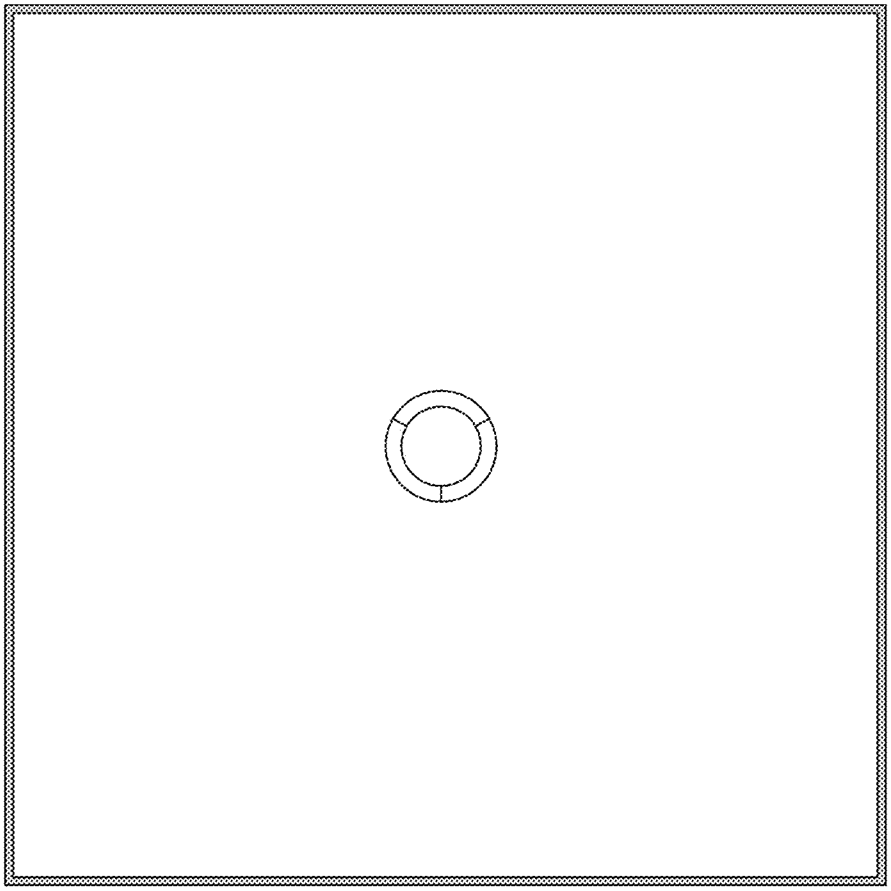
FIG. 2A is an example room layout for a spatial audio system in accordance with an embodiment of the invention.
Figure 2B:
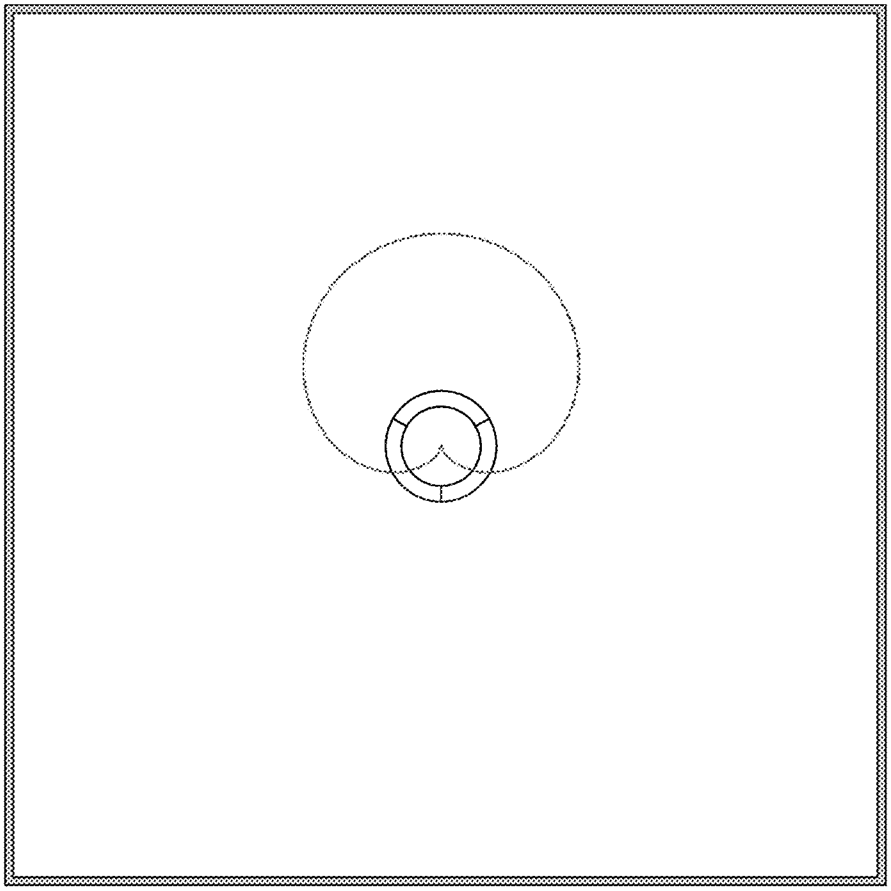
FIGS. 2B-2F illustrate exemplary first order ambisonics around a cell in the example room layout of FIG. 2A in accordance with an embodiment of the invention.
Figure 2C:
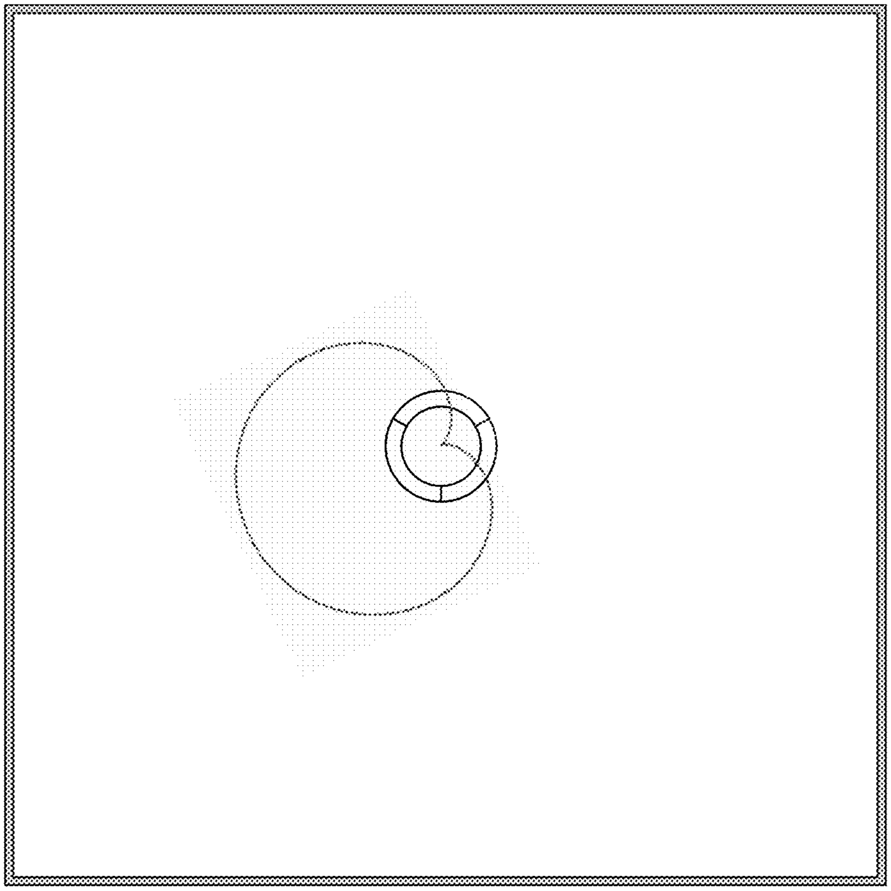
Figure 2D:
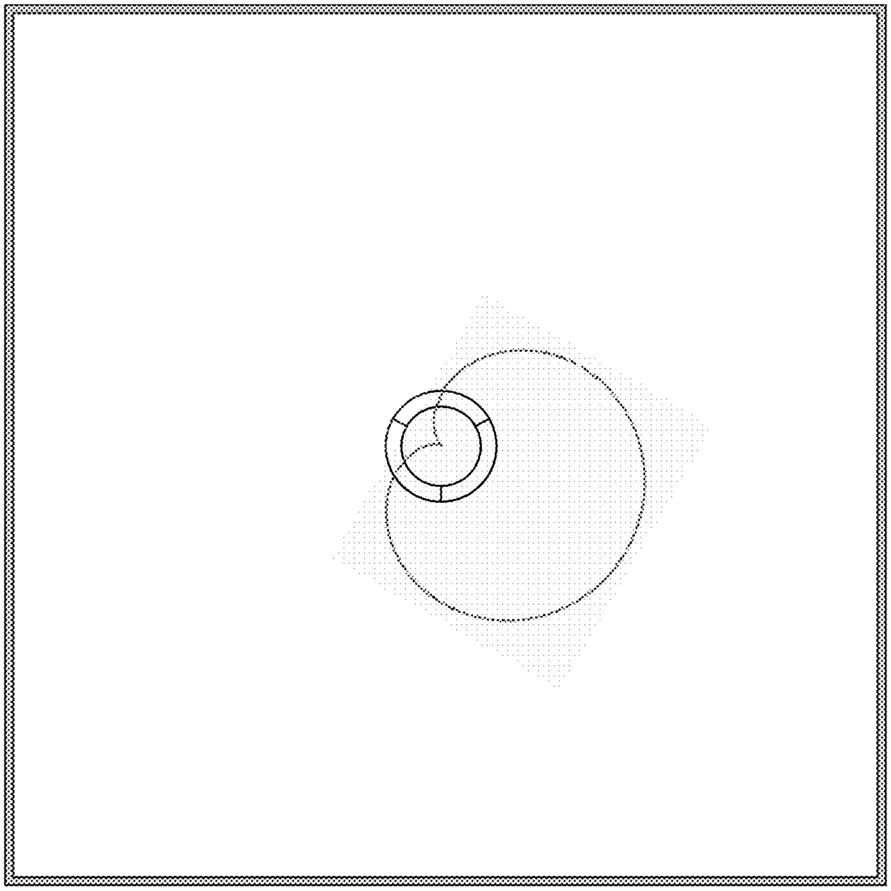
Figure 2E:
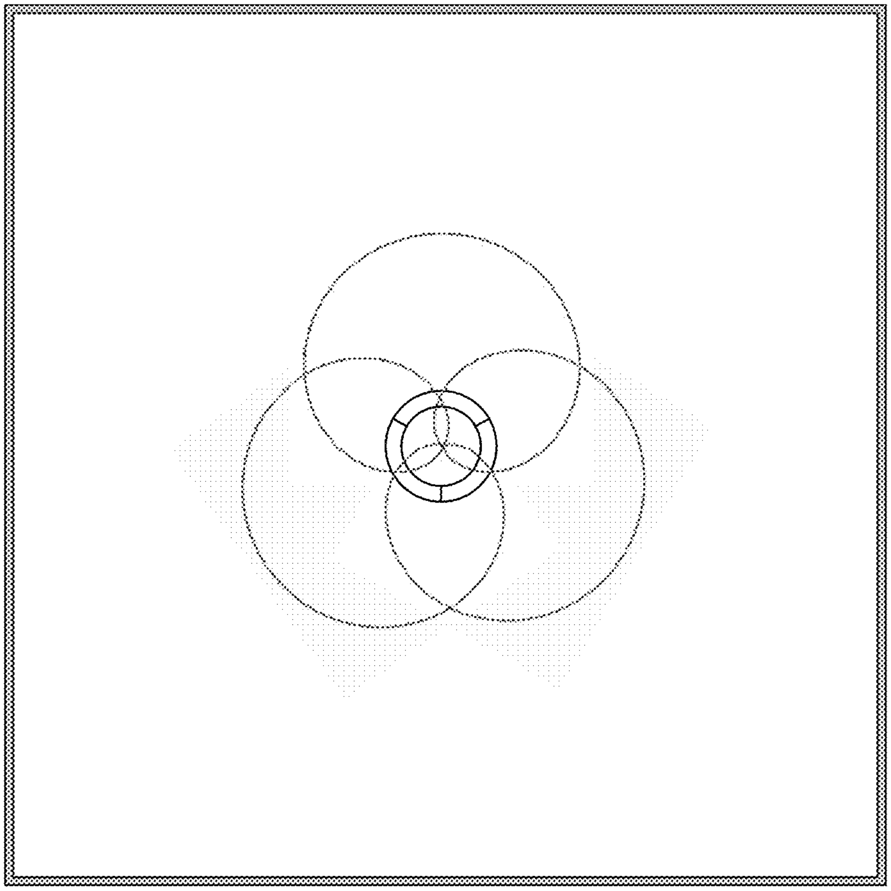
Figure 2F:
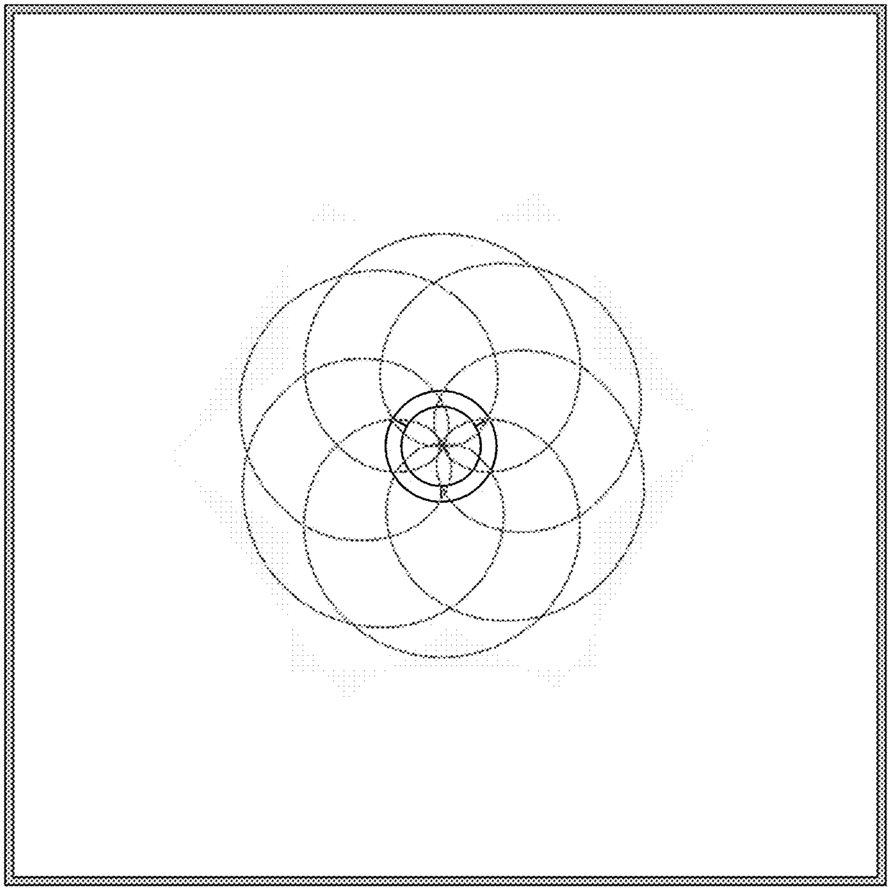
Figure 2G:
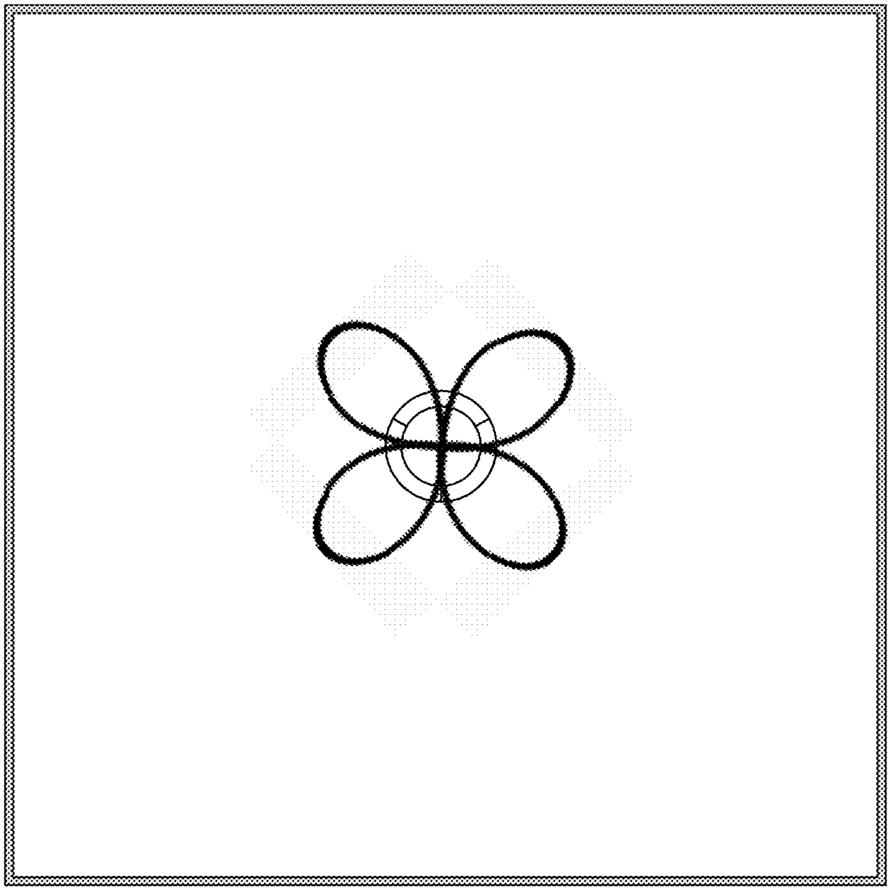
FIG. 2G illustrate exemplary second order ambisonics around a cell in the example room layout of FIG. 2A in accordance with an embodiment of the invention.

Turning now to FIG. 2A, a single cell capable of generating directional audio using modal beamforming is shown in the center of a room in accordance with an embodiment of the invention. In many embodiments, a single cell can be placed in locations including (but not limited to) resting on the floor, resting on a counter, mounted on a stand or suspended from the ceiling. FIGS. 2B, 2C, and 2D represent a first order cardioid generated by an array of drivers positioned around the cell using modal beamforming techniques. While first order cardioids are illustrated, cells in accordance with many embodiments of the invention can also generate alternative directivity patterns including (but not limited to) supercardioids and hypercardioids. A single cell alone is capable of generating directional audio with the single cell as the origin similar to an array of conventional speakers that are capable of performing modal beamforming and can also control perceived ratios of direct and reverberant audio by producing multiple beams in a manner that is dependent upon the acoustic environment as illustrated in accordance with an embodiment of the invention in FIG. 2E. The cell can map acoustic reflections based on the walls, floor, ceiling and/or objects in the room, and modify its driver inputs to create diffuse sound. Cardioids reflecting the manner in which a cell that includes a halo having three horns in accordance with an embodiment of the invention can steer the directivity pattern produced by the cell is illustrated in FIG. 2F. One of a number of higher order directivity patterns that can also be produced by the cell is illustrated in FIG. 2G.

As can readily be appreciated, cells are not limited to any particular configuration of drivers and the directivity patterns that can be generated by a cell are not limited to those described herein. For example, while cardioids are shown in the above referenced figures, supercardioids or hypercardioids can be used in addition or as a replacement for cardioids based on horn and/or driver arrangement. Supercardioids have a null near ±120° which can reduce attenuation at horns arranged at ±120° as can be found in many halos. Similarly, hypercardioids also have a null at ±120° that can provide even better directivity at the cost of a larger side lobe at 180°. As can be readily appreciated, different ambisonics, including mixed ambisonics, can be used depending on horn and/or driver arrangement as appropriate to the requirements of specific applications of embodiments of the invention. In addition, drivers can produce directional audio using any of a variety of directional audio production techniques.

Figure 3A:
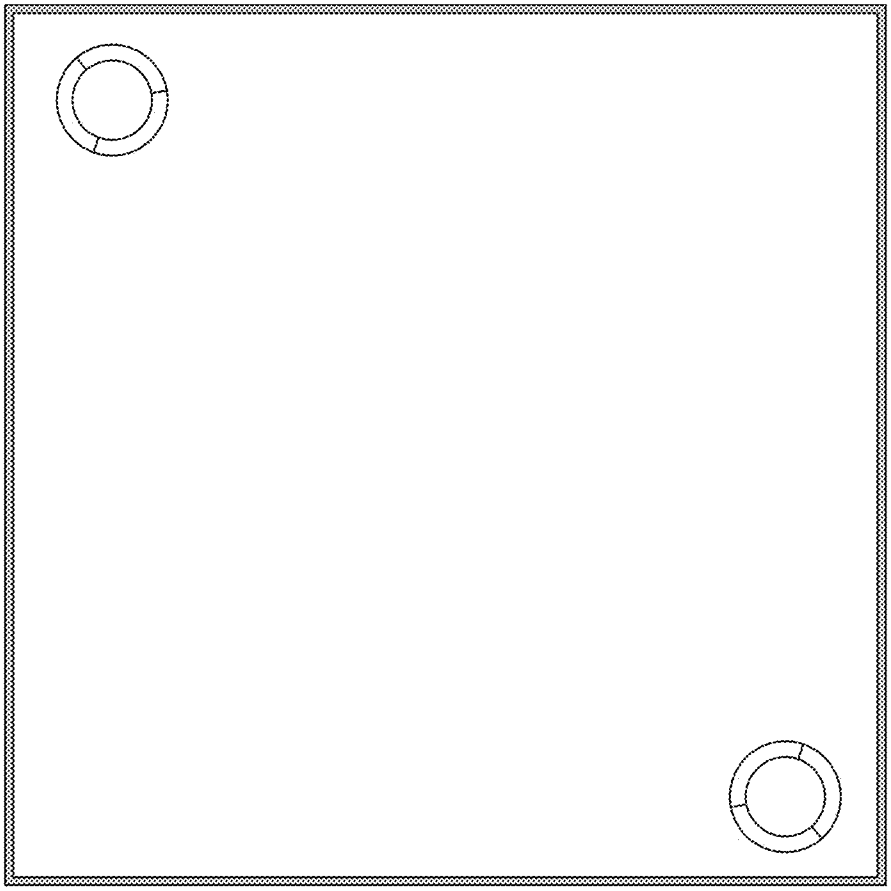
FIG. 3A illustrates an example room layout for a spatial audio system in accordance with an embodiment of the invention.
Figure 3B:
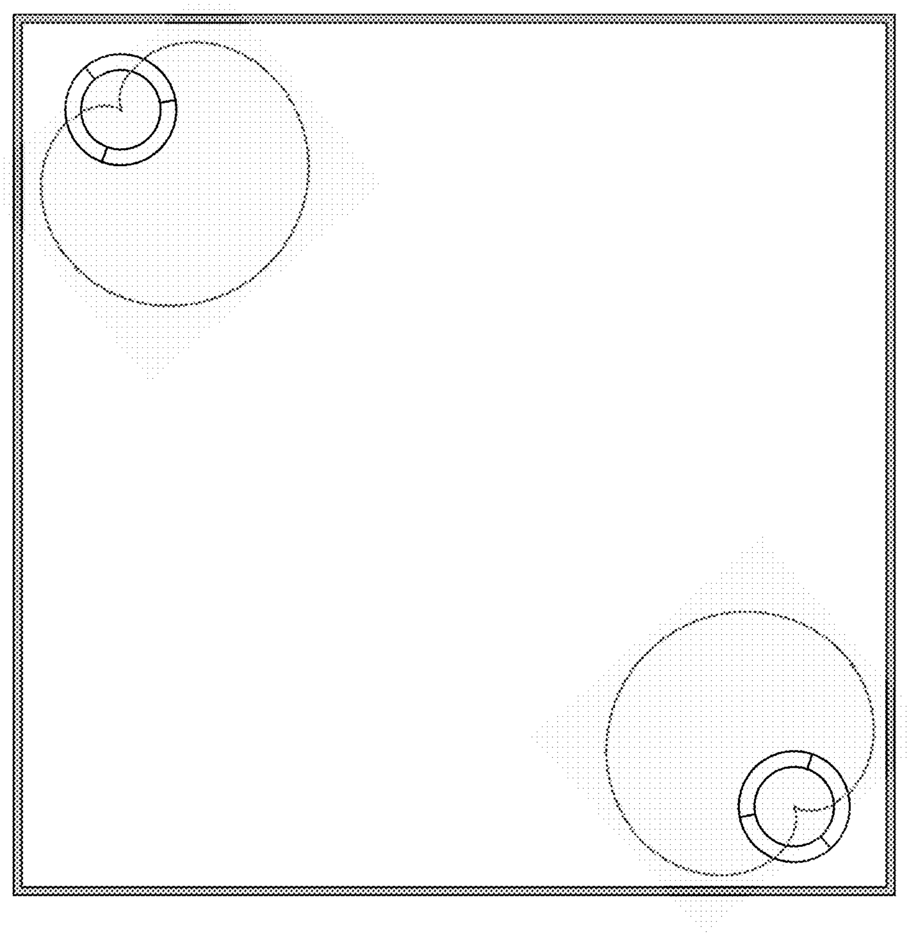
FIG. 3B illustrates exemplary first order ambisonics around the cells in the example room layout of FIG. 3A in accordance with an embodiment of the invention.
Figure 4A:
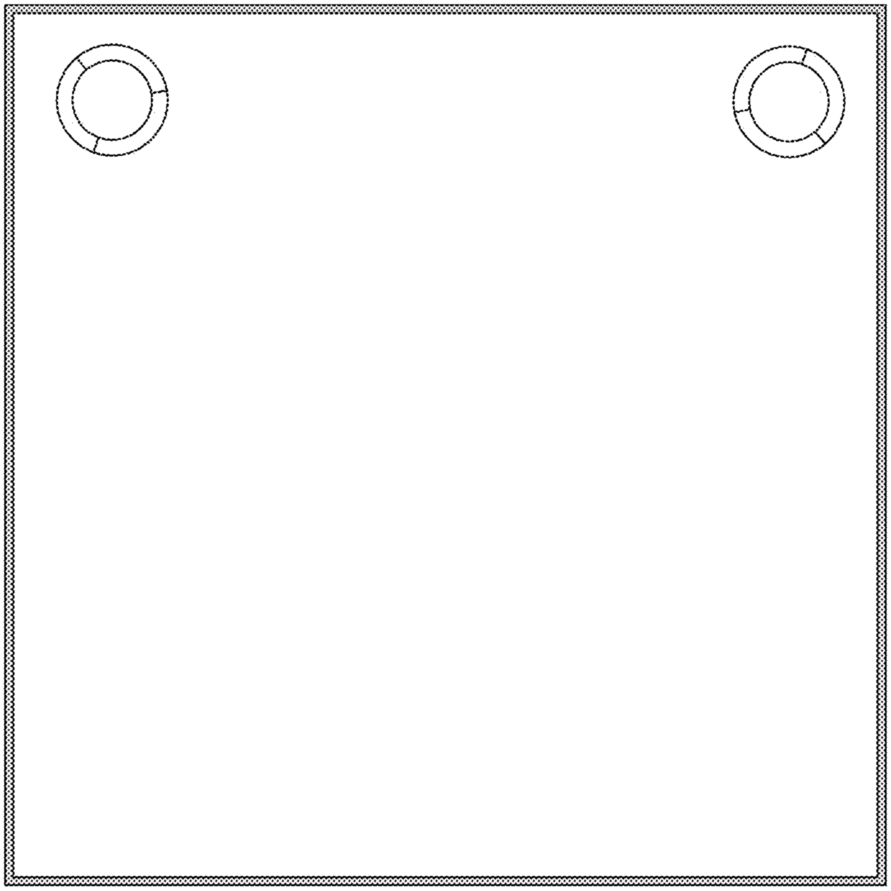
FIG. 4A illustrates an example room layout for a spatial audio system in accordance with an embodiment of the invention.
Figure 4B:
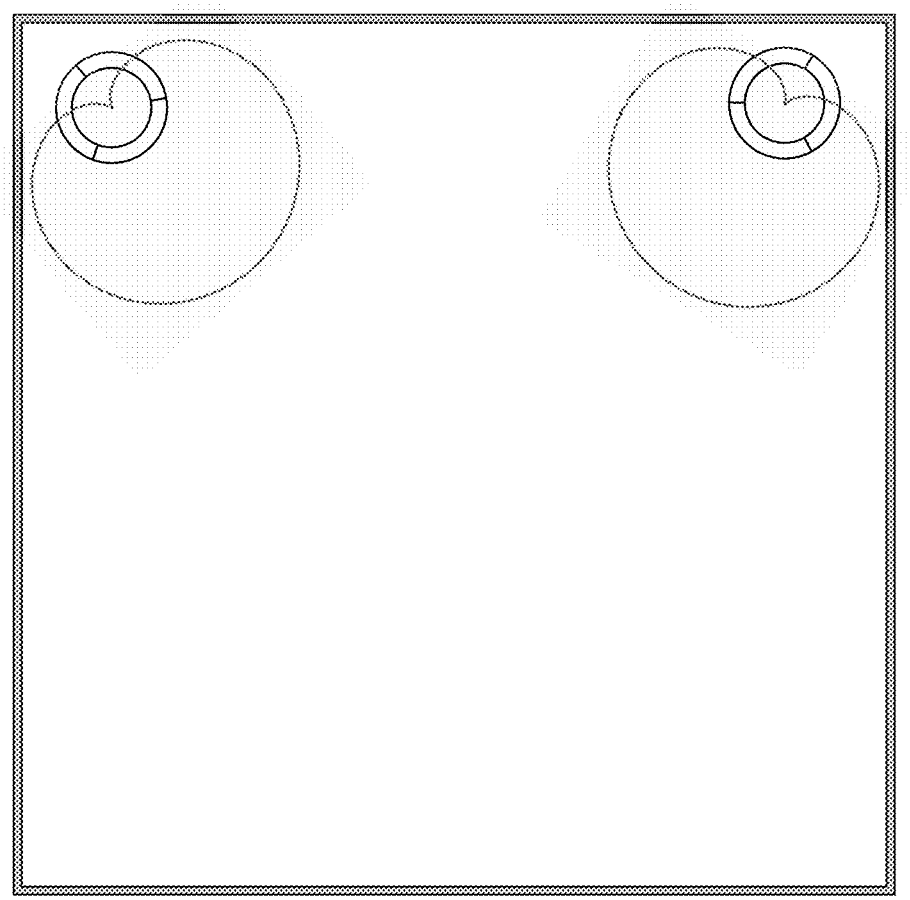
FIG. 4B illustrates exemplary first order ambisonics around the cells in the example room layout of FIG. 4A in accordance with an embodiment of the invention.

By adding a second cell, the two cells can begin to interact and coordinate sound production in order to produce spatial audio with increased spatial resolution. The placement of the cells in a room can impact how the cells configure themselves to produce sound. An example of two cells placed diagonally in a room in accordance with an embodiment of the invention is illustrated in FIG. 3A. As shown in FIG. 3B, the cells can project sound at each other. While only one cardioid wave pattern is shown per cell, cells can produce multiple beams and/or directivity patterns to manipulate the sound field across the entire room. An alternative arrangement with two cells against a shared wall in accordance with an embodiment of the invention is illustrated in FIG. 4A and FIG. 4B. In this configuration, there may be issues with volume balance on the opposite facing wall most distant from the cells due to the imbalanced placement. However, cells can diminish the impact of this arrangement by appropriately modifying the sound produced by the drivers.

Figure 5A:
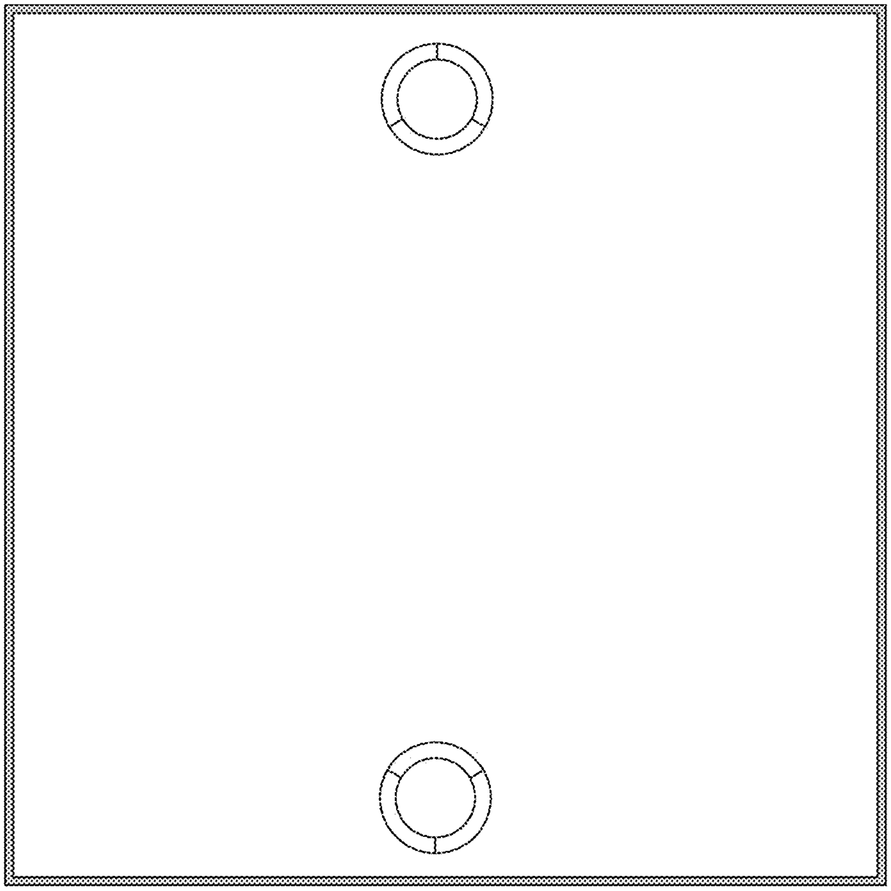
FIG. 5A illustrates an example room layout for a spatial audio system in accordance with an embodiment of the invention.
Figure 5B:
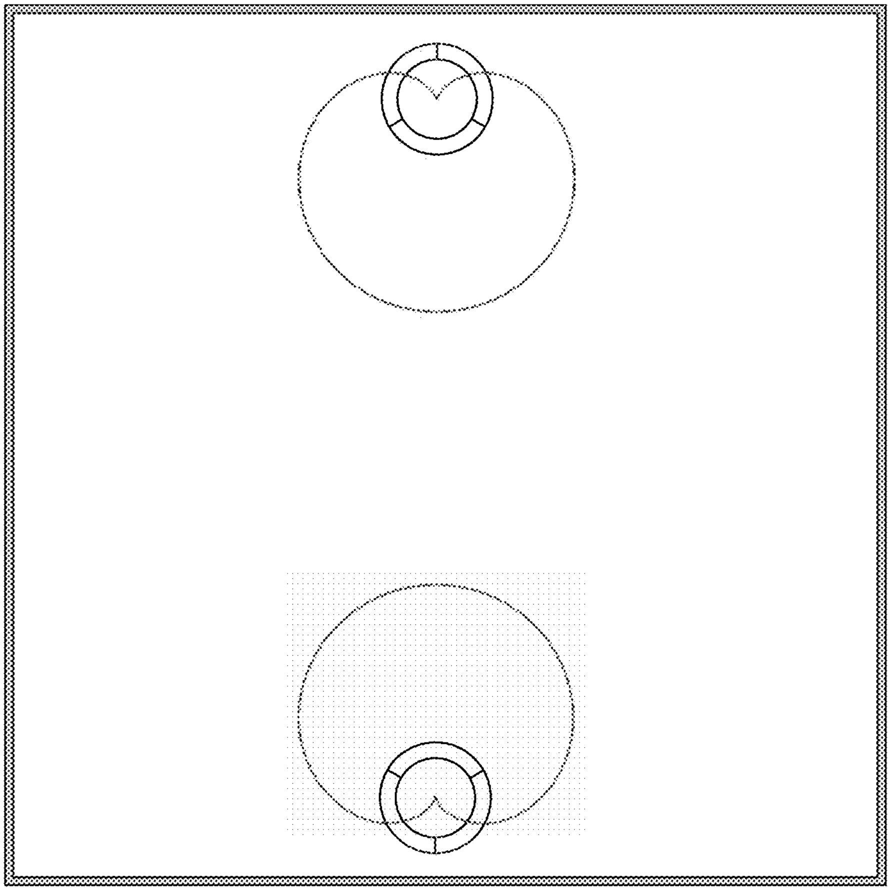
FIG. 5B illustrates exemplary first order ambisonics around the cells in the example room layout of FIG. 5A in accordance with an embodiment of the invention.

Cells need not necessarily be placed in corners of rooms. FIG. 5A and FIG. 5B illustrate a placement of two cells in accordance with an embodiment of the invention. In many situations, this can be an optimal placement acoustically.

However, depending on the room and the objects within it, it may not be practical to place cells in this configuration. Furthermore, while cells have been illustrated with drivers facing in a particular direction, depending on the room, the cells can be rotated to a more appropriate orientation for the space. In numerous embodiments, the spatial audio system and/or specific cells can utilize their user interfaces to suggest that a particular cell be rotated to provide placement that is more appropriate to the space and/or positioning relative to other cells.

Figure 6A:
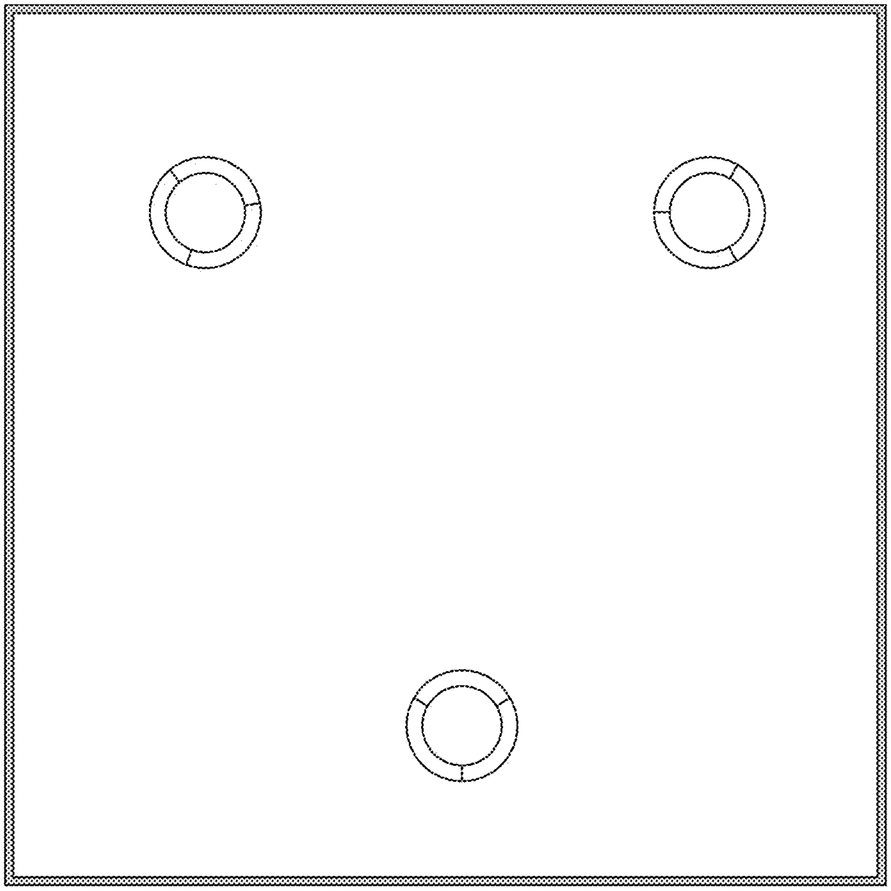
FIG. 6A illustrates an example room layout for a spatial audio system in accordance with an embodiment of the invention.
Figure 6B:
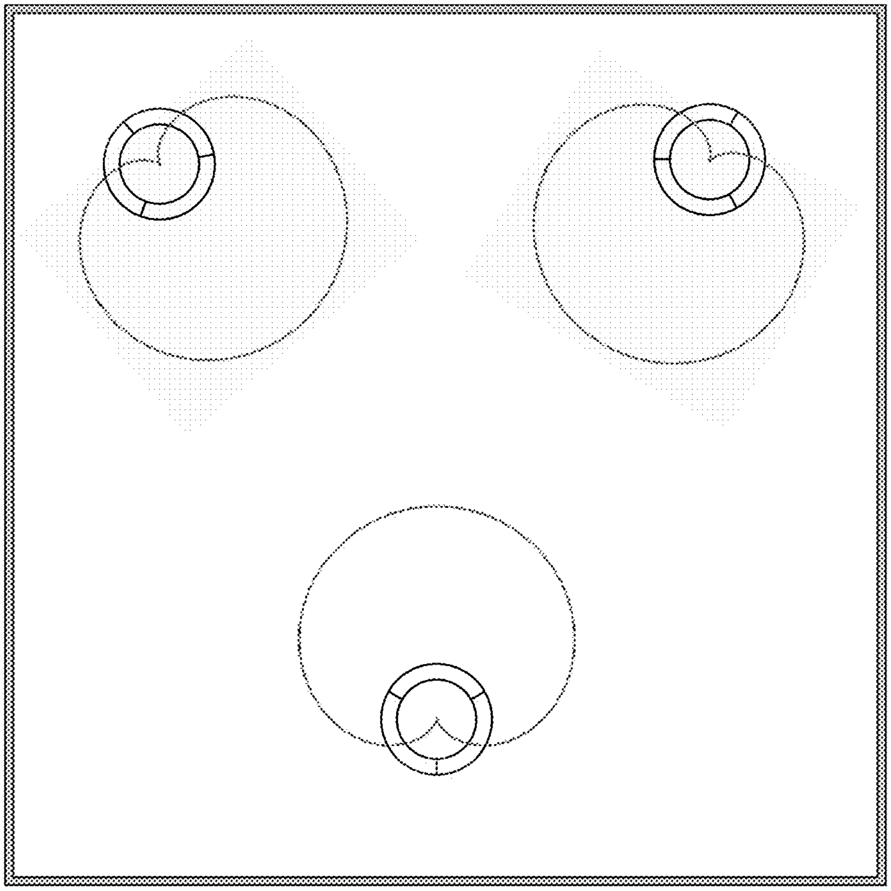
FIG. 6B illustrates exemplary first order ambisonics around the cells in the example room layout of FIG. 6A in accordance with an embodiment of the invention.
Figure 7A:
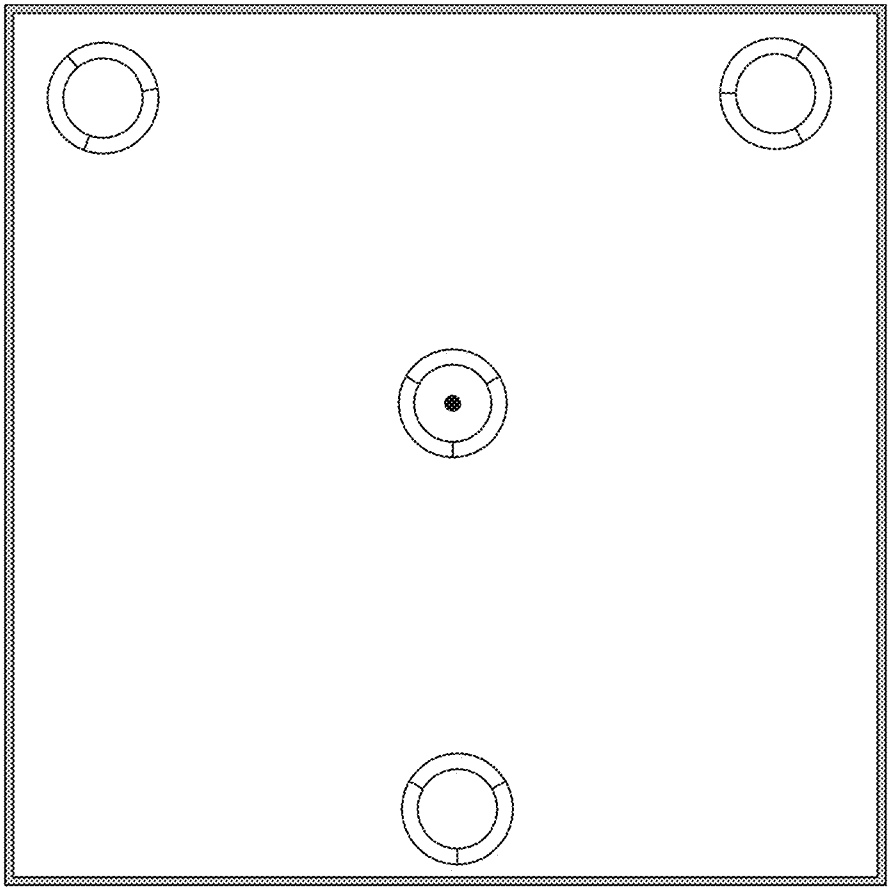
FIG. 7A illustrates an example room layout for a spatial audio system in accordance with an embodiment of the invention.
Figure 7B:
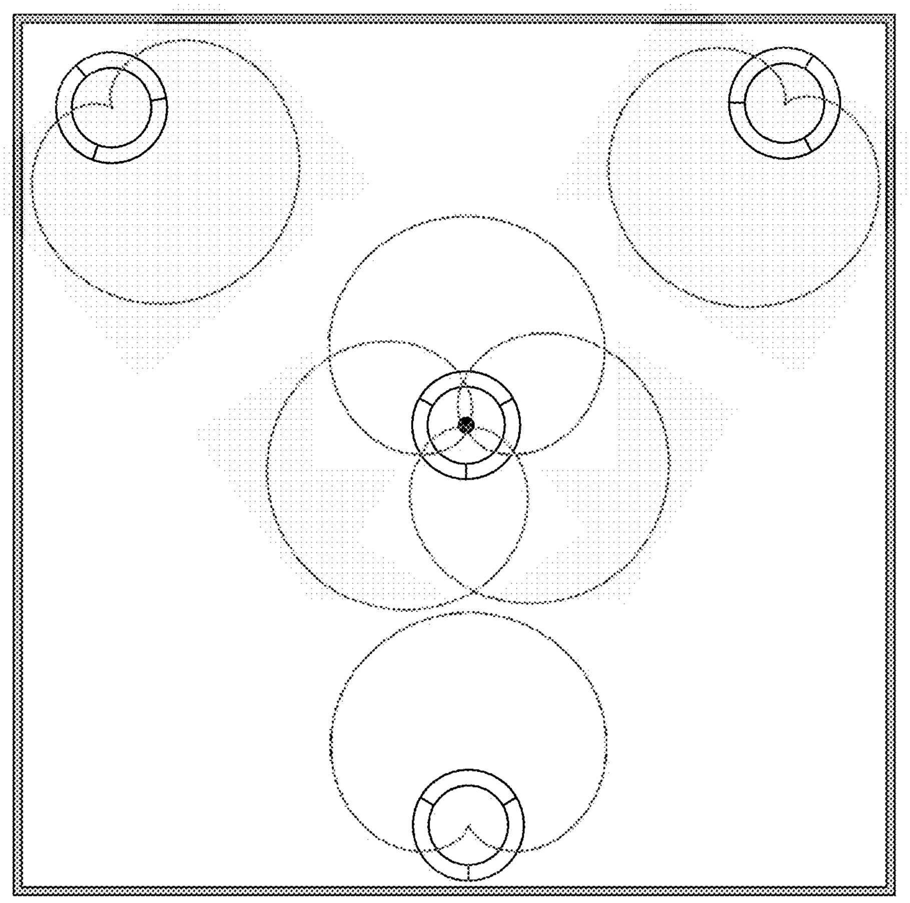
FIG. 7B illustrates exemplary first order ambisonics around the cells in the example room layout of FIG. 7A in accordance with an embodiment of the invention.

In numerous embodiments, once three cells have been networked in the same space, complete control and reproduction of spatial sound objects can be achieved in at least the horizontal plane. In various embodiments, depending on the room, an equilateral triangular arrangement can be utilized. However, cells are able to adapt and adjust to maintain control over the sound field in alternative arrangements. A three-cell arrangement, where each cell is capable of producing directional audio using modal beamforming, in accordance with an embodiment of the invention is illustrated in FIGS. 6A and 6B. By adding an overhead cell, additional 3D spatial control can be gained over the sound field. FIGS. 7A and 7B illustrate a three cell grouping with an additional central overhead cell suspended from the ceiling in accordance with an embodiment of the invention.

Figure 8A:
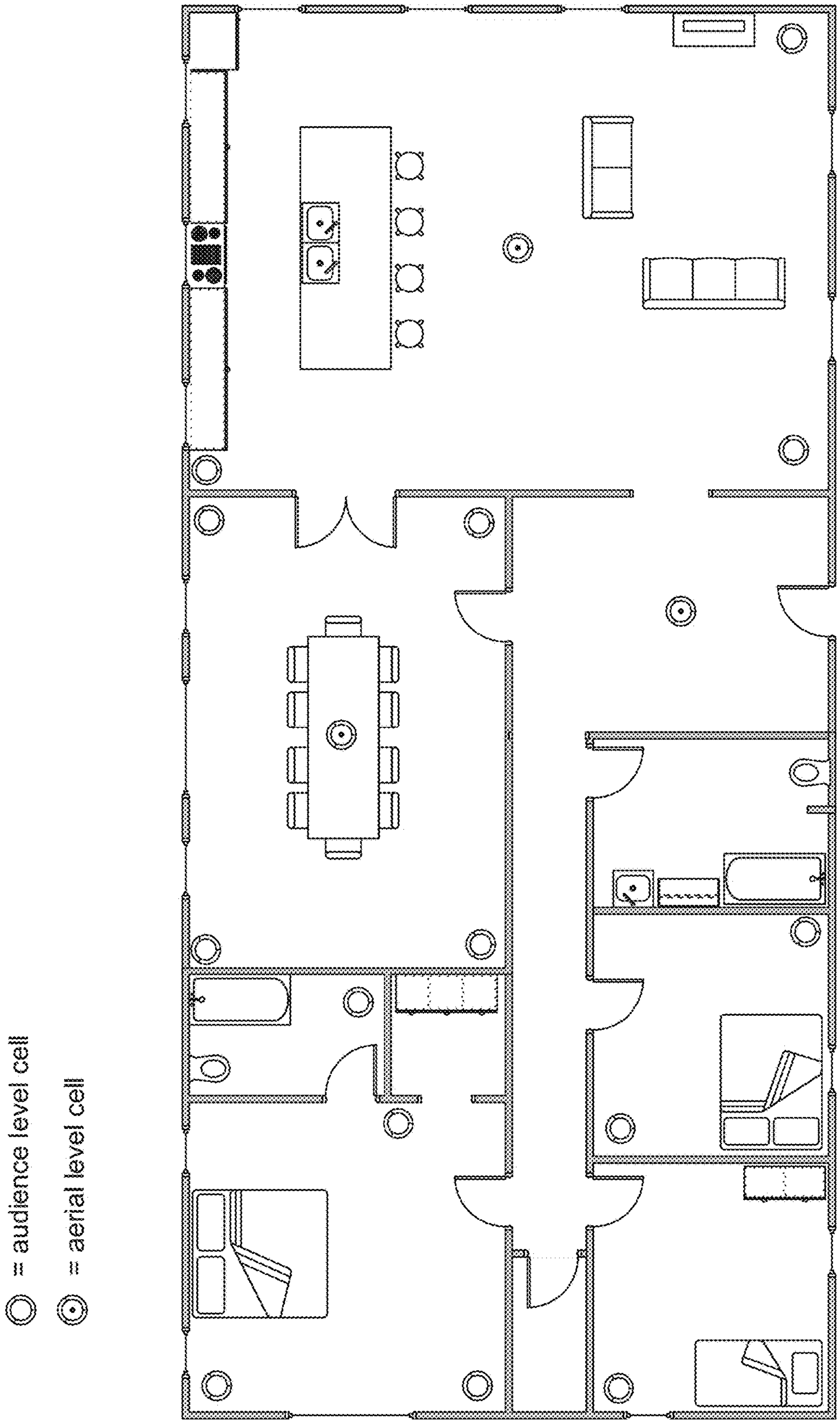
FIG. 8A illustrates an example home containing cells in accordance with an embodiment of the invention.
Figure 8B:
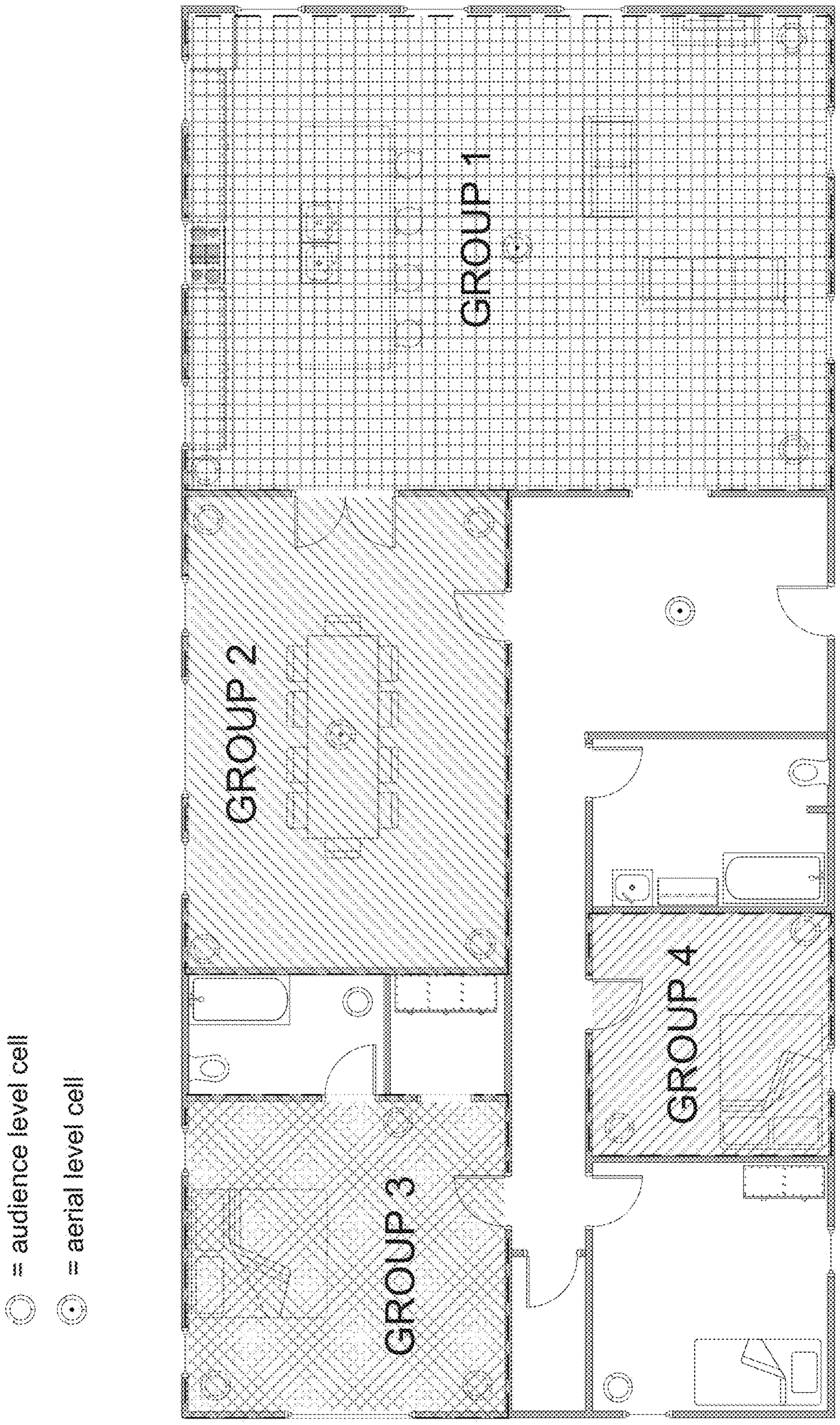
FIG. 8B illustrates the example home organized into various groups in accordance with an embodiment of the invention.
Figure 8C:
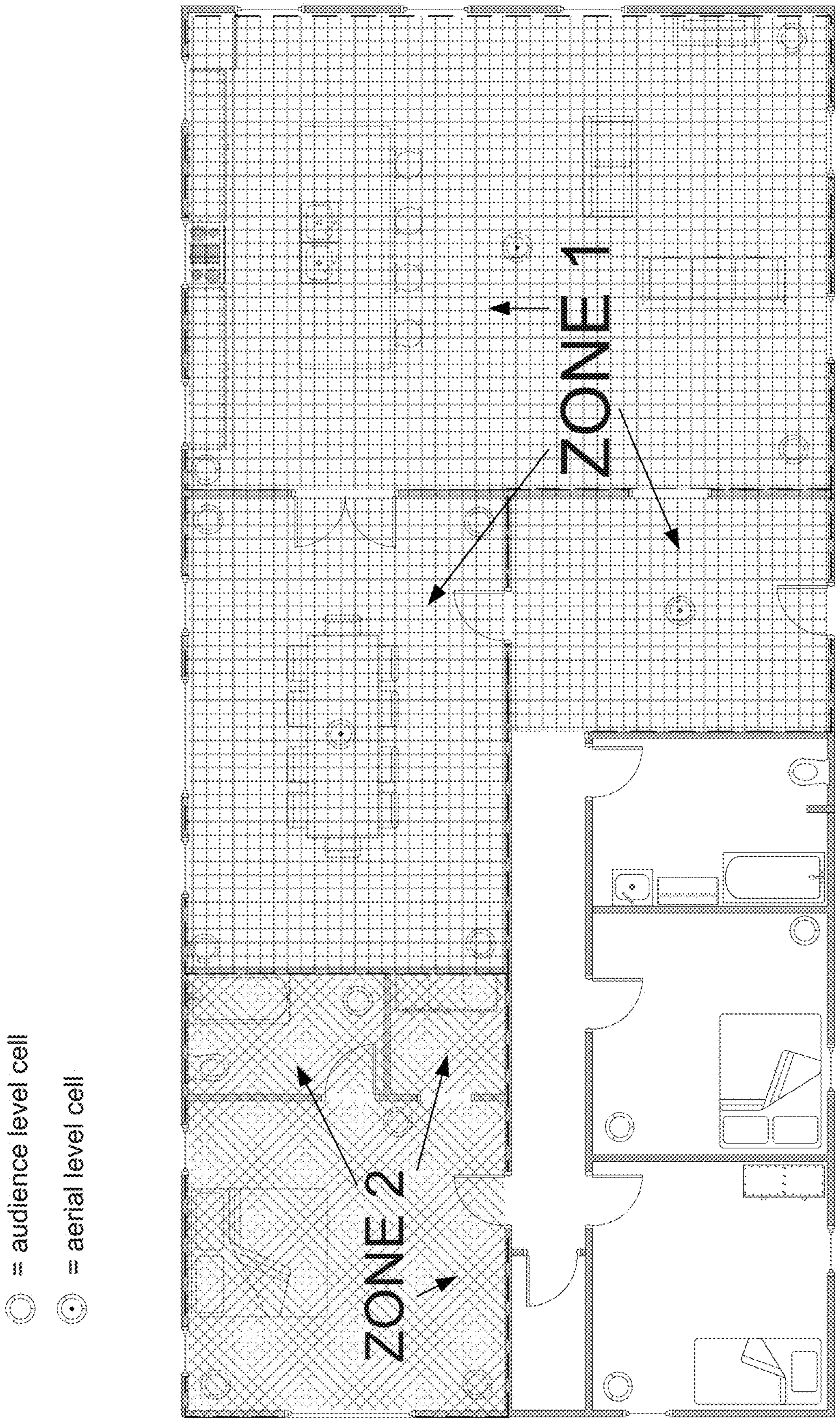
FIG. 8C illustrates the example home organized into various zones in accordance with an embodiment of the invention.
Figure 8D:
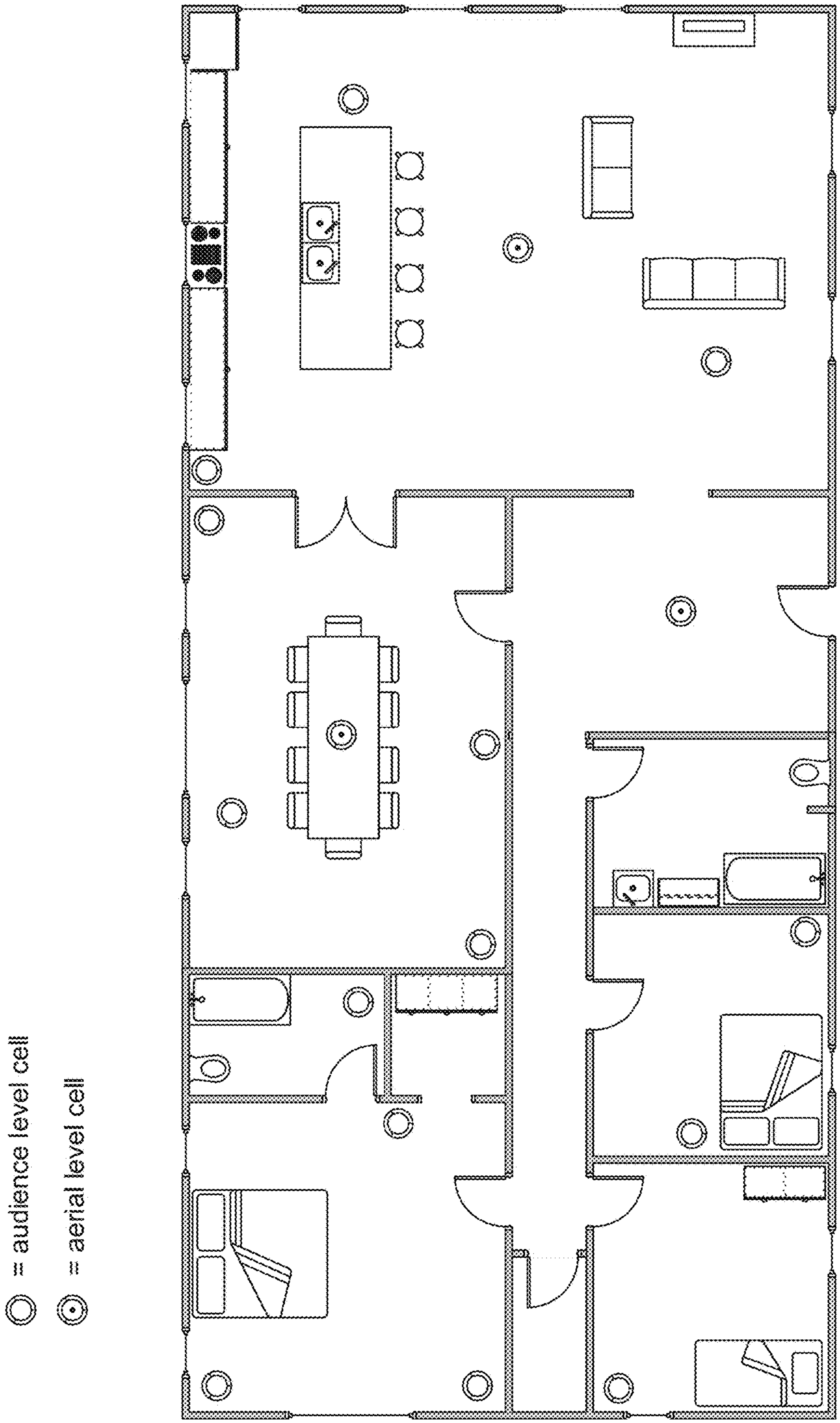
FIG. 8D illustrates the example home containing cells in accordance with an embodiment of the invention.

Cells can be "grouped" to operate in tandem to spatially playback a piece of media. Often, groups include all of the cells in a room. However, particularly in very large spaces, groups do not necessarily include all cells in the room. Groups can be further aggregated into "zones." Zones can further include single cells that have not been grouped (or alternatively can be considered in their own group with a cardinality of one). In some embodiments, each group in a zone may be playing back the same piece of media, but may be spatially locating the objects differently. An example home layout of cells in accordance with an embodiment of the invention is illustrated in FIG. 8A. Example groups in accordance with an embodiment of the invention are illustrated in FIG. 8B, and example zones are illustrated in FIG. 8C. Groupings and zones can be adjusted in real time by users, and cells can dynamically readapt to their groupings. As can be readily appreciated, cells can be placed in any arbitrary configuration within a physical space. Non-exhaustive examples of alternative arrangements are shown in accordance with an embodiment of the invention in FIG. 8D. Similarly, cells can be grouped in any arbitrary arrangement as desired by a user. In addition, some cells utilized in many spatial audio systems are incapable of generating directional audio, but may still be incorporated into spatial audio systems. Processes for enabling cells to perform spatial audio rendering in a synchronized and controllable manner regardless of their positioning are discussed below.

Section 3: Spatial Audio Rendering

Spatial audio has traditionally been rendered with a static array of speakers located in prescribed locations. While, up to a point, more speakers in the array is conventionally thought of as "better," consumer grade systems have currently settled on 5.1 and 7.1 channel systems, which use 5 speakers, and 7 speakers, respectively in combination with one or more subwoofers. Currently, some media is supported in up to 22.2 (e.g. in Ultra HD Television as defined by the International Telecommunication Union). In order to play higher channel sound on fewer speakers, audio inputs are generally either downmixed to match the number of speakers present, or channels that do not match the speaker arrangement are merely dropped. An advantage to systems and methods described herein is the ability to create any number of audio objects based upon the number of channels used to encode the audio source. For example, an arrangement of three cells could generate the auditory sensation of the presence of a 5.1 speaker arrangement by placing five audio objects in the room, encoding the five audio objects into a spatial representation (e.g. an ambisonic representation such as (but not limited to) B-format), and then rendering a sound field using the three cells by decoding the spatial representation of the original 5.1 audio source in a manner appropriate to the number and placement of cells (see discussion below). In many embodiments, the bass channel can be mixed into the driver signals for each of the cells. Processes that treat channels as spatial audio objects are extensible to any arbitrary number of speakers and/or speaker arrangements. In this way, fewer physical speakers in the room can be utilized to achieve the effects of a higher number of speakers. Furthermore, cells need not be placed precisely in order to achieve this effect.

Conventional audio systems typically have what is often referred to as a "sweet spot" at which the listener should be situated. In numerous embodiments, the spatial audio system can use information regarding room acoustics to control the perceived ratio between direct and reverberant sound in a given space such that it sounds like a listener is surrounded by sound, regardless of where they are located within the space. While most rooms are very non-diffuse, spatial rendering methods can involve mapping a room and determining an appropriate sound field manipulation for rendering diffuse audio (see discussion below). Diffuse sound fields are typically characterized by sound arriving randomly from evenly distributed directions at evenly distributed delays.

In many embodiments, the spatial audio system maps a room. Cells can use any of a variety of methods for mapping a room, including, but not limited to, acoustic ranging, applying machine vision processes, and/or any other ranging method that enables 3D space mapping. Other devices can be utilized to create or augment these maps, such as smart phones or tablet PCs. The mapping can include: the location of cells in the space; wall, floor, and/or ceiling placements; furniture locations; and/or the location of any other objects in a space. In several embodiments, these maps can be used to generate speaker placement and/or orientation recommendations that can be tailored to the particular location. In some embodiments, these maps can be continuously updated with the location of listeners traversing the space and/or a history of the location(s) of listeners. As is discussed further below, many embodiments of the invention utilize virtual speaker layouts to render spatial audio. In several embodiments, information including (but not limited to) any of cell placement and/or orientation information, room acoustic information, user/object tracking information can be utilized to determine an origin location at which to encode a spatial representation (e.g. an ambisonic representation) of an audio source and a virtual speaker layout to use in the generation of driver inputs at individual cells. Various systems and methods for rending of spatial audio using spatial audio systems in accordance with certain embodiments of the invention are discussed further below.

Figure 45:
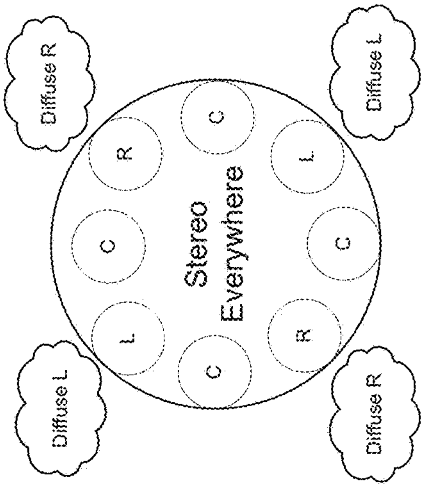
FIG. 45 conceptually illustrates audio objects in a space to create the sensation of stereo everywhere in accordance with an embodiment of the invention.
Figure 46:
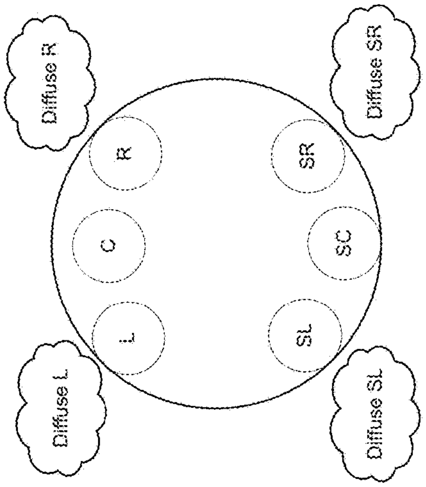
FIG. 46 conceptually illustrates placing audio objects relative to a virtual stage in accordance with an embodiment of the invention.
Figure 47:
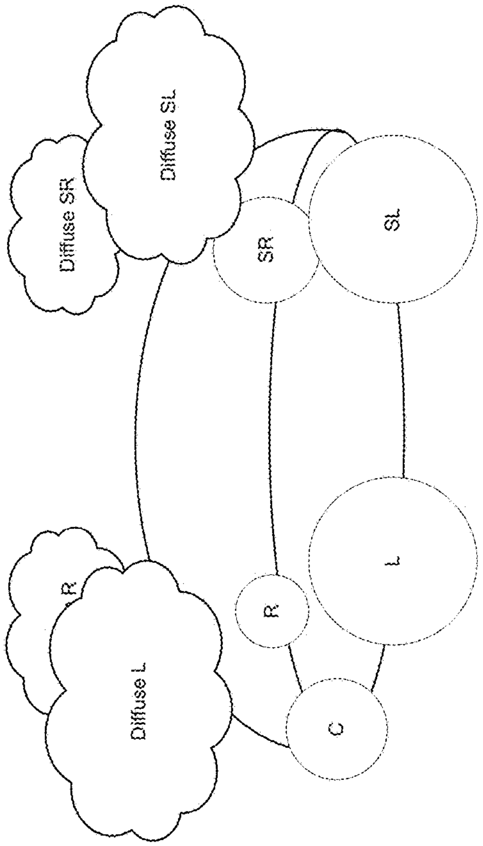
FIG. 47 conceptually illustrates placing audio objects in 3D space in accordance with an embodiment of the invention.

In a number of embodiments, upmixing can be utilized to create a number of audio objects that differs from the number of channels. In several embodiments, a stereo source containing two channels can be upmixed to create a number of left (L), center (C), and right (R) channels. In a number of embodiments, diffuse audio channels can also be generated via upmixing. Audio objects corresponding to the upmixed channels can then be placed relative to a space defined by a number of cells to create various effects including (but not limited to) the sensation of stereo everywhere within the space as conceptually illustrated in FIG. 45. In certain embodiments, upmixing can be utilized to place audio objects relative to a virtual stage as conceptually illustrated in FIG. 46. In a number of embodiments, audio objects can be placed in 3D as conceptually illustrated in FIG. 47. While specific examples of the placement objects are discussed with reference to FIGS. 45-47, any of a variety of audio objects (including audio objects obtained directly the spatial audio system that are not obtained via upmixing) can be placed in any of a variety of arbitrary 1D, 2D, and/or 3D configurations for the purposes of rendering spatial audio as appropriate to requirements of specific applications in accordance with various embodiments of the invention. The rendering of spatial audio from a variety of different audio sources is discussed further below. Furthermore, any of the audio object 2D or 3D layouts described above with reference to FIGS. 45-47 can be utilized in any of the processes for selecting and processing sources of audio within a spatial audio system described herein in accordance with various embodiments of the invention.

Figure 9:
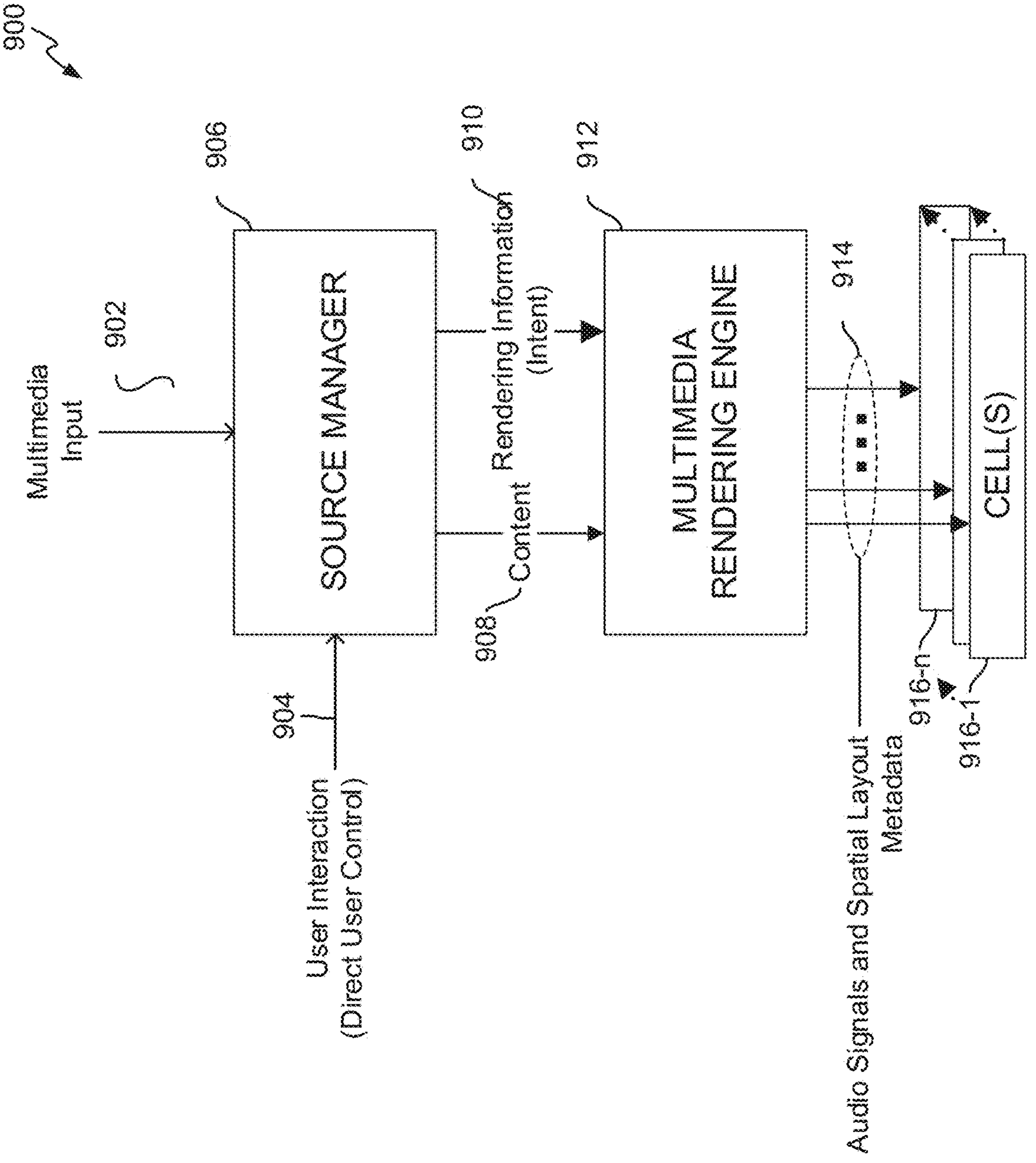
FIG. 9 illustrates a spatial audio system in accordance with an embodiment of the invention.

In many embodiments, spatial audio systems include source managers that can select between one or more sources of audio for rending. FIG. 9 illustrates a spatial audio system 900 that includes a source manager 906 configured in accordance with various aspects of the method and apparatus for spatial multimedia source management disclosed herein. As noted above, the spatial audio system 900 may be implemented using a cell and/or using multiple cells. The source manager 906 can receive a multimedia input 902 that includes a variety of data and information used by the source manager 906 to generate and manage content 908 and rendering information 910. The content 908 can include encoded audio that is to be spatially rendered, selected from the multimedia sources in the multimedia input 902. The rendering information 910 can provide context for the reproduction of the content 908 in terms of how the sound should be presented, both spatially (telemetry) and volume (level), as further described herein. In many embodiments, the source manager is implemented within a cell in the spatial audio system. In several embodiments, the source manager is implemented on a server system that communicates with one or more of the cells within the spatial audio system. In a number of embodiments, the spatial audio system includes network connected source input devices that enable the connection of sources (e.g. wall mounted televisions) to the network connected source input device in a location distant from the closest cell. In several embodiments, the network connected source input device implements a source manager that can direct selected sources for rendering on cells within the spatial audio system 900.

A user may directly control the spatial audio system 900 through a user interaction input 904. The user interaction input 904 may include commands received from the user through a user interface, including a graphical user interface (GUI) on an app on a "smart device," such as a smartphone; voice input, such as through commands issued to a "virtual assistant," such as Apple Inc.'s Siri, Amazon.com Inc.'s Alexa, or Google Assistant from Google LLC (Google); and "traditional" physical interfaces such as buttons, dials, and knobs. The user interface may be coupled to the source manager 906 and, in general, the spatial audio system 900, directly or through a wireless interface, such as through Bluetooth or Wi-Fi wireless standards as promulgated by the IEEE in IEEE 802.15.1 and IEEE 802.11 standards, respectively. One or more of the cells utilized within the spatial audio system 900 can also include one or more of a touch (e.g. buttons and/or capacitive touch) or voice based user interaction input 904.

The source manager 906 can provide the content 908 and the rendering information 910 to a multimedia rendering engine 912. The multimedia rendering engine 912 can generate audio signals and spatial layout metadata 914 to a set of cells 916-1 to **916-*n* based on the content 908 and the rendering information 910. In many embodiments, the audio signals are audio signals with respect to specific audio objects. In several embodiments, the audio signals are virtual speaker audio inputs. The specific spatial layout metadata 914 provided to the cells typically depends upon the nature of the audio signals (e.g. locations of audio objects and/or locations of virtual speakers). Thus, using the set of cells 916-1 to 916-*n*, the multimedia rendering engine 912 may reproduce the content 908, which may include multiple sound objects, distributed in a room based on the rendering information 910**. Various approaches for performing spatial audio rendering using cells in accordance with various embodiments of the invention are discussed further below.

In several embodiments, the audio signals and (optionally) spatial layout metadata 914 provided by the multimedia rendering engine 912 to the cells 916-1 to **916-*n* may include a separate data stream generated specifically for each cell. The cells can generate driver inputs using the audio signals and (optionally) the spatial layout metadata 914. In a number of embodiments, the multimedia rendering engine 912 can produce multiple audio signals for each individual cell, where each audio signal corresponds to a different direction. When a cell receives the multiple audio signals, the cell can utilize the multiple audio signals to generate driver inputs for a set of drivers corresponding to each of the plurality of directions. For example, a cell that includes three sets of drivers oriented in three different directions can receive three audio signals that the cell can utilize to generate driver inputs for each of the three sets of drivers. As can readily be appreciated, the number of audio signals can depend upon the number of sets of drivers and/or upon other factors appropriate to the requirements of specific applications in accordance with various embodiments of the invention. Furthermore, the rendering engine 912** can produce audio signals specific to each cell and also provide the same bass signal to all cells.

As noted above, each cell may include one or more sets of different types of audio transducers. For example, each of the cells may be implemented using a set of drivers that includes one or more bass, mid-range, and tweeter drivers. A filter, such as (but not limited to) a crossover filter, may be used so that an audio signal can be divided into a low-pass signal that can be used in the generation of driver inputs to one or more woofers, a bandpass signal that can be used in the generation of driver inputs to one or more mids, and a high-pass signal that can be used in the generation of driver inputs to one or more tweeters. As can readily be appreciated, the audio frequency bands utilized to generate driver inputs to different classes of drivers can overlap as appropriate to the requirements of specific applications. Furthermore, any number of drivers and/or orientations of drivers can be utilized to implement a cell as appropriate to the requirements of specific applications in accordance with various embodiments of the invention.

Figure 10:
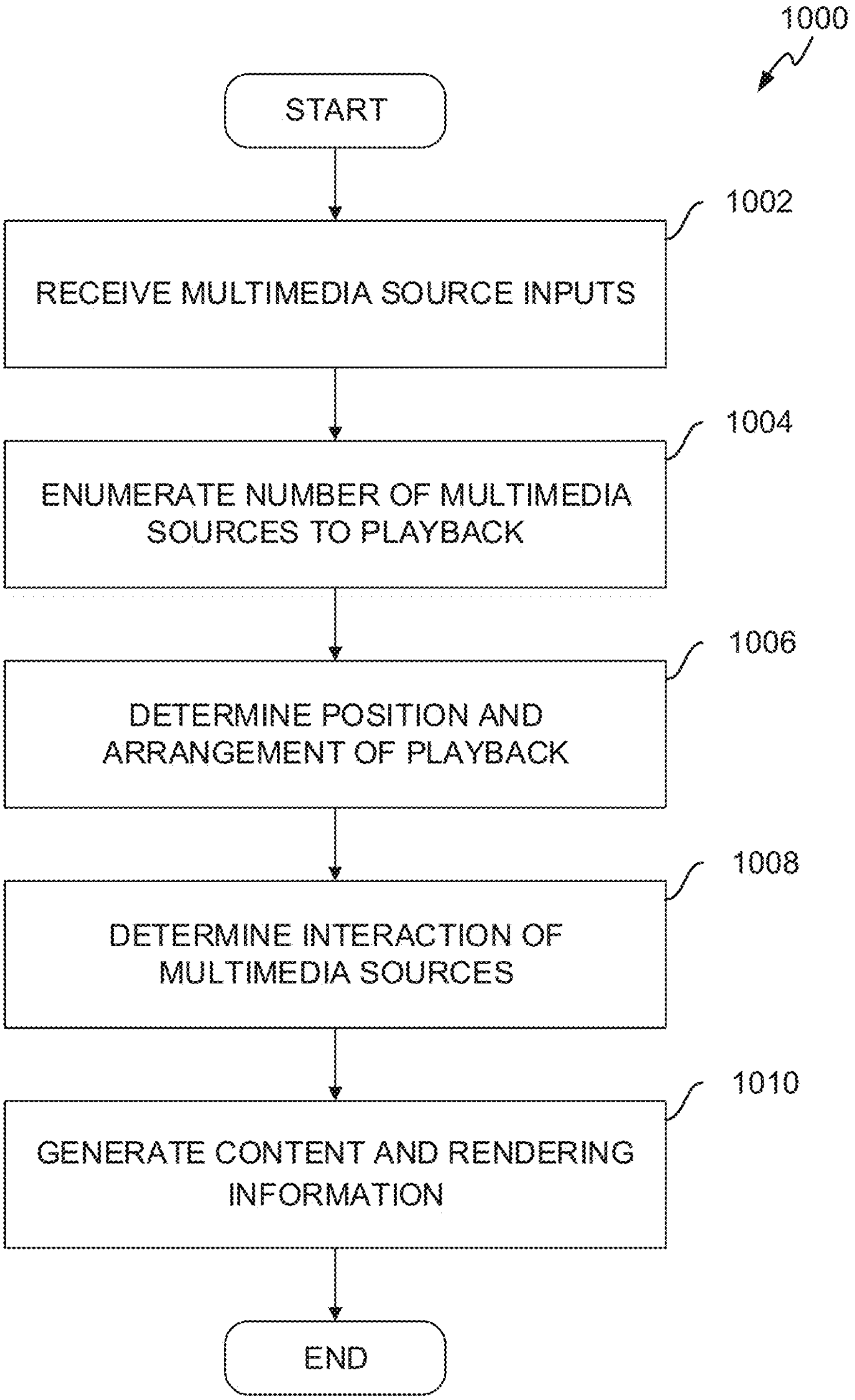
FIG. 10 illustrates a process for rendering sound fields using a spatial audio system in accordance with an embodiment of the invention

As is discussed further below, spatial audio systems in accordance with many embodiments of the invention can utilize a variety of processes for spatially rendering one or more audio sources. The specific processes typically depend upon the nature of the audio sources, the number of cells, the layout of the cells, and the specific spatial audio representation and nested architecture utilized by the spatial audio system. FIG. 10 illustrates one process 1000 for rendering sound fields that may be implemented by a spatial audio system in accordance with an embodiment of the invention. At 1002, the spatial audio system receives a plurality of multimedia source inputs. One or more content sources may be selected and preprocessed by a source selection software process executing on a processor, and the data and information associated therewith can be provided to an enumeration determination software process.

At 1004, a number of sources that are selected for rendering is determined by an enumeration determination software process. The enumeration information can be provided to a position management software process that allows for the tracking of the number of content sources.

At 1006, position information for each content source to be spatially rendered can be determined by the position management software process. As discussed above, various factors, including (but not limited to) the type of content being played, positional information of the user or an associated device, and/or historical/predicted position information, may be used to determine position information relevant to subsequent software processes utilized to spatially render the content sources.

At 1008, interactions between the enumerated content sources at various positions can be determined by an interaction management software process. The various interactions may be determined based on various factors such as (but not limited to) those discussed above, including (but not limited to) type of content, position of playback and/or positional information of the user or an associated device, and historical/predicted interaction information.

At 1010, information including (but not limited to) content and rendering information can be generated and provided to the multimedia rendering engine.

In one aspect of the disclosure, the position of playback associated with each content source determined at 1006 can occur before interaction between the content sources is determined at 1008. This can allow for a more complete management of rendering of spatial audio sources. Thus, for example, if multiple content sources are being played in close proximity, interaction/mixing may be determined based on awareness of that positional proximity. Moreover, a priority level for each content source may also be considered.

In accordance with various aspects of the disclosure, information received in the preset/history information may be used by the source manager to affect the content and the rendering information that is provided to the multimedia rendering engine. The information may include user-defined presets and history of how various multimedia sources have been handled before. For example, a user may define a preset that all content received over a particular HDMI input is reproduced in a particular location, such as the living room. As another example, historical data may indicate that the user always plays time alarms in the bedroom. In general, historical information may be used to heuristically determine how multimedia sources may be rendered.

Although specific spatial audio systems that include source managers and multimedia rendering engines and processes for implementing source managers and multimedia rendering engines are described above with reference to FIGS. 9 and 10, spatial audio systems can utilize any of a variety of hardware and/or software processes to select audio sources and render sound fields using a set of cells as appropriate to the requirements of specific applications in accordance with various embodiments of the invention. Processes for rendering sound fields by encoding representations of spatial audio sources and decoding the representations based upon a specific cell configuration in accordance with various embodiments of the invention are discussed further below.

Section 4A: Nested Architectures

Spatial audio systems in accordance with many embodiments of the invention utilize a nested architecture that can have particular advantages in that it enables spatial audio rendering in a manner that can adapt to the number and configuration of the cells and/or loudspeakers being used to render the spatial audio. In addition, the nested architecture can distribute the processing associated with rendering of spatial audio across a number of computing devices within the spatial audio system. The specific manner in which a nested architecture of encoders and decoders within a spatial audio system is implemented is largely dependent upon the requirements of a given application. Furthermore, individual encoder and/or decoder functions can be distributed across cells. For example, a primary cell can partially perform the function of a cell decoder to decode audio streams specific to a cell. The primary cell can then provide these audio streams to the relevant secondary cell. The secondary cell can then complete the cell decoding process by converting the audio streams to driver signals. As can readily be appreciated, spatial audio systems in accordance with various embodiments of the invention can utilize any of a variety of nested architectures as appropriate to the requirements of specific applications.

In several embodiments, a primary cell within a spatial audio system spatially encodes separate audio signals for each audio object being rendered. As discussed above, the audio objects can be directly provided to the spatial audio system, obtained by mapping channels of the source audio to corresponding audio objects and/or obtained by upmixing and mapping channels of the source audio to corresponding audio objects as appropriate to the requirements of a specific application The primary cell can then decode the spatial audio signals for each audio object based upon the locations of the cells being used to render the spatial audio. A given cell can use its specific audio signals to encode a spatial audio signal for that cell, which can then be decoded to generate signals for each of the cell's drivers.

When each audio object is separately spatially encoded, the amount of data transmitted by a primary cell within the network increases with the number of spatial objects. Another approach in which the amount of data transmitted by a primary cell is independent of the number of audio objects is for the primary cell to spatially encode all audio objects into a single spatial representation. The primary cell can then decode the spatial representation of all of the audio objects with respect to a set of virtual speakers. The number and locations of the virtual speakers is typically determined based upon the number and locations of the cells used to render the spatial audio. In many embodiments, however, the number of virtual speakers can be fixed irrespective of the number of cells, but have locations that are dependent upon the number and locations of cells. For example, a spatial audio system can utilize eight virtual speakers located around the circumference of a circle in certain use cases (irrespective of the number of cells). As can readily be appreciated, the number of virtual speakers can depend upon the number of grouped cells and/or the number of channels in the source. Furthermore, the number of virtual speakers can be greater than or less than eight. The primary cell can then provide a given cell with a set of audio signals decoded based upon the locations of the virtual speakers associates with that cell. The virtual speaker inputs can be converted into a set of driver inputs by treating the virtual speakers as audio objects and performing a spatial encoding based upon the cell's position relative to the virtual speaker locations. The cell can then decode the spatial representation of the virtual speakers to generate driver inputs. In many embodiments, the cells can efficiently convert received virtual speaker inputs into a set of driver inputs using a set of filters. In several embodiments, the primary can commence the decoding of the virtual speaker inputs into a set of audio signals for each cell, where each audio signal corresponds to a specific direction. When the set of audio signals is provided to a secondary cell, the secondary cell can utilize each audio signal to generate driver inputs for a set of drivers oriented to project sound in a particular direction.

In several embodiments, the spatial encodings performed within a nested architecture involve encoding the spatial objects into ambisonic representations. In many embodiments, the spatial encodings performed within the nested architecture utilize higher order ambisonics (e.g. sound field representation), a Vector Based Amplitude Panning (VBAP) representation, a Distance Based Amplitude Panning (DBAP), and/or a k-Nearest-Neighbors panning (KNN panning) representation. As can readily be appreciated, the spatial audio system may support multiple spatial encodings and can select between a number of different spatial audio encoding techniques based upon factors including (but not limited to): the nature of the audio source, the layout of a particular group of cells, and/or user interactions with the spatial audio system (e.g. spatial audio object placement and/or spatial encoding control instructions). As can readily be appreciated, any of a variety of spatial audio encoding techniques can be utilized within a nested architecture as appropriate to the requirements of specific applications in accordance with various embodiments of the invention. Furthermore, the specific manner in which spatial representations of audio objects are decoded to provide audio signals to individual cells can depend upon factors including (but not limited to) the number of audio objects, the number of virtual speakers (where the nested architecture utilizes virtual speakers) and/or the number of cells.

Figure 11:
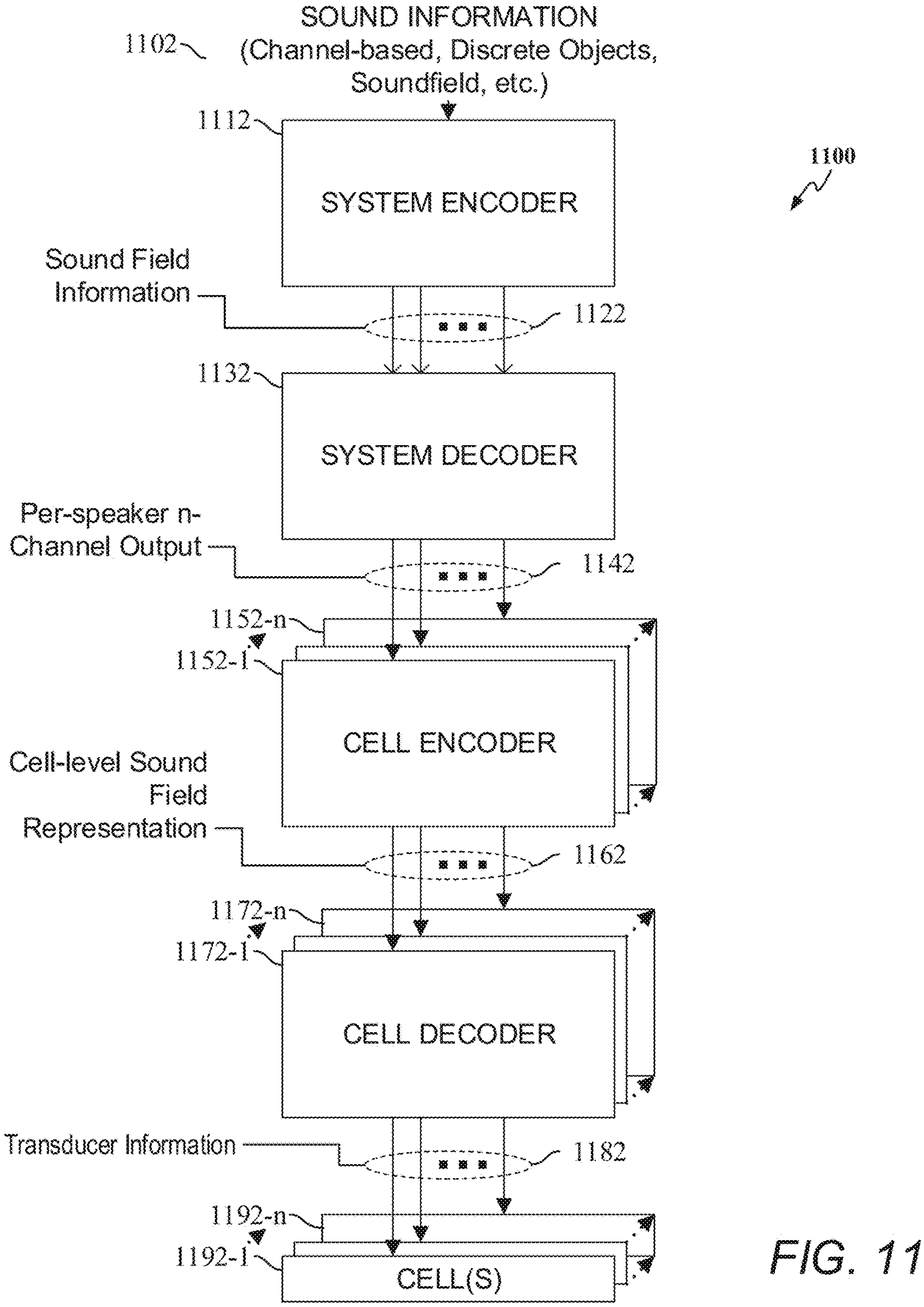
FIG. 11 illustrates a process for spatial audio control and reproduction in accordance with an embodiment of the invention.

FIG. 11 conceptually illustrates a process 1100 for spatial audio control and reproduction that involves creating an ambisonic encoding of an audio source by treating different channels as spatial sound objects. The audio objects can then be placed in distinct locations and the locations of the audio objects used to generate an ambisonic representation of a sound field at a selected origin location. While FIG. 11 is described in the context of a spatial audio system that uses ambisonic representations of spatial audio, processes similar to those illustrated in FIG. 11 can be implemented using any of a variety of spatial audio representations including (but not limited to) higher order ambisonics (e.g. sound field representation), a VBAP representation, a DBAP representation, and/or a KNN panning representation.

The process 1100 can be implemented by a spatial audio system and can involve a system encoder 1112 that provides conversion of audio rendering information into an intermediate format. In many embodiments, the conversion process can involve demultiplexing encoded audio data that encodes one or more audio tracks and/or audio channels from a container file or portion of a container file. The audio data can then be decoded to create a plurality of separate audio inputs that can each be treated as a separate sound object. In one aspect, the system encoder 1112 can encode sound objects and their associated information (e.g., position) for a particular environment. Examples can include (but are not limited to) a desired speaker layout for a channel-based audio surround sound system, a band position template, and/or an orchestra template for a set of instruments.

The system encoder 1112 may position, or map, sound objects and operate in a fashion such as a panner. The system encoder 1112 can receive information about sound objects in sound information 1102 and renders, in a generalized form, these sound objects. The system encoder 1112 can be agnostic to any implementation details (e.g. number of cells, and/or placement and orientation of cells), which are handled downstream by decoders, as further described herein. In addition, the system encoder 1112 may receive sound information in a variety of content and formats, including (but not limited to) channel-based sound information, discrete sound objects, and/or sound fields.

Figure 12A:
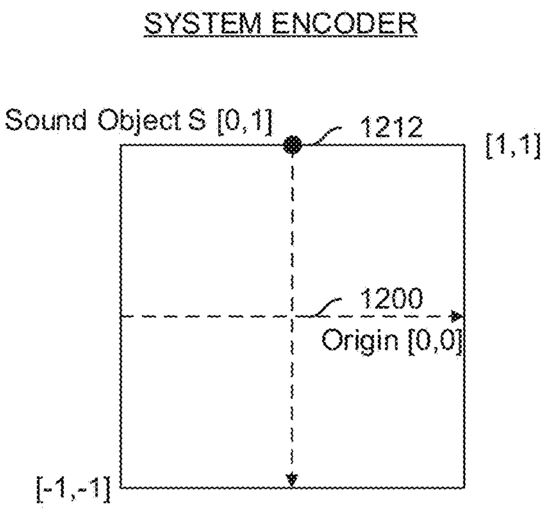
FIG. 12A-12D illustrate relative positions of sound objects within a system encoder and a speaker node encoder in accordance with an embodiment of the invention.

FIG. 12A illustrates a conceptual representation of a physical space 1200 with an example mapping of sound objects by the system encoder 1112 that may be used to describe various aspects of the operation of the system encoder 1112. In one aspect of the disclosure, the system encoder 1112 performs the mapping of sound objects using a coordinate system in which positional information is defined relative to an origin. The origin and coordinate system may be arbitrary and can be established by the system encoder 1112. In the example as shown in FIG. 12A, the system encoder 1112 establishes an origin 1202 at location [0,0] for a Cartesian coordinate system in the conceptual representation, with the four corners of the coordinate system being [−1,−1], [−1,1], [1,−1], and [1,1]. The sound information provided to the system encoder 1112 includes a sound object S 1212 that the system encoder 1112 maps to location [0,1] in the conceptual representation. It should be noted that although the example provided in FIG. 12A is expressed in terms of the Cartesian coordinate system in two dimensions, other coordinate systems and dimensions may be used, including polar, cylindrical, and spherical coordinate systems. A particular choice of the coordinate system used in the examples herein should not be considered limiting.

In some cases, the system encoder 1112 may apply a static transform of the coordinate system of the system encoder 1112 to adapt to an initial orientation of external playback or control devices including, but not limited to, head mounted displays, mobile phone, tablets, or gaming controllers. In other cases, the system encoder 1112 may receive a constant stream of telemetry data associated with a user, such as, for example, from a 6 degree of freedom (6DOF) system, and continually reposition sound objects in order to maintain a particular rendering using this stream of telemetry data.

The system encoder 1112 can generate, as output, an ambisonic encoding of the spatial audio objects in an intermediary format (e.g. B-format) 1122. As noted above, other formats can be utilized to represent spatial audio information as appropriate to the requirements of specific applications including (but not limited to) formats capable of representing second and/or higher order ambisonics. In FIG. 11, the sound field information is shown as sound field information 1122, which can include mapping information about sound objects such as the sound object S 1212.

Referring again to FIG. 11, the system 1100 includes a system decoder 1132 that may be used to receive ambisonic encodings 1122 of the spatial audio objects from the system encoder 1112 and provide system-level ambisonic decoding for each of the cells in the spatial audio system 1100. In one aspect of the disclosure, the system decoder 1132 is aware of the cells and their physical layouts and allows the system 1100 to process the sound information 1102 appropriately to reproduce audio with the particular speaker arrangement and environment (e.g., room).

Figure 12B:
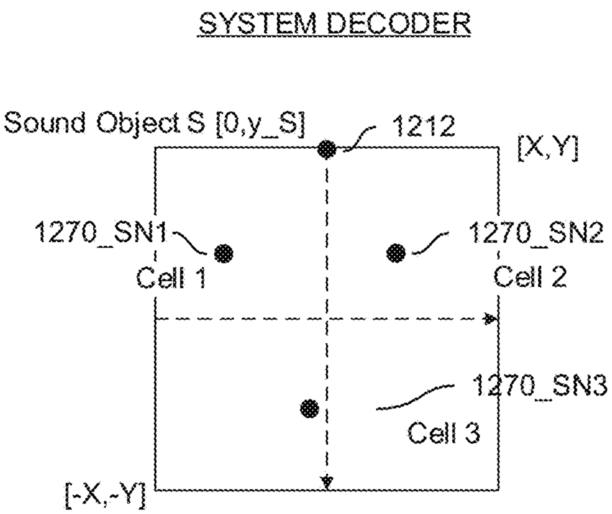

FIG. 12B illustrates a conceptual representation of the physical space corresponding to the conceptual representation of FIG. 12A that includes an overlay of a layout of a group of cells. The group of cells includes three (3) cells: cell 1 1270_SN1, cell 2 1270_SN2, and cell 3 1270_SN3. The system decoder 1132 adapts the mapping performed by the system encoder 1112 with actual physical measurements to arrive at the conceptual representation shown in FIG. 12B. Thus, in the conceptual representation shown in FIG. 12B, the corners of the conceptual representation shown in FIG. 12A have been translated to locations [−X,−Y], [−X, Y], [X,−Y], and [X,Y], where X and Y represent physical dimensions of the physical space. For example, if the physical space is defined to be a 20 meter by 14 meter room, then X may be 20 and Y may be 20. The sound object S 1212 is mapped to location [0,y_S]. While not shown in FIG. 12B, the spatial locations of the cells are determined in three dimensions in spatial audio systems in accordance with many embodiments of the invention.

The system decoder 1132 can generate an output data stream for each cell encoder that can include (but is not limited to) audio signals for each of the sound objects and spatial location metadata. In several embodiments, the spatial location metadata describes the spatial relationship between the cell and the locations of the audio objects utilized by the system decoder 1132 in the ambisonic decoding of the ambisonic representation of the spatial audio objects generated by the system encoder 1112. As shown in FIG. 11, where there are n-cells, the system decoder 1132 may provide n distinct data streams as separate outputs 1142 to each of the n cells, where each data stream includes sound information for a specific cell. Furthermore, each of the data streams for each of the n cells can include multiple audio streams. As discussed above, each audio stream may correspond to a direction relative to the cell.

In addition to the system encoder 1112, the system 1100 also includes encoder functionality at the cell-level. In accordance with various aspects of the disclosure, the system 1100 can include a second encoder associated with each cell, illustrated as cell encoders 1152-1 to **1152-*n* in FIG. 11. In one aspect, each of the cell encoders 1152-1 to 1152-*n* is responsible for generating sound field information at a cell-level for its associated cell from the sound information received from the system decoder 1132. Specifically, each of the cell encoders 1152-1 to 1152-*n* can receive sound information from the output 1142 from the system decoder 1132**.

Each of the cell encoders 1152-1 to **1152-*n* may provide a cell-level sound field representation output to a respective cell decoder that includes directivity and steering information. In one aspect of the disclosure, the cell-level sound field representation output from each cell encoder is a sound field representation relative to its respective cell and not the origin of the system. A given cell encoder can utilize information concerning the locations of each sound object, and/or virtual speaker and the cell relative to the system origin and/or relative to each other to encode the cell-level sound field representation. From this information, each of the cell encoders 1152-1 to 1152-*n* may determine a distance and an angle from its associated cell to each sound object, such as the sound object S 1212**.

Figure 12C:
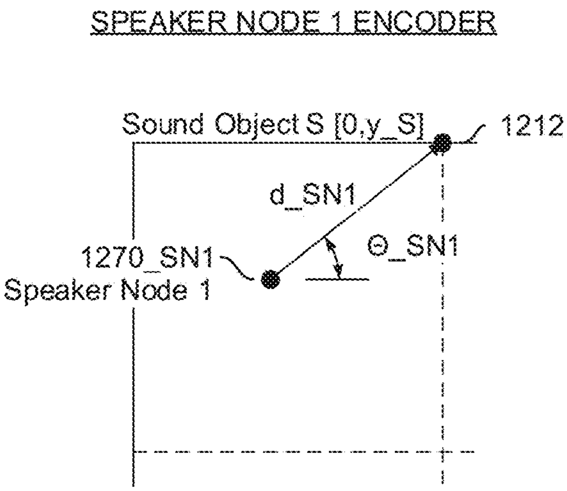

Referring to FIG. 12C, for example, where there are three cells (n=3), a first cell encoder 1152_SN1 for cell 1 1270_SN1 may use the sound information in the n-channel output 1142 to determine that the sound object S 1212 is at a distance d_SN1 at an angle theta_SN1 with respect to cell 1 1270_SN1. Similarly, a second cell encoder 1152_SN2 and a third cell encoder 1152_SN3 that are associated with cell 2 1270_SN2, and cell 3 1270_SN3, respectively, may use the sound information in the n-channel output 1142 to determine distances and angles from each of these cells and the sound object S 1212. In one aspect of the disclosure, each cell encoder may only receive its associated channel from the n-channel output 1142. In many embodiments, a similar process is performed during cell encoding based upon the locations of virtual speakers relative to a cell.

The cell-level sound field representation outputs from all of the cell encoders 1152-1 to **1152-*n* are collectively illustrated in FIG. 11 as cell-level sound field representation information 1162**.

Based on the cell-level sound field representation output 1162 received from the cell encoder 1152-1 to **1152-*n* which can be located in each of the n cells or on a single primary cell, a local cell decoder 1172-1 to 1172-*n* can render audio to drivers contained in the cell, collectively illustrated as transducer information 1182. Continuing with the example above, groups of drivers 1192-1 to 1192-*n* are also associated with respective cell decoders 1172-1 to 1172-*n***, where one group of drivers is associated with each cell and, more specifically, each cell decoder. It should be noted that the orientation and number of drivers in a group of drivers for a cell are provided as examples and the cell decoder contained therein may adapt to any specific orientation or number of loudspeakers. Furthermore, a cell can have a single driver and different cells within a spatial audio system can have different sets of drivers.

In one aspect of the disclosure, each cell decoder provides transducer information based on physical driver geometry of each respective cell. As further described herein, the transducer information may be converted to generate electrical signals that are specific to each driver in the cell. For example, a first cell decoder for cell 1 1270_SN1 may provide transducer information for each of the drivers in the cell 1294_S1, 1294_S2, and 1294_S3. Similarly, a second cell decoder 1172_SN2 and a third cell decoder 1172_SN3 may provide transducer information for each of the drivers in cell 2 1270_SN2 and cell 3 1270_SN3, respectively.

Figure 12D:
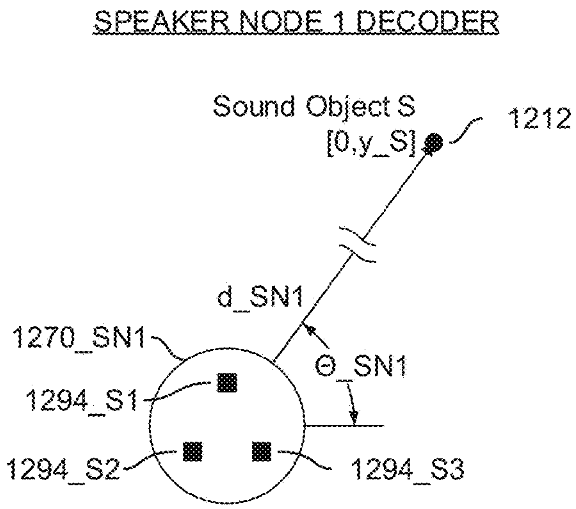

Referring to FIG. 12D in addition to FIG. 12C, if cell 1 1270_SN1 is to render the sound object S 1212 at the angle theta_SN1 and the distance d_SN1, where cell 1 1270_SN1 includes three drivers illustrated as a first driver 1294_S1, a second driver 1294_S2, and a third driver 1294_S3, the first cell decoder 1172_SN1 may provide transducer information to each of these three drivers. As can readily be appreciated, the specific signals generated by a cell decoder are largely dependent upon the configuration of the cell.

While specific processes for rendering sound fields from arbitrary audio sources using ambisonics, any of a variety of audio signal processing pipelines can be utilized to render sound fields using multiple cells in a manner that is independent from a number of channels and/or speaker-layout assumption utilized in the original encoding of an audio source as appropriate to the requirements of specific applications in accordance with various embodiments of the invention. For example, nested architectures can be utilized that employ other spatial audio representations in combination with or as an alternative to ambisonic representations including (but not limited to) higher order ambisonics (e.g. sound field representation), VBAP representations, DBAP, and/or KNN panning representations. Specific processes for rendering sound fields that utilize spatial audio reproduction techniques to generate audio inputs for a set of virtual speakers that are then utilized by individual cells to generate driver inputs in accordance with various embodiments of the invention are discussed further below.

Section 4B: Nested Architectures That Utilize Virtual Speakers

Spatial audio reproduction techniques in accordance with various embodiments of the invention can be used to render an arbitrary piece of source audio content on any arbitrary arrangement of cells, regardless of the number of channels of the source audio content. For example, source audio encoded in a 5.1 surround sound format is normally rendered using 5 speakers and a dedicated subwoofer. However, systems and methods described herein can render the same content in the same quality using a smaller number of cells. Turning now to FIGS. 13A-D, a visual representation of ambisonic rendering techniques utilized to map 5.1 channel audio to three cells in accordance with an embodiment of the invention is illustrated. As can be readily appreciated, the example shown in FIGS. 13A-D is generalizable to any arbitrary number of input channels to any arbitrary number of cells. Furthermore, channel based audio can be upmixed and/or downmixed to create a number of spatial audio objects that is different to the number of channels used in the encoding of audio. In addition, the processes described herein are not limited to the use of ambisonic representations of spatial audio.

Figure 13A:
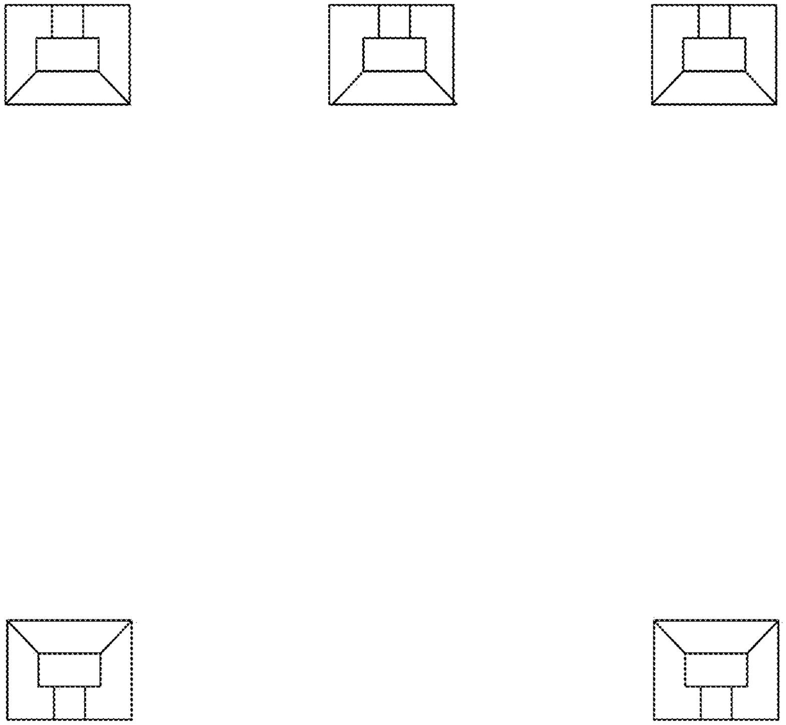
FIG. 13A-13D visually illustrate an example process for mapping 5.1 channel audio to three cells in accordance with an embodiment of the invention.
Figure 13B:
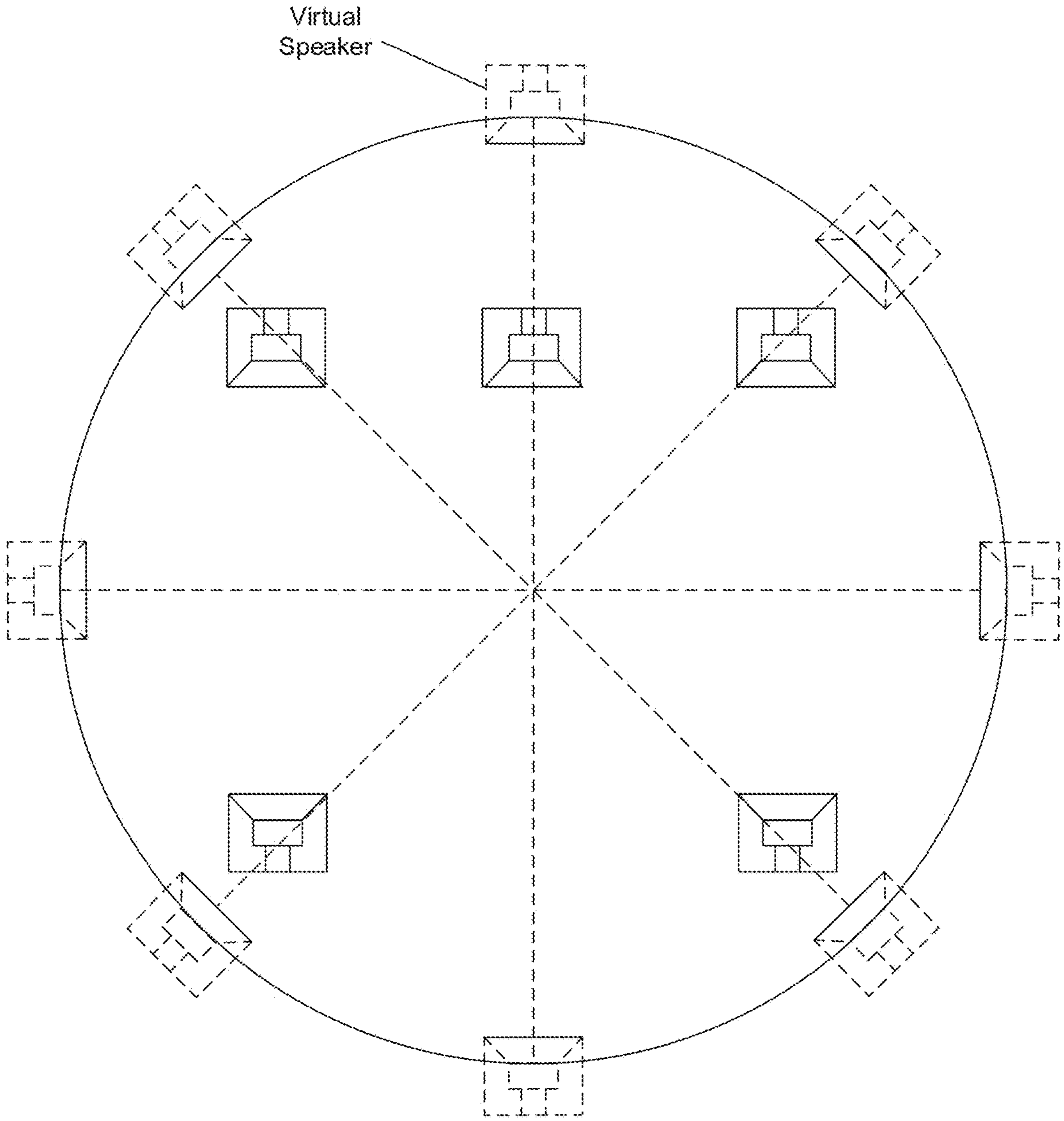

FIG. 13A illustrates a desired 5.1 channel speaker configuration. The 5.1 format has three forward speakers and two rear speakers, where the forward and rear speakers fire toward each other. The 5.1 channel speaker configuration is set up so that a point at the center of the configuration is the focus of the surround sound. Using this information, a ring of virtual speakers can be established with the same focus. This ring of virtual speakers in accordance with an embodiment of the invention is illustrated in FIG. 13B. In this example, eight virtual speakers are instantiated, although the number can be higher or lower depending on the number of cells used and/or the degree of spatial separation desired. In many embodiments, the ring of virtual speakers emulates an ambisonic loudspeaker array. Ambisonic encoding can be used to map the 5.1 channel audio to the ring of virtual loudspeakers by calculating the ambisonic representation required to create the same sound field that would match the sound field generated by the 5.1 channel speaker system. Using the ambisonic representation, each virtual speaker can be assigned an audio signal, which, if rendered, would create said sound field. Alternative spatial audio rendering techniques can be utilized to encode the 5.1 channel audio to any of a variety of spatial audio representations, which is then decoded based upon an array of virtual speakers, using a representation such as (but not limited to) higher order ambisonics (e.g. sound field representation), a VBAP representation, DBAP representation, and/or a KNN panning representation.

Figure 13C:
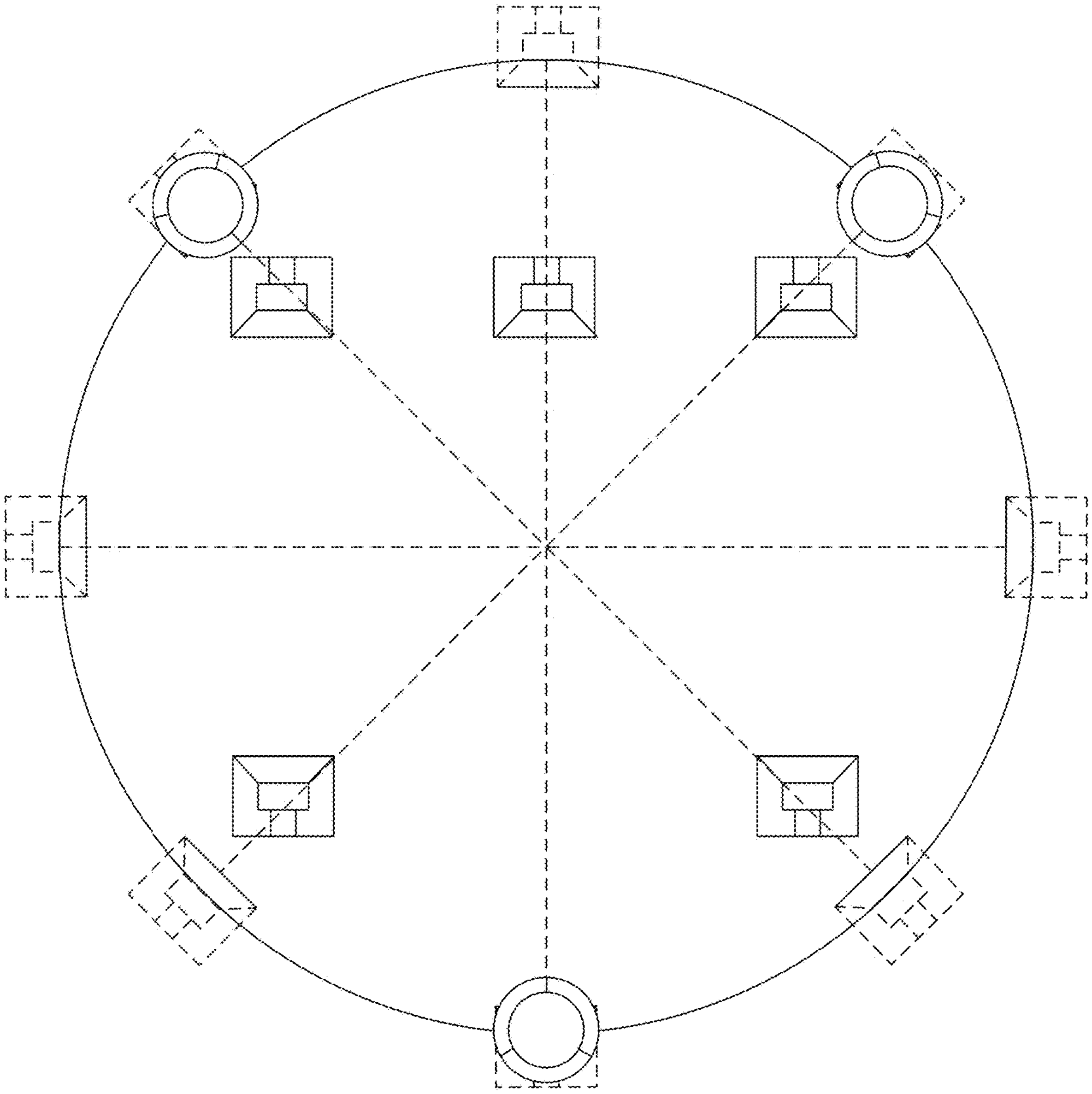
Figure 13D:
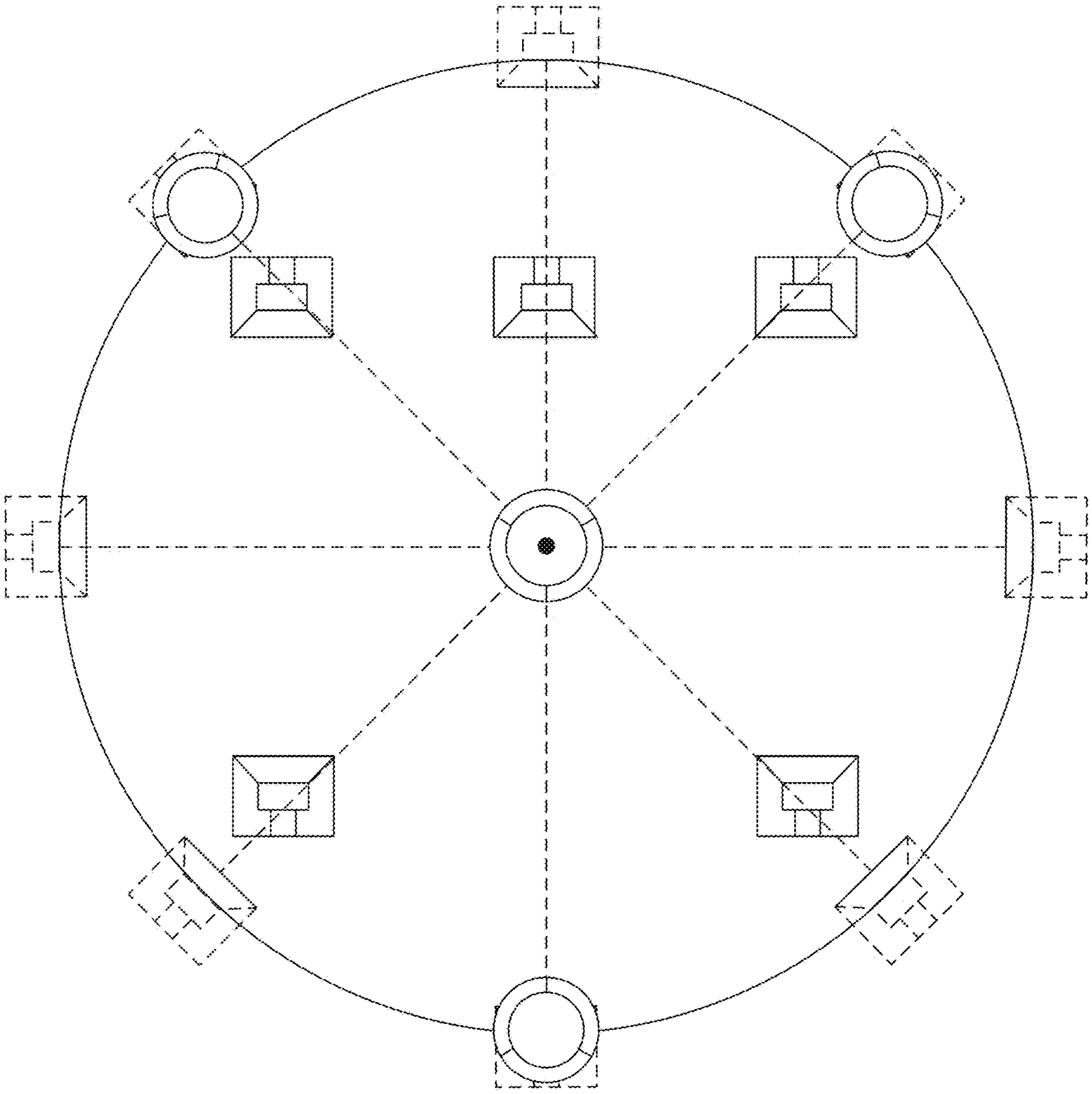

Due to the modal beamforming capabilities of the cells utilized in many embodiments of the invention, which enable them to render sound objects, the virtual speakers can be assigned to cells in a group as sound objects. The cells each can encode the audio signals associated with the virtual speakers that they are assigned into a spatial audio representation, which the cell can then decode to obtain a set of signals to drive the drivers contained within the cell. In this way, the cells can collectively render the desired sound field. A three cell arrangement rendering the 5.1 channel audio in accordance with an embodiment of the invention is illustrated in FIG. 13C. In some embodiments, an aerial cell (located on a higher horizontal plane than the other cells, can be introduced to more closely approximate an ambisonic speaker array. An example configuration that includes an aerial cell in accordance with an embodiment of the invention is illustrated in FIG. 13D. While specific examples are described above with reference to FIGS. 13A-13D based upon a 5.1 channel source and groups including 3 or 4 cells, any of a variety of mappings of any number of channels (including a single channel) to one or more spatial audio objects (including by upmixing and/or downmixing of channels) for rendering by an arbitrary configuration of a group of one or more cells can be performed using processes similar to any of the processes described herein as appropriate to the requirements of specific applications in accordance with various embodiments of the invention.

Figure 14:
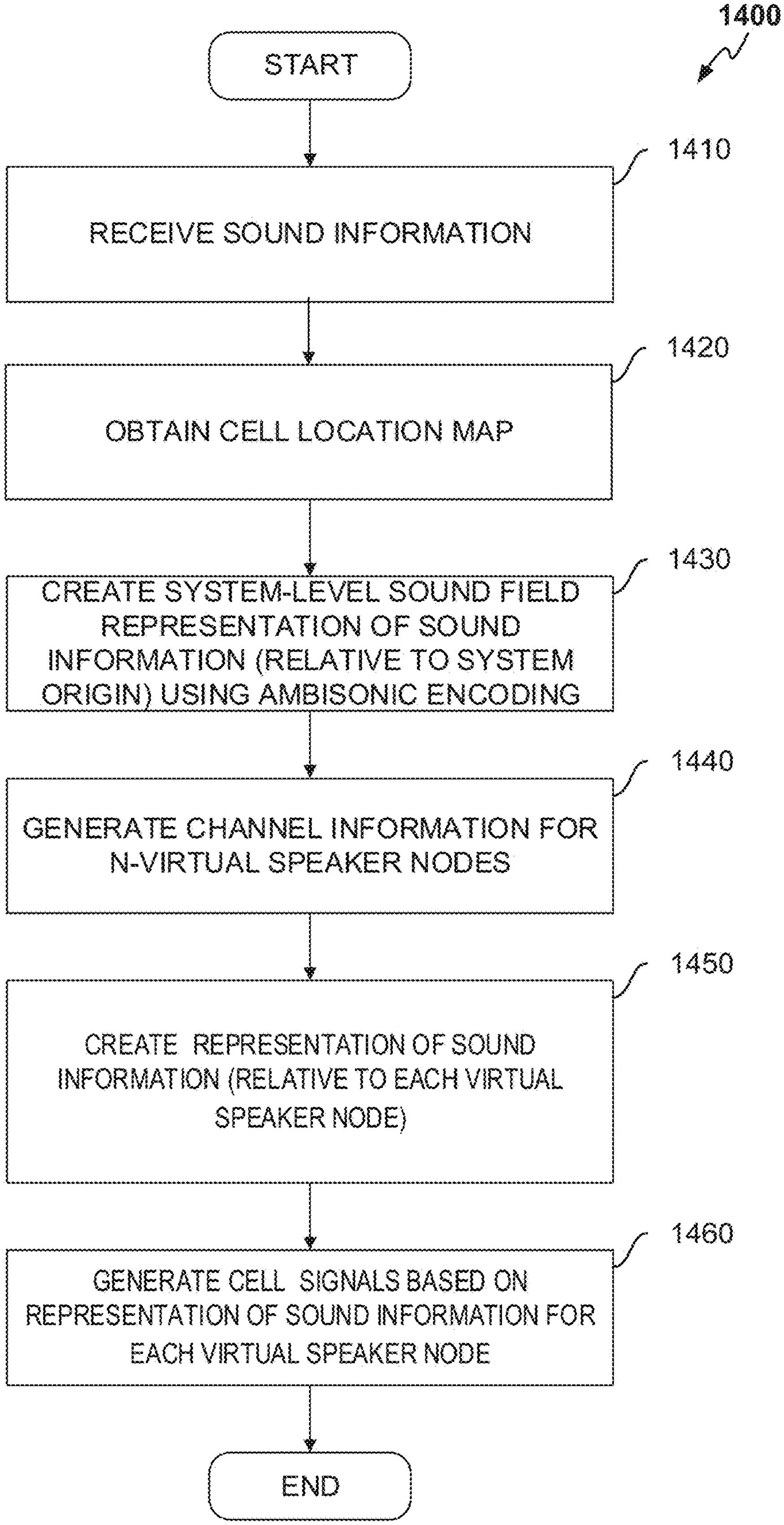
FIG. 14 illustrates a process for processing sound information in accordance with an embodiment of the invention.

FIG. 14 illustrates a sound information process 1400 for processing sound information that may be implemented by a system for spatial audio control and reproduction in accordance with various aspects of the present disclosure. At 1410, sound information which, can include sound objects, is received by a system encoder. At 1420, a map of the cell locations can be obtained. At 1430, the system encoder creates a sound field representation using sound information for a set of sound objects. In general, the system encoder generates the sound field representation of the sound objects at a system-level. In one aspect of the present disclosure, this system-level sound field representation includes position information of the sound objects in the sound information. For example, the system encoder may generate the sound field information by mapping sound objects contained in the sound information. The sound field information may utilize an ambisonic representation that includes components W, which is the omnidirectional component, X and Y, and, if applicable, Z. As noted above, alternative spatial audio representations can be utilized including (but not limited to) higher order ambisonics (e.g. sound field representation), a VBAP representation, a DBAP representation, and/or a KNN panning representation. The position information can be defined with respect to an origin selected by the system encoder, which is referred to as the "system origin" because the system encoder has determined the origin.

At 1440, a system decoder receives the sound field information, which includes the system-level sound field representation generated by the system encoder using the sound information. The system decoder, using the system-level sound field representation and an awareness of the layout and number of the cells in the system, may generate a per-cell output in the form of an n-channel output. As discussed, in one aspect of the disclosure, information in the n-channel output is based on the number and layout of cells in the system. In many embodiments, the decoder utilizes the layout of the cells to define a set of virtual speakers and generates a set of audio inputs for a set of virtual speakers. The specific channel output from the n-channel output that is provided to a given cell can include one or more of the audio inputs for the set of virtual speakers and information concerning the locations of those virtual speakers. In several embodiments, a primary cell utilizes the virtual speakers to decode a set of audio signals for each of the cells (e.g. the primary cell performs processing to generate cell signals based on representations of sound information for each virtual speaker 1460). In a number of embodiments, each audio signal decoded for a particular cell corresponds to a set of drivers oriented in a specific direction. When a cell has, for example, three sets of drivers oriented in different directions, then the primary cell can decode three audio signals (one for each set of drivers) from the all or a subset of the audio signals for the virtual speakers. When the primary cell decodes a set of audio signals for each of the cells, then it is these signals that are the n-channel output that is provided to a given cell.

At 1450, each cell encoder receives one of the n-channels of sound information for the set of virtual speakers in the n-channel output generated by the system decoder. Each cell encoder can determine sound field representation information at a cell level from the audio inputs to the virtual speakers and the locations of the virtual speakers, which can allow a respective cell decoder to later generate appropriate transducer information for one or more drivers associated therewith, as further discussed herein. Specifically, each cell encoder in a cell passes its sound field representation information to its associated cell decoder in outputs that can be collectively referred to as the cell-level sound field representation information. The associated cell decoder can then decode the cell-level sound field representation information to output 1460 individual driver signals to the drivers. In one aspect of the disclosure, this cell-level sound field representation information is provided as information to attenuate the audio to be generated from each cell. In other words, the signal is being attenuated by a certain amount to bias it in a particular direction (e.g., panning). In many embodiments, the virtual speaker inputs can be directly transformed to individual driver signals using a set of filters such as (but not limited to) a set of FIR filters. As can readily be appreciated, generation of driver signals using filters is an efficient technique for performing the nested encoding and decoding the virtual speaker inputs in a manner that accounts for a fixed relationship between the virtual speaker locations and the cell locations irrespective of the locations of the spatial audio objects rendered by the cells.

In several embodiments, the cell encoder and cell decoder can use ambisonics to control the directivity of the signals produced by each cell. In a number of embodiments, first order ambisonics are utilized within the process for encoding and/or decoding audio signals for a specific cell based upon the audio inputs of the set of virtual speakers. In a number of embodiments, a weighted sampling decoder is utilized to generate a set of audio signals for a cell. In several embodiments, additional side rejection is obtained in beams formed by a cell using higher order ambisonics including (but not limited to) supercardoids and/or hypercardiods. In this way, the use of a decoder that relies upon higher order ambisonics can achieve greater directivity and less crosstalk between sets of drivers (e.g. horns) of the cells utilized within spatial audio systems in accordance with various embodiments of the invention. In several embodiments maximum energy vector magnitude weighting can be utilized to implement a higher order ambisonic decoder utilized to decode audio signals for a cell within a spatial audio system. As can readily be appreciated, any of a variety of spatial audio decoders can be utilized to generate audio signals for a cell based upon a number of virtual speaker input signals and their locations as appropriate to the requirements of specific applications in accordance with various embodiments of the invention.

As is discussed further below, the perceived distance and direction of spatial audio objects can be controlled by modifying the directivity and/or direction of the audio produced by the cells in ways that modify characteristics of the sound including (but not limited to) the ratio of the power of direct audio to the power of diffuse audio perceived by one or more listeners located proximate a cell or group of cells. While various processes for decoding audio signals for specific cells in a nested architecture utilizing virtual speakers are described above, cell decoders similar to the cell decoders described herein can be utilized in any of a variety of spatial audio systems including (but not limited to) spatial audio systems that to not rely upon the use of virtual speakers in the encoding of spatial audio and/or rely upon any of a variety of different numbers and/or configurations of virtual speakers in the encoding of spatial audio as appropriate to the requirements of specific applications in accordance with various embodiments of the invention. When multiple network-connected cells exist on a network, it can be beneficial to reduce the amount of traffic needed to flow over the network. This can reduce latency which can be critical for synchronizing audio. As such, in a variety of embodiments, a primary cell can be responsible for encoding the spatial representation and decoding the spatial representation based upon a virtual speaker layout. The primary cell can then transmit the decoded signals for the virtual speakers to secondary cells for the remainder of the steps. In this fashion, the maximum number of audio signals to be transmitted across the network is independent of the number of spatial audio objects and instead depends upon the number of virtual speaker audio signals that are desired to be provided to each cell. As can readily be appreciated, the division between primary cell processing and secondary cell processing can be drawn at any arbitrary point with various benefits and consequences.

Figure 15:
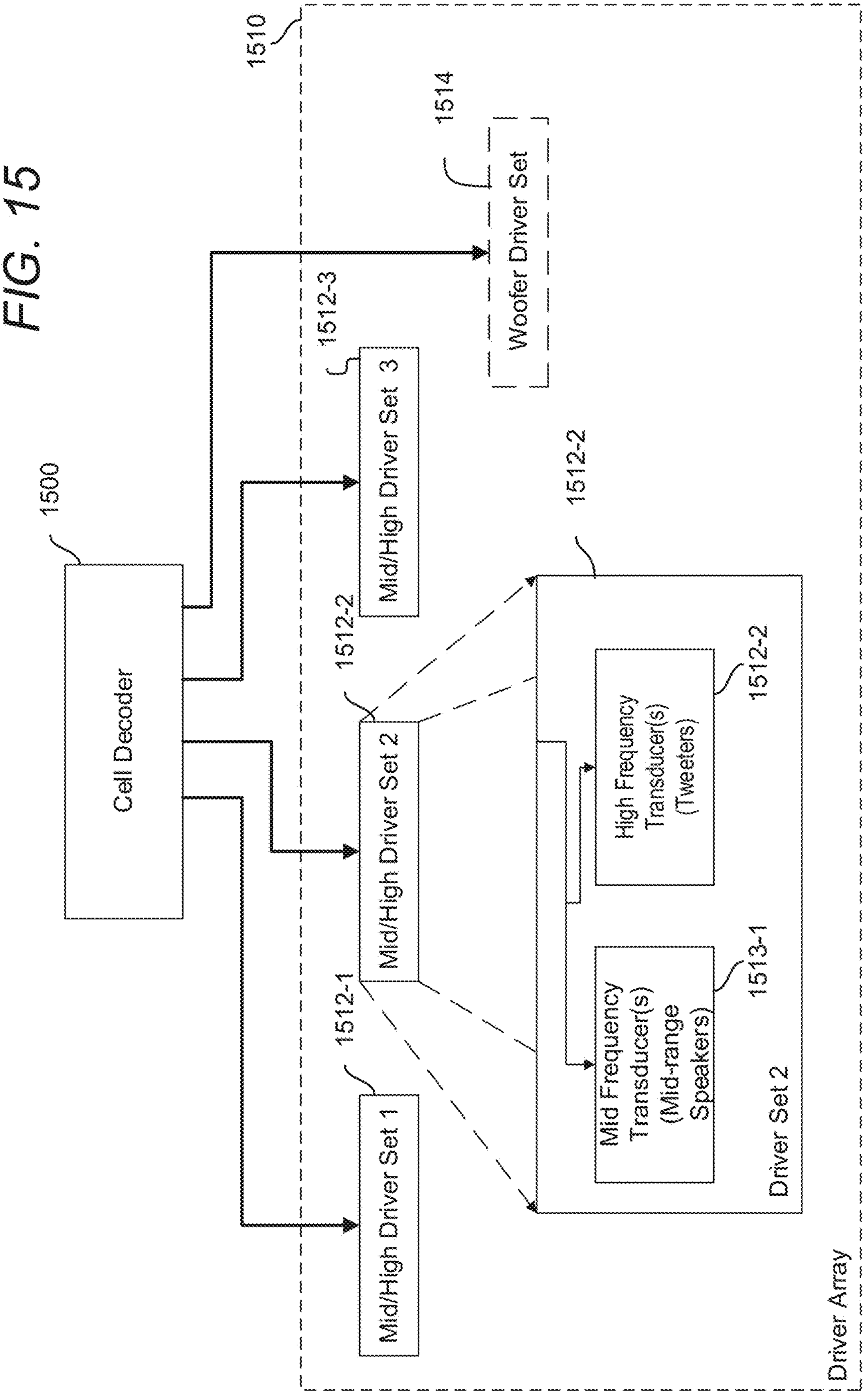
FIG. 15 illustrates sets of drivers in a driver array of a cell in accordance with an embodiment of the invention.

In many embodiments, drivers in the driver array of a cell may be arranged into one or more sets, which can each be driven by the cell decoder. In numerous embodiments, each driver set contains at least one mid and at least one tweeter. However, different numbers of drivers and classes of drivers can make up a driver set, including, but not limited to, all one type of driver as appropriate to the requirements of specific applications in accordance with various embodiments of the invention. For example, FIG. 15 illustrates sets of drivers in a driver array of a cell in accordance with an embodiment of the invention. A cell decoder 1500 drives a driver array 1510, which includes a first set of mid/high drivers 1512-1, a second set of mid/high drivers 1512-2, and a third set of mid/high drivers 1512-3. Each driver set may include one or more audio transducers of different types, such as one or more bass, mid-range, and tweeter speakers. In one aspect of the disclosure, a separate audio signal may be generated for each loudspeaker set in a loudspeaker array, and a bandpass filter such as a crossover may be used so that the transducer information generated by the cell decoder 1500 may be divided into different band-passed signals for each of the different types of driver in a particular driver set. In the illustrated embodiment, each of the mid/high driver sets includes a mid 1513-1 and a tweeter 1513-2. In many embodiments, the driver array further includes a woofer driver set 1514. In many embodiments, the woofer driver set includes two woofers. However, any number of woofers, including no woofers, one woofer, or n woofers can be utilized as appropriate to the requirements of specific applications in accordance with various embodiments of the invention.

In a number of embodiments, the perceived quality of the spatial audio rendered by a spatial audio system can be enhanced by using directional audio to control the perceived ratio of direct and reverberant sound in the rendered sound field. In many embodiments, increased reverberant sound is achieved using modal beamforming to direct beams to reflect off walls and/or other surfaces within a space. In this way, the ratio between direct and reverberant noise can be controlled by rendering audio that includes direct components in a first direction and additional indirect audio components in additional directions that will reflect off nearby surfaces. Various techniques that can be utilized to achieve immersive spatial audio using directional audio in accordance with a number of different embodiments of the invention are discussed below.

Figure 16:
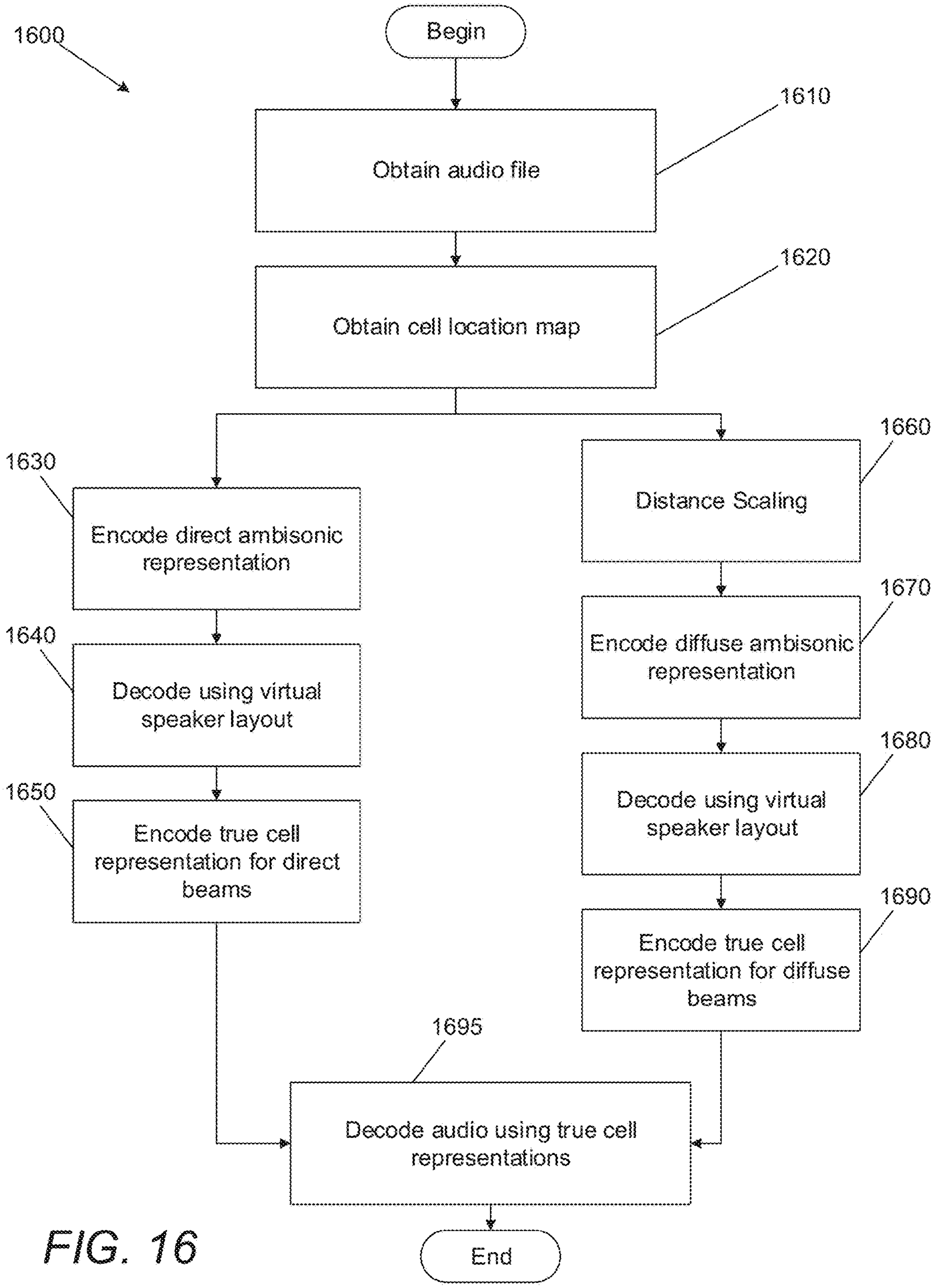
FIG. 16 illustrates a process for rendering spatial audio in a diffuse and a directed fashion in accordance with an embodiment of the invention.

Turning now to FIG. 16, a process for rendering spatial audio in a diffuse and directed fashion in accordance with an embodiment of the invention is illustrated. Process 1600 includes obtaining (1610) all or a portion of an audio file and obtaining (1620) a cell location map. Using this information, a direct audio spatial representation is encoded (1630). The direct representation can include the information regarding direct sound (rather than diffuse sound). The direct representation can be decoded (1640) using a virtual speaker layout and then the output is encoded (1650) for the true cell layout. This encoded information can contain spatial audio information that can be used to generate the direct portion of the sound field associated with the source audio. In substantially real time, a distance scaling process can be performed (1660) and a diffuse spatial representation encoded (1670). This diffuse representation can be decoded (1680) using the virtual speaker layout and encoded (1690) for the true cell layout to control the perceived ratio between direct and reverberant sound. The diffuse and direct representations can be decoded (1695) by the cells to render the desired sound field.

As can be appreciated from the discussion above, the ability to determine spatial information including (but not limited to) the relative position and orientation of cells in a space, and the acoustic characteristics of a space can greatly assist with the rendering of spatial audio. In a number of embodiments, ranging processes are utilized to determine various characteristics of the placement and orientation of cells and/or the space in which the cells are placed. This information can then be utilized to determine virtual speaker locations. Collectively spatial data including (but not limited to) spatial data describing cells, a space, location of a listener, historic locations of listeners, and/or virtual speaker locations can be referred to as spatial location metadata. Various processes for generating spatial location metadata and distributing some or all of the spatial location metadata to various cells within a spatial audio system in accordance with various embodiments of the invention are described below.

Figure 17:
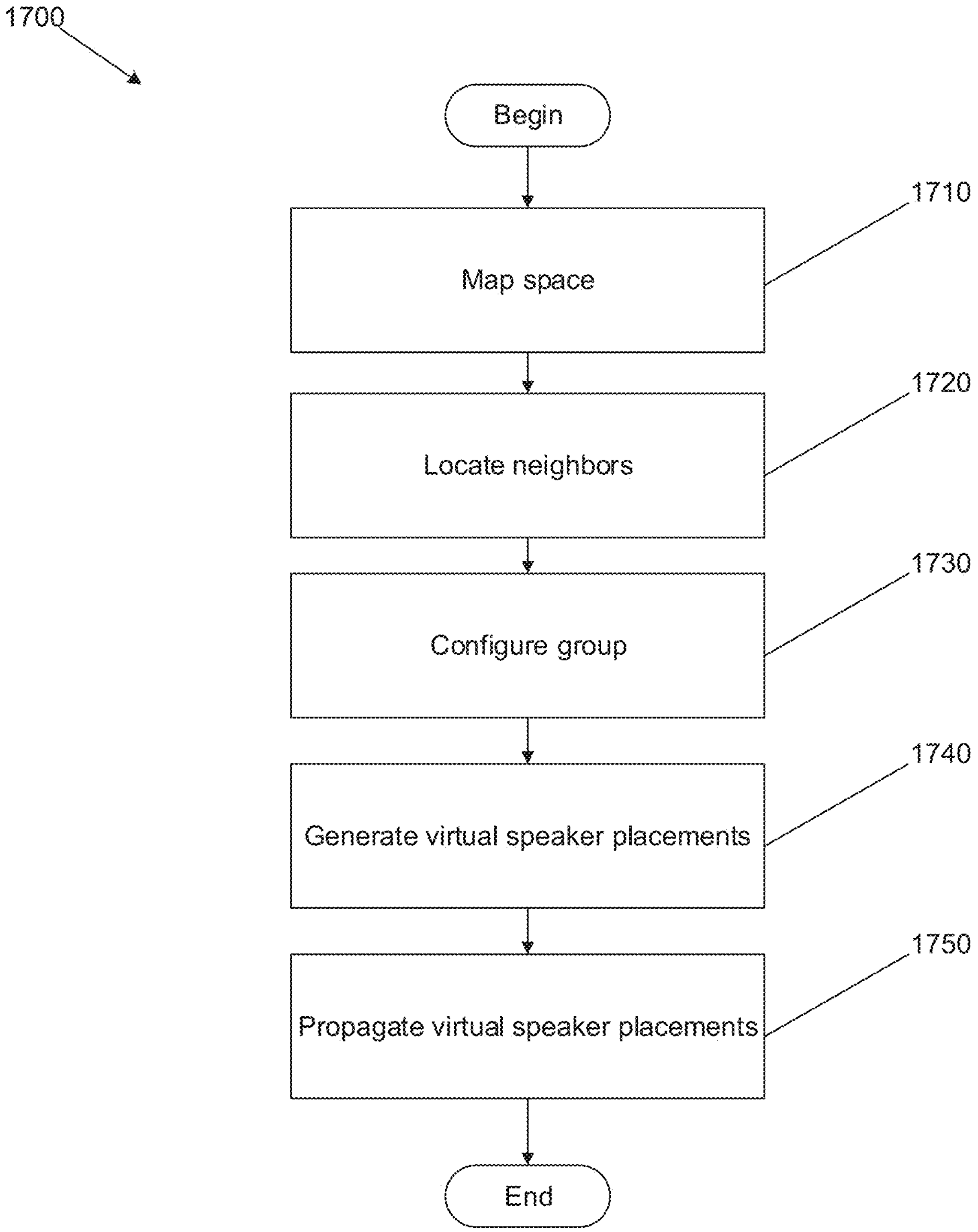
FIG. 17 is a process for propagating virtual speaker placements to cells in accordance with an embodiment of the invention.

Turning now to FIG. 17, a process for propagating virtual speaker placements to cells in accordance with an embodiment of the invention is illustrated. Process 1700 includes mapping (1710) the space. As noted above, space mapping can be performed by cells and/or other devices using any of a number of techniques. In a variety of embodiments, mapping a space includes determining the acoustic reflectivity of various objects and barriers in the space.

Process 1700 further includes locating (1720) neighboring cells. In numerous embodiments, cells can be located by other cells using acoustic signaling. Cells can also be identified via visual confirmation using a network connected camera (e.g. mobile phone camera). Once cells in a region have been located, a group can be configured (1730). Based on the location of the speakers in the group, a virtual speaker placement can be generated (1740). The virtual speaker placement can then be propagated (1750) to other cells. In numerous embodiments, a primary cell generates the virtual speaker placements and propagates the placements to secondary cells connected to the primary. In many embodiments, more than one virtual speaker placement can be generated. For example, conventional 2, 2.1, 5.1, 5.1.2, 5.1.4, 7.1, 7.1.2, 7.1.4, 9.1.2, 9.1.4, and 11.1 speaker placements including speaker placements recommended in conjunction with various audio encoding formats including (but not limited to) Dolby Digital, Dolby Digital Plus, and Dolby Atmos, as developed by Dolby Laboratories, Inc. may be generated as they are more common. However, virtual speaker placements can be generated on the fly using the map.

Figure 48:
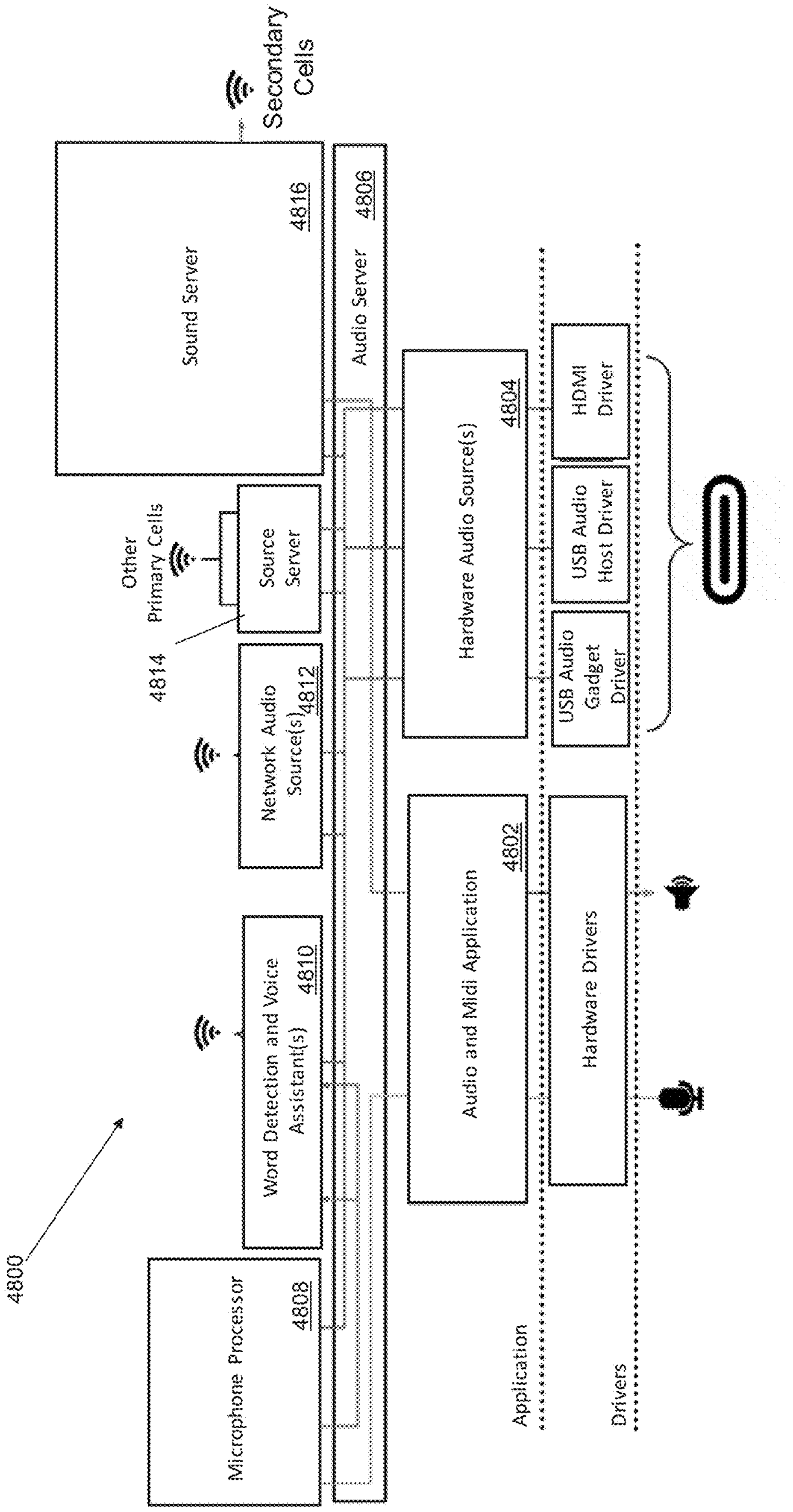
FIG. 48 conceptually illustrates software of a cell that can be configured to act as a primary cell or a secondary cell in accordance with an embodiment of the invention.

As noted above, the components of a nested architecture of spatial encoders and spatial decoders can be implemented within individual cells within a spatial audio in a variety of ways. Software of a cell that can be configured act as a primary cell or a secondary cell within a spatial audio system in accordance with an embodiment of the invention is conceptually illustrated in FIG. 48. The cell 4800 includes a series of drivers including (but not limited to) hardware drivers, and interface connector drivers such as (but not limited to) USB and HDMI drivers. The drivers enable the software of the cell 4800 to capture audio signals using one or more microphones and to generate driver signals (e.g. using a digital to analog converter) for the one or more drivers in the cell. As can readily be appreciated, the specific drivers utilized by a cell are largely dependent upon the hardware of the cell.

In the illustrated embodiment, an audio and midi application D #402 is provided to manage information passing between various software processes executing on the processing system of the cell and the hardware drivers. In several embodiments, the audio and midi application is capable of decoding audio signals for rendering on the sets of drivers of the cell. Any of the processes described herein for decoding audio for rendering on a cell can be utilized by the audio and midi application including the processes discussed in detail below.

A hardware audio source processes 4804 manage communication with external sources via the interface connector drivers. The interface connector drivers can enable audio sources to be directly connected to the cell. Audio signals can be routed between the drivers and various software processes executing on the processing system of the cell using an audio server 4806.

As noted above, audio signals captured by microphones can be utilized for a variety of applications including (but not limited to) calibration, equalization, ranging, and/or voice command control. In the illustrated embodiment, audio signals from the microphone can be routed from the audio and midi application 4802 to a microphone processor 4808 using the audio server 4806. The microphone processor can perform functions associated with the manner in which the cell generates spatial audio such as (but not limited to) calibration, equalization, and/or ranging. In several embodiments, the microphone is utilized to capture voice commands and the microphone processor can process the microphone signals and provide them to word detection and/or voice assistant clients 4810. When command words are detected, the voice assistant clients 4810 can provide audio and/or audio commands to cloud services for additional processing. The voice assistant clients 4810 can also provide response from the voice assistant cloud services to the application software of the cell (e.g. mapping voice commands to controls of the cell). The application software of the cell can then implement the voice commands as appropriate to the specific voice command.

In several embodiments, the cell receives audio from a network audio source. In the illustrated embodiment, a network audio source process 4812 is provided to manage communication with one or more remote audio sources. The network audio source process can manage authentication, streaming, digital rights management, and/or any other processes that the cell is required to perform by a particular network audio source to receive and playback audio. As is discussed further below, the received audio can be forwarded to other cells using a source server process 4814 or provided to a sound server 4816.

The cell can forward a source to another cell using the source server 4814. The source can be (but is not limited to) an audio source directly connected to the cell via a connector, and/or a source obtained from a network audio source via the network audio source process 4812. Sources can be forwarded between a primary in a first group of cells and a primary in second group of cells to synchronize playback of the source between the two groups of cells. The cell can also receive one or more sources from another cell or a network connected source input device via the source server 4814.

The sound server 4816 can coordinate audio playback on the cell. When the cell is configured as a primary, the sound server 4816 can also coordinate audio playback on secondary cells. When the cell is configured as a primary, the source server 4816 can receive an audio source and process the audio source for rendering using the drivers on the cell. As can readily be appreciated any of a variety of spatial audio processing techniques can be utilized to process the audio source to obtain spatial audio objects and to render audio using the cell's drivers based upon the spatial audio objects. In a number of embodiments, the cell software implements a nested architecture similar to the various nested architectures described above in which the source audio is used to obtain spatial audio objects. The sound server 4816 can generate the appropriate source audio objects for a particular audio source and then spatially encode the spatial audio objects. In several embodiments, the audio sources can already be spatially encoded (e.g. encoded in an ambisonic format) and so the sound server 4816 need not perform spatial encoding. The sound server 4816 can decode spatial audio to a virtual speaker layout. The audio signals for the virtual speakers can then be used by the sound server to decode audio signals specific to the location of the cell and/or locations of cells within a group. In several embodiments, the process of obtaining audio signals for each cell involves spatially encoding the audio inputs of the virtual speakers based upon the location of the cell and/or other cells within a group of cells. The spatial audio for each cell can then be decoded into separate audio signals for each set of drivers included in the cell. In a number of embodiments, the audio signal for the cell can be provided to the audio and midi application 4802, which generates the individual driver inputs. Where the cell is primary cell within a group of cells, the sound server 4816 can transmit the audio signals for each of the secondary cells over the network. In many embodiments, the audio signals are transmitted via unicast. In several embodiments, some of the audio signals are unicast and at least one signal is multicast (e.g. a bass signal that is used for rendering by all cells within a group). In a number of embodiments, the sound server 4816 generates direct and diffuse audio signals that are utilized by the audio and midi application 4802 to generate inputs to the cell's drivers using the hardware drivers. Direct and diffuse signals can also be generated by the sound server 4816 and provided to secondary cells.

When the cell is a secondary cell, the sound server 4802 can receive an audio signals that were generated on a primary cell and provided to the cell via a network. The cell can route the received audio signals to the audio and midi application 4802, which generates the individual driver inputs in the same manner as if the audio signals had been generated by the cell itself.

Various potential implementations of sound servers can be utilized in cells similar to those described above with reference to FIG. 48 and/or in any of a variety of other types of cells that can be utilized within spatial audio systems in accordance with certain embodiments of the invention. A sound server software implementation that can be utilized in a cell within a spatial audio system in accordance with an embodiment of the invention is conceptually illustrated in FIG. 49. The sound server 4900 utilizes source graphs 4902 to process particular audio sources for input into appropriate spatial encoders 4904 as appropriate to the requirements of specific applications. In several embodiments, multiple sources can be mixed. In the illustrated embodiment, a mix engine 4906 mixes spatially encoded audio from each of the sources. The mixed spatially encoded audio is provided to at least a local decoder 4908, which decodes the spatially encoded audio into audio signals specific to the cell that can be utilized to render driver signals for the sets of drivers within the cell. The mixed spatially encoded audio signal can be provided to one or more secondary decoders 4910. Each secondary decoder is capable of decoding spatially encoded audio into audio signals specific to a particular secondary cell based upon on the location of the cell and/or the layout of the environment in which the group of cells is located. In this way, a primary cell can generate audio signals for each cell in a group of cells. In the illustrated embodiment, a secondary send process 4912 is utilized to transmit the audio signals via a network to the secondary cells.

The source graphs 4902 can be configured in a variety of different ways depending upon the nature of the audio. In several embodiments, the cell can receive sources that mono, stereo, any of a variety of multichannel surround sound formats, and/or audio encoded in accordance with an ambisonic format. Depending upon the encoding of the audio, the source graph can map an audio signal or an audio channel to an audio object. As discussed above, the received source can be upmixed and/or downmixed to create a number of audio objects that is different to the number of audio signals/audio channels provided by the audio source. When the audio is encoded in an ambisonic format, the source graph may be able to forward the audio source directly to the spatial encoder. In several embodiments, the ambisonic format may be incompatible with the spatial encoder and the audio source must be reencoded in an ambisonic format that is an appropriate input for the spatial encoder. As can readily be appreciated, an advantage of utilizing source graphs to process sources for input to a spatial encoder is that additional source graphs can be developed to support additional formats as appropriate to the requirements of specific applications.

Figure 49:
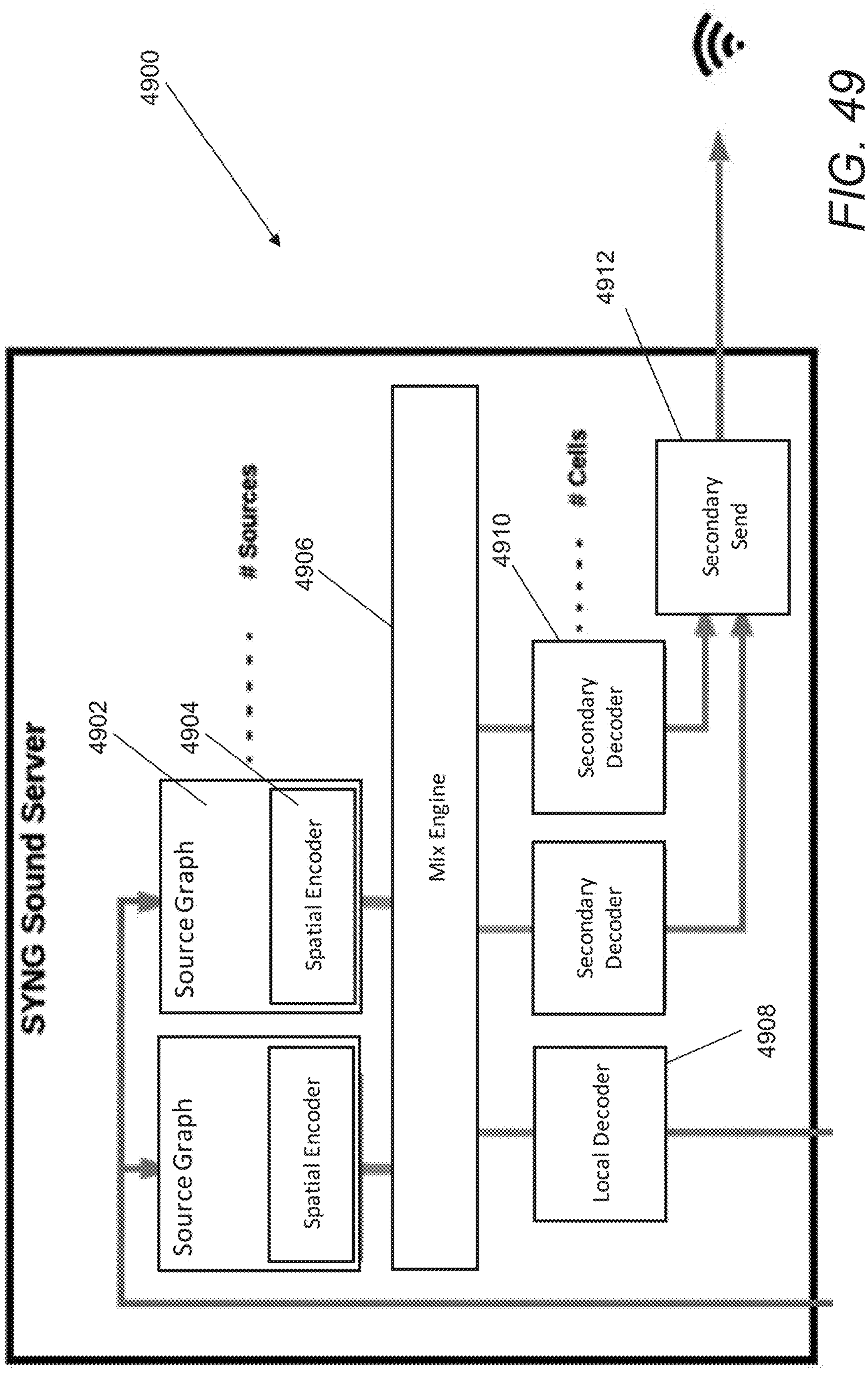
FIG. 49 conceptually illustrates a sound server software implementation in accordance with an embodiment of the invention.

A variety of spatial encoders can be utilized in sound servers similar to the sound server shown in FIG. 49. Furthermore, a specific cell may include a number of different spatial encoders that can be utilized based upon factors including (but not limited to) any one or more of: the type of audio source, the number of cells, and/or the placement of cells. For example, the spatial encoding utilized can vary depending upon whether the cells are grouped in a configuration in which multiple cells are substantially on the same plane and in a second configuration when the group of cells also includes at least one cell mounted overhead (e.g. ceiling mounted).

Figure 50:
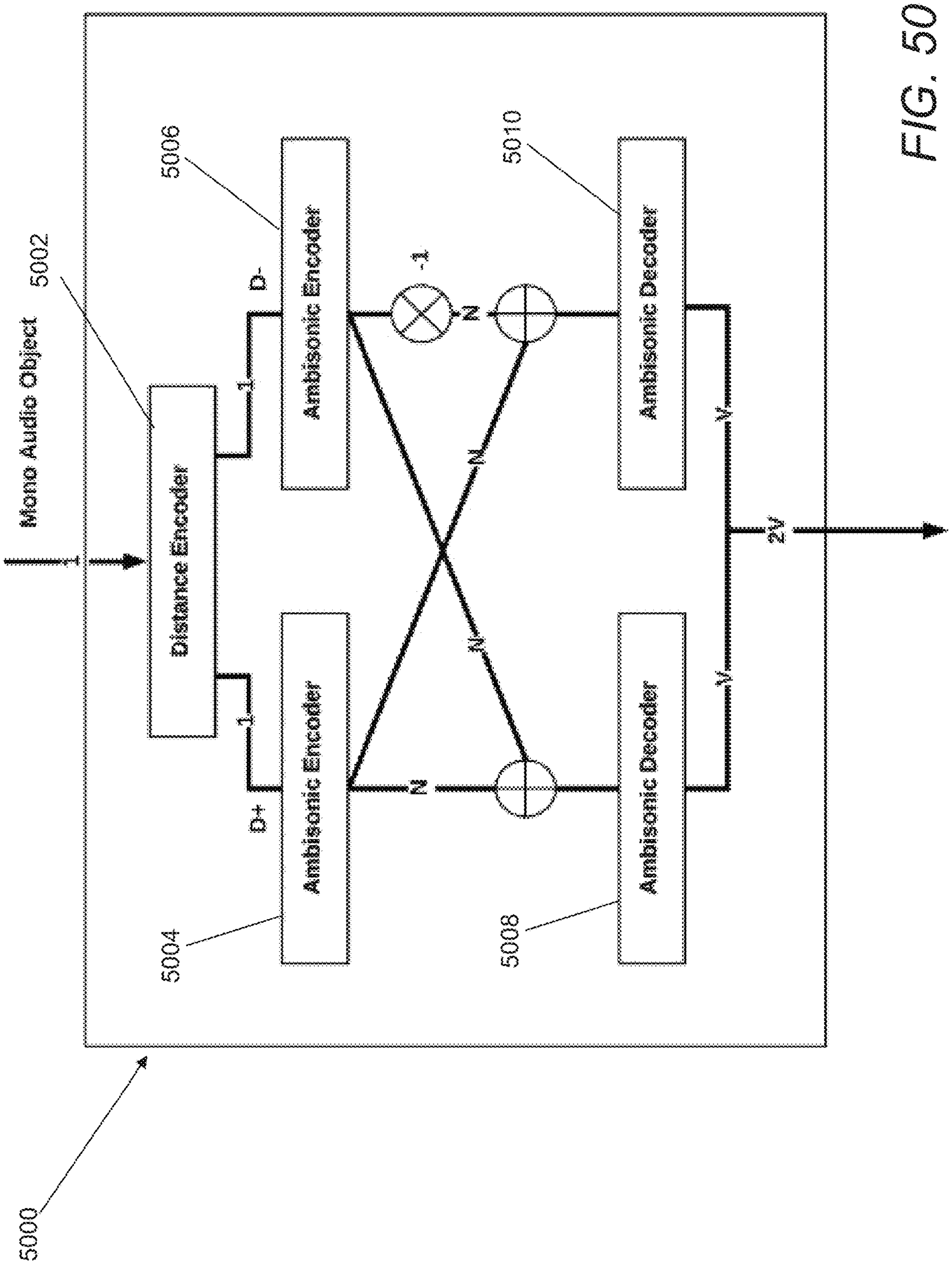
FIG. 50 illustrates a spatial encoder that can be utilized to encode a mono source in accordance with an embodiment of the invention.

A spatial encoder that can be utilized to encode a mono source in any of the sound servers described herein in accordance with an embodiment of the invention is conceptually illustrated in FIG. 50. The spatial encoder 5000 accepts as an input and individual mono audio object and information concerning the location of the audio object. In many embodiments, the location information can be expressed in Cartesian and/or radial coordinates relative to a system origin in 2D or 3D. The spatial encoder 5000 utilizes a distance encoder 5002 to encode to generate signals used to represent the direct and diffuse audio generated by the audio object. In the illustrated embodiment, a first ambisonic encoder 5004 is utilized to generate a higher order ambisonic representation (e.g. a second order ambisonic and/or sound field representation) of the direct audio generated by the audio object. In addition, a second ambisonic encoder 5006 is utilized to generate a higher order ambisonic representation of the diffuse audio (e.g. a second order ambisonic and/or sound field representation). A first ambisonic decoder 5008 decodes the higher order ambisonic representation of the direct audio into audio inputs for a set of virtual speakers. A second ambisonic decoder 5010 decodes the higher order ambisonic representation of the diffuse audio into audio inputs for the set of virtual speakers. While the spatial encoder described with respect to FIG. 50 utilizes higher order ambisonic representations of the direct and diffuse audio, spatial encoders can also use representations such as (but not limited to) a VBAP representation, a DBAP representation, and/or a KNN panning representation.

Figure 51:
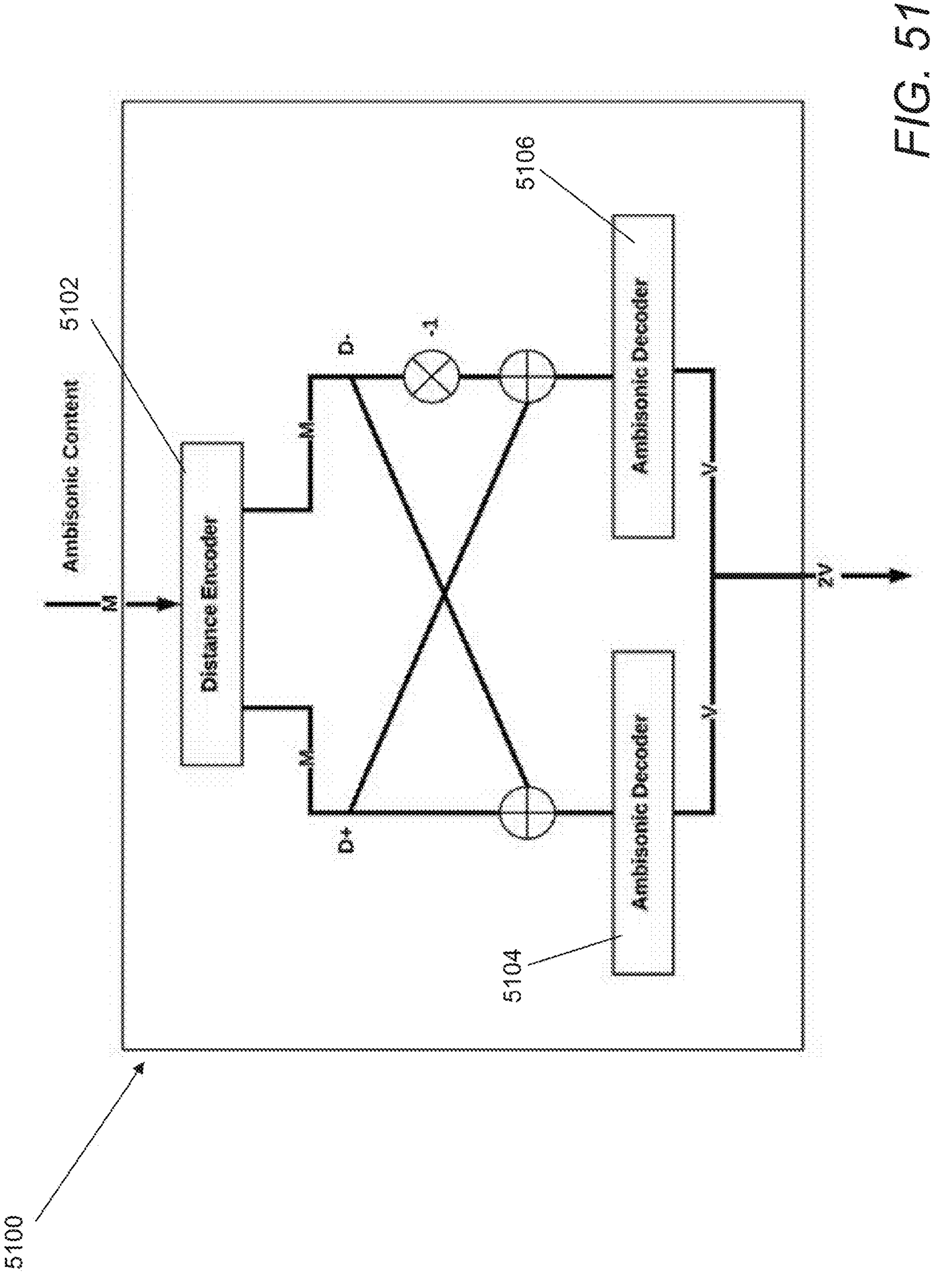
FIG. 51 illustrates a source encoder in accordance with an embodiment of the invention.

As can be appreciated from the source encoder illustrated in FIG. 51, a source that is ambisonically encoded in a format that is compatible with the source encoder does not require separate ambisonic encoding. Instead, the source encoder 5100 can utilize a distance encoder 5102 to determine direct and diffuse audio for the ambisonic content. The ambisonic representations of the direct and diffuse audio can then be decoded to provide audio inputs for a set of virtual speakers. In the illustrated embodiment, a first ambisonic decoder 5104 decodes the ambisonic representation of the direct audio into inputs for a set of virtual speakers and a second ambisonic decoder 5106 decodes the ambisonic representation of the diffuse audio into inputs for the set of virtual speakers. While the discussion source encoders above with respect to FIG. 51 references ambisonic encodings, any of a variety of representations of spatial audio can be similarly decoded into direct and/or diffuse inputs for a set of virtual speakers as appropriate to the requirements of specific applications in accordance with various embodiments of the invention.

Figure 52:
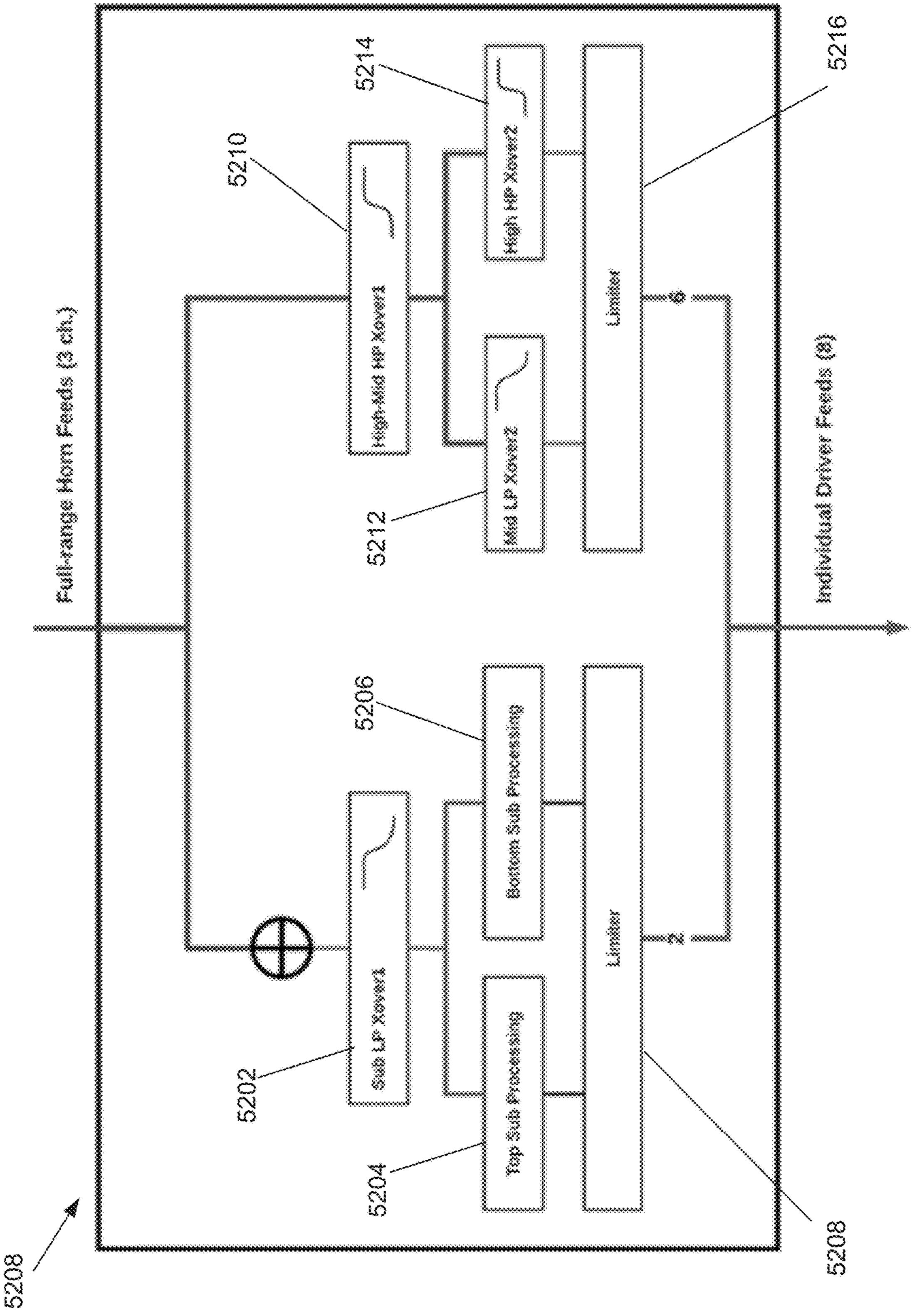
FIG. 52 is a graph showing generation of individual driver feeds based upon three audio signals corresponding to feeds for each of a set of three horns in accordance with an embodiment of the invention.

As noted above, virtual speaker audio inputs can be directly decoded to provide feed signals for one or more sets of one or more drivers. In many embodiments, each set of drivers is oriented in a different direction and the virtual speaker audio inputs are utilized to generate an ambisonic, or other appropriate spatial representation, of the sound field generated by the cell. The spatial representation of the sound field generated by the cell can then be utilized to decode feed signals for each set of drivers. The following section discusses various embodiments of cells including a cell that has three horns distributed around the perimeter of the hell that are fed by mid and tweeter drivers. The cell also includes a pair of opposing woofers. A graph for generating individual driver feeds based upon three audio signals corresponding to feeds for each of the set of drivers associated with each of the horns is illustrated in FIG. 52. In the illustrated embodiment, the graph 5200 generates drivers for each of the tweeters and mids (six total) and the two woofers. The bass portions of each of the three feed signals is combined and low pass filtered 5202 to produce a bass signal to drive the woofers. In the illustrated embodiment, sub-processing is separately performed 5204, 5206 for each of the top and bottom sub-woofers and the resulting signals are provided to a limiter 5208 to ensure that the resulting signals will not cause damage to the drivers. Each of the feed signals is separately processed with respect to the higher frequency portions of the signal. The mid-frequencies and the high frequencies are separated using a set of frequencies 5210, 5212, and 5214, and the signals are provided to limiters 5216 to generate the 6 driver signals for the mid and tweeter drivers in each of the three horns. While a specific graph is shown in FIG. 52, any of a variety of graphs can be utilized as appropriate to the specific drivers utilized within a cell based upon separate feed signals for each set of drivers. In a number of embodiments, a separate low frequency feed can be provided to the cell that is used to drive the subwoofers. In certain embodiments, the same low frequency feed is provided to all cells within a group. As can readily be appreciated, the specific feeds and particular manner in which a cell implements a graph to generate driver feeds are largely dependent upon the requirements of specific applications in accordance with various embodiments of the invention.

While various nested architectures employing a variety of spatial audio encoding techniques are described above, any of a number of spatial audio reproduction processes including (but not limited to) distributed spatial audio reproduction processes and/or spatial audio reproduction processes that utilize virtual speaker layouts to determine the manner in which to render spatial audio can be utilized as appropriate to the requirements of different applications in accordance with various embodiments of the invention. Furthermore, a number of different spatial location metadata formats and components are described above. It should be readily appreciated that the spatial layout metadata generated and distributed within a spatial audio system is not in any way limited to specific pieces of data and/or specific formats. The components and/or encoding of spatial layout metadata largely is largely dependent upon the requirements of a given application. Accordingly, it should be appreciated that any of the above nested architectures and/or spatial encoding techniques can be utilized in combination and are not limited to specific combinations. Furthermore, specific techniques can be utilized in processes other than those specifically disclosed herein in accordance with certain embodiments of the invention.

Much of the above discussion talks generally regarding the characteristics of the many variants of cells that can be utilized within spatial audio systems in accordance with various embodiments of the invention. However, a number of cell configurations have specific advantages when utilized in spatial audio systems. Accordingly, a discussion of several different techniques for constructing cells for use in spatial audio systems in accordance with various embodiments of the invention are discussed further below.

Section 5: Distribution of Audio Data Within a Spatial Audio System

As noted above, multiple cells can be used to render spatial audio. A challenge for a multi-cell configurations is managing the flow of data between cells. For example, audio must be rendered in a synchronized fashion in order to prevent an unpleasant listening experience. In order to provide a seamless, quality listening experience, cells can automatically form hierarchies to promote efficient data flow. Audio data for rendering spatial audio is carried between cells, but other data can be carried as well. For example, control information, position information, calibration information, as well as any other desired messaging between cells and control servers can be carried between cells as appropriate to the requirements of specific applications of embodiments of the invention.

Depending on the needs of the particular situation, different hierarchies for data transmission between cells can be established. In many embodiments, a primary cell is responsible for managing the flow of data, as well as the processing of input audio streams into audio streams for respective connected secondary cells managed by the primary cell. In numerous embodiments, multiple primary cells communicate with each other to synchronously manage multiple sets of secondary cells. In various embodiments, one or more primary cells can be designated as a super primary cell, which in turn controls data flow between primaries.

Figure 53:
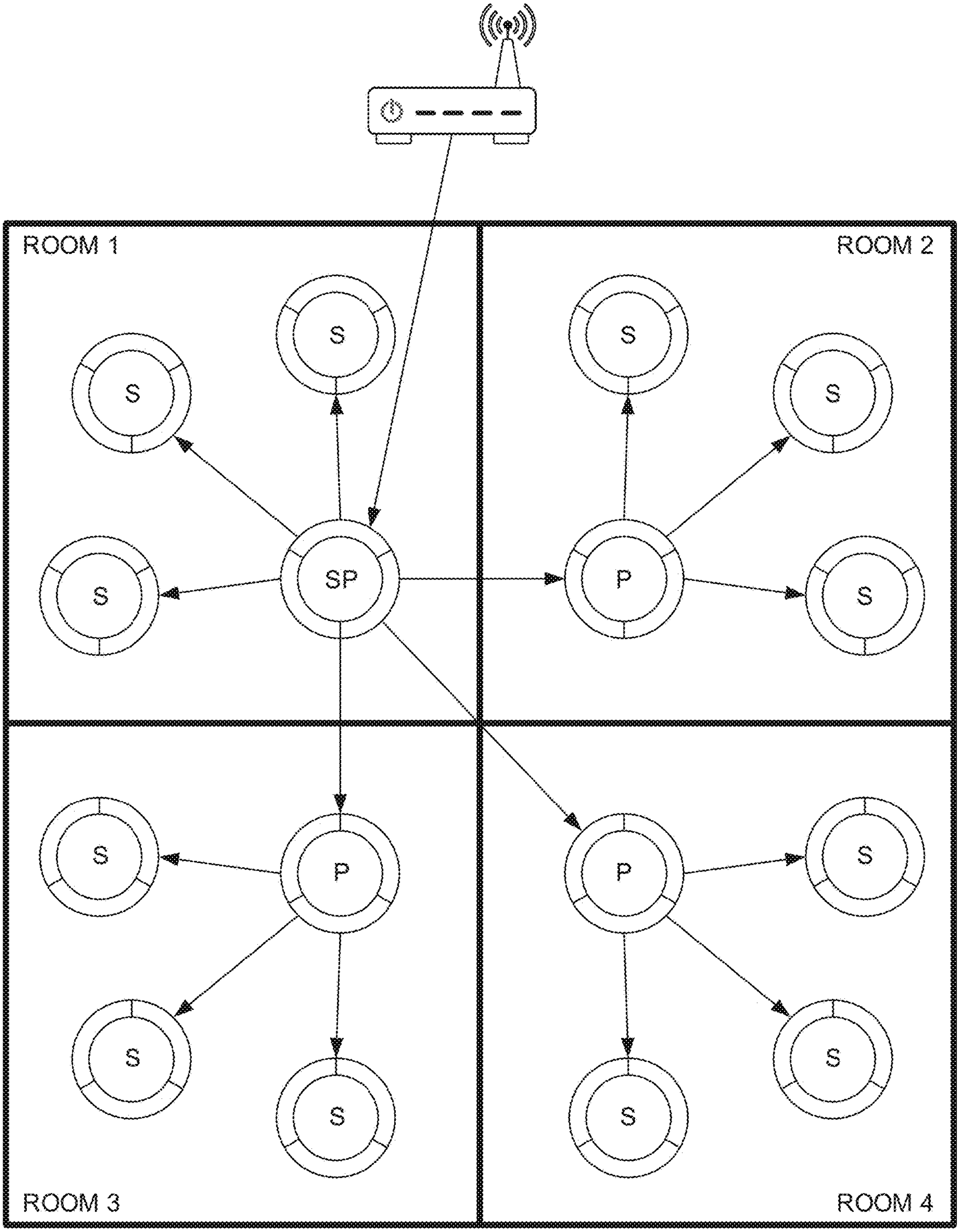
FIG. 53 illustrates audio data distribution in a hierarchy with a super primary cell in accordance with an embodiment of the invention.

An example hierarchy with a super primary in accordance with an embodiment of the invention is illustrated in FIG. 53. As can be seen, a super primary cell (SP) obtains an audio stream from a wireless router. The super primary disburses the audio stream to connected primary cells (P) over a wireless network established between the cells. Each primary cell in turn processes the audio stream to create individual streams for the secondary cells that they govern as discussed above. These streams can be unicast to their destination secondary cell. Further, the super primary cell can perform all the actions of a primary cell, including generating audio streams for its governed secondary cells.

While the arrows illustrated are one directional, this refers only to the flow of audio data. All cell types can communicate with each other via the cell network. For example, if a secondary cell receives an input command such as (but not limited to) pause playback or skip track, the command can be propagated across the network up from the secondary cell. Further, primary cells and super primary cells may communicate with each other to pass metadata, time synchronization signals, and/or any other message as appropriate to the requirements of specific applications of embodiments of the invention. As can readily be appreciated, while primary cells in separate rooms are shown, primary cells can be within the same room depending on many factors including (but not limited to) size and layout of the room, and groupings of cells. Further, while clusters of three secondary cells to a primary cell are shown, any number of different secondary cells can be governed to a primary cell, including a configuration where a primary has no governed secondary cells.

Figure 54:
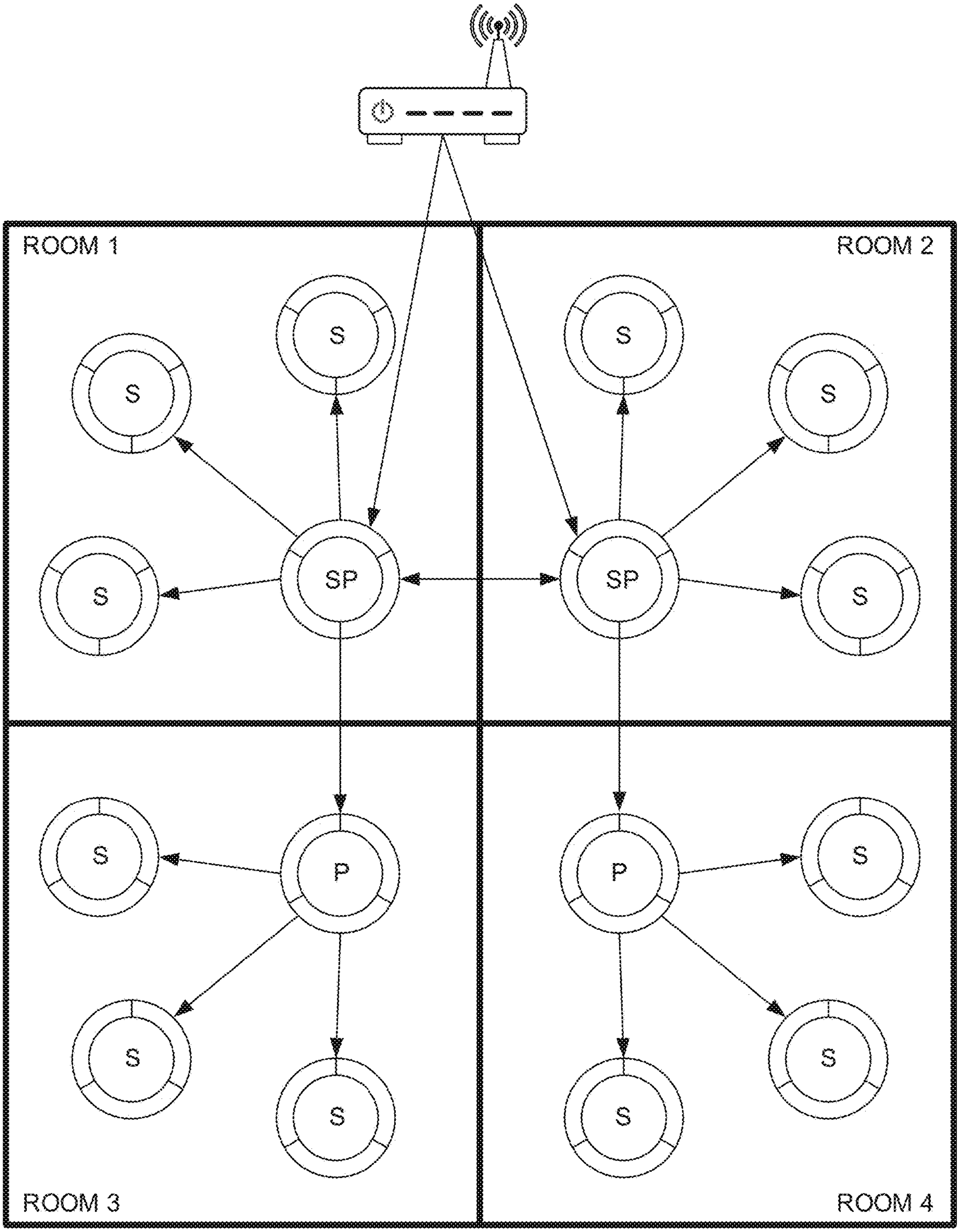
FIG. 54 illustrates audio data distribution in a hierarchy with two super primary cells in accordance with an embodiment of the invention.
Figure 55:
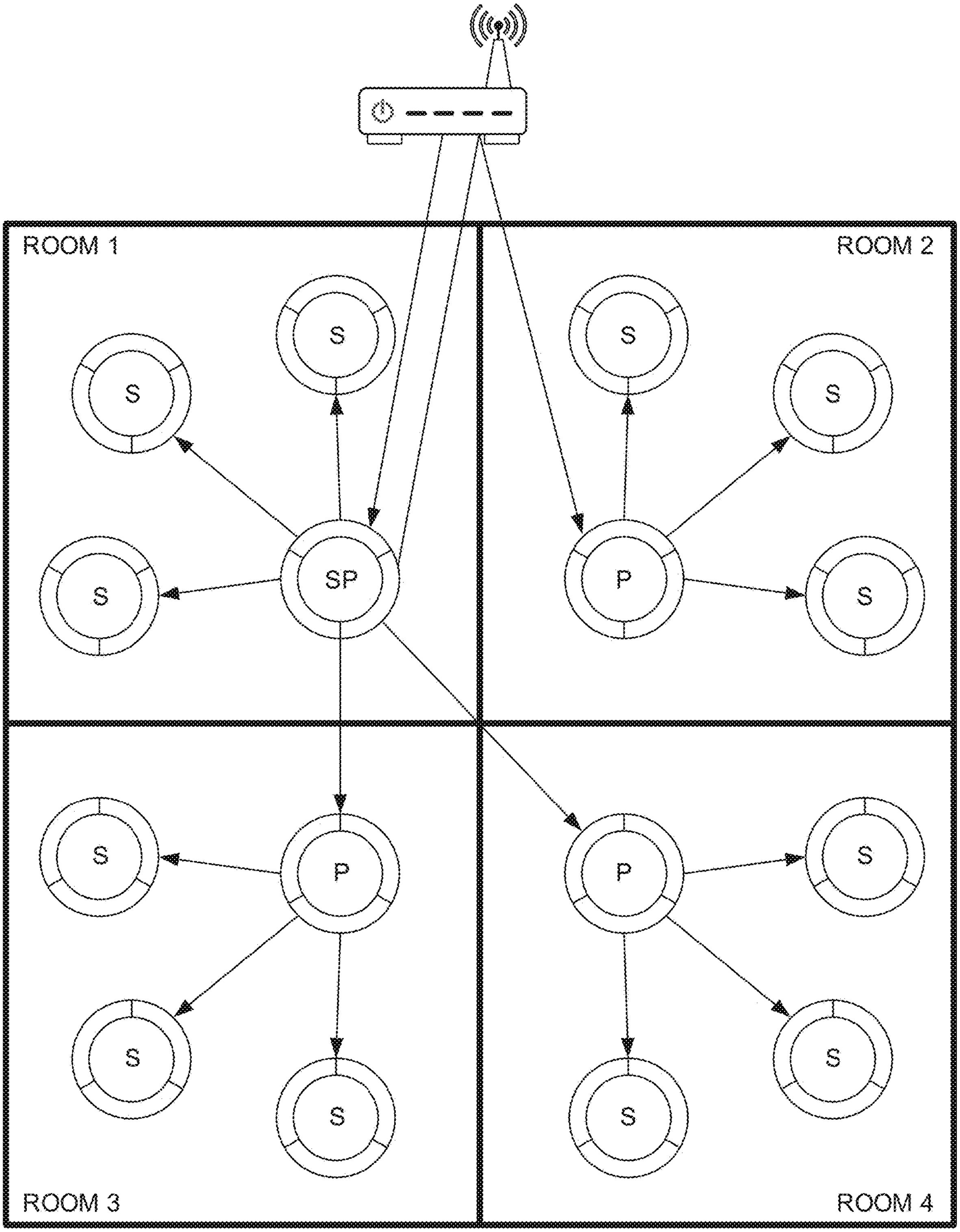
FIG. 55 illustrates audio data distribution in a hierarchy with a super primary cell with communication between cells over a Wi-Fi router in accordance with an embodiment of the invention.

Furthermore, as illustrated in accordance with an embodiment of the invention in FIG. 54, multiple super primary cells can be established which in turn push audio streams to their respective governed primary cells. In numerous embodiments, super primary cells can communicate between each other to control synchronization and share other data. In various embodiments, the super primary cells connect via the wireless router. Indeed, in many embodiments, a super primary cell can govern a primary cell via the wireless router. For example, if the primary cell is too far away to be able to efficiently communicate with the super primary cell, but is not itself a super primary cell, then it can be governed via a connection facilitated by the wireless router. Governance of a primary cell by a super primary cell via a wireless router in accordance with an embodiment of the invention is illustrated in FIG. 55.

Figure 56:
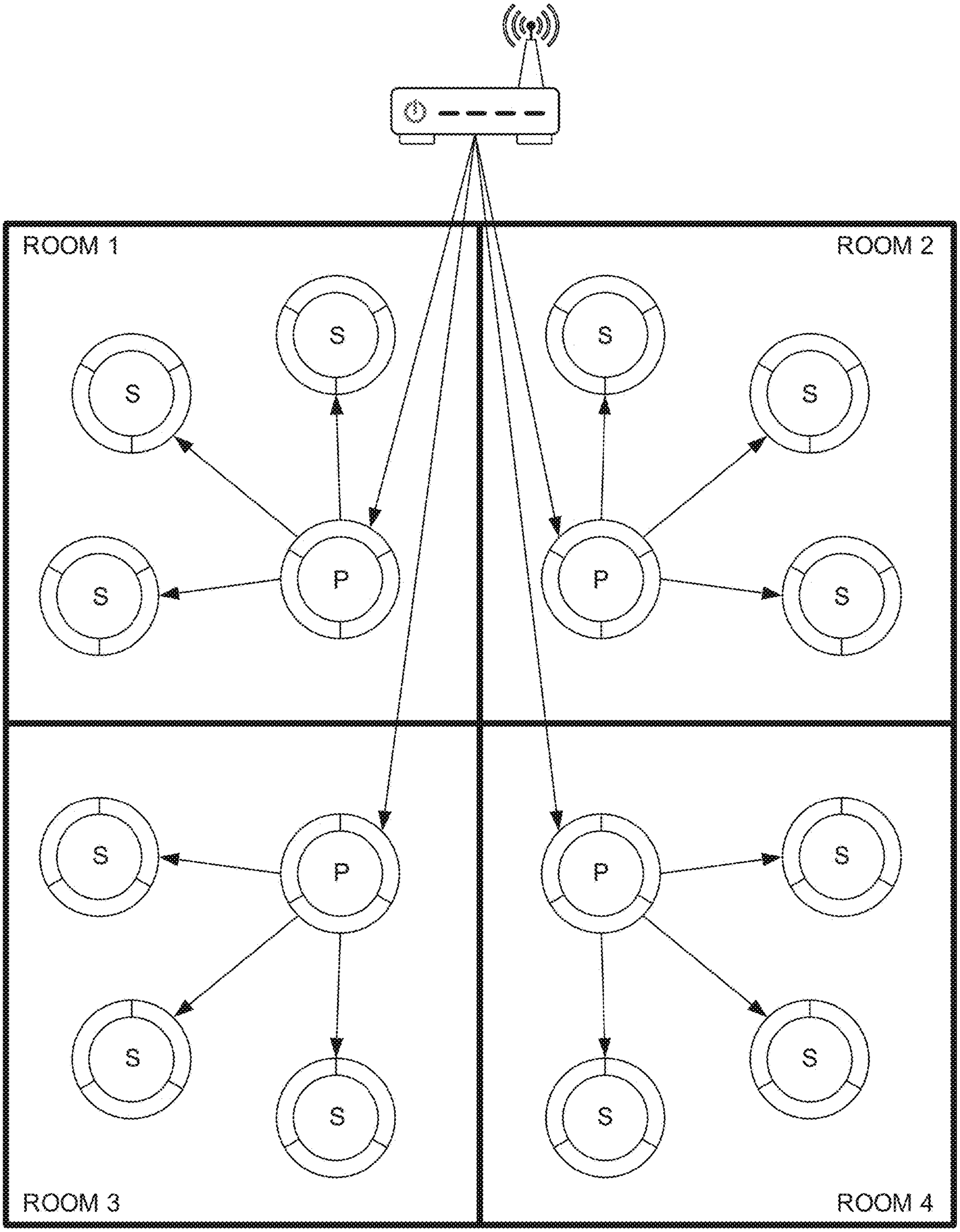
FIG. 56 illustrates audio data distribution in a hierarchy without super primary cells in accordance with an embodiment of the invention.

Super primary cells are not a requirement of any hierarchy. In numerous embodiments, a number of primary cells can all directly receive audio streams from the wireless router (or any other input source). Additional information can be passed via the wireless router as well and/or directly between primary cells. A hierarchy with no super primary cells in accordance with an embodiment of the invention is illustrated in FIG. 56.

Figure 57:
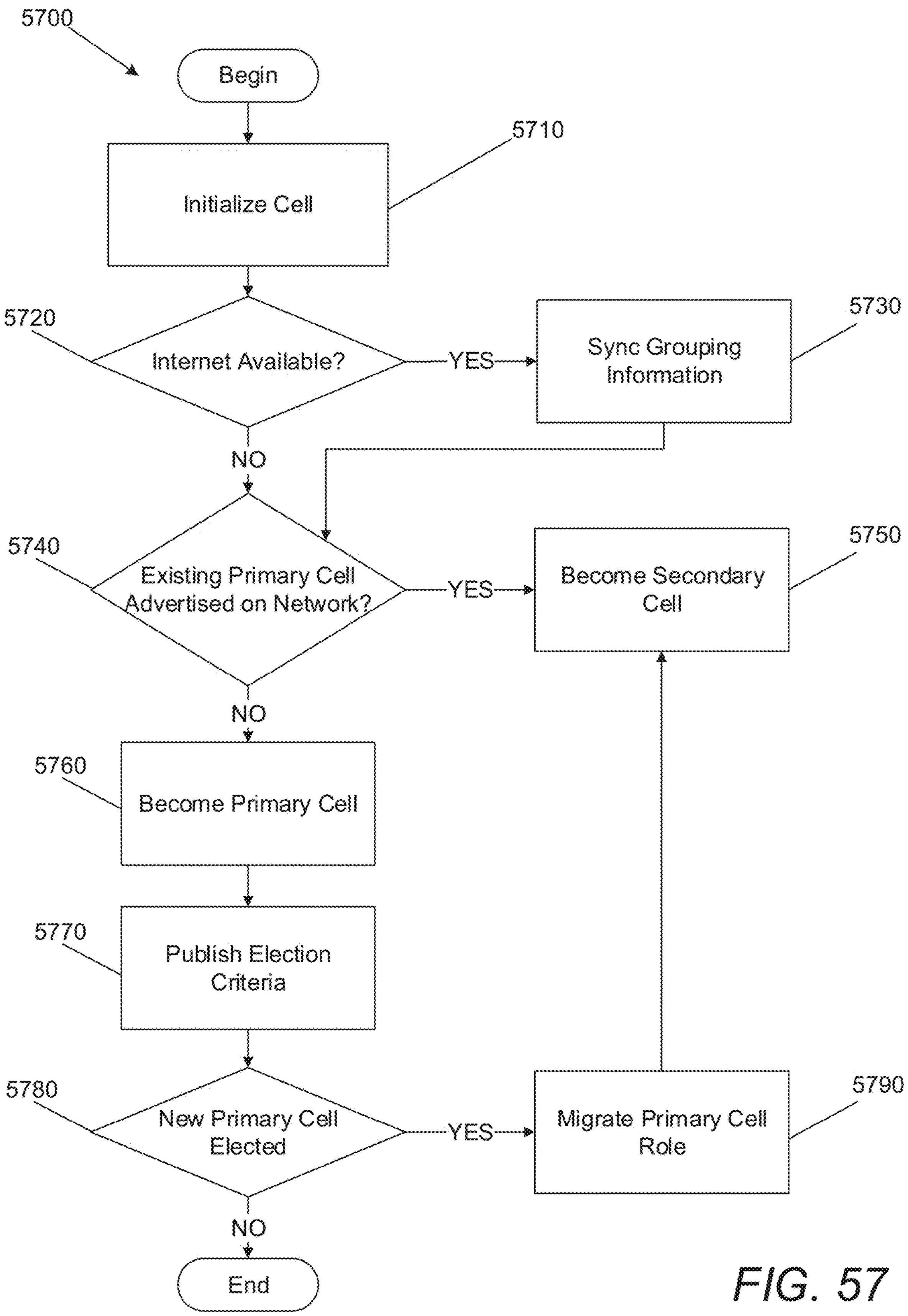
FIG. 57 is a flow chart for a primary cell election process in accordance with an embodiment of the invention.

While several specific architectures have been illustrated above, as can readily be appreciated, many different hierarchy layouts can be used, with any number of super primary, primary, and secondary cells depending on the needs of a particular user. Indeed, in order to support robust, automatic hierarchy generation, cells can negotiate amongst each other to elect cells for specific roles. A process for electing primaries in accordance with an embodiment of the invention is illustrated in FIG. 57.

Process 5700 includes initializing (5710) a cell. Initializing a cell refers to a cell joining a network of cells, but can also refer to a lone cell beginning the network. In numerous embodiments, cells can be initialized more than once, for example, when being moved to a new room, or when powering on, and is not restricted to a "first boot" scenario. If a connection to the Internet is available (5720), the cell can contact a control server to sync (5730) grouping information and/or another network connected device from which grouping information can be obtained. Grouping information can include (but is not limited to) information regarding the placement of other cells and their groupings (e.g. which cells are in which groups and/or zones. If another primary cell is advertised (5740) on the network, then the newly initialized cell becomes (5750) a secondary cell. However, if there are no primary cells advertised (5740) on the network, the newly initialized cell becomes (5760) a primary cell.

In order to discover the most efficient role for each cell across the network, the new primary cell publishes (5770) election criteria for becoming the new primary. In many embodiments, the election criteria includes metrics regarding the performance of the current primary such as (but not limited to) operating temperature, available bandwidth, physical location and/or proximity to other cells, channel conditions, reliability of connection to the Internet, connection quality to secondary cells, and/or any other metric related to the operation efficiency of a cell to perform the primary role as appropriate to the requirements of specific applications of embodiments of the invention. In many embodiments, the metrics are not all weighted equally, with some metrics being more important than others. In various embodiments, the published election criteria includes a threshold score based on the metrics, which if beaten, would signify a cell better suited to be a primary cell. If an election is made (5780) for a change in primary cell based on the published election criteria, then the primary cell migrates (5790) the role of primary to the elected cell, and becomes a secondary cell (5750). If no new cell is elected (5780), the primary cell maintains its role.

In various embodiments, the election process is periodically repeated to maintain an efficient network hierarchy. In numerous embodiments, the election process can be triggered by events such as (but not limited to) initialization of new cells, indication that the primary cell is incapable of maintaining primary role performance, cells dropping from the network (due to powering down, signal interruption, cell failure, wireless router failure, etc.), physical relocation of a cell, presence of a new wireless network, or any of a number of other triggers as appropriate to the requirements of specific applications of embodiments of the invention. While a specific election process is illustrated in FIG. 57, it can be readily appreciated that any number of variations of election processes can be utilized, including variants that elect super primary cells, without departing from the scope or spirit of the invention.

Section 6: Construction of Cells

As noted above, cells in accordance with many embodiments of the invention are speakers capable of modifying a sound field with relatively equal precision across a 360° area surrounding the cell. In many embodiments, cells contain at least one halo containing a radially symmetrical arrangement of drivers. In numerous embodiments, each horn contains at least one tweeter and at least one mid. In a variety of embodiments, each horn contains a tweeter and a mid, coaxially aligned such that the tweeter is positioned exterior to the mid relative to the midpoint of the cell. However, halos can contain multiple tweeters and m ids so long as the overall arrangement maintains radial symmetry for each driver type. Various driver arrangements are discussed further below. In many embodiments, each cell contains an upward-firing woofer and a downward-firing woofer coaxially aligned. However, several embodiments utilize only one woofer. A significant problem in many embodiments is that a stand for holding the cell may be required to go through one of the woofers. In order to address this structural issue, one of the woofers can have an open channel through the center of the driver to accommodate wiring and other connectors. In a number of embodiments, the woofers are symmetrical and both include a channel through the center of the driver. Particular woofer construction to address this unusual concern is discussed below.

Figure 18A:
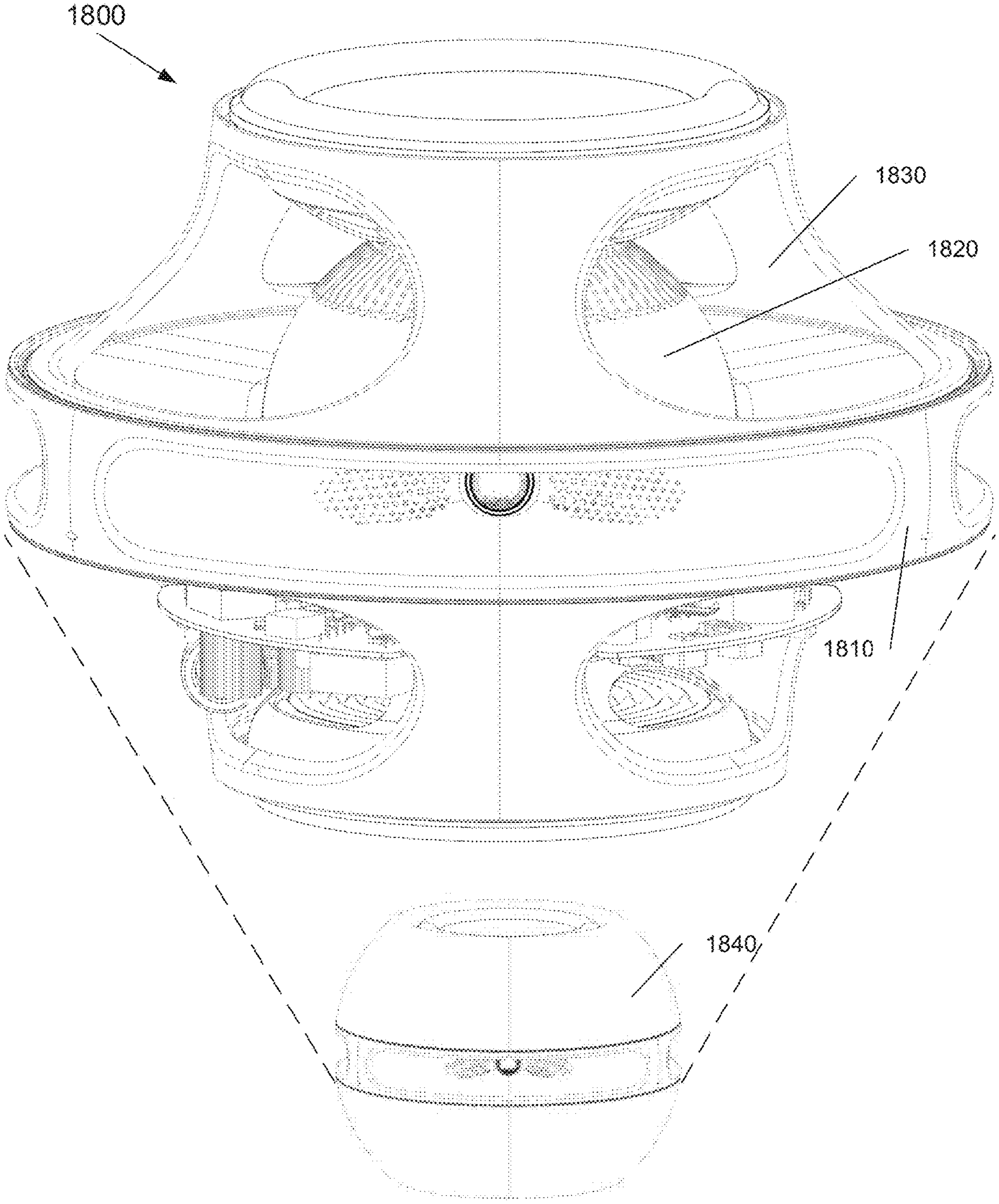
FIG. 18A is illustrates a cell in accordance with an embodiment of the invention.

Turning now to FIG. 18A a cell in accordance with an embodiment of the invention is illustrated. The cell 1800 includes a halo 1810, a core 1820, a support structure (referred to as a "crown") 1830, and lungs 1840. In many embodiments, the lungs constitute the exterior shell of the cell, and provide a sealed back enclosure for the woofers. The crown provides support and a seal for the woofer, and in many embodiments provides support to the lungs. The halo includes three horns positioned in a radially symmetric manner, and in many embodiments, includes apertures for microphones positioned between the horns. Each of these components is discussed in further detail from the inside out to provide an overview of both form and construction.

Section 6.1: Halos

Halos are rings of horns with seated drivers. In numerous embodiments, halos radially symmetrical and can be manufactured to promote modal beamforming. However, beamforming can be accomplished with halos that are asymmetric and/or have different size and/or placements of horns. While there are many different arrangements of horns that would satisfy the function of a halo, the primary discussion of halos below is with respect to a three-horned halo. However, halos containing multiple horns can be utilized in accordance with many embodiments of the invention in order to provide different degrees of beam control. The horns can include multiple input apertures as well as structural acoustic components to assist with controlling sound dispersal. In many embodiments, the halo also contains apertures and/or support structures for microphones.

Figure 18B:
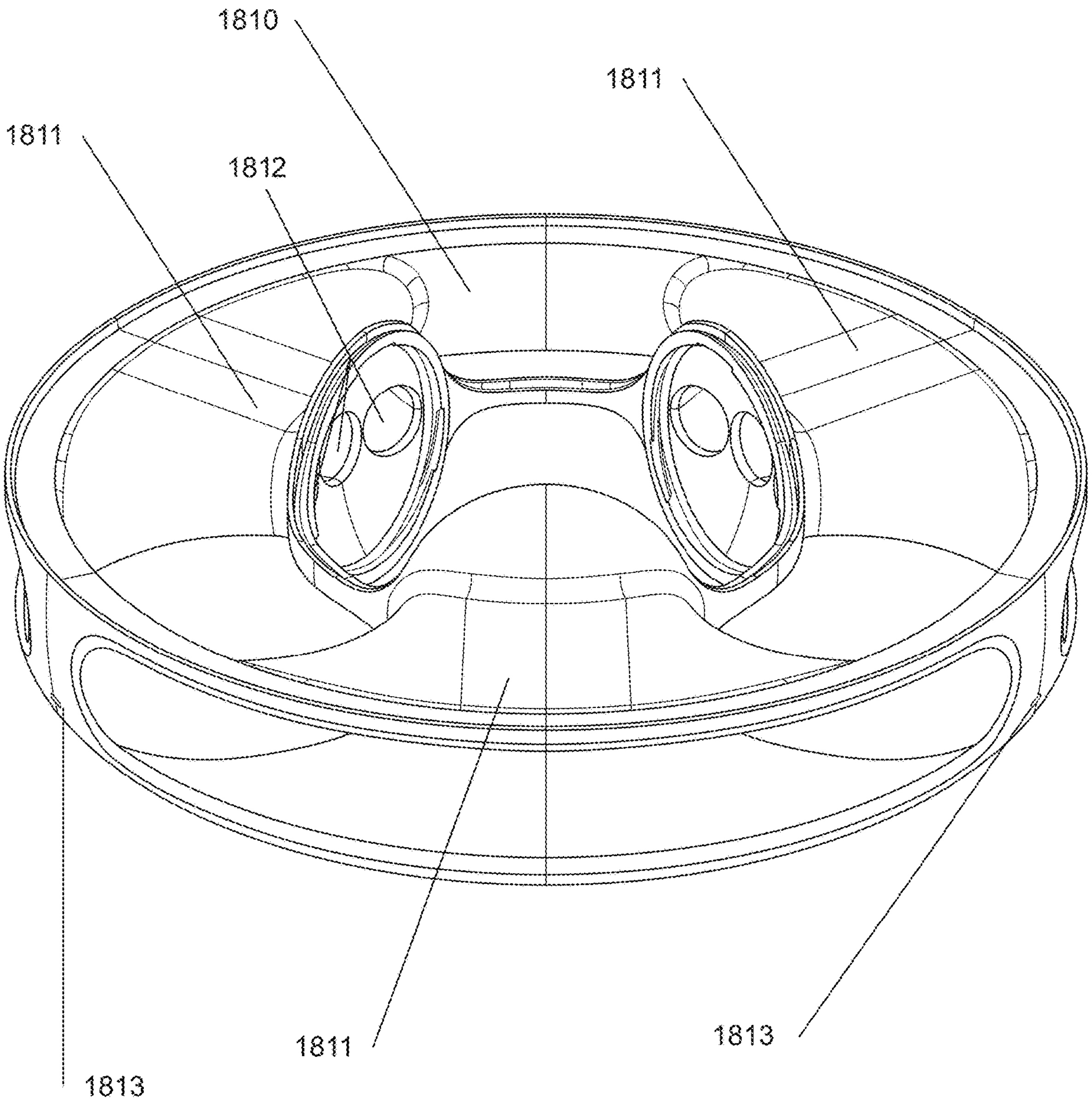
FIG. 18B is a render of a halo of a cell in accordance with an embodiment of the invention.
Figure 18C:
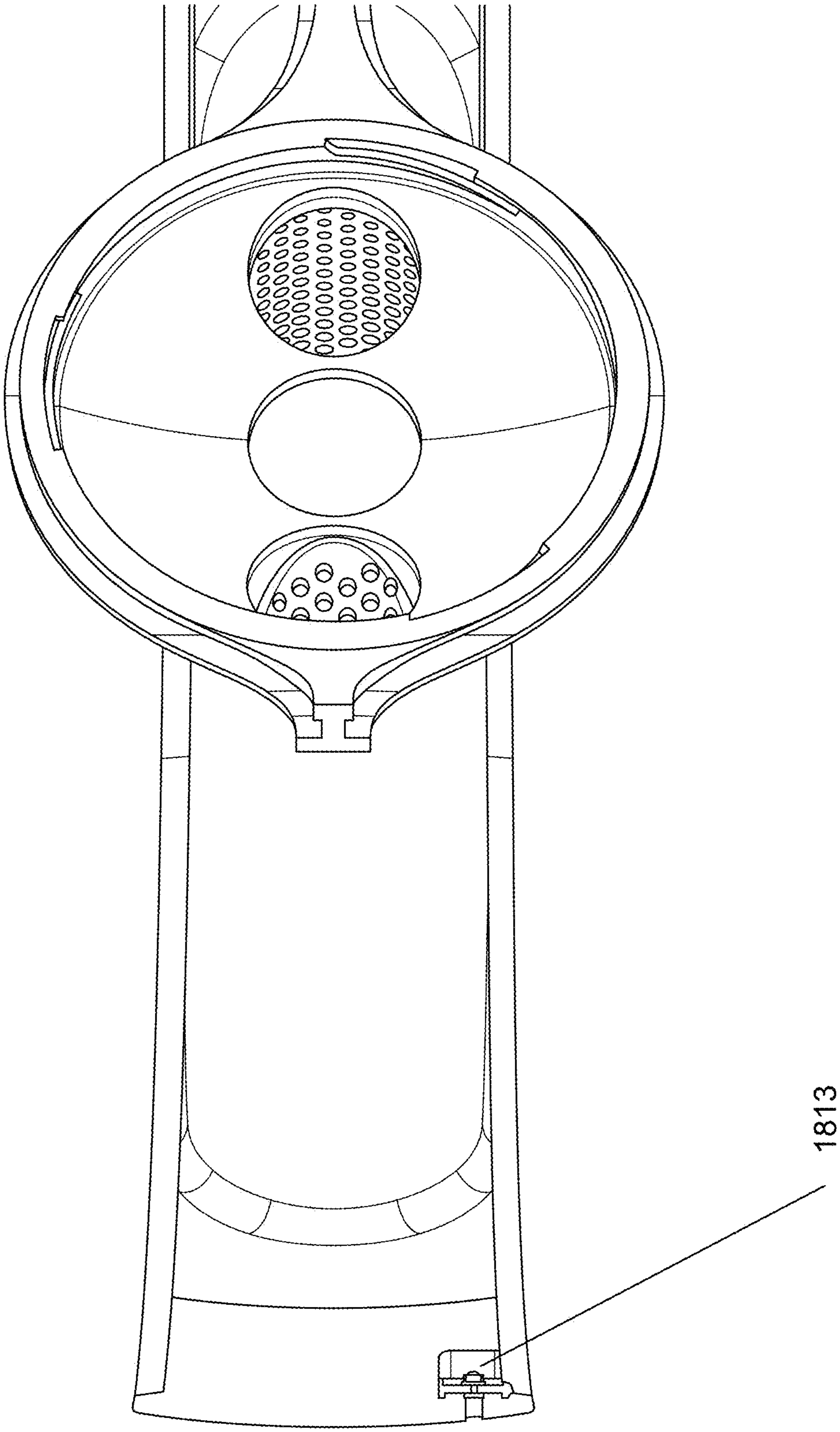
FIG. 18C is a cross section of the halo in accordance with an embodiment of the invention.

Turning now to FIG. 18B, a halo in accordance with an embodiment of the invention is illustrated. Halo 1810 includes three horns 1811. Each horn contains three apertures 1812. The Halo further includes a set of three microphone apertures 1813 (two visible, one occluded in the provided view of the embodiment). A cross sectional view of the microphone aperture showing the housing for the microphone in accordance with an embodiment of the invention is illustrated in FIG. 18C. In many embodiments, the Halo is manufactured as a complete object via a 3D printing process. However, Halos can be constructed piecewise. In numerous embodiments, the three horns are oriented 120° apart such that they have threefold radial symmetry (or "trilateral symmetry").

Figure 18D:
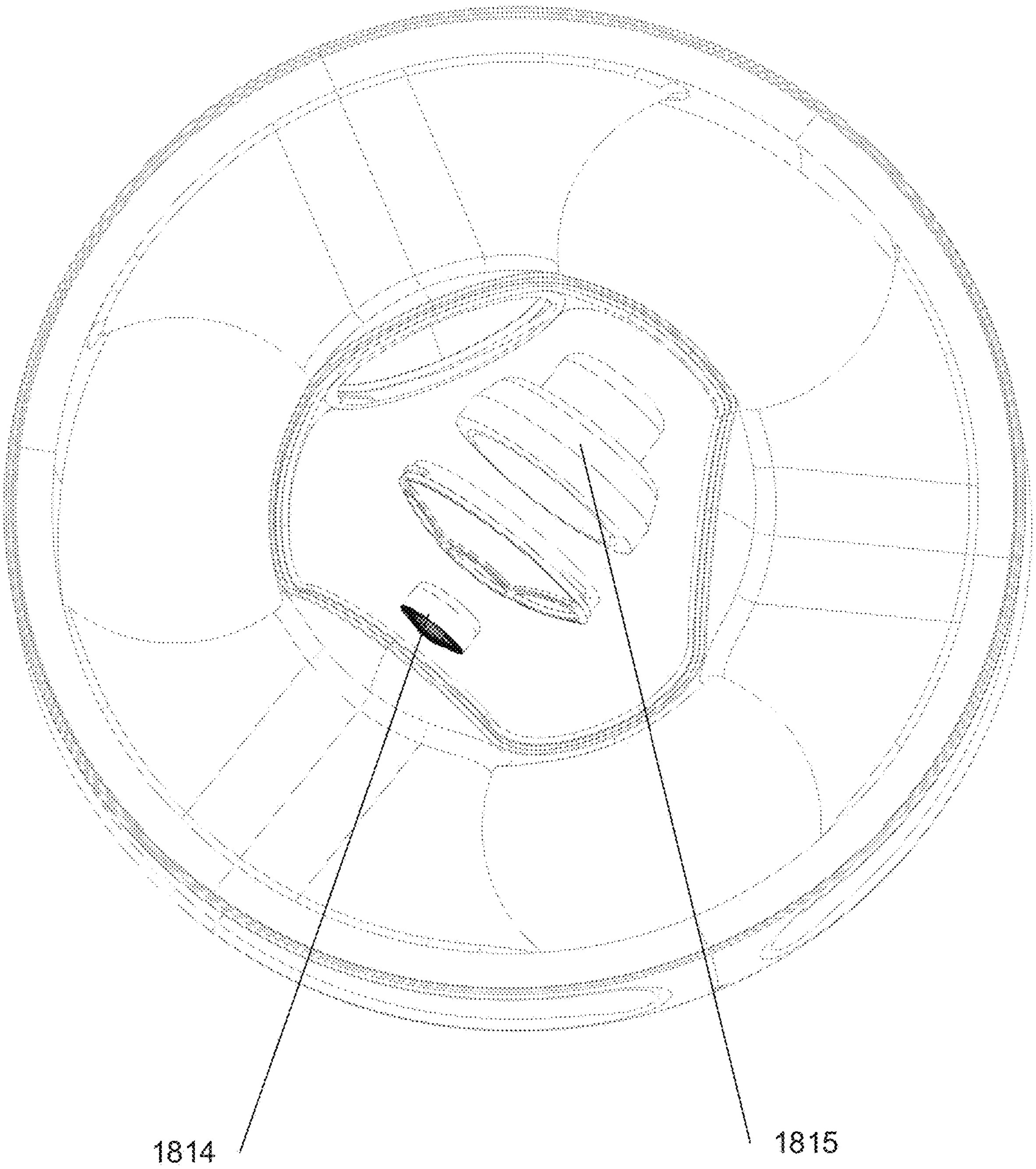
FIG. 18D illustrates an exploded view of a coaxial alignment of drivers for a single horn of a halo in accordance with an embodiment of the invention.
Figure 18E:
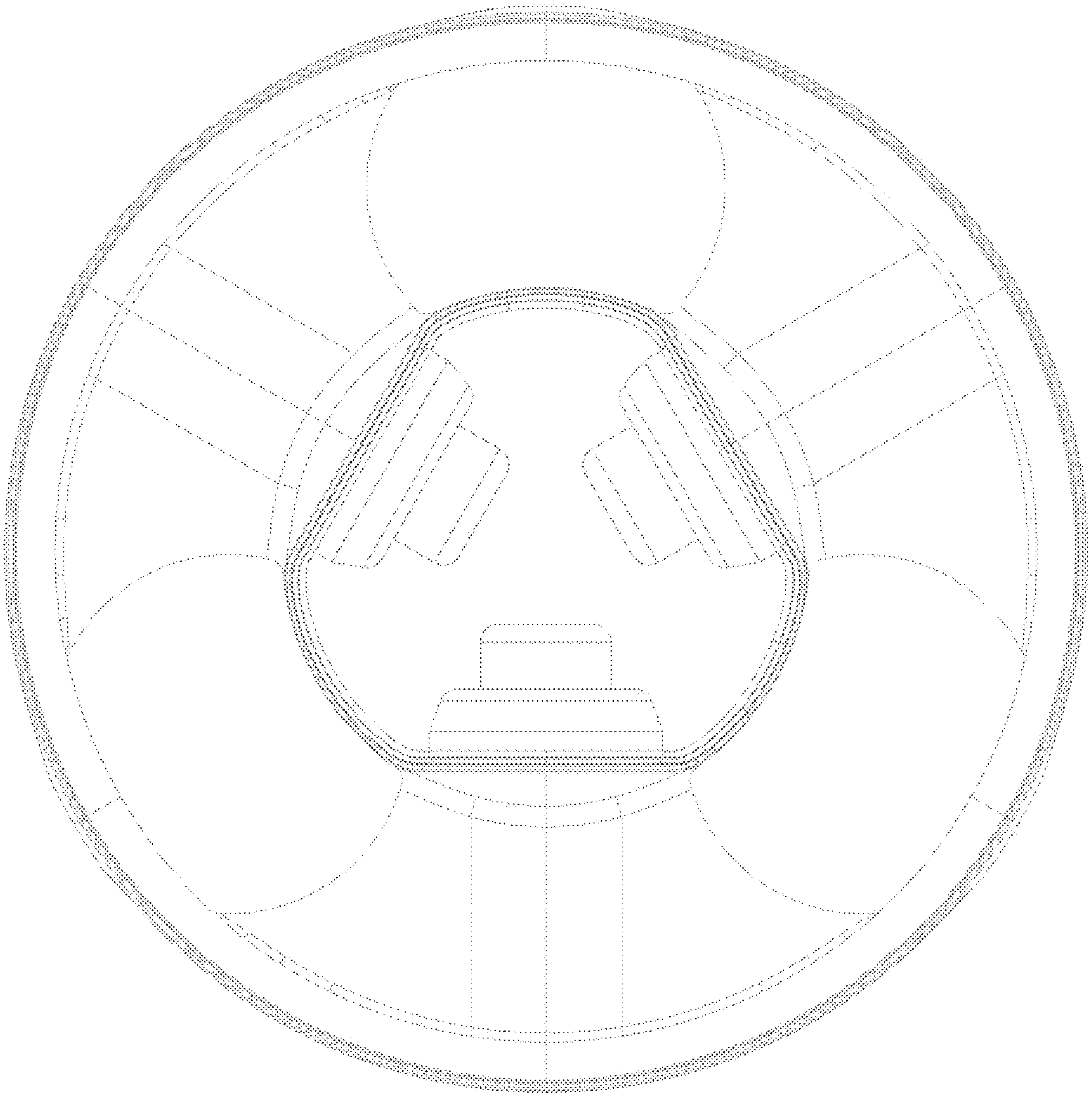
FIG. 18E illustrates a socketed set of drivers for each horn in a halo in accordance with an embodiment of the invention.

In numerous embodiments, each horn is connected to a tweeter and a mid driver. In many embodiments, the tweeter is exterior to the mid relative to the center point of the halo, and the two drivers are coaxially positioned. FIG. 18D illustrates an exploded view of a coaxial alignment of the tweeter and mid for a single horn of a halo in accordance with an embodiment of the invention. Tweeter 1814 is positioned exterior to the mid 1815. FIG. 18E illustrates a socketed set of tweeter/mid drivers for each horn in a halo in accordance with an embodiment of the invention.

Figure 18F:
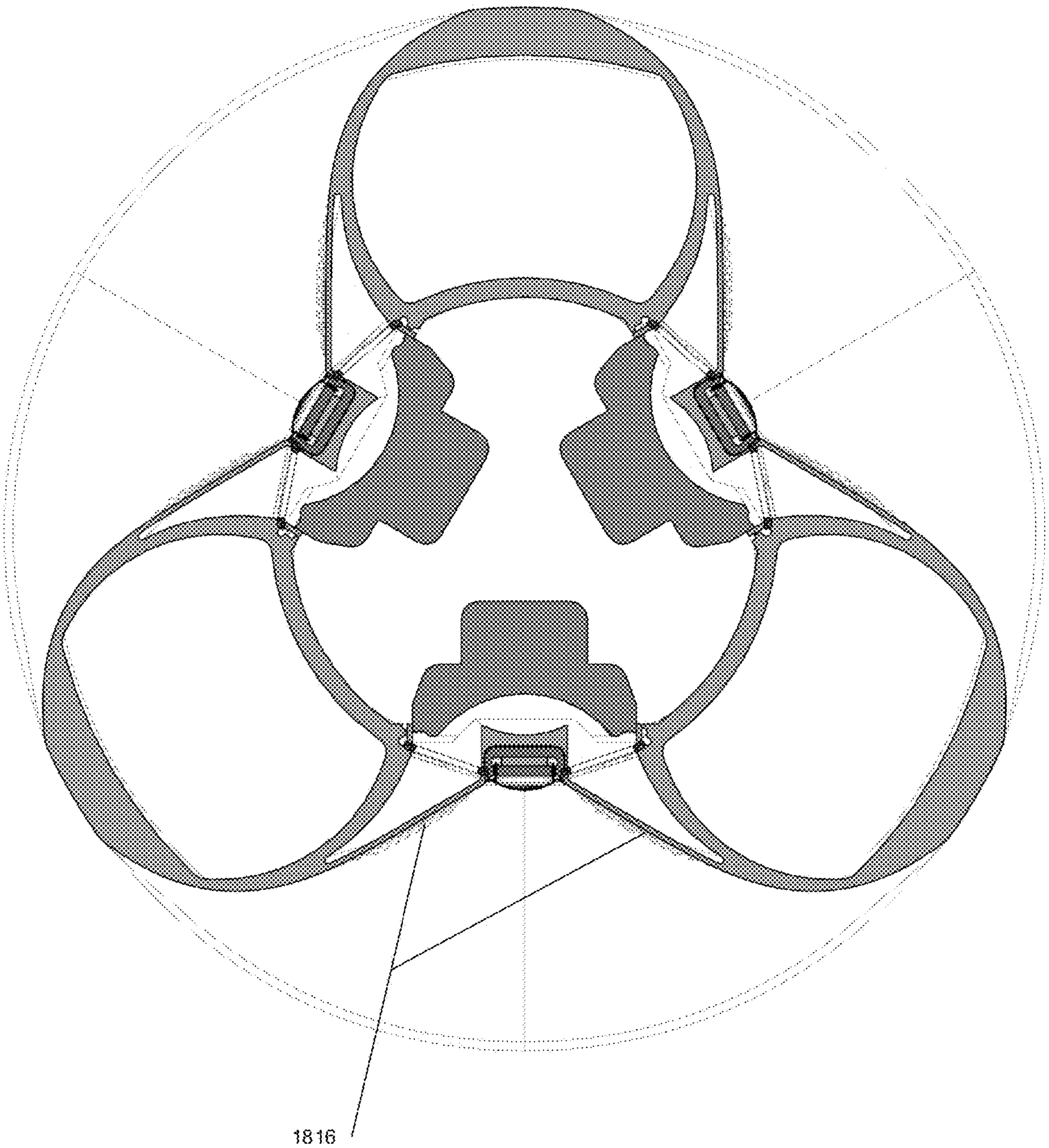
FIG. 18F is a horizontal cross section of the halo in accordance with an embodiment of the invention.

In numerous embodiments, the tweeter is fitted into the center aperture of the horn, whereas the mid is configured to direct sound through the outer two apertures of the halo. Turning now to FIG. 18F, a horizontal cross section of a socketed set of tweeter/mid drivers for each horn in a halo is illustrated in accordance with an embodiment of the invention. As shown, the apertures can be utilized to provide additional separation of different frequencies generated by the driver. Further, the horn itself can include an acoustic structure 1816 in order to avoid internal multipath reflections. In many embodiments, the acoustic structure is a perforated grid. In some embodiments, the acoustic structure is a porous foam. In a number of embodiments, the acoustic structure is a lattice. The acoustic structure can prevent the passage of highs while admitting mids. In many embodiments, the acoustic structure assists in maintaining the directionality of the sound waves. In a variety of embodiments, the horns are constructed in such a way as to minimize the amount of sound dispersal outside of the 120° sector of the horn. In this way, each individual horn of the halo is primarily responsible for the cell's sound reproduction within a discreet 120° sector.

The microphone array situated in a halo can be used for multiple purposes, many of which will be discussed in further detail below. Among their many uses, the microphones can be used in conjunction with the directional capabilities of the cell to measure the environment via acoustic ranging. In many embodiments, the halo itself often abuts a core component. A discussion of the core component is found below.

Section 6.2: The Core

Cells can utilize logic circuitry in order to process audio information and perform other computational processes, including, but not limited to, controlling drivers, directing playback, acquiring data, performing acoustic ranging, responding to commands, and managing network traffic. This logic circuitry can be contained on a circuit board. In many embodiments, the circuit board is an annulus. The circuit board may be made up of multiple annulus sector pieces. However, the circuit board can also take other shapes. In many embodiments, the center of the annulus is at least partially occupied by a roughly spherical housing (the "core housing") that provides a back volume for the drivers connected to the halo. In numerous embodiments, the core housing includes two interlocking components.

Figure 18G:
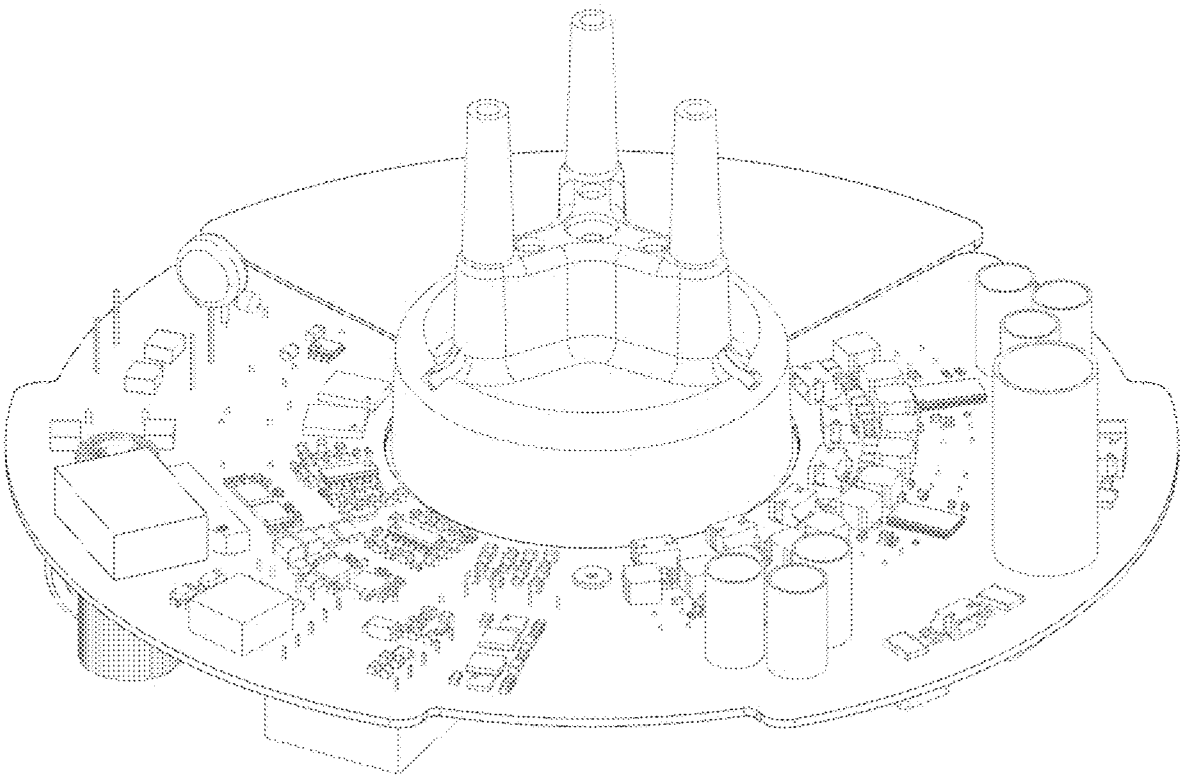
FIG. 18G illustrates a circuit board annulus and bottom portion of the housing of a core of a cell in accordance with an embodiment of the invention.

A circuit board annulus and the bottom portion of the housing in accordance with an embodiment of the invention is illustrated in FIG. 18G. In the illustrated embodiment, the circuit board accompanies a set of pins to which various other components of the cell are mounted. In other embodiments, the circuit board is split into two or more separate annulus sectors. In a variety of embodiments, each sector is responsible for a different functional purpose. For example, in many embodiments, one sector is responsible for power supply, one sector is responsible for driving the drivers, and one sector is responsible for generic logic processing tasks. However, the functionality of the sectors or the circuit board in general is not restricted to any particular physical layout.

Figure 18H:
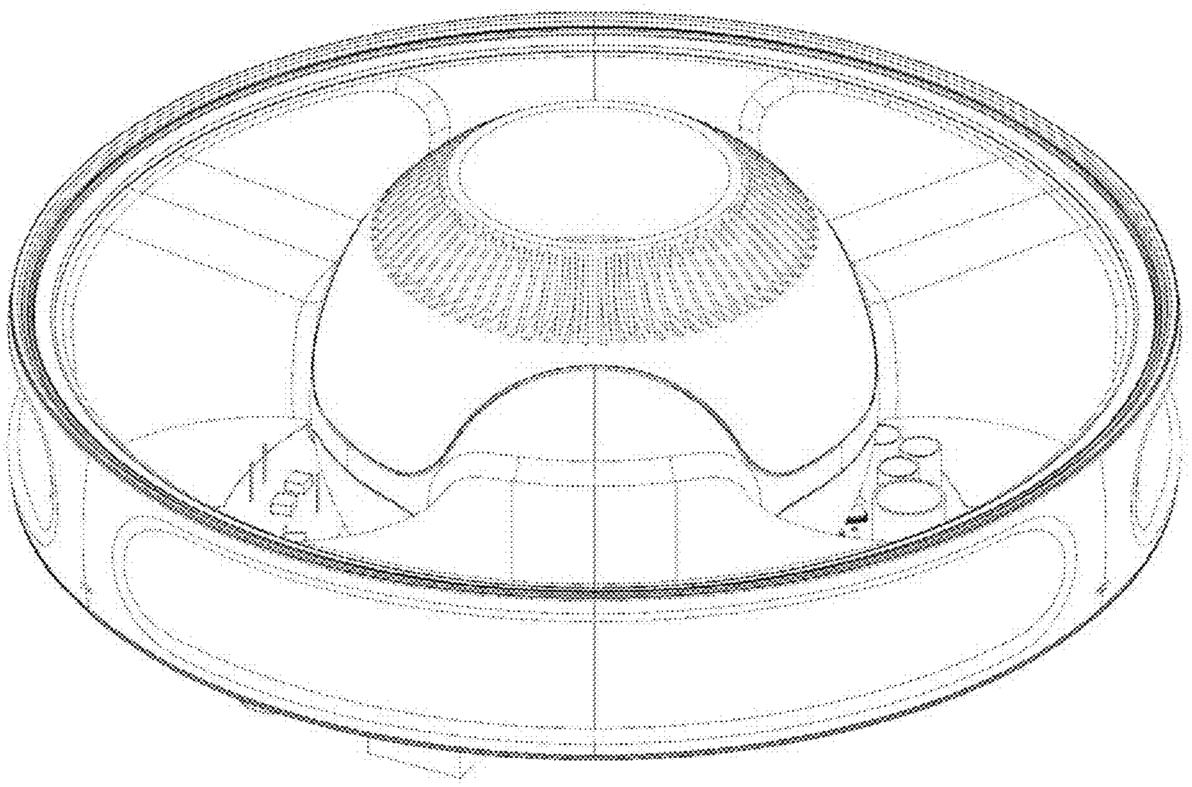
FIG. 18H is an illustration of a halo and core in accordance with an embodiment of the invention.

Turning now to FIG. 18H, a core section surrounded by a halo and drivers in accordance with an embodiment of the invention is illustrated. The core is shown with both the top and bottom housing components. In many embodiments, the housing components of the core are divided into three distinct volumes, each providing a separate back volume for the set of drivers associated with a particular horn in the halo. In a variety of embodiments, the core housing includes three divider walls that meet at the center of the core housing. While the core housing illustrated in FIG. 18H is roughly spherical, the core housing can be any shape as appropriate to the requirements of specific applications in accordance with various embodiments of the invention. Further, gaskets and/or other sealant methods can be used to form seals in order to prevent air movement between different sections. In many embodiments, surrounding the core and halo is the crown. Crowns are discussed below.

Section 6.3: The Crown

In many embodiments, as discussed above, cells include a pair of opposing, coaxial woofers. The crown can be a set of struts which support the woofers. In many embodiments, the crown is made of a top component and a bottom component. In numerous embodiments, the top component and bottom component are a single component that protrudes from both sides of the halo. In other embodiments, the top and bottom components can be separate pieces.

Figure 18I:
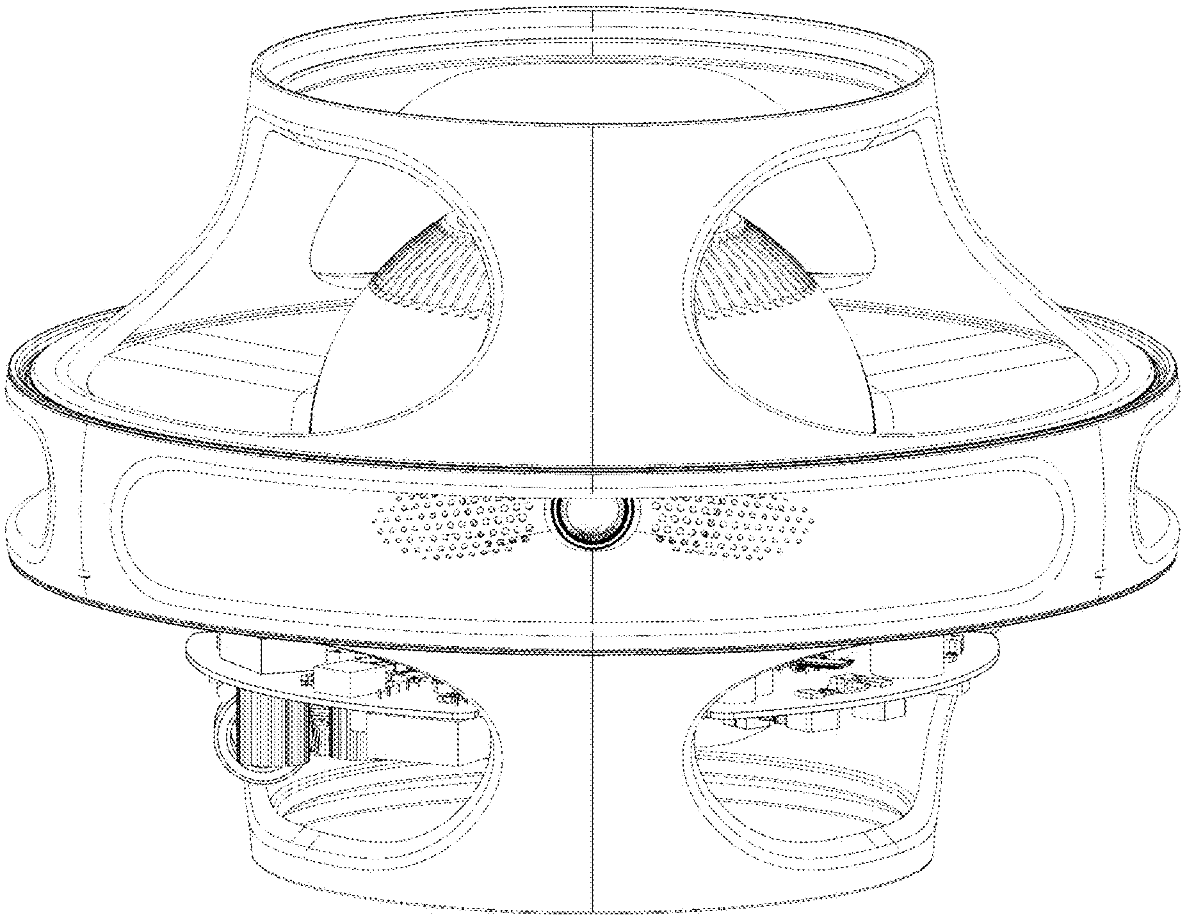
FIG. 18I is an illustration of a halo, core, and crown in accordance with an embodiment of the invention.

A crown positioned around a halo and core in accordance with an embodiment of the invention is illustrated in FIG. 18I. The crown may have "windows" or other cutouts in order to reduce weight and/or provide aesthetically pleasing designs. The crown may have gaskets and/or other seals to prevent air from escaping into other volumes within the cell. In the illustrated embodiment, the crown is surrounded by the lungs, which are discussed in further detail below.

Section 6.4: The Lungs

In many embodiments, the outer surface of the cell is the lungs. The lungs can provide many functions, including, but not limited to, providing a sealed back volume for the woofers, and protecting the interior of the cell. However, in numerous embodiments, additional components can be exterior to the lungs for either cosmetic or functional effect (e.g. connectors, stands, or any other function as appropriate to the requirements of specific applications in accordance with various embodiments of the invention). In numerous embodiments, the lungs are transparent, and enable a user to see inside the cell. However, the lungs can be opaque without impairing the functionality of the cell.

Figure 18J:
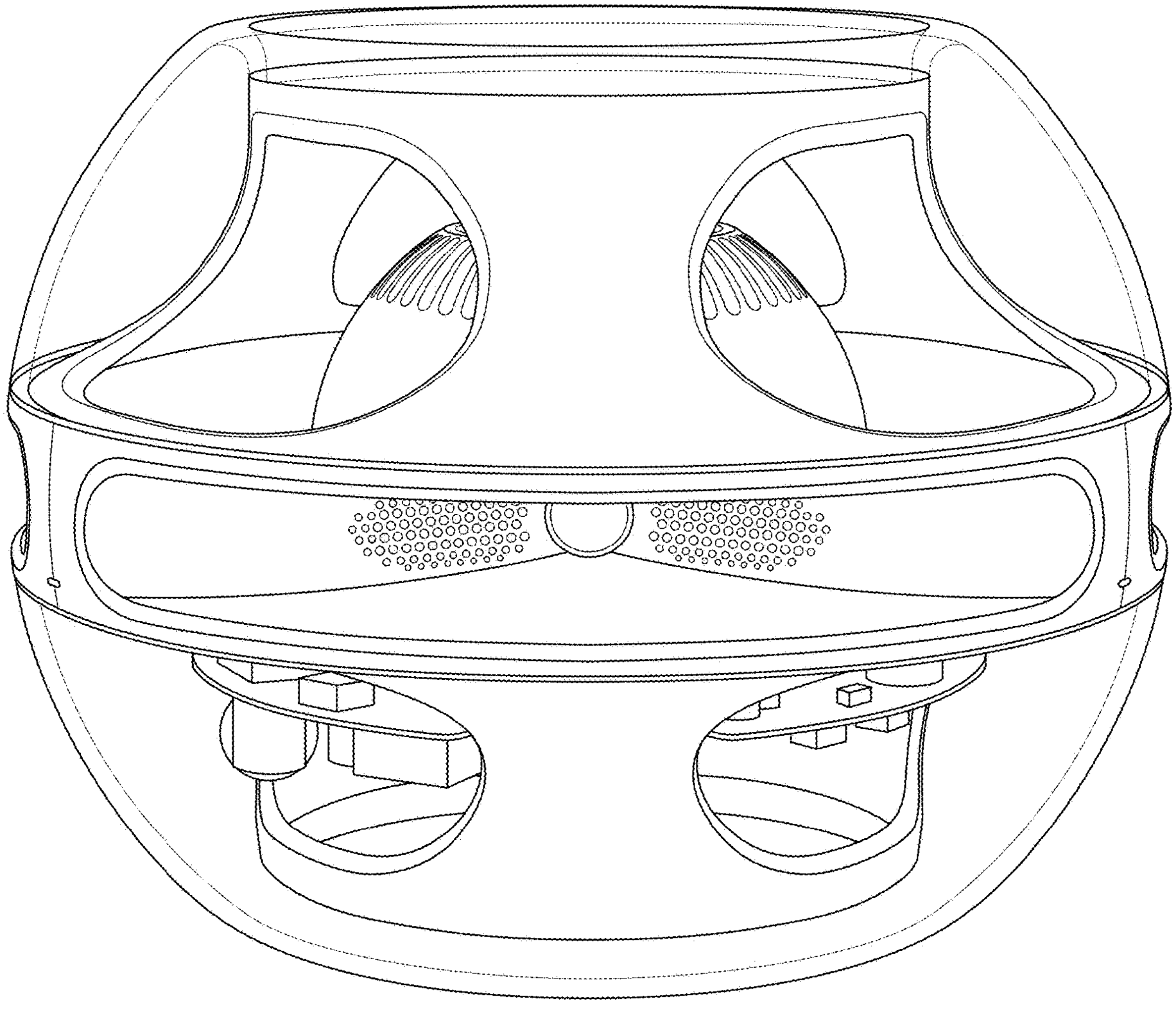
FIG. 18J is an illustration of a halo, core, crown, and lungs in accordance with an embodiment of the invention.
Figure 18K:
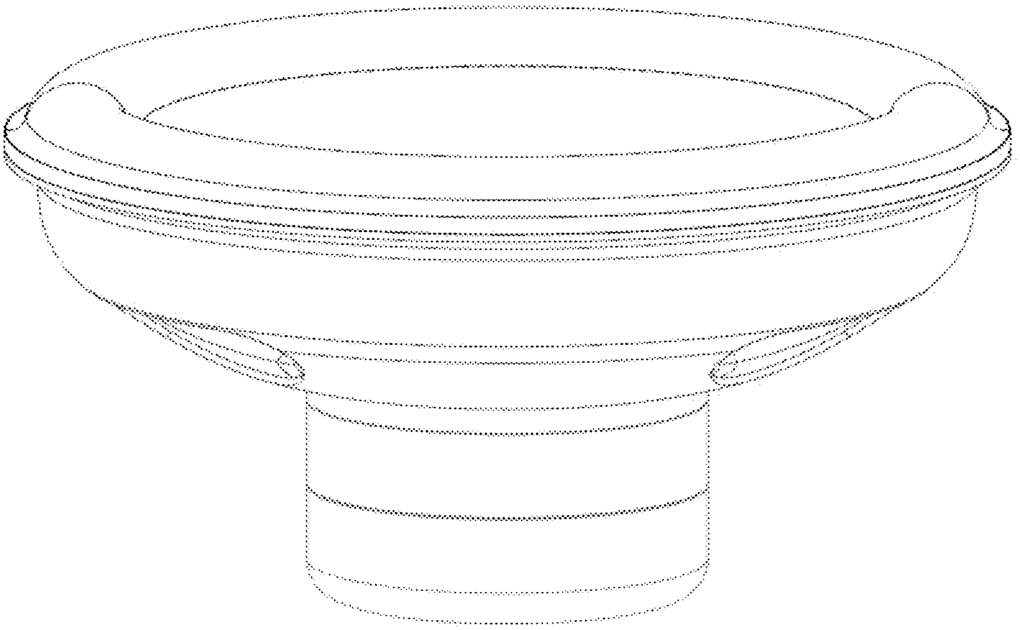
FIGS. 18K and 18L illustrate opposing woofers in accordance with an embodiment of the invention.
Figure 18L:
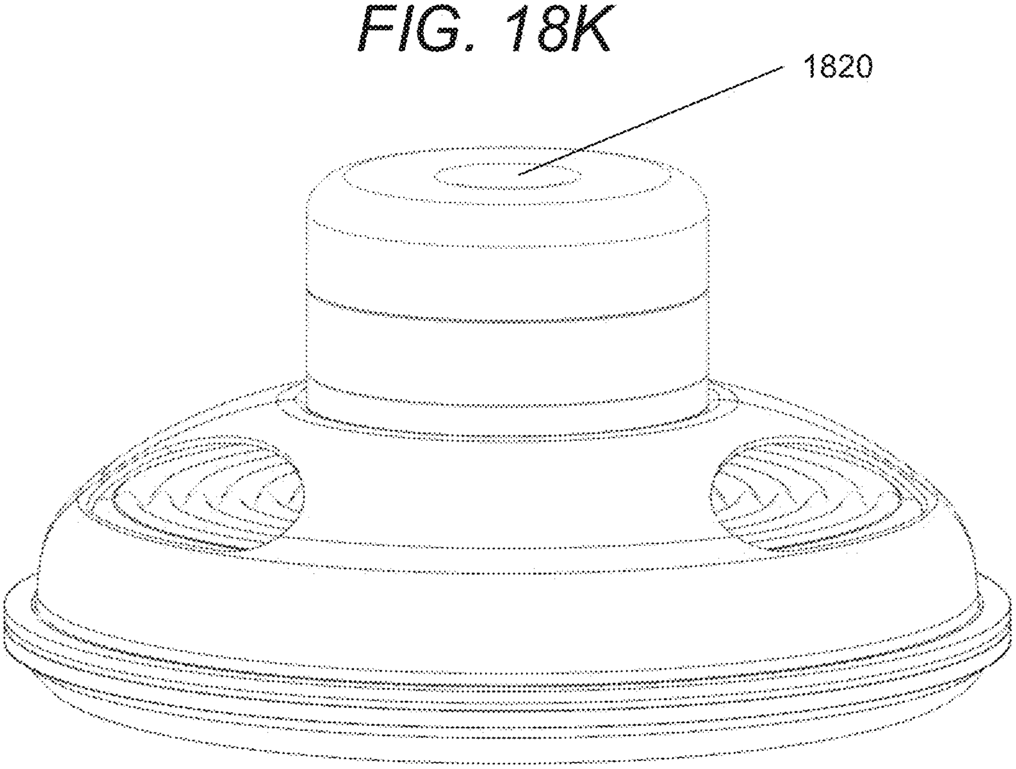
Figure 18M:
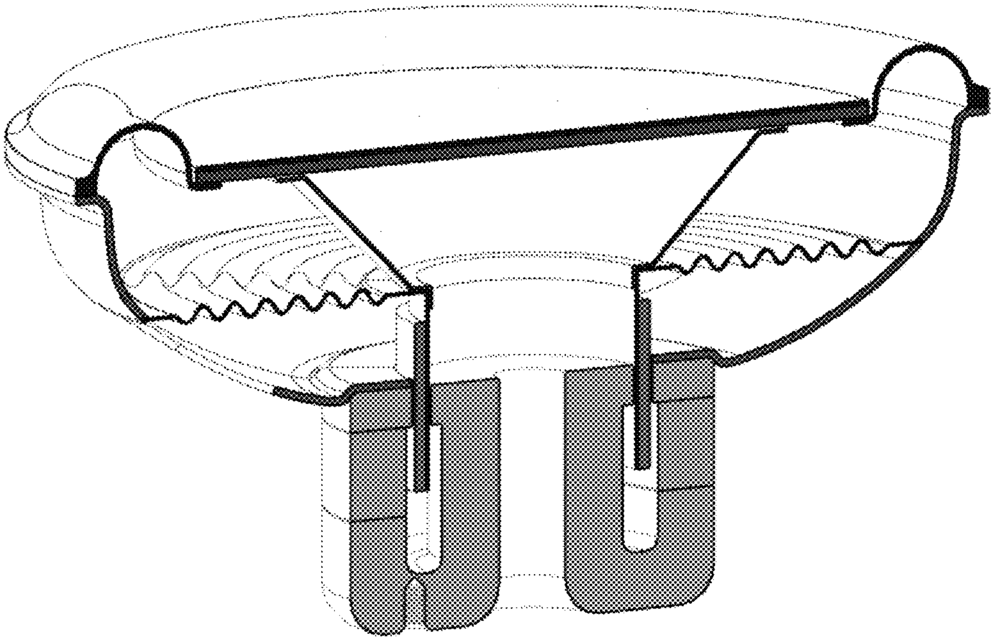
FIGS. 18M and 18N are a cross section of the opposing woofers in accordance with an embodiment of the invention.
Figure 18N:
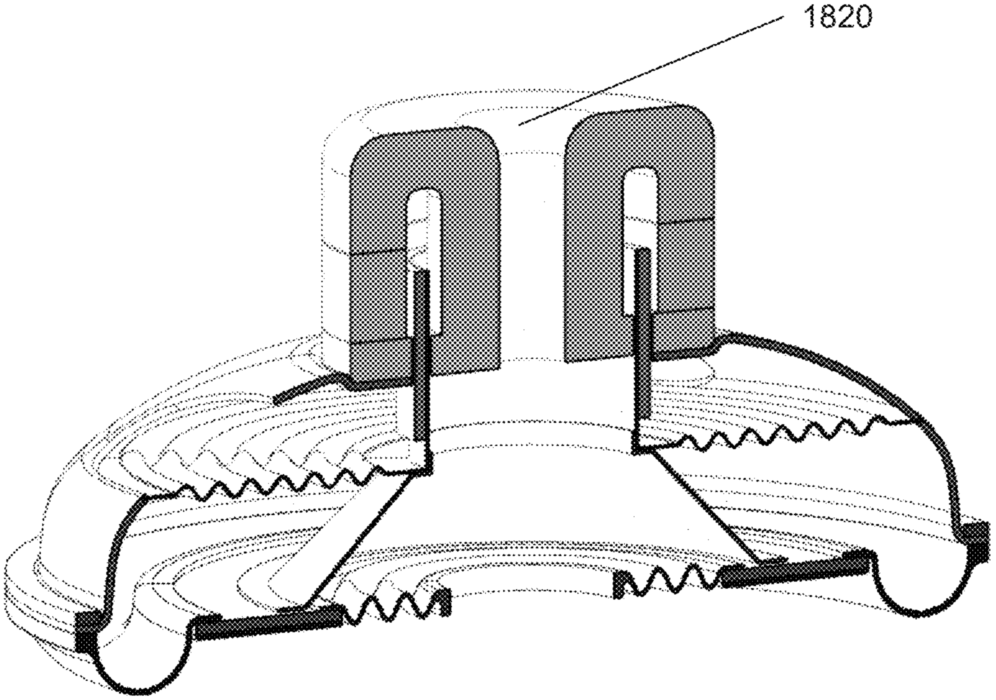
Figure 18O:
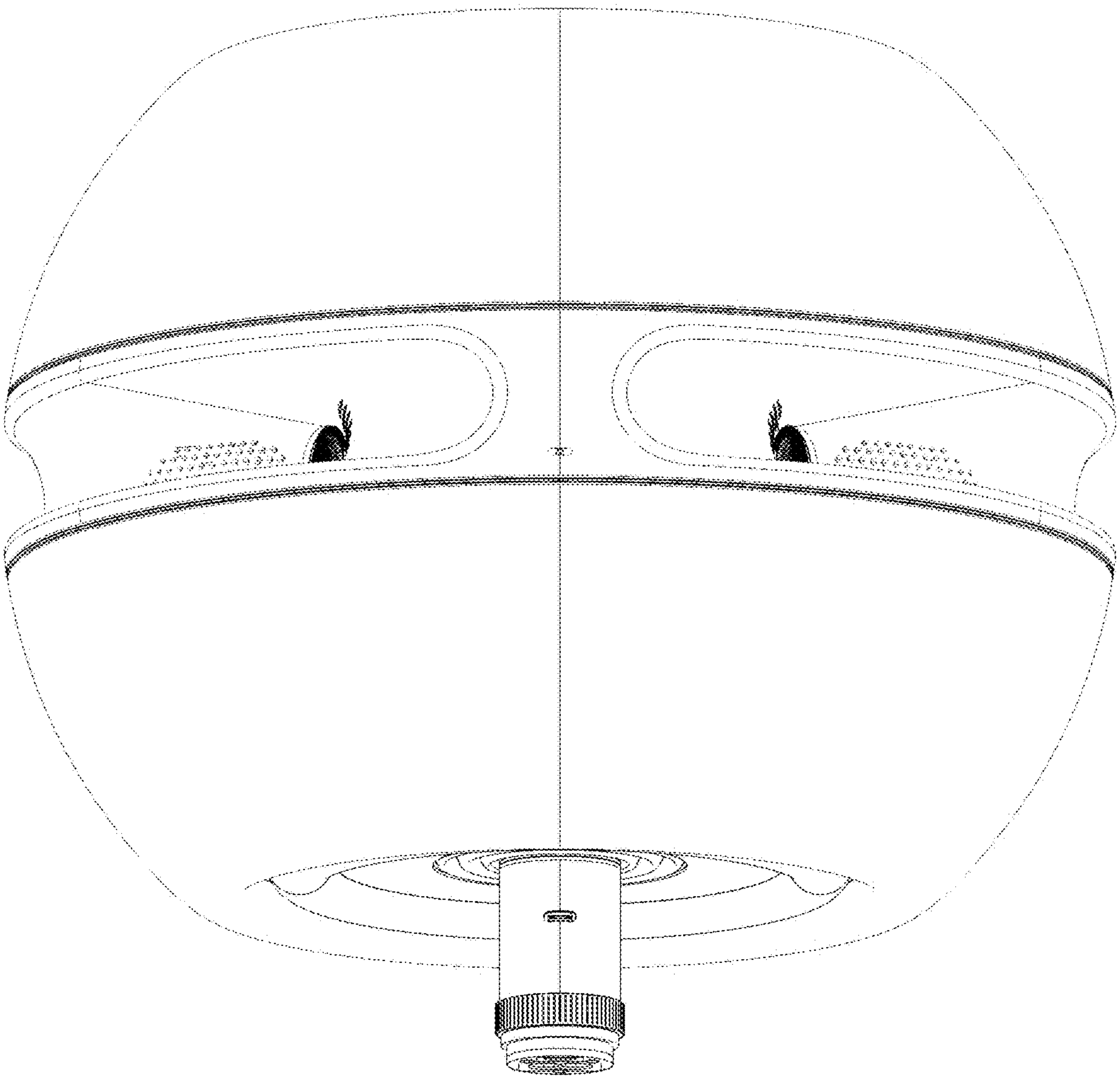
FIG. 18O illustrates a cell with a stem in accordance with an embodiment of the invention.
Figure 18P:
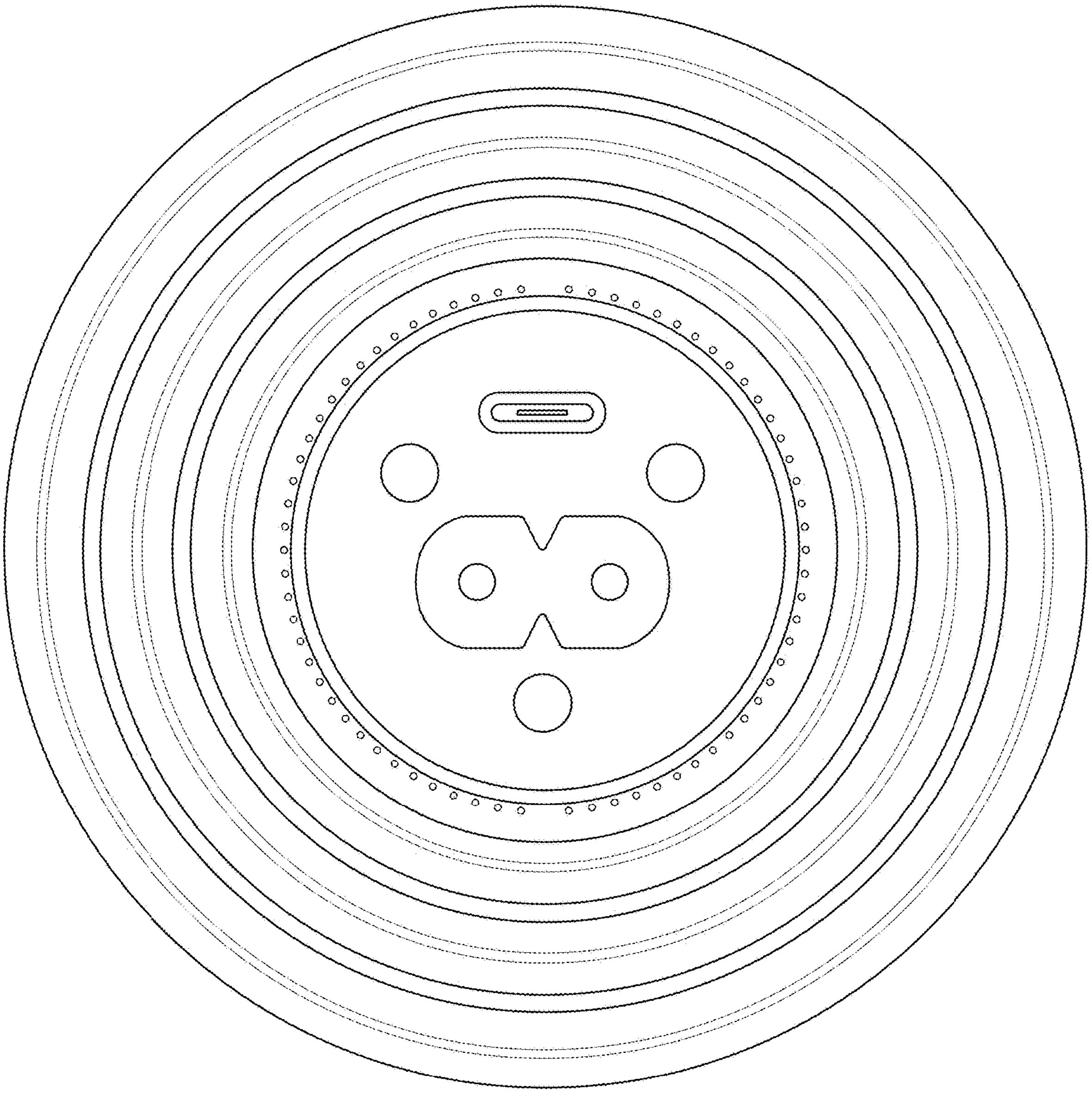
FIG. 18P illustrates an example connector on the bottom of a stem in accordance with an embodiment of the invention.

Turning now to FIG. 18J, a cell with lungs surrounding a crown, core, and halo in accordance with an embodiment of the invention is illustrated. Apertures can be provided in the lungs on the top and bottom of the cell to enable placement of woofers. A coaxial arrangement of woofers designed to fit into the apertures in accordance with an embodiment of the invention can be found in FIGS. 18K and 18L, which illustrate the top and bottom woofers, respectively. As can be seen, the top woofer is a conventional woofer, whereas the bottom woofer contains a hollow tunnel through the center. This is further illustrated in the cross sectional views of the top and bottom woofer illustrated respectively in FIGS. 18M and 18N. The channel through the bottom woofer can provide an access port for physical connectors to reach the exterior of the cell. In many embodiments, a "stem" extends from the cell through the channel which can connect to any number of different configurations of stands. In a variety of embodiments, power cabling and data transfer cabling are routed through the channel. A cell with a stem going through the channel is illustrated in accordance with an embodiment of the invention in FIG. 18O. A close up view of various ports on a stem in accordance with an embodiment of the invention is illustrated in FIG. 18P. Ports can include, but are not limited to, USB connectors, power connectors, and/or any other connector implemented in accordance with a data transfer connection protocol and/or standard as appropriate to the requirements of specific applications in accordance with various embodiments of the invention.

In order to maintain woofer functionality, a double surround can be used to keep the channel 1820 open while keeping the woofer sealed. Further, in many embodiments, a gasket used to seal the bottom woofer can be extended to cover the frame to reinforce the seal. However, in many embodiments, a cell may only have a single woofer. Due to the nature of low frequency sound, many spatial audio renderings may not require opposing woofers. In such a case, a channel may not be required as the bottom (or top) may not have a woofer. Further, in many embodiments, additional structural elements can be utilized on the exterior of the cell that provide alternative connections to stands, or may in fact be stands themselves. In such a case where a stem is not connected through the bottom of the cell, a conventional woofer could be used instead. In many embodiments, the diaphragm (or cone) of the woofer is constructed out of a triaxial carbon fiber weave which has a high stiffness to weight ratio. However, the diaphragm can be constructed out of any material appropriate for a woofer as appropriate to the requirements of specific applications of embodiments of the invention. Further, in numerous embodiments, a cell can be made to be completely sealed with no external ports by use of induction-based power systems and wireless data connectivity. However, a cell can retain these functions while still providing physical ports. Stems are discussed in further detail below.

Section 6.5: Stems

As noted above, in numerous embodiments, cells include stems which can serve any of a number of functions, including, but not limited to, supporting the body of the cell, providing a surface for placing controls, providing connections to stands, providing a location for connectors, and/or any of a number of other functions as appropriate to the requirements of specific applications of embodiments of the invention. Indeed, while in many embodiments, cells can be operated remotely via control devices, in various embodiments, cells can be operated directly via physical controls connected to the cell such as, but not limited to, buttons, toggles, dials, switches, and/or any other physical control method as appropriate to the requirements of specific applications of embodiments of the invention. In numerous embodiments, a "control ring" located on the stem can be used to directly control the cell.

Figure 20:
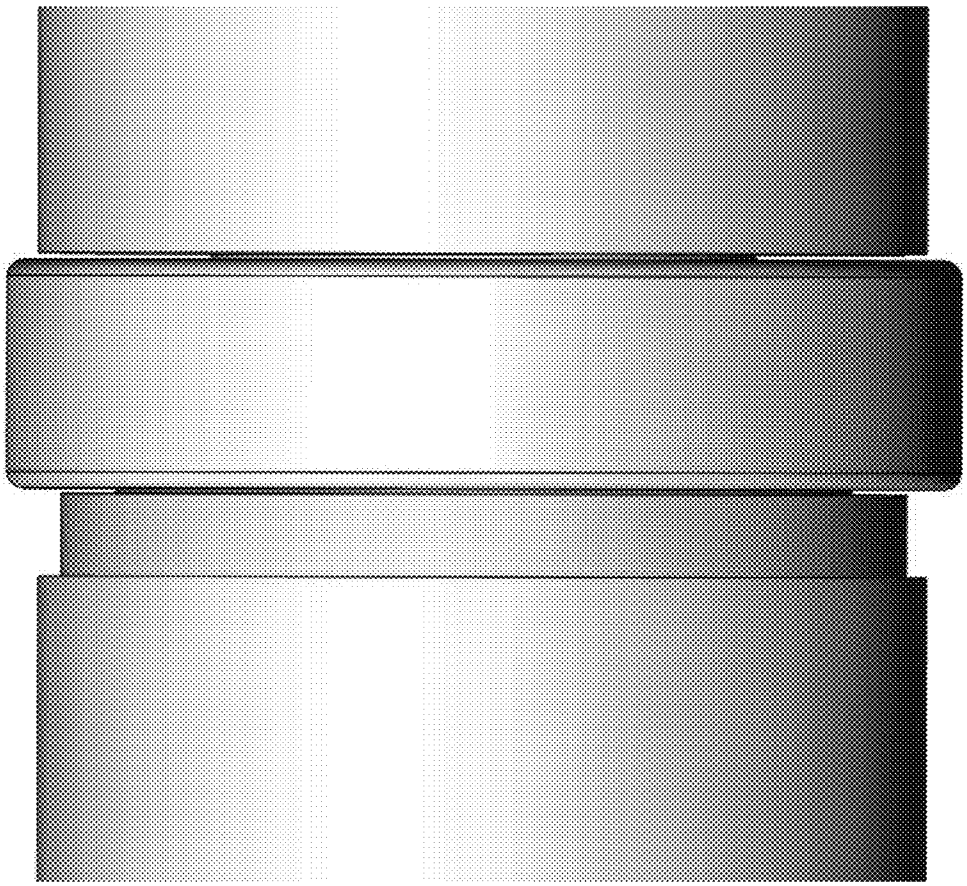
FIG. 20 illustrates a control ring on a stem in accordance with an embodiment of the invention.
Figure 21:
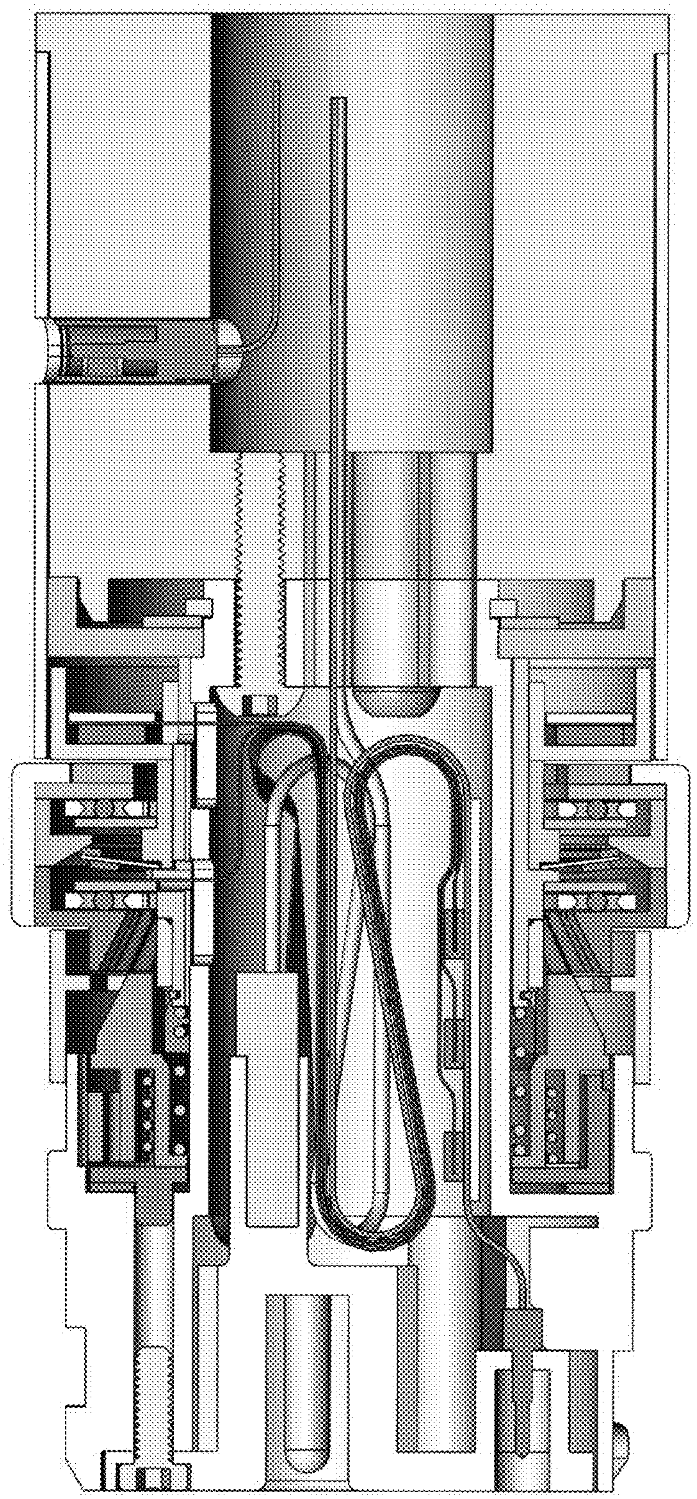
FIG. 21 is a cross section of a stem and control ring in accordance with an embodiment of the invention.

Turning now to FIG. 20, a control ring on a stem is illustrated in accordance with an embodiment of the invention. Control rings are rings that can be manipulated to send control signals to a cell, similar to a control device. Control rings can be rotated (e.g. twisted), pulled up, pushed down, pushed (e.g. "clicked," or pressed perpendicularly to the axis of the stem), and/or any other manipulation as appropriate to the requirements of specific applications of embodiments of the invention. A cross section of an example control ring showing the interior mechanics in accordance with an embodiment of the invention is illustrated in FIG. 21. Different mechanical components are discussed below with respect to the actions with which they are associated.

Figure 22:
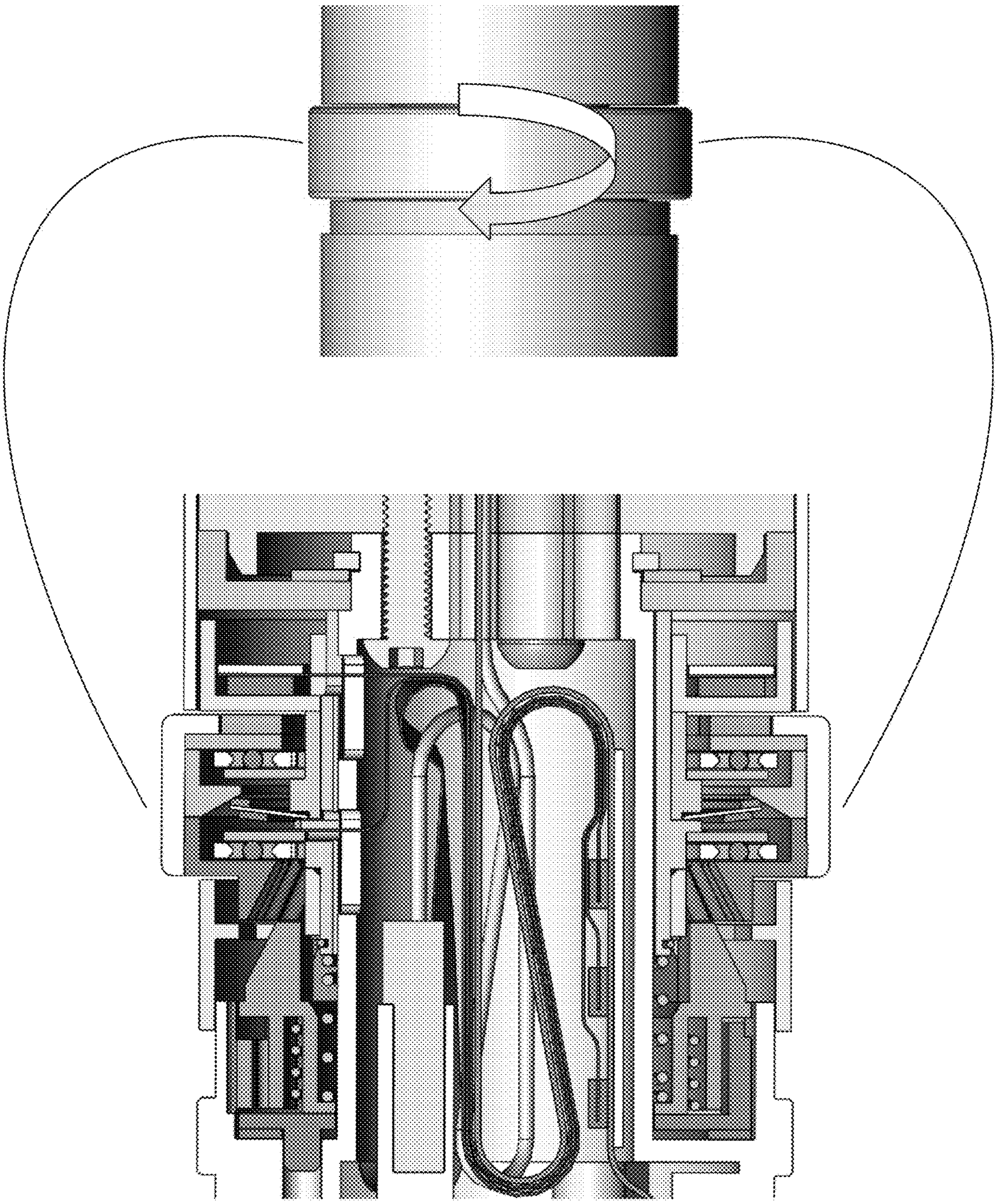
FIG. 22 is an illustration of a control ring rotation in accordance with an embodiment of the invention.
Figure 23:
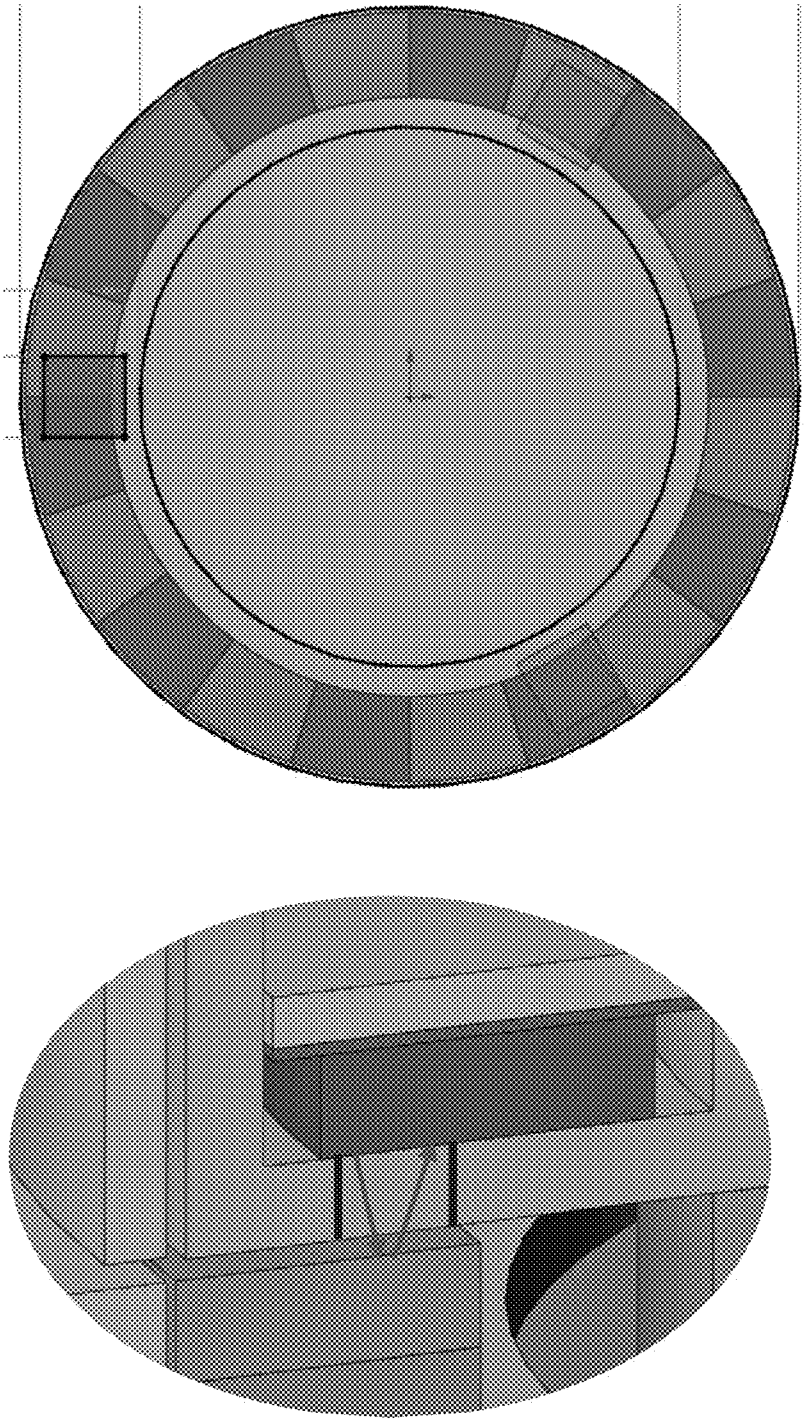
FIG. 23 is a close view of a portion of the control ring mechanism for detecting rotation in accordance with an embodiment of the invention.

In numerous embodiments, rotating can be used as a method of control. While rotating can indicate a number of different controls as appropriate to the requirements of specific applications of embodiments of the invention, in many embodiments, the rotating motion can be used to change volume and/or skip tracks. FIG. 22 indicates the mechanical structures involved with registering a rotation of the control ring in accordance with an embodiment of the invention. FIG. 23 is a close view of the particular component. A disk containing an alternating sensible surface is connected to the ring, which when rotated, moves the alternating sensible surface across a sensor. The rotation can be sensed by the sensor by measuring the alternating surface. In numerous embodiments, the alternating sensible surface is made of magnets, and the sensor detects the changing magnetic field. In various embodiments, the alternating sensible surface is an alternating colored surface which is sensed via an optical sensor. However, any number of different sensing schemes can be utilized as appropriate to the requirements of specific applications of embodiments of the invention. Furthermore, in numerous embodiments, the alternating sensible surface is an annulus rather than a disk.

Figure 24:
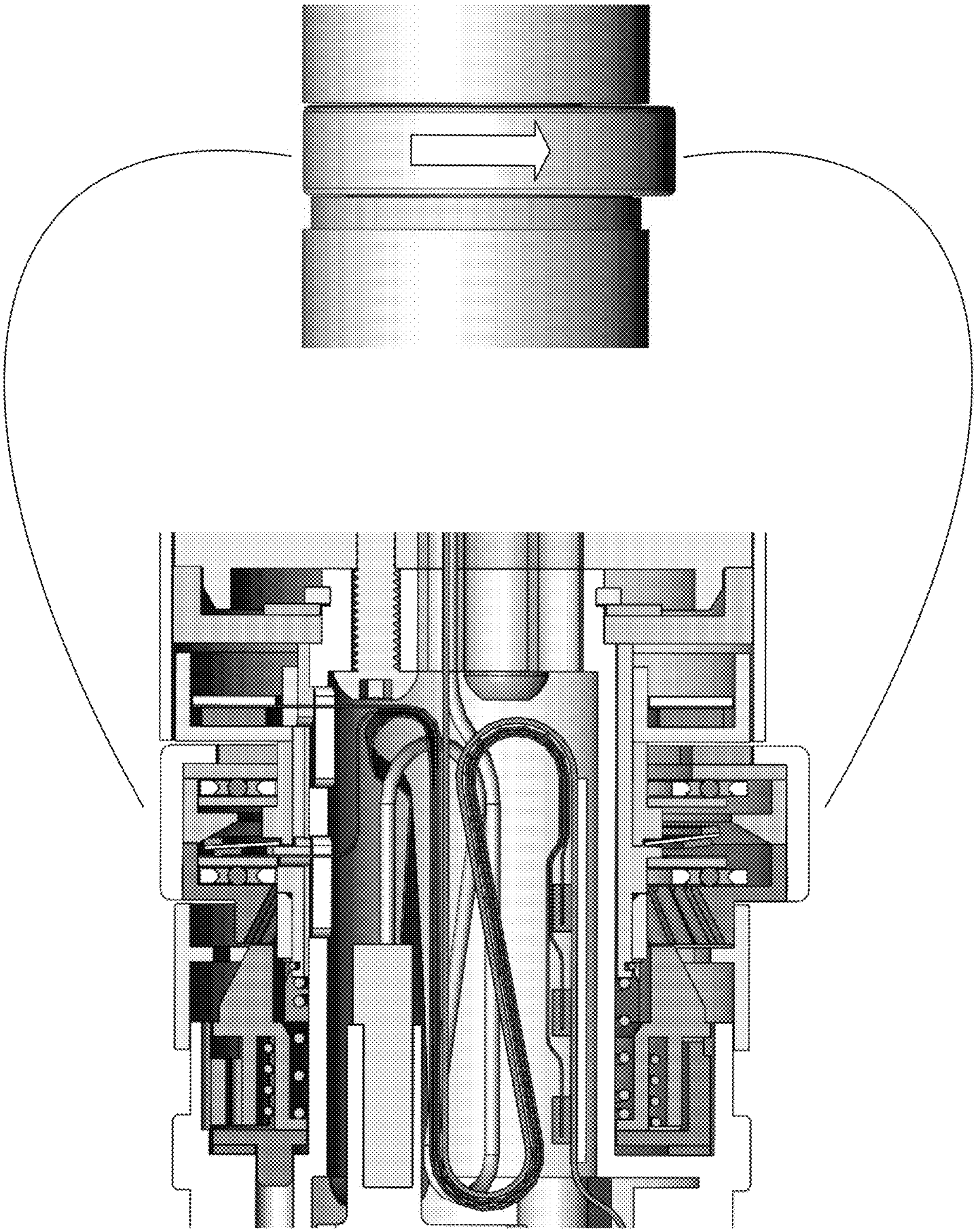
FIG. 24 is an illustration of a control ring click in accordance with an embodiment of the invention.
Figure 25:
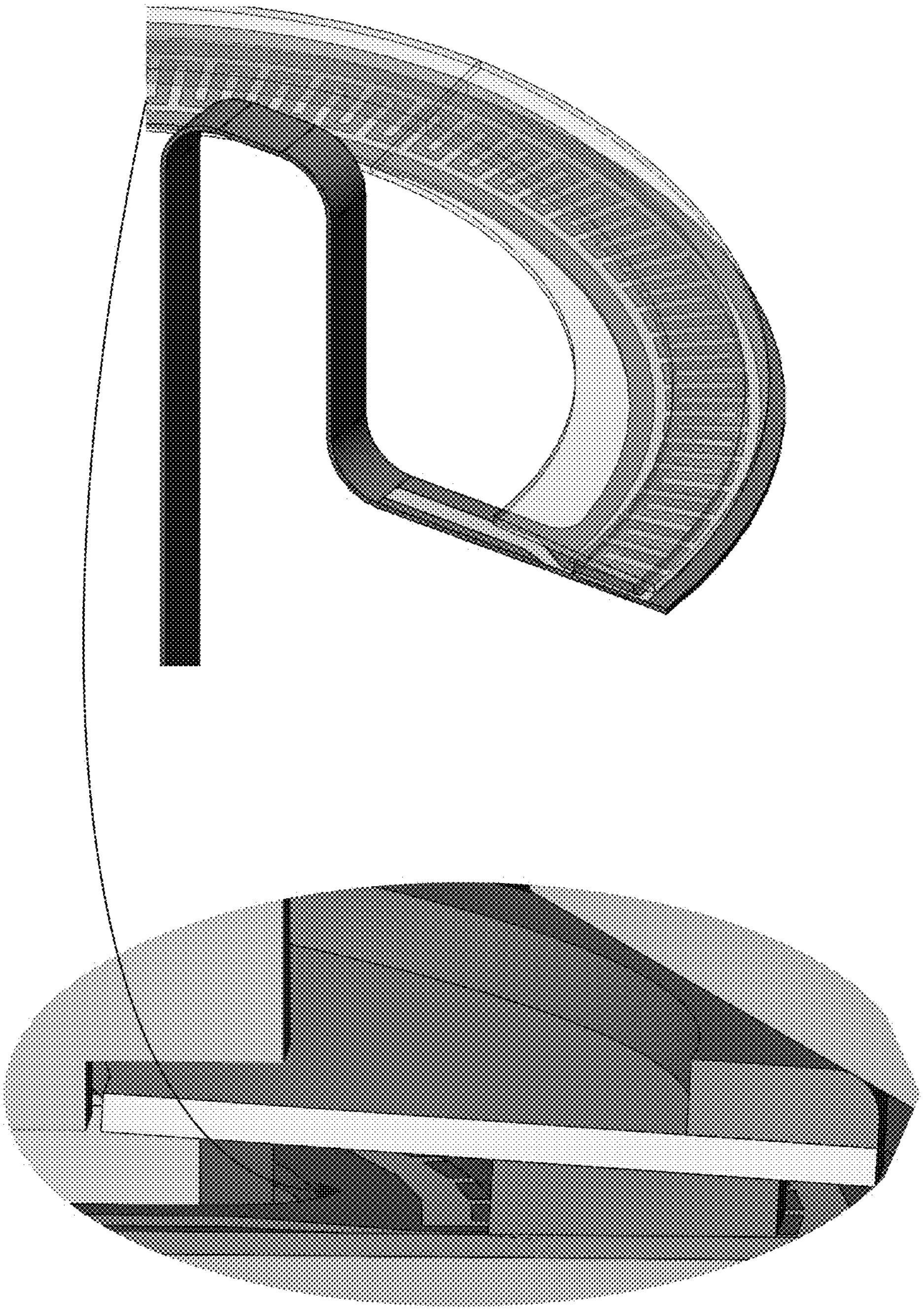
FIG. 25 is a close view of a portion of the control ring mechanism for detecting clicks in accordance with an embodiment of the invention.

In a variety of embodiments, forcing a control ring off center, or "clicking," can be used as a method of control. FIG. 24 illustrates "clicking" a control ring in accordance with an embodiment of the invention. In many embodiments, a radial push is resisted by race springs while a static ramp engages a conical washer (also referred to as a "Belleville washer") causing it to invert, which is then detected. In several embodiments, when the washer inverts, a ring of carbon pill material presses against an electrode pattern and shorts two contact rings. The short can be measured and recorded as a click. A carbon pill membrane with associated electrodes under a conical washer in an inverted "clicked" position in accordance with an embodiment of the invention is illustrated in FIG. 25. However, any number of different detection methods can be used as appropriate to the requirements of specific applications of embodiments of the invention.

Figure 26:
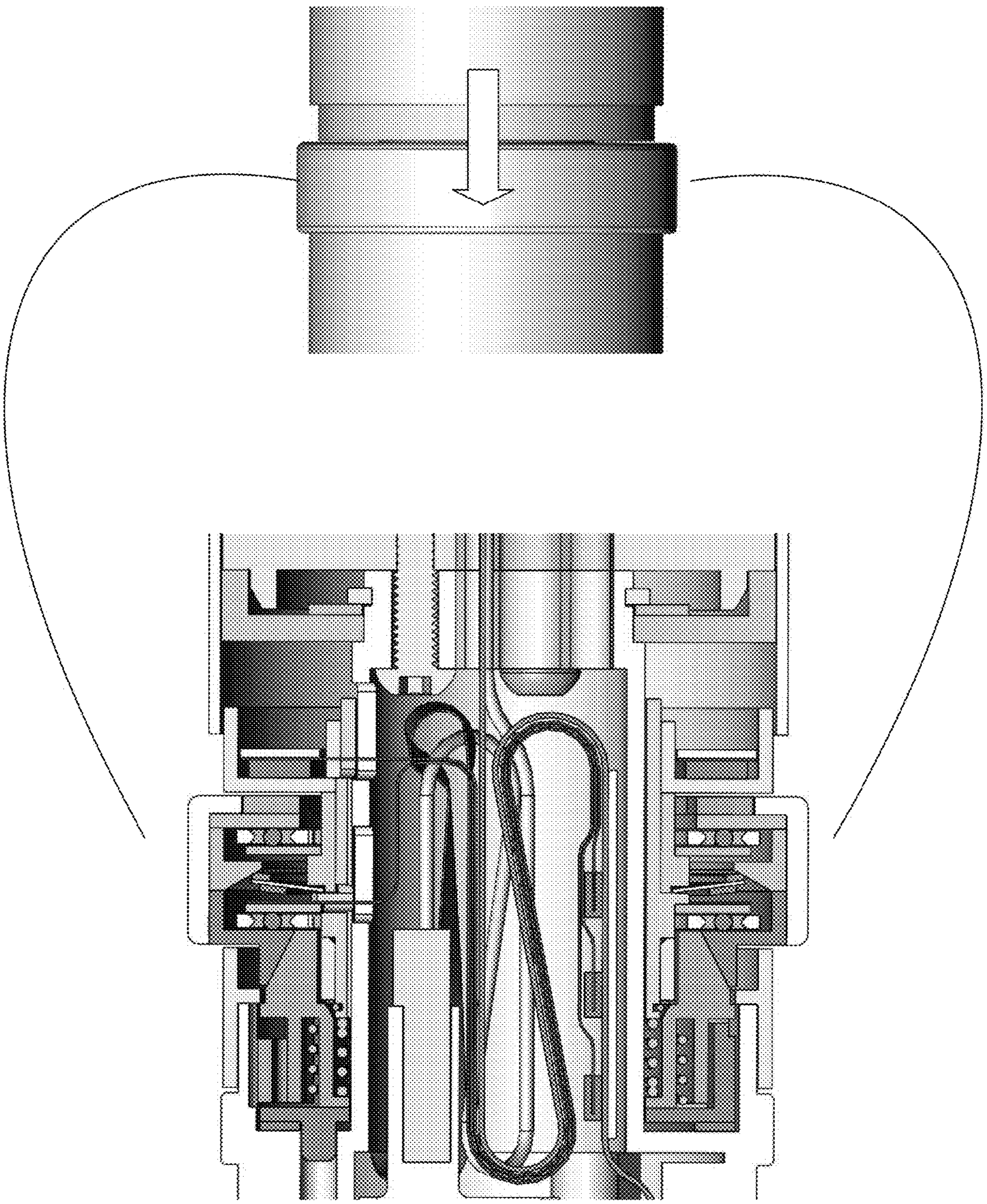
FIG. 26 is an illustration of a control ring vertical movement in accordance with an embodiment of the invention.
Figure 27:
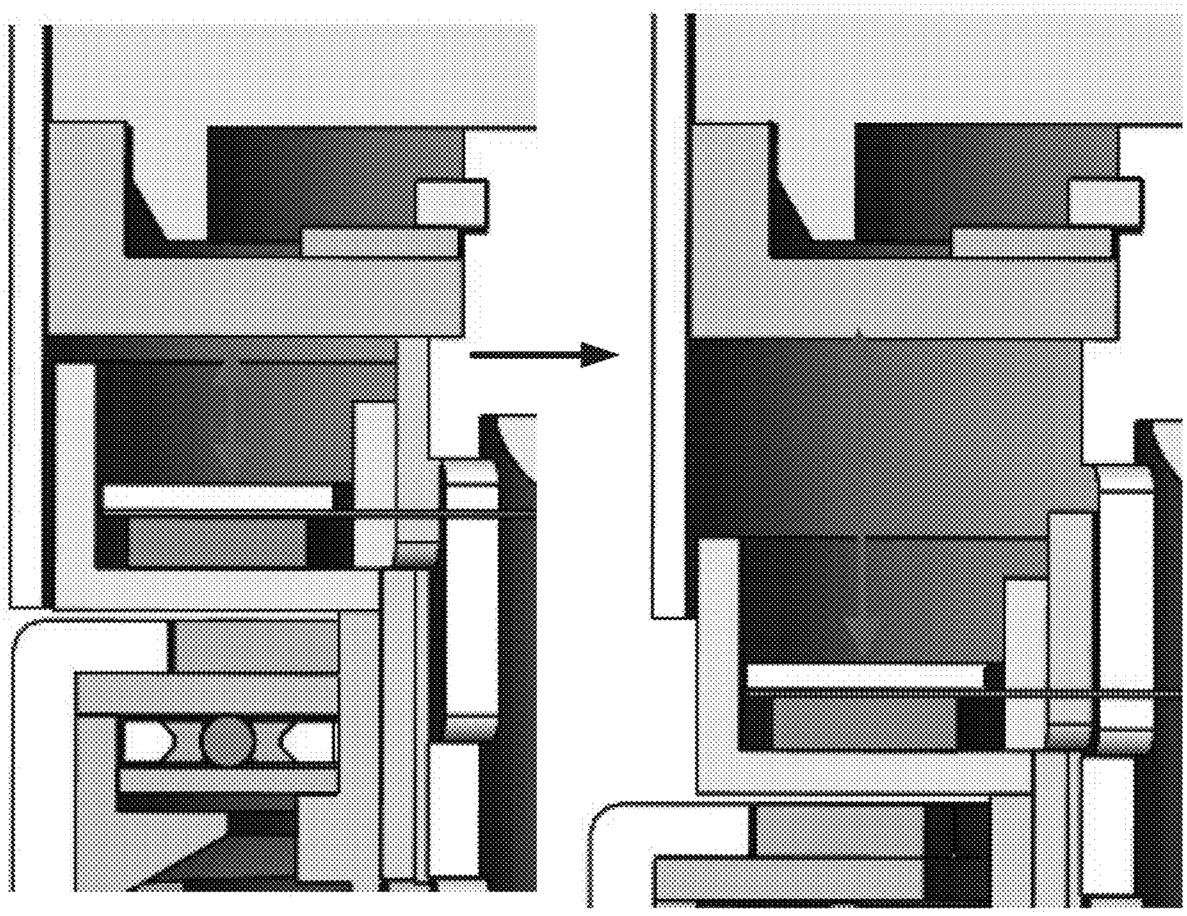
FIG. 27 is a close view of a portion of the control ring mechanism for detecting vertical movement in accordance with an embodiment of the invention.

In many embodiments, moving the control ring vertically along the stem can be used as a method of control. An example mechanical structure for registering vertical movement in accordance with an embodiment of the invention is illustrated in FIG. 26. In a number of embodiments, the vertical movement of the control ring can be measured by revealing a flag which can in turn be detected via an opto-interrupter. In many embodiments, a proximity sensor is used instead of, or in conjunction with, an opto-interrupter. An illustration of the space created for revealing a flag in accordance with an embodiment of the invention is illustrated in FIG. 27. In a variety of embodiments, the movement can be detected mechanically via a physical switch or circuit short such as with respect to a click. One of ordinary skill in the art can appreciate that there are any number of ways to detect movement as appropriate to the requirements of specific applications of embodiments of the invention.

Figure 28:
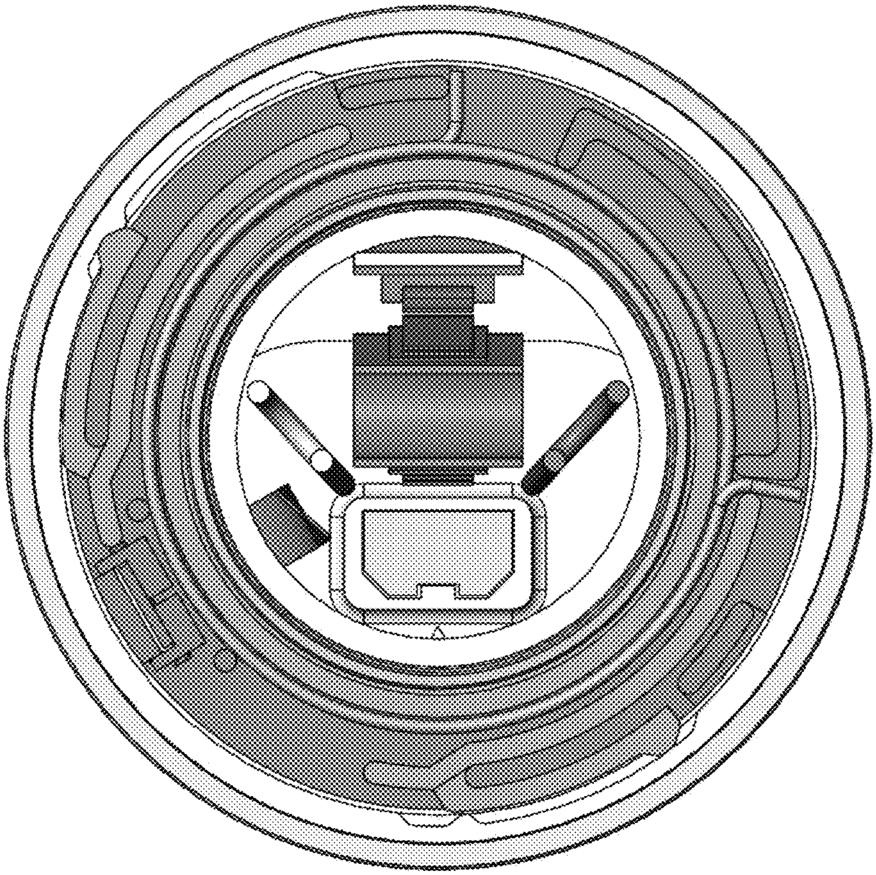
FIG. 28 is a close view of a portion of the control ring mechanism for detecting rotation on a secondary plane in accordance with an embodiment of the invention.

Once a control ring has been moved from its resting position via a vertical movement, a rotation on the new plane can be used as a different control than rotation on the resting plane. In many embodiments, a rotation on the second plane is referred to as a "twist," and is detected when the rotation achieves a set angle. In many embodiments, a clutch is engaged when the control ring is moved to a second plane, and can be moved relative to a separate clutch plate. In a variety of embodiments, a torsion spring can be used to resist motion while an integrated detent spring can provide a detent at the end of travel to enhance feel and/or prevent accidental movement. For example, a twist of 120 degrees (or any arbitrary number of degrees), can be registered using snap done switches at the end of a track. An example configuration of a clutch body and clutch plate in accordance with an embodiment of the invention is illustrated in FIG. 28. However, any number of different rotation methods can be used as appropriate to the requirements of specific applications of embodiments of the invention. An advantage to the discussed mechanisms is that they can be implemented with a passage in the middle to accommodate components that may pass through the stem.

Figure 29:
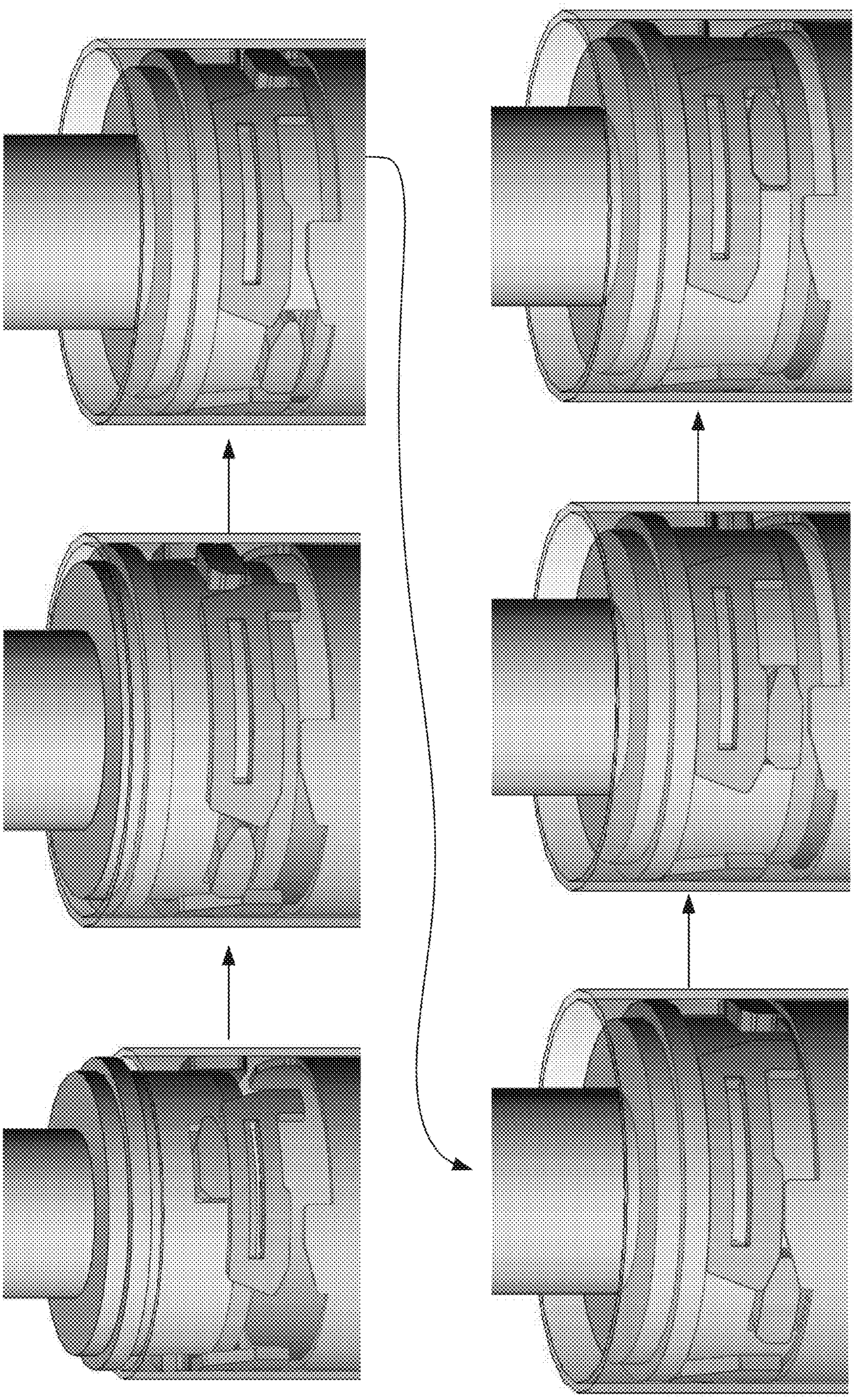
FIG. 29 visually illustrates a process for locking a stem to a stand using a bayonet based locking system in accordance with an embodiment of the invention.
Figure 30:
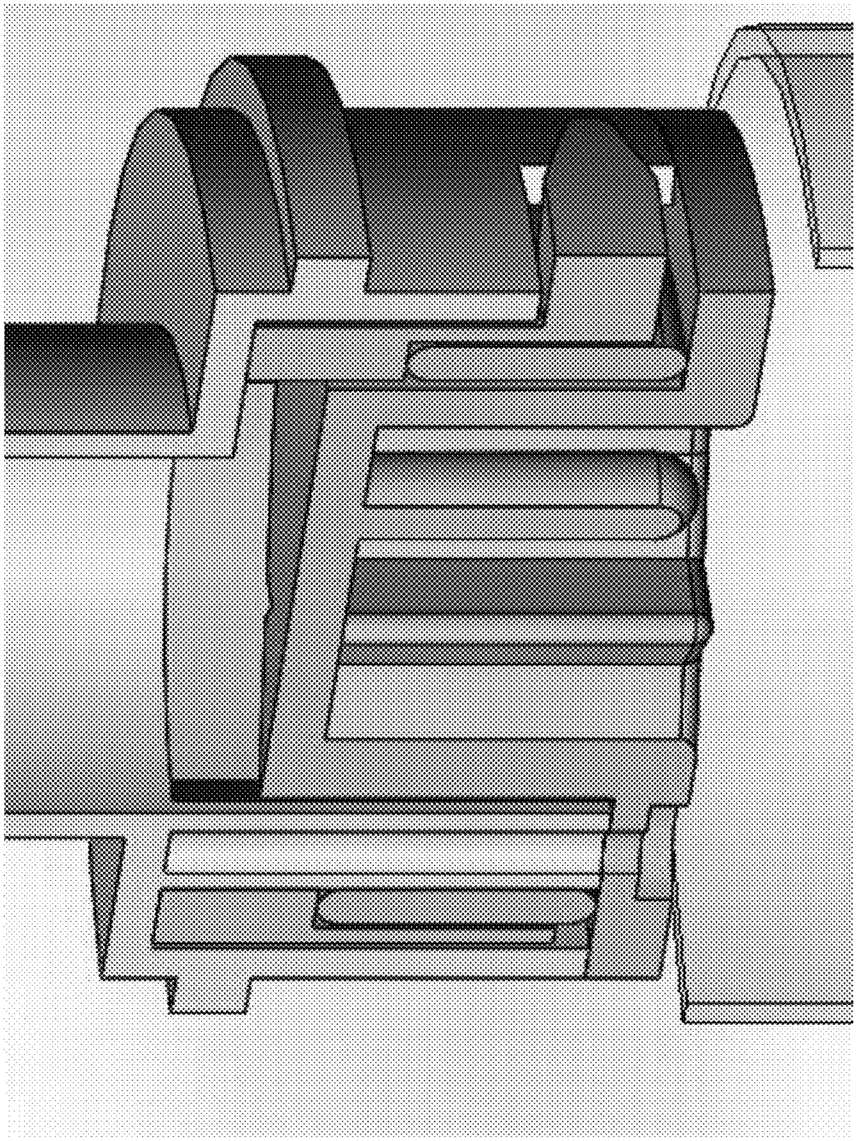
FIG. 30 is a cross section of a bayonet based locking system in accordance with an embodiment of the invention.

Stems further can lock into stands. In numerous embodiments, a bayonet based locking system is used, where a bayonet located on the stem travels into a housing in the stand to fix the connection. An example bayonet locking system in accordance with an embodiment of the invention is illustrated in FIG. 29. As illustrated, the stem has several bayonets that are pointed on one side, and the stand has a track formed by two surfaces which form bayonet shaped housings at the end of a track. In many embodiments, the number of bayonets match the number of housings, however so long as at least one bayonet matches to a housing, and no other bayonets (if present) collide with the surfaces such that the connection is off balance, the connection can be stable. If the stem and the stand are not aligned such that the bayonets can drop into the track, the stand or stem can be rotated such that they all fall into the track. In various embodiments, when twisted, the pointed end of the bayonet pushes open the two surfaces to reach and drop into the housing, after which the two surfaces can be forced together via springs in order to close the track. This can lock the stem into the stand, and prevent unwanted motion or removal under normal forces. A cross section of a stand and stem locked together using a bayonet based locking system in accordance with an embodiment of the invention is illustrated in FIG. 30.

Figure 31B:
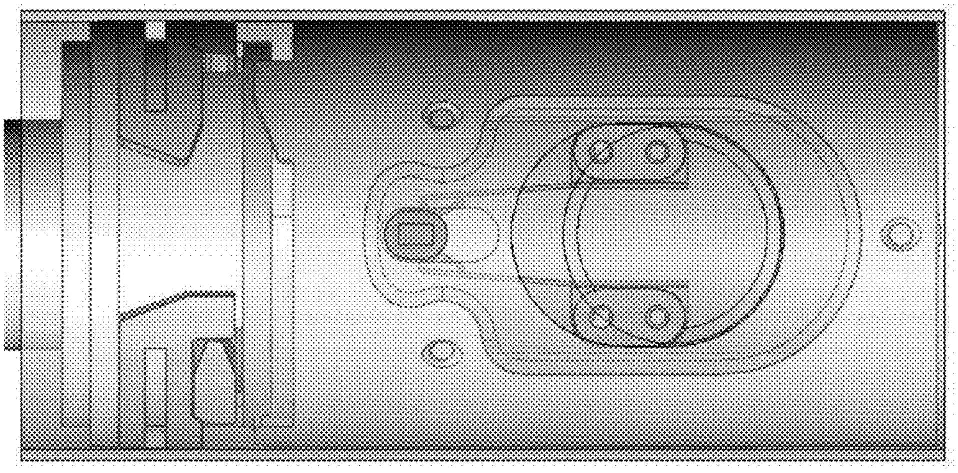
FIGS. 31A and 31B illustrate a locked and unlocked position for a bayonet based locking system in accordance with an embodiment of the invention.
Figure 31A:
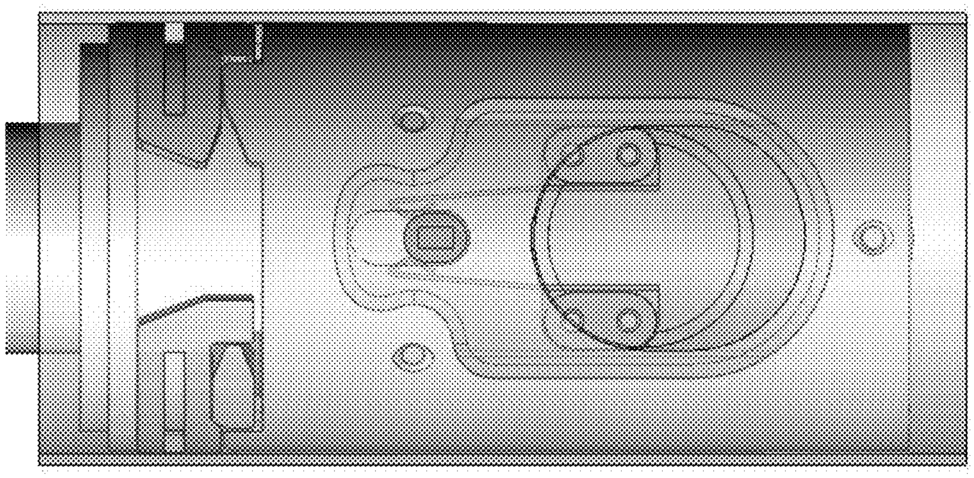

In order to remove the stem from the stand, the two surfaces can be separated again to form a track which the bayonets can be backed out of and removed. In various embodiments, one of the surfaces can be pushed up or down. In many embodiments, this is achieved using a set of loaded springs which are manipulable by a user. An example implementation is illustrated in accordance with an embodiment of the invention in FIGS. 31A and 31B. Positional bi-stability can be achieved using springs on a lock plate engaged with a tab. By sliding a plate, the user can move one of the surfaces by applying the appropriate force against the springs. FIG. 31A shows the mechanism in the locked position, whereas FIG. 31B shows the mechanism in the unlocked position. However, one of ordinary skill in the art can appreciate that any number of configurations can be utilized for bayonet based locking systems as appropriate to the requirements of specific applications of embodiments of the invention. Indeed, one of ordinary skill in the art can appreciate that any number of locking systems can be used aside from bayonet based locking systems to secure stems to stands without departing from the scope or spirit of the invention.

Figure 18Q:
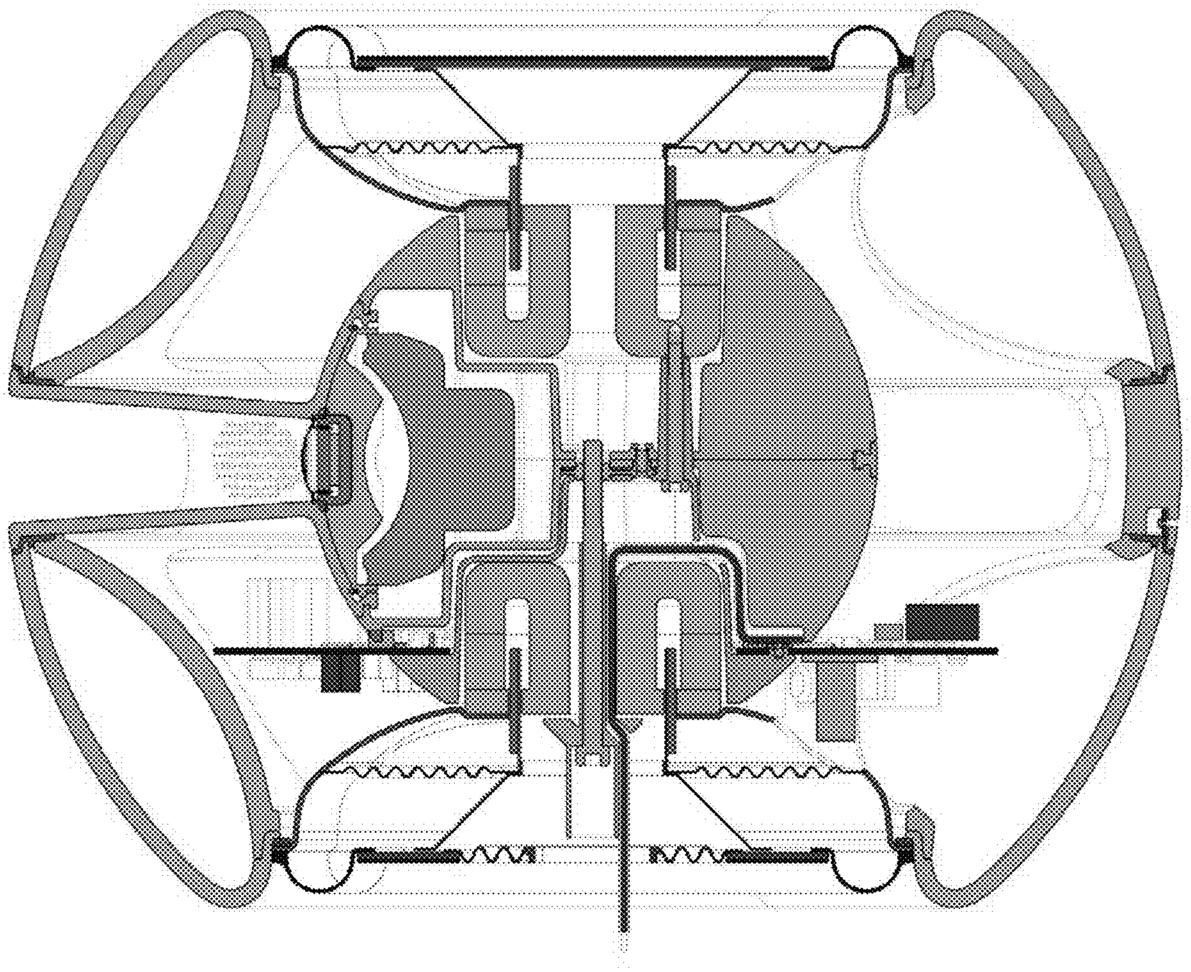
FIG. 18Q is a cross section of a cell in accordance with an embodiment of the invention.
Figure 18R:
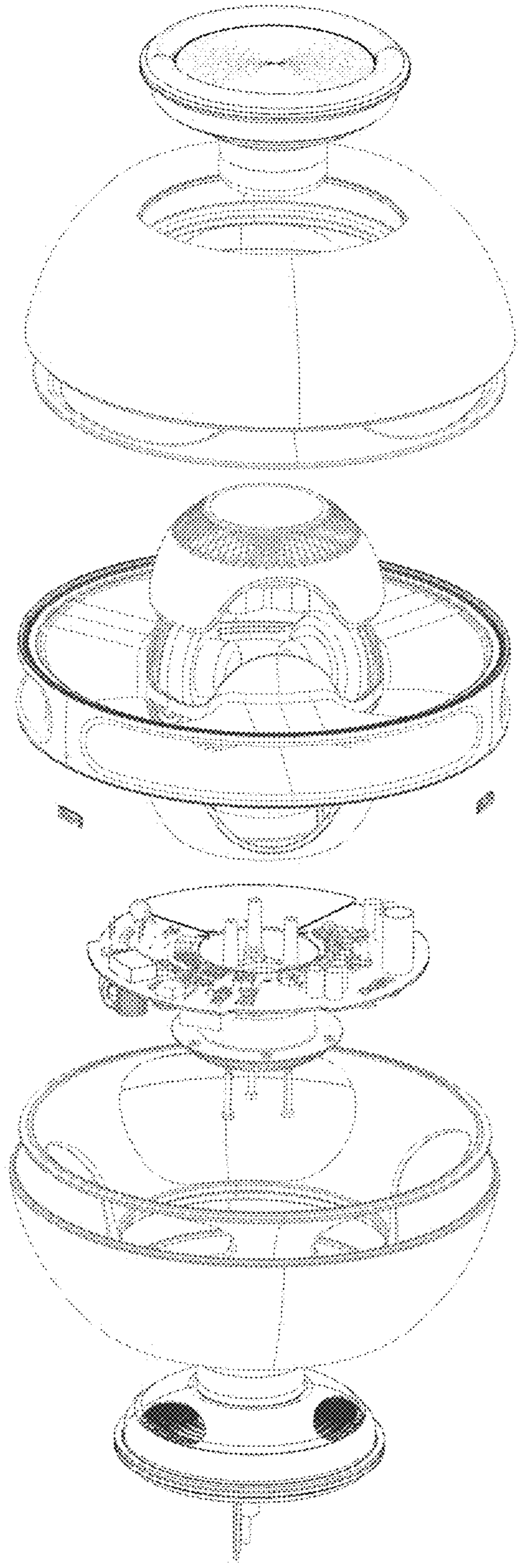
FIG. 18R is an exploded view of a cell in accordance with an embodiment of the invention.
Figure 19A:
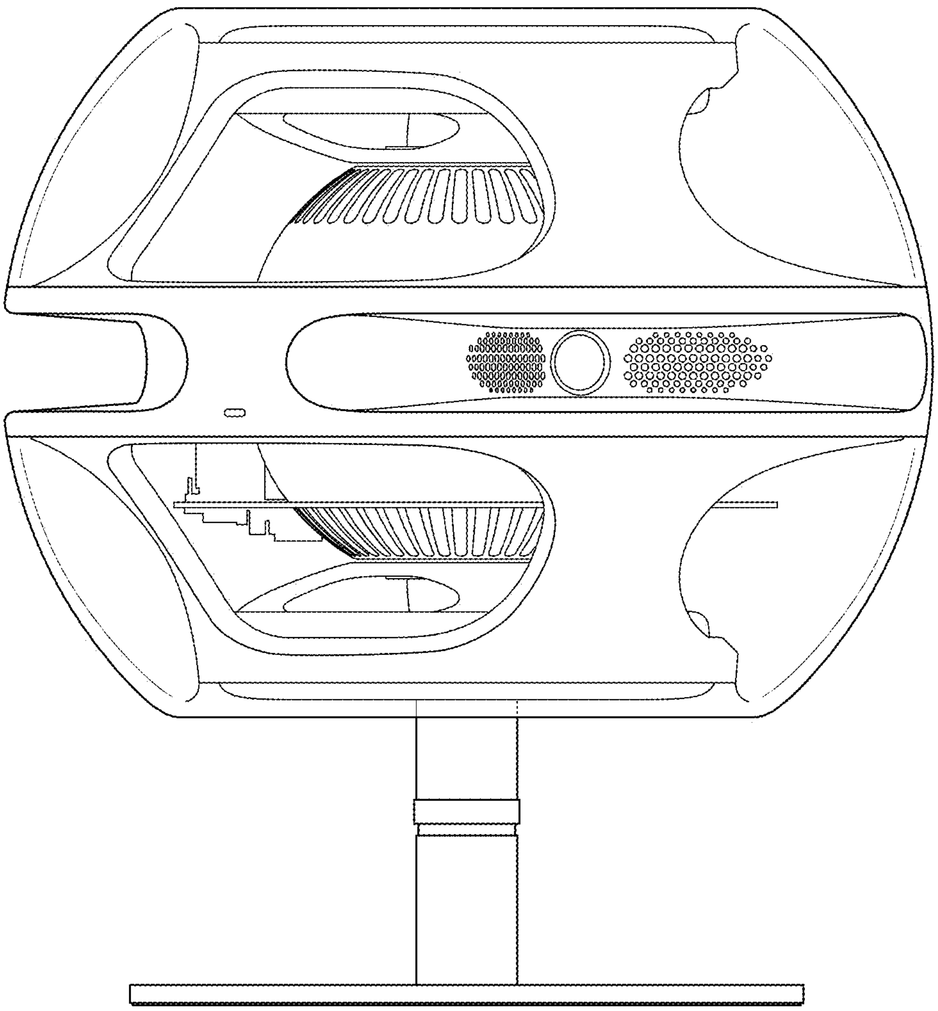
FIG. 19A-19D illustrates a cell on several stand variants in accordance with embodiments of the invention.
Figure 19B:
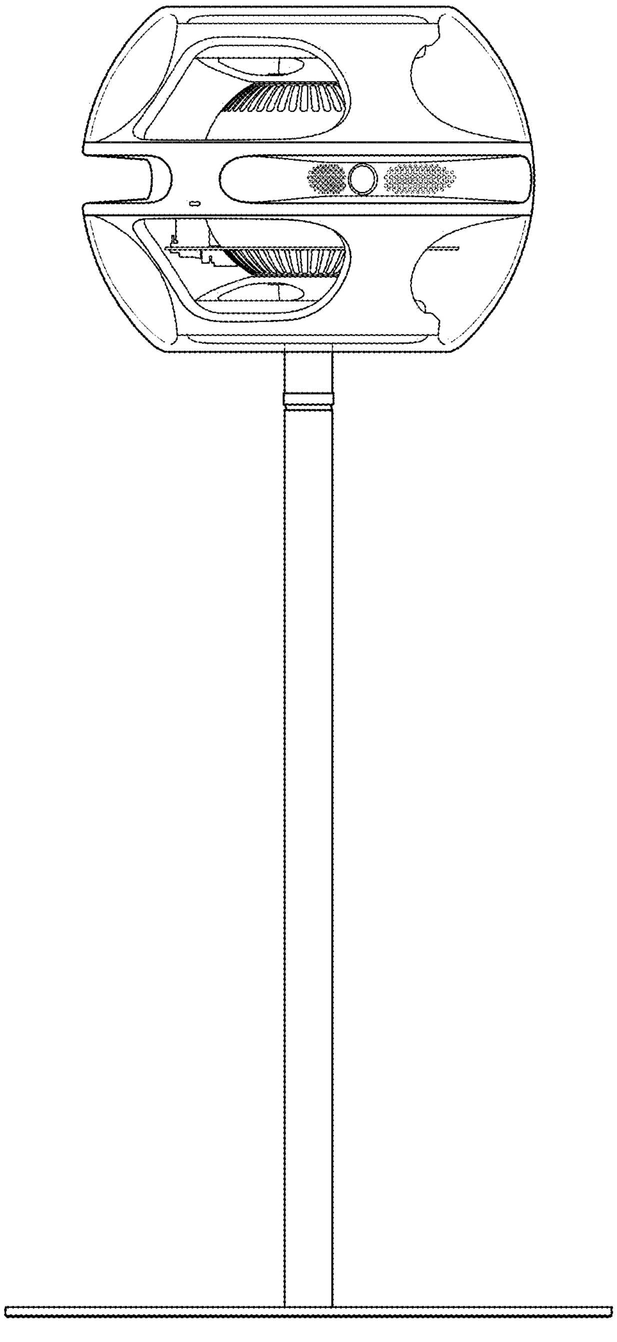
Figure 19C:
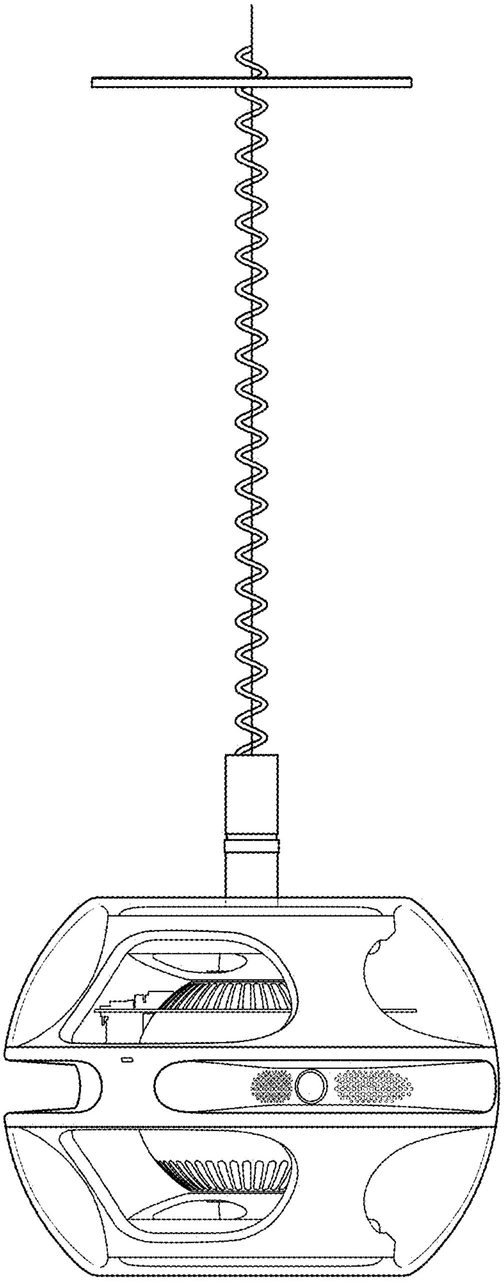
Figure 19D:
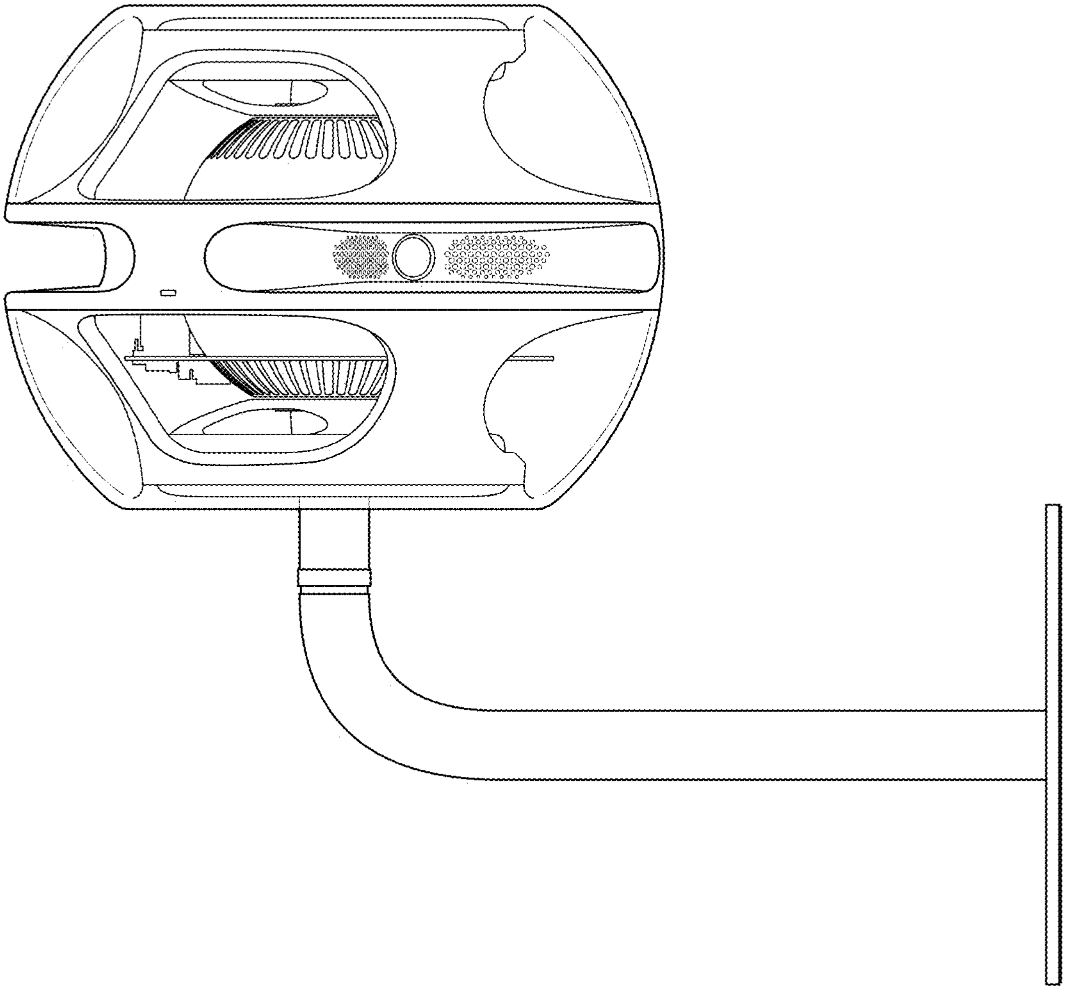

Putting together the above described components can yield a functional cell. Turning now to FIGS. 18Q and 18R, FIG. 18Q is a cross section of a complete cell and FIG. 18R is an exploded view of the complete cell in accordance with an embodiment of the invention. While a particular embodiment of a cell is illustrated with respect to FIGS. 18A-R, cells can take any number of different configurations, including, but not limited to, having different numbers of drivers, different horn configurations, replacing horns with other driver configurations including (but not limited to) tetrahedral driver configurations, lacking a stem, and/or different overall form factors. In many embodiments, cells are supported by support structures. A non-exclusive set of example support structures in accordance with embodiments of the invention are illustrated in FIGS. 19A-D.

Section 6.6: Cell Circuitry

Figure 32:
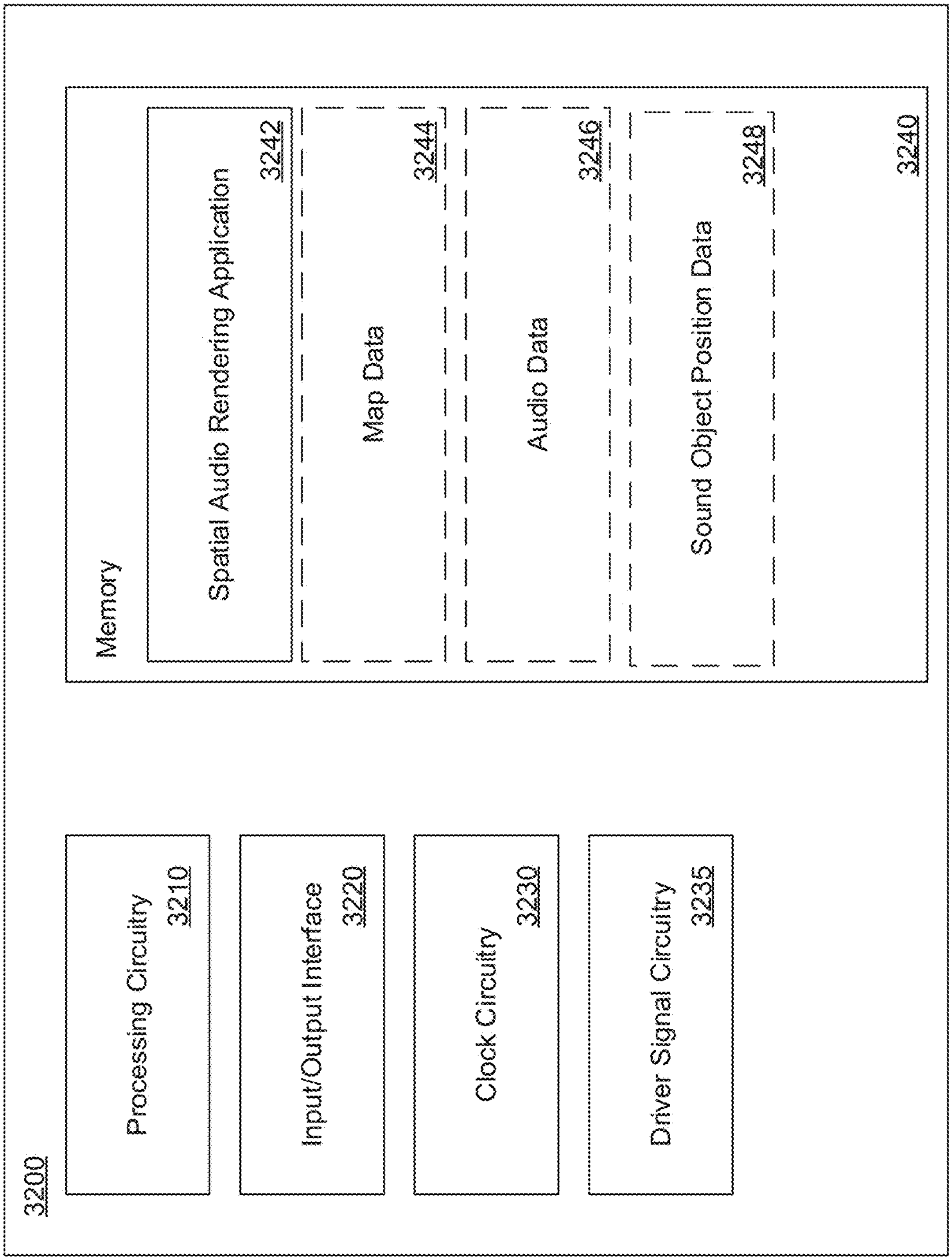
FIG. 32 is a block diagram illustrating cell circuitry in accordance with an embodiment of the invention.

Turning now to FIG. 32, a block diagram for cell circuitry in accordance with an embodiment of the invention is illustrated. Cell 3200 includes processing circuitry 3210. Processing circuitry can include any number of different logic processing circuits such as, but not limited to, processors, microprocessors, central processing units, parallel processing units, graphics processing units, application specific integrated circuits, field-programmable gate-arrays, and/or any other processing circuitry capable of performing spatial audio processes as appropriate to the requirements of specific applications in accordance with various embodiments of the invention.

Cell 3200 can further include an input/output (I/O) interface 3220. In many embodiments, the I/O interface includes a variety of different ports and can communicate using a variety of different methodologies. In numerous embodiments, the I/O interface includes a wireless networking device capable of establishing an ad hoc network and/or connecting to other wireless networking access points. In a variety of embodiments, the I/O interface has physical ports for establishing wired connections. However, I/O interfaces can include any number of different types of technologies capable of transferring data between devices. Cell 3200 further includes clock circuitry 3230. In many embodiments, the clock circuitry includes a quartz oscillator.

Cell 3200 can further include driver signal circuitry 3235. Driver signal circuitry is any circuitry capable of providing an audio signal to a driver in order to make the driver produce audio. In many embodiments, each driver has its own portion of the driver circuitry.

Cell 3200 can also include a memory 3240. Memory can be volatile memory, non-volatile memory, or a combination of volatile and non-volatile memory. Memory 3240 can store an audio player application such as (but not limited to) a spatial audio rendering application 3242. In numerous embodiments, spatial audio rendering applications can direct the processing circuitry to perform various spatial audio rendering tasks such as, but not limited to, those described herein. In numerous embodiments, the memory further includes map data 3244. Map data can describe the location of various cells within a space, the location of walls, floors, ceilings, and other barriers and/or objects in the space, and/or the placement of virtual speakers. In many embodiments, multiple sets of map data may be utilized in order to compartmentalize different pieces of information. In a variety of embodiments, the memory 3240 also includes audio data 3246. Audio data can include one or more pieces of audio content that can contain any number of different audio tracks and/or channels. In a variety of embodiments, audio data can include metadata describing the audio tracks such as, but not limited to, channel information, content information, genre information, track importance information, and/or any other metadata that can describe an audio track as appropriate to the requirements of specific applications in accordance with various embodiments of the invention. In many embodiments, audio tracks are mixed in accordance with an audio format. However, audio tracks can also represent individual, unmixed channels.

Memory can further include sound object position data 3248. Sound object position data describes the desired location of a sound object in the space. In some embodiments, sound objects are located at the position of each speaker in a conventional speaker arrangement ideal for the audio data. However, sound objects can be designated for any number of different audio tracks and/or channels and can be similarly located at any desired point.

Figure 33:
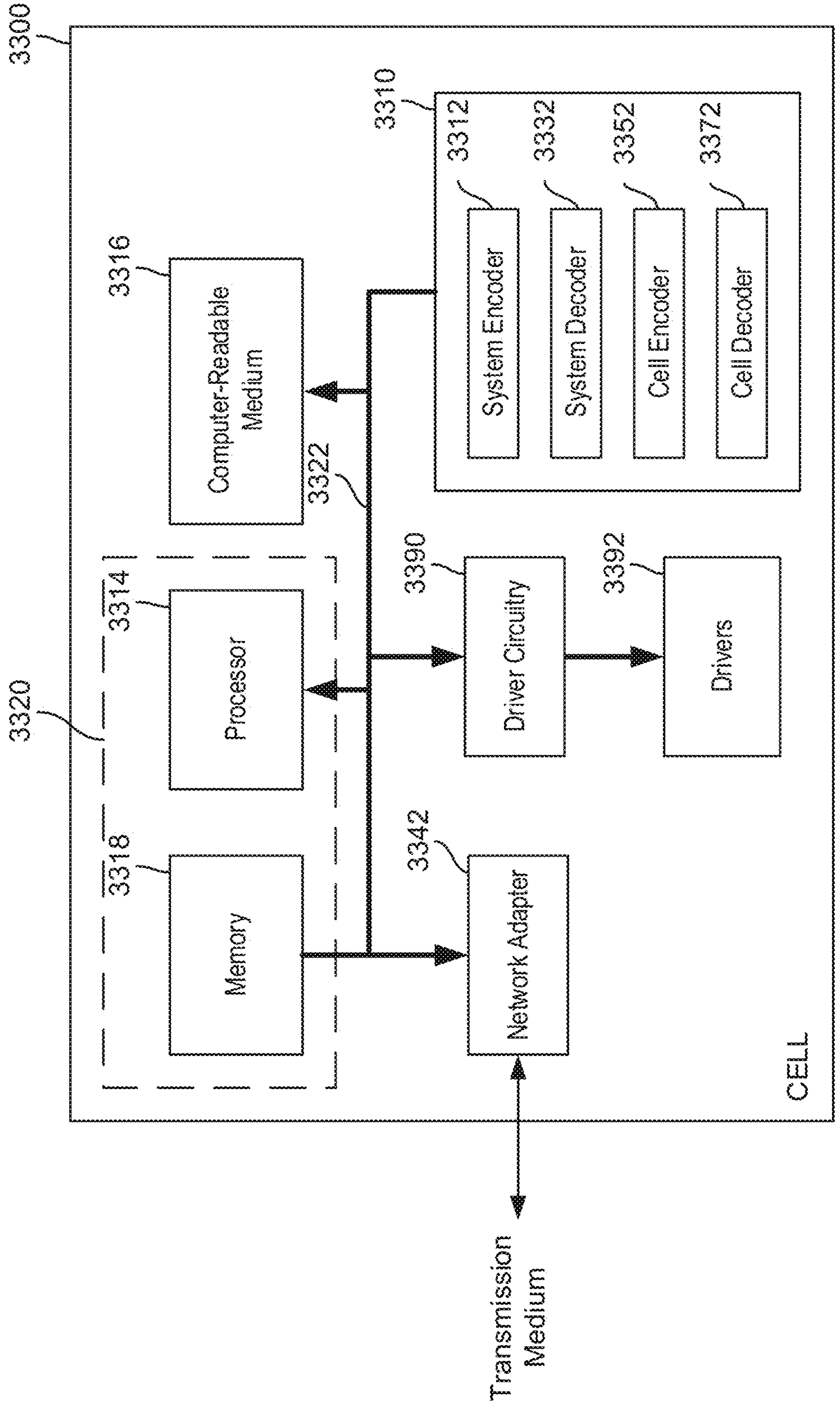
FIG. 33 illustrates an example hardware implementation of a cell in accordance with an embodiment of the invention.

FIG. 33 illustrates an example of a hardware implementation for an apparatus 3300 employing a processing system 3320 that may be used to implement a cell configured in accordance with various aspect of the disclosure for the system and architecture for spatial audio control and reproduction. In accordance with various aspects of the disclosure, an element, or any portion of an element, or any combination of elements in the apparatus 3300 that may be used to implement any device, including a cell, may utilize the spatial audio and approach described herein.

The apparatus 3300 may be used to implement a cell. The apparatus 3300 includes a set of spatial audio control and production modules 3310 that includes a system encoder 3312, a system decoder 3332, a cell encoder 3352, and a cell decoder 3372. The apparatus 3300 can also include a set of drivers 3392. The set of drivers 3392 may include one or more subsets of drivers that include one or more of different types of drivers. The drivers 3392 can be driven by driver circuitry 3390 that generates the electrical audio signals for each of the drivers. The driver circuitry 3390 may include any bandpass or crossover circuits that may divide audio signals for different types of drivers.

In various aspects of the disclosure, as illustrated by the apparatus 3300, each cell may include a system encoder and a system decoder such that system-level functionality and processing of related information may be distributed over the group of cells. This distributed architecture can also minimize the amount of data that needs to be transferred between each of the cells. In other implementations, each cell may only include a cell encoder and a cell decoder, but not a system encoder nor a system decoder. In various embodiments, secondary cells only utilize their cell encoder and cell decoder.

The processing system 3320 can include one or more processors illustrated as a processor 3314. Examples of processors 3314 can include (but is not limited to) microprocessors, microcontrollers, digital signal processors (DSPs), field programmable gate arrays (FPGAs), programmable logic devices (PLDs), state machines, gated logic, discrete hardware circuits, and/or other suitable hardware configured to perform the various functionality described throughout this disclosure.

The apparatus 3300 may be implemented as having a bus architecture, represented generally by a bus 3322. The bus 3322 may include any number of interconnecting buses and/or bridges depending on the specific application of the apparatus 3302 and overall design constraints. The bus 3322 can link together various circuits including the processing system 3320, which can include the one or more processors (represented generally by the processor 3314) and a memory 3318, and computer-readable media (represented generally by a computer-readable medium 3316). The bus 3322 may also link various other circuits such as timing sources, peripherals, voltage regulators, and/or power management circuits, which are well known in the art, and therefore, will not be described any further. A bus interface (not shown) can provide an interface between the bus 3322 and a network adapter 3342. The network adapter 3342 provides a means for communicating with various other apparatus over a transmission medium. Depending upon the nature of the apparatus, a user interface (e.g., keypad, display, speaker, microphone, joystick) may also be provided.

The processor 3314 is responsible for managing the bus 3322 and general processing, including execution of software that may be stored on the computer-readable medium 3316 or the memory 3318. The software, when executed by the processor 3314, can cause the apparatus 3300 to perform the various functions described herein for any particular apparatus. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The computer-readable medium 3316 or the memory 3318 may also be used for storing data that is manipulated by the processor 3314 when executing software. The computer-readable medium 3316 may be a non-transitory computer-readable medium such as a computer-readable storage medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. Although illustrated as residing in the apparatus 3300, the computer-readable medium 3316 may reside externally to the apparatus 3300, or be distributed across multiple entities including the apparatus 3300. The computer-readable medium 3316 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 34:
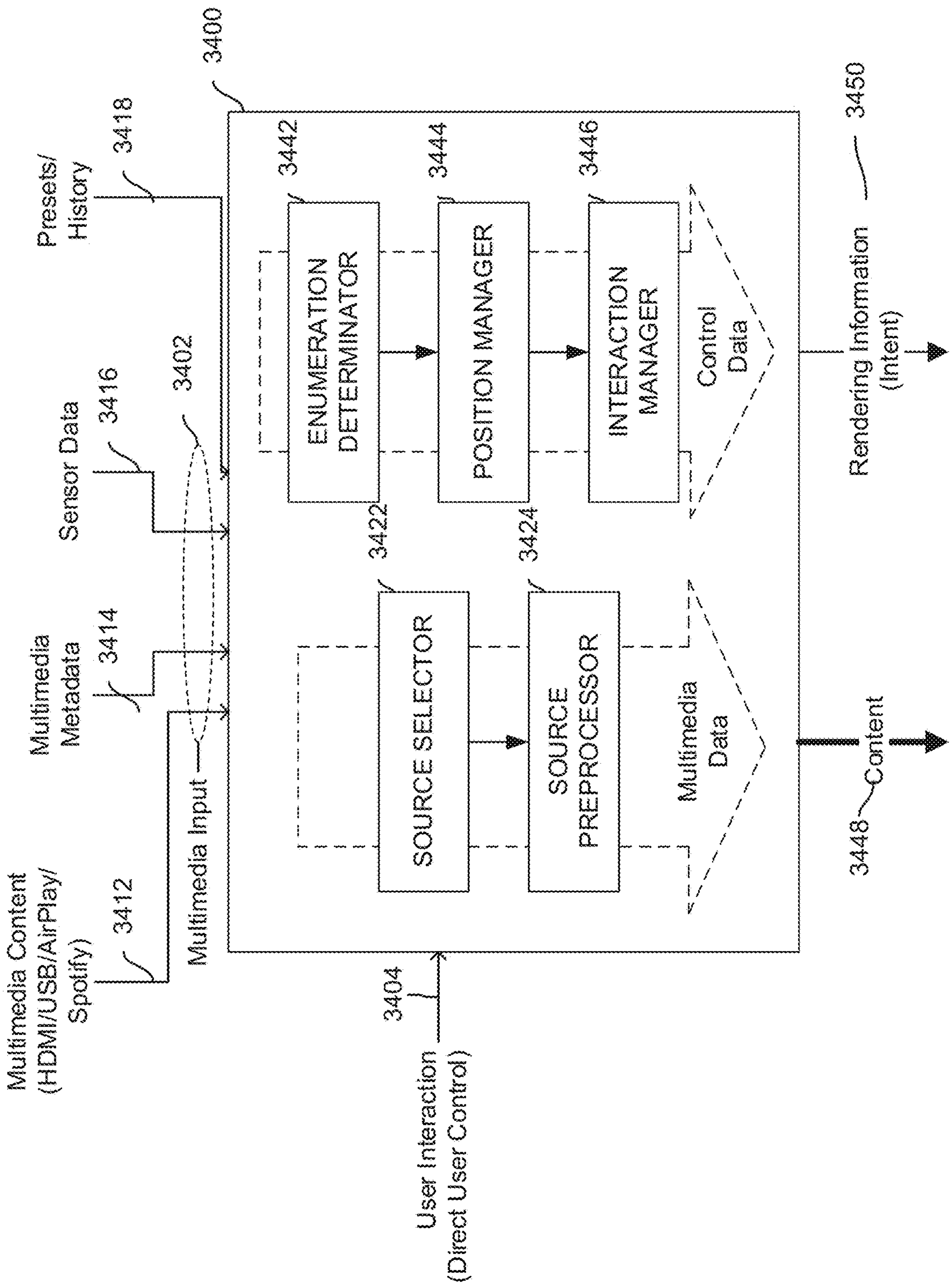
FIG. 34 illustrates a source manager in accordance with an embodiment of the invention.

FIG. 34 illustrates the source manager 3400 configured in accordance with various aspects of the disclosure that receives the multimedia input 3402. The multimedia input 3402 may include multimedia content 3412, multimedia metadata 3414, sensor data 3416, and/or preset/history information 3418. The source manager 3400 can also receive user interaction 3404 that may directly manage playback of the multimedia content 3412, including affecting selection of a source of multimedia content and managing rendering of that source of multimedia content. As further discussed herein, the multimedia content 3412, the multimedia metadata 3414, the sensor data 3416, and the preset/history information 3418 may be used by the source manager 3400 to generate and manage content 3448 and rendering information 3450.

The multimedia content 3412 and the multimedia metadata 3414 related thereto may be referred to herein as "multimedia data." The source manager 3400 includes a source selector 3422 and a source preprocessor 3424 that may be used by the source manager 3400 to select one or more sources in the multimedia data and perform any preprocessing to provide as the content 3448. The content 3448 is provided to the multimedia rendering engine along with the rendering information 3450 generated by the other components of the source manager 3400, as described herein.

The multimedia content 3412 and the multimedia metadata 3414 may be multimedia data from such sources as High-Definition Multimedia Interface (HDMI), Universal Serial Bus (USB), analog interfaces (phono/RCA plugs, stereo/headphone/headset plugs), as well as streaming sources using the Airplay protocol developed by Apple Inc. or the Chromecast protocol developed by Google. In general, these sources may provide sound information in a variety of content and formats, including channel-based sound information (e.g., Dolby Digital, Dolby Digital Plus, and Dolby Atmos, as developed by Dolby Laboratories, Inc.), discrete sound objects, sound fields, etc. Other multimedia data can include text-to-speech (TTS) or alarm sounds generated by a connected device or another module within the spatial multimedia reproduction system (not shown).

The source manager 3400 further includes an enumeration determinator 3442, a position manager 3444, and an interaction manager 3446. Together, these components can be used to generate the rendering information 3450 that is provided to the multimedia rendering engine. As further described herein, the sensor data 3416 and the preset/history information 3418, which may be referred to generally as "control data," may be used by these modules to affect playback of the multimedia content 3412 by providing the rendering information 3450 to the multimedia rendering engine. In one aspect of the disclosure, the rendering information 3450 contains telemetry and control information as to how the multimedia rendering engine should playback the multimedia in the content 3448. Thus, the rendering information 3450 may specifically direct how the multimedia rendering engine is to reproduce the content 3448 received from the source manager 3400. In other aspects of the disclosure, the multimedia rendering engine may make the ultimate determination as to how to render the content 3448.

The enumeration determinator module 3442 is responsible for determining the number of sources in the multimedia information included in the content 3448. This may include multiple channels from a single source, such as, for example, two channels from a stereo sound source, as well as TTS or alarm/alert sounds such as those that may be generated by the system. In one aspect of the disclosure, the number of channels in each content source is part of the determination of the number of sources to produce the enumeration information. The enumeration information may be used in determining the arrangement and mixing of the sources in the content 3448.

Figure 35:
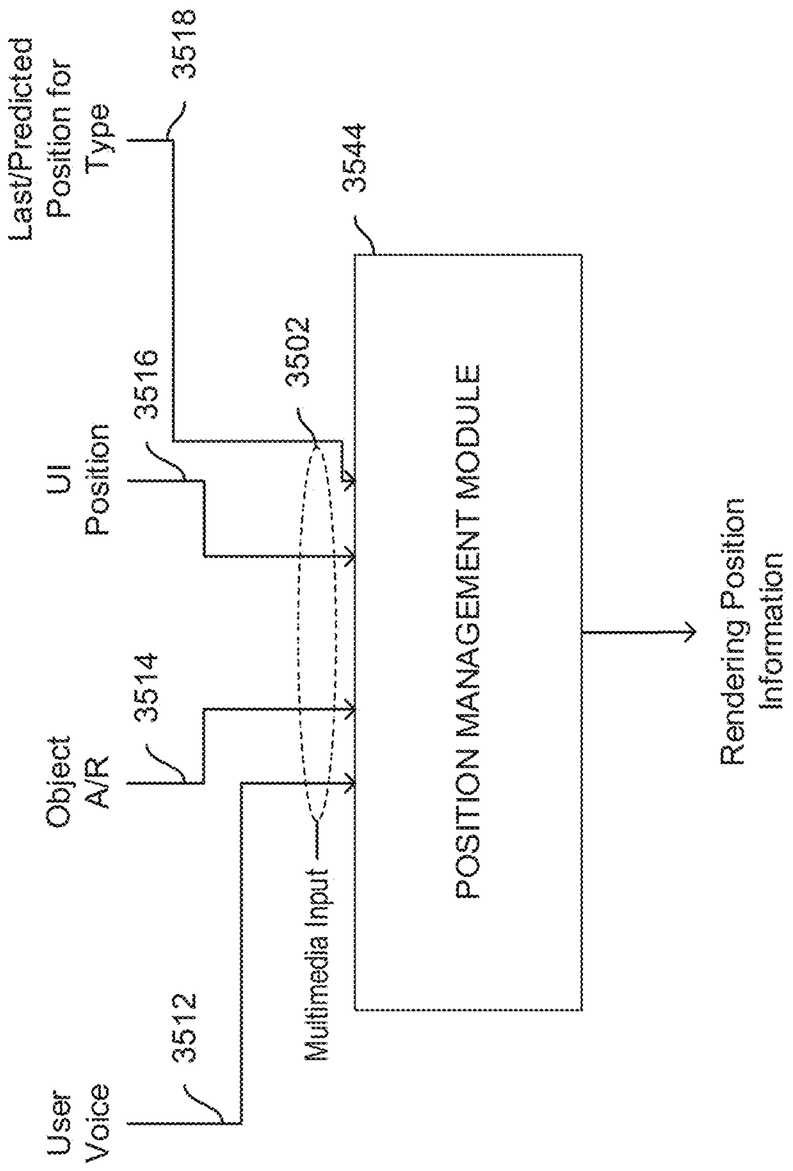
FIG. 35 illustrates a position manager in accordance with an embodiment of the invention.

The position manager 3444 can manage the arrangement of reproduction of the sources in the multimedia information included in the content 3448 using a desired position of reproduction for each source. A desired position may be based on various factors, including the type of content being played, positional information of the user or an associated device, and historical/predicted position information. With reference to FIG. 35, the position manager 3544 may determine position information used for rendering multimedia sources based on information from a user voice input 3512, an object augmented reality (A/R) input 3514, a UI position input 3516, and last/predicted position information associated for a particular input type 3518. The positional information may be generated in a position determination process using such approaches as a simultaneous localization and mapping (SLAM) algorithm. For example, the desired position for playback in a room may be based on a determination of a user's location in the room. This may include detecting the user voice 3512 or, alternatively, a received signal strength indicator (RSSI) of a user device (e.g., a user's smartphone).

The playback location may be based on the object A/R 3514, which may be information for an AR object in a particular rendering for a room. Thus, the playback position of a sound source may match the NR object. In addition, the system may determine where cells are using visual detection and, through a combination of scene detection and view of the NR object being rendered, the playback position may be adjusted accordingly.

The playback position of a sound source may be adjusted based on a user interacting with a user interface through the UI position input 3516. For example, the user may interact with an app that includes a visual representation of the room in which a sound object is to be reproduced as well as the sound object itself. The user may then move the visual representation of the sound object to position the playback of the sound object in the room.

The location of playback may also be based on other factors such as the last playback location of a particular sound source or type of sound source 3518. In general, the playback location may be based on a prediction based on factors including (but not limited to) type of the content, time of day, and/or other heuristic information. For example, the position manager 3544 may initiate playback of an audio book in a bedroom because the user plays back the audio book at night, which is the typical time that the user plays the audio book. As another example, a timer or reminder alarm may be played back in the kitchen if the user requests a timer be set while the user is in the kitchen.

In general, the position information sources may be classified into active or passive sources. Active sources refer to positional informational sources provided by a user. These sources may include user location and object location. In contrast, passive sources are positional informational sources that are not actively specified by users but used by the position manager 3544 to predict playback position. These passive sources may include type of content, time of day, day of the week, and based on heuristic information. In addition, a priority level may be associated with each content source. For example, alarms and alerts may have a higher level of associated priority than other content sources, which may mean that these are played at higher volumes if they are being played in a position next to other content sources.

The desired playback location may be dynamically updated as the multimedia is reproduced by the multimedia rendering engine. For example, playback of music may "follow" a user around a room by the spatial multimedia reproduction system receiving updated positional information of the user or a device being carried by the user.

An interaction manager 3446 can manage how each of the different multimedia sources are to be reproduced based on their interaction with each other. In accordance with one aspect of the disclosure, playback of a multimedia source such as a sound source may paused, stopped, or reduced in volume (also referred as "ducked"). For example, where an alarm needs to be rendered during playback of an existing multimedia source, such as a song, an interaction manager may pause or duck the song while the alarm is being played.

Section 7: UI/UX and Additional Functionality

Spatial audio systems in accordance with many embodiments of the invention include user interfaces (UIs) to enable users to interact with and control spatial audio rendering. In several embodiments, a variety of UI modalities can be provided to enable users to interact with spatial audio systems in various ways including (but not limited to) direct interaction with a cell via buttons, a gesture based UI, and/or a voice activated UI, and/or interaction with an additional device such (as but not limited to) a mobile device or a voice assistant device via buttons, a gesture based UI, and/or a voice activated UI. In numerous embodiments, UIs can provide access to any number of functions including, but not limited to, controlling playback, mixing audio, placing audio objects in a space, configuring spatial audio systems, and/or any other spatial audio system function as appropriate to the requirements of specific applications. While the below reflect several different versions of UIs for various functions, one of ordinary skill in the art can appreciate that any number of different UI layouts and/or affordances can be used to provide users with access to and control over spatial audio system functionality.

Figure 36:
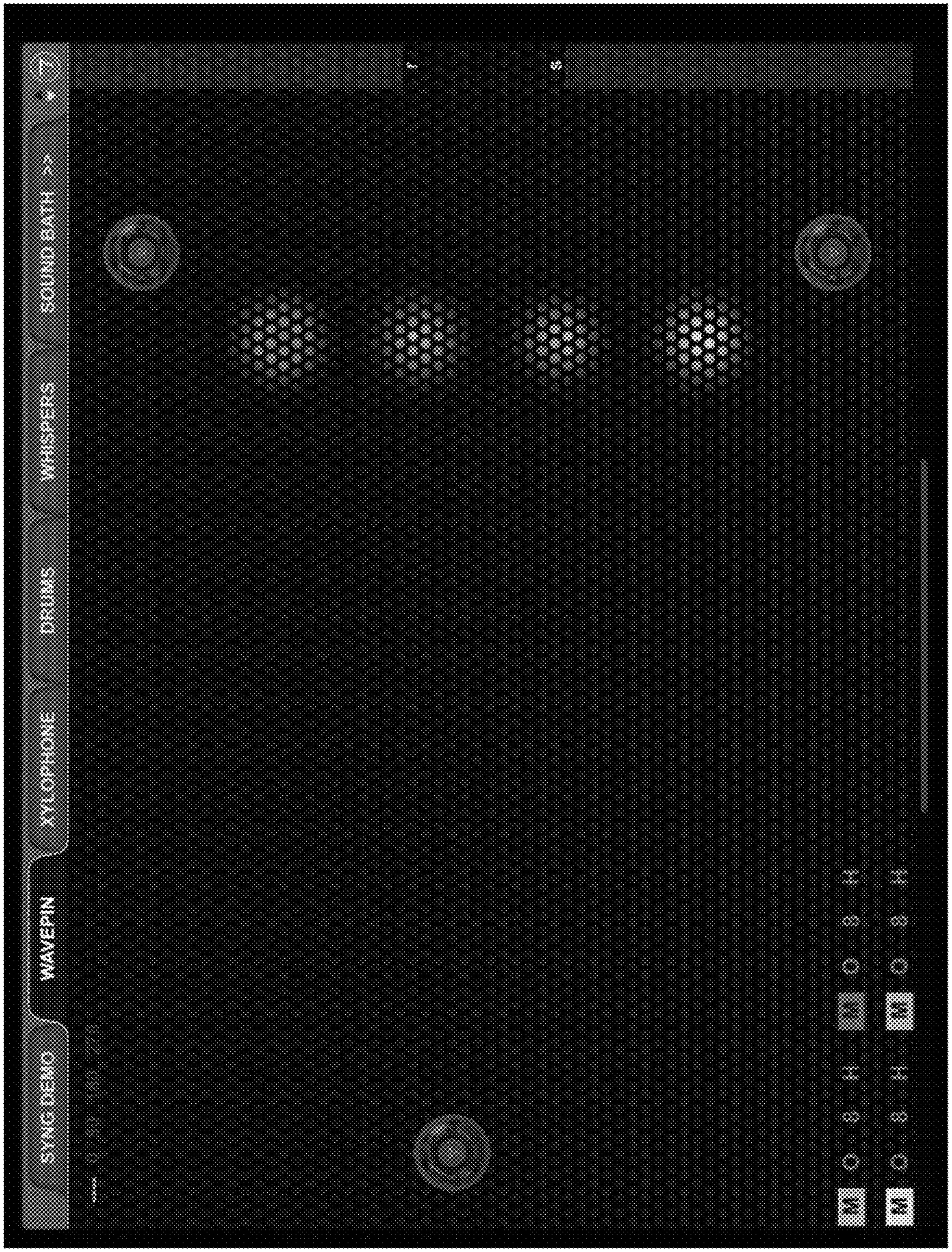
FIG. 36 illustrates an example UI for controlling the placement of sound objects in a space in accordance with an embodiment of the invention.

Turning now to FIG. 36, a UI for controlling the placement of sound objects in a space in accordance with an embodiment of the invention is illustrated. As shown, cells can be graphically represented in their approximate location in a virtual space as an analog to the physical space. In numerous embodiments, different sound objects can be created and associated with different audio sources. In the cases of a channel-based audio source a separate audio object can be created for different channels (often with the bass mixed into all channels). Each spatial audio object can be represented by a different UI object having a different graphical representation (e.g. color). Indeed, the graphical representations can be differentiated in any number of ways including, but not limited to, shape, size, animation, symbol, and/or any other differentiating mark as appropriate to the requirements of specific applications. Sound objects can be moved throughout the virtual space which can result in a perceived "movement" of the sound object in the physical space when rendered by the spatial audio system using a process similar to any of the various spatial audio reproduction processes described above. In many embodiments, moving sound objects can be achieved via a "click-and-drag" operation, however any number of different interface techniques can be used.

Figure 37A:
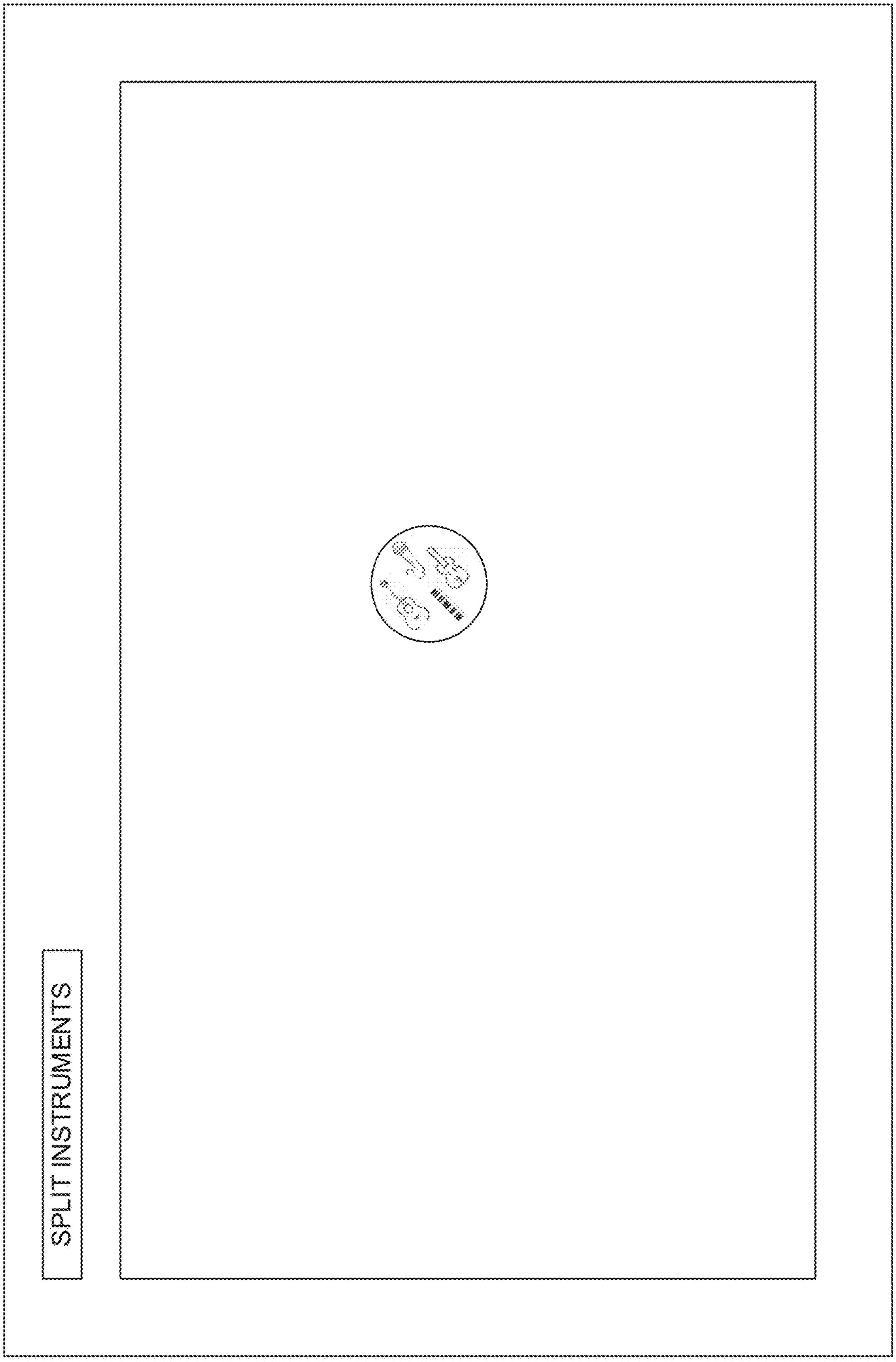
FIGS. 37A and 37B illustrate an example UI for controlling the placement of and splitting sound objects in a space in accordance with an embodiment of the invention.
Figure 37B:
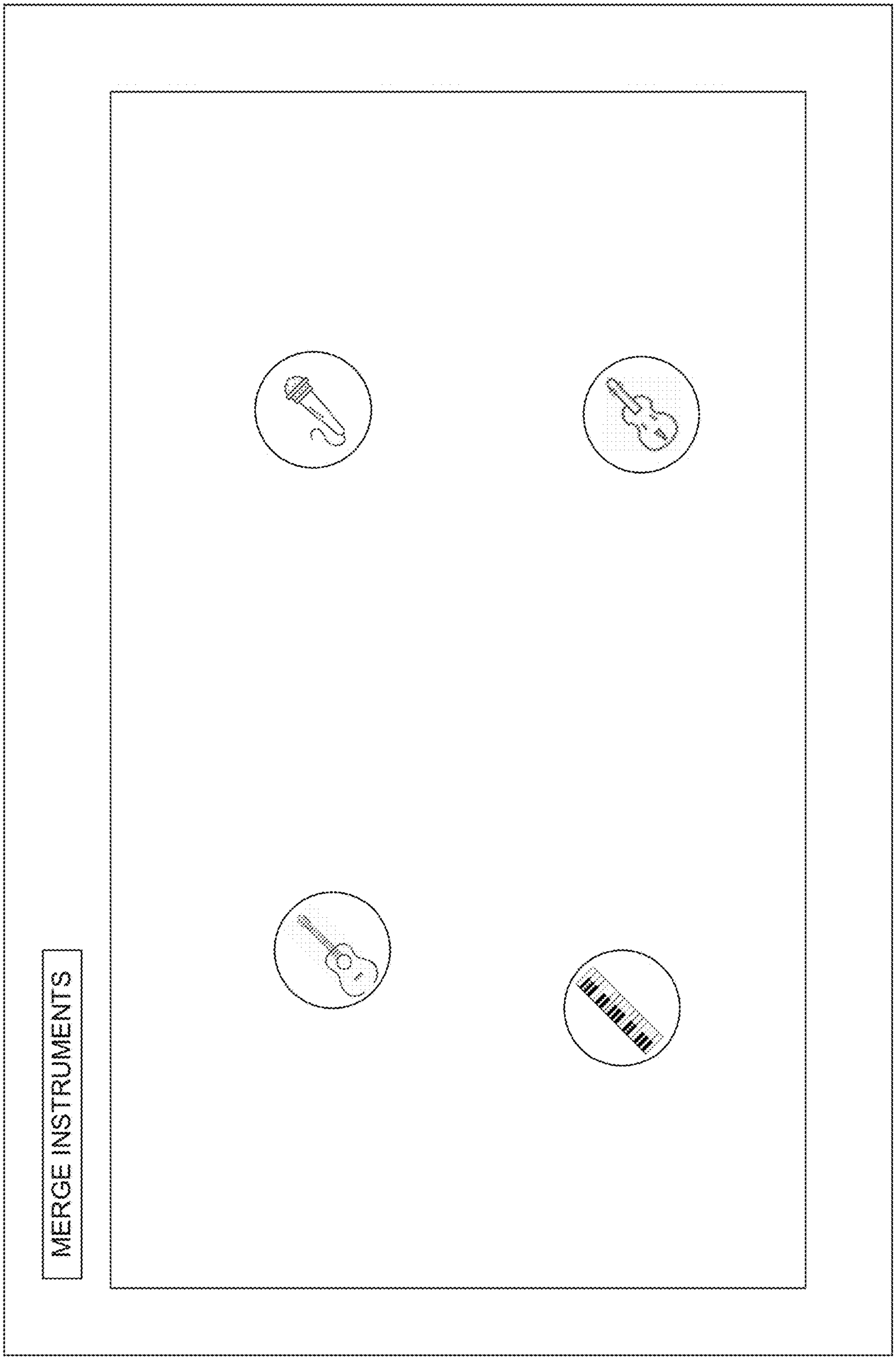

Turning now to FIGS. 37A and 37B, a second UI for controlling the placement of sound objects in accordance with an embodiment of the invention is illustrated. The illustrated embodiment demonstrates a UI capable of enabling the splitting and merging of sound objects. In numerous embodiments a single sound object can represent more than one audio source and/or audio channel. In various embodiments, each audio object can represent one or more instruments, for example, as in a "master" recording. FIG. 37A demonstrates a sound object that has been assigned audio tracks for four different instruments, in this case vocals, guitar, cello, and keyboard. Of course, any number of different instruments or arbitrary audio tracks can be assigned as appropriate to the requirements of specific applications in accordance with various embodiments of the invention. A button and/or other affordance can be provided to enable the user to "split" the sound object into multiple sound objects which can each reflect one or more of the channels in the original sound object. As seen in FIG. 37B, the sound object is split into four separate sound objects which can be independently placed, each representing a single instrument. A button and/or interface object can be provided to enable the merging of different sound objects in a similar manner.

Figure 38:
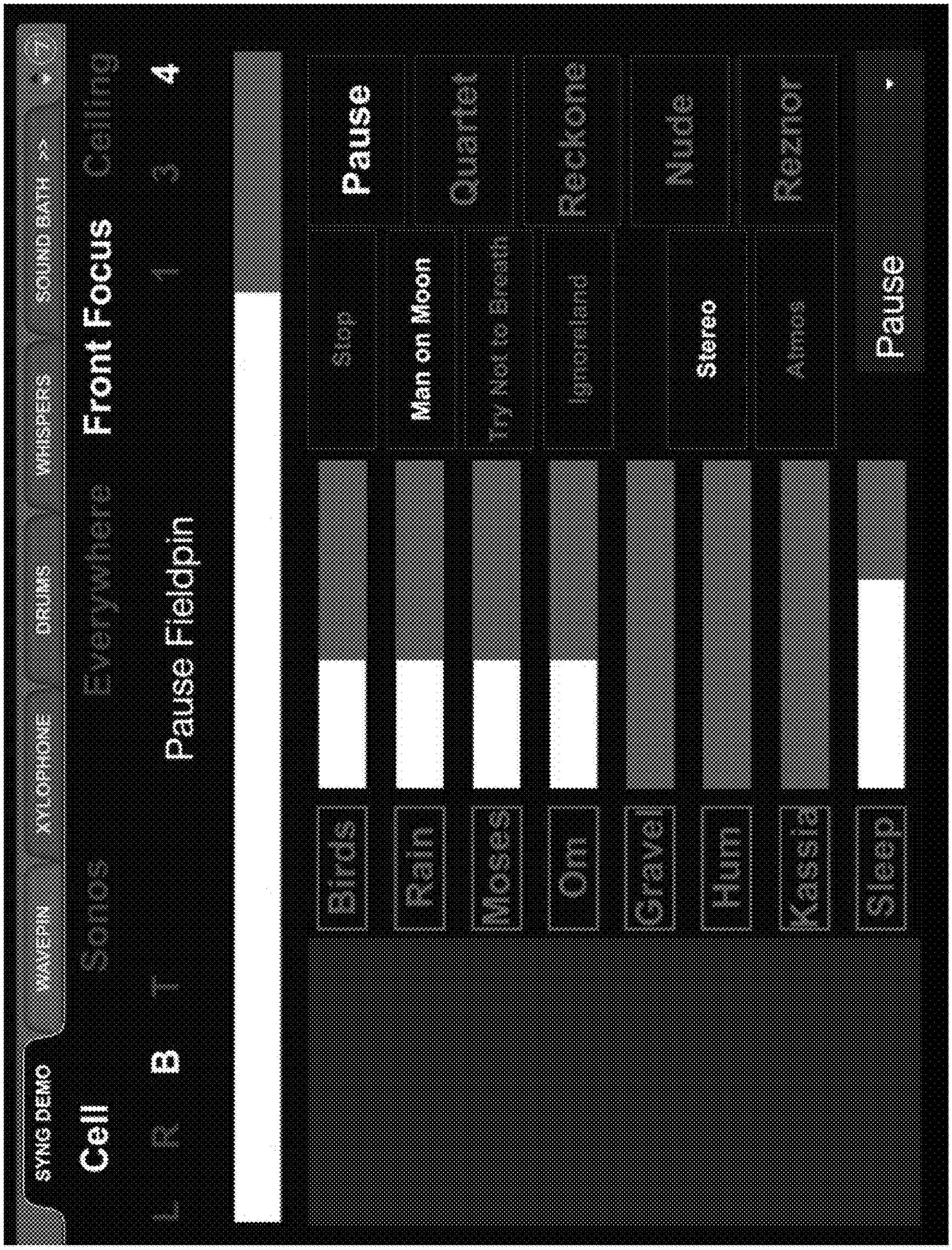
FIG. 38 illustrates an example UI for controlling volume and rendering of sound objects in accordance with an embodiment of the invention.

Turning now to FIG. 38, a UI element for controlling the volume and rendering of sound objects in accordance with an embodiment of the invention is illustrated. In numerous embodiments, each sound object can be associated with a volume control. In the illustrated environment, volume sliders are provided. However, any of a number of different volume control schemes can be used as appropriate to the requirements of specific applications in accordance with various embodiments of the invention. In several embodiments, a single sound control can be associated with multiple sound objects. It should be readily appreciated that independently controlling sound objects is different from independently controlling individual speakers. Controlling the volume of a single sound object, can impact the manner in which audio is rendered by multiple speakers in a manner determined by a spatial audio reproduction process such as (but not limited to) the various nested architectures described above. In embodiments in which virtual speakers are utilized within a spatial audio reproduction process, buttons can be provided in order to change between various preset virtual speaker configurations impacting number and/or placement of the virtual speakers relative to cells. In many embodiments, audio control buttons and/or affordances such as, but not limited to, play, pause, skip, seek, and/or any other sound control can be provided as part of a UI.

Figure 39:
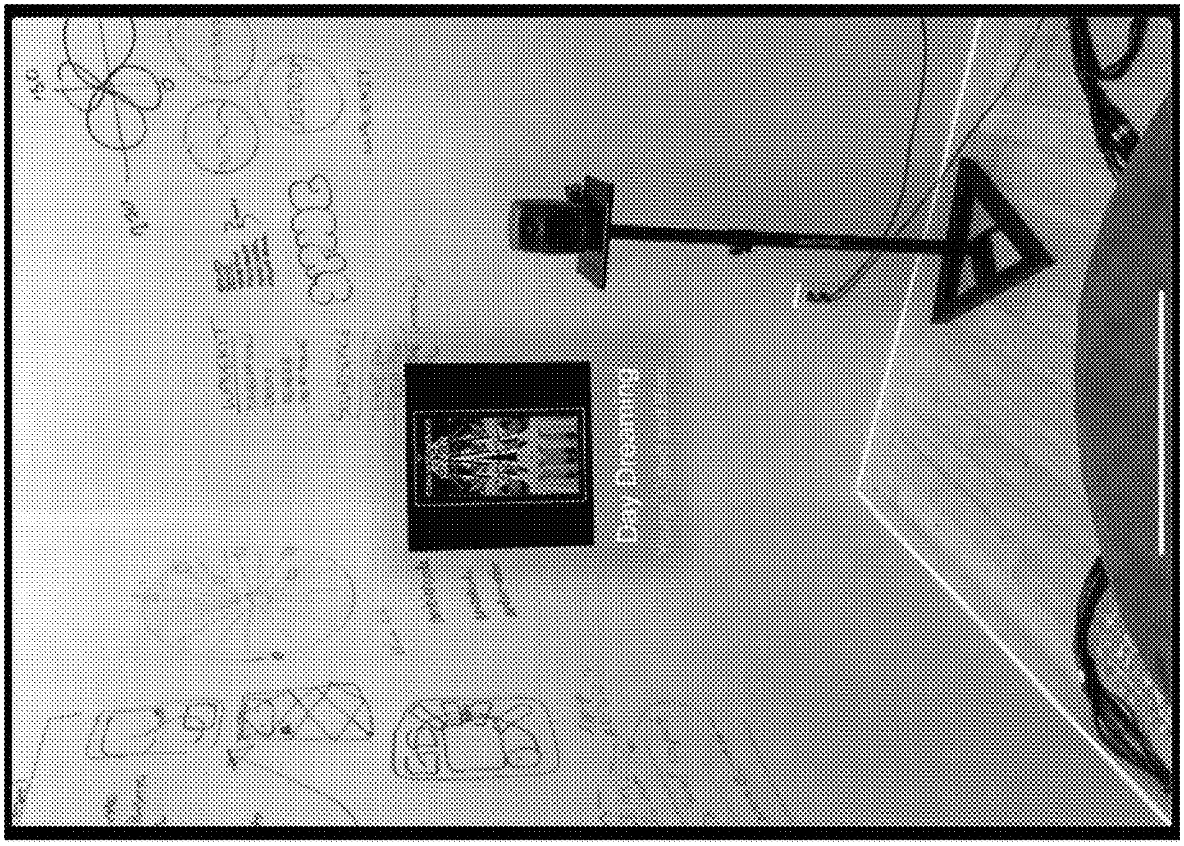
FIG. 39 illustrates a sound object in an augmented reality environment in accordance with an embodiment of the invention.
Figure 40:
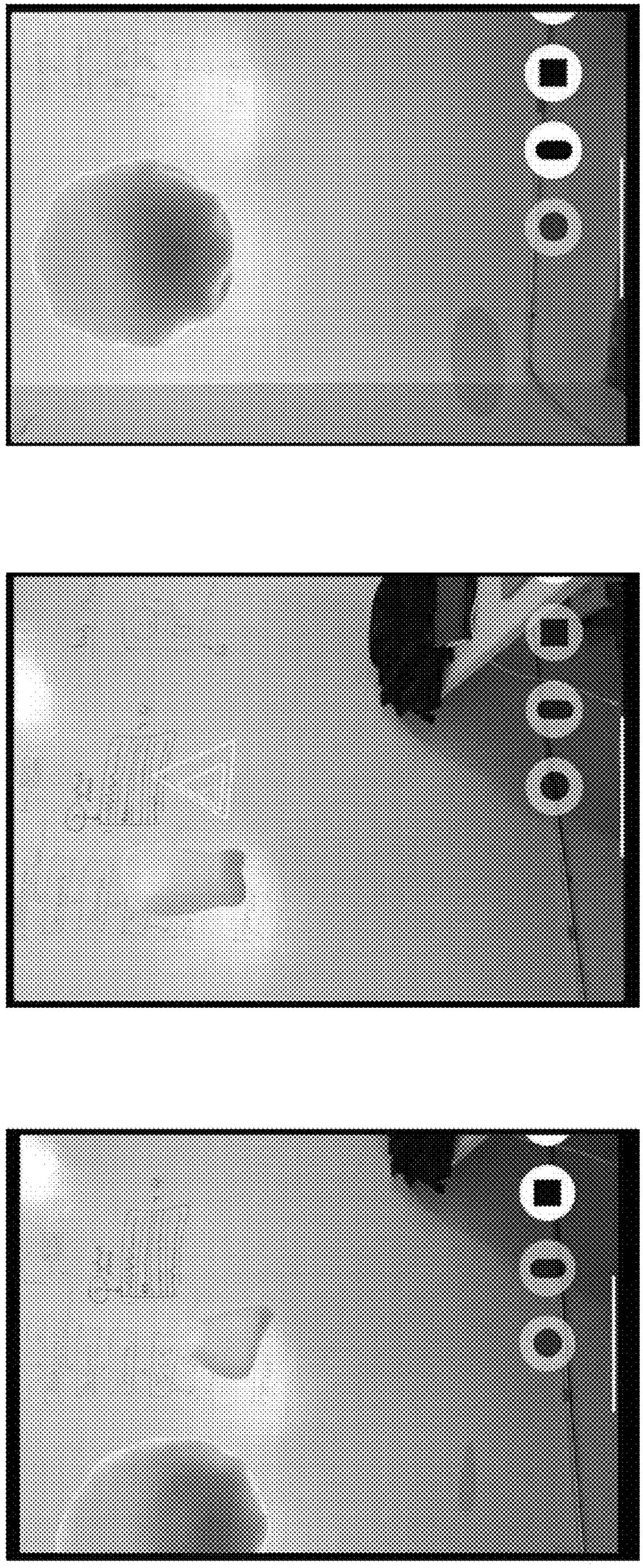
FIG. 40 illustrates sound objects in an augmented reality environment in accordance with an embodiment of the invention.

Spatial audio objects can further be viewed in an augmented reality manner. In numerous embodiments, control devices can have augmented reality capabilities, and sound objects can be visualized. Turning now to FIG. 39, a sound object representing an audio track being played along with album art in accordance with an embodiment of the invention is illustrated. However, the track can be represented in any number of different ways, including those without art, with different shapes, those that are more abstract, and/or any other graphical representation as appropriate to the requirements of specific applications of various embodiments of the invention. For example, FIG. 40 illustrates three different visualizations of abstract representations of audio objects in accordance with an embodiment of the invention. As one of ordinary skill in the art can appreciate, there are any number of different applications of visually rendering sound objects in an augmented and/or virtual reality environment that can be implemented in combination with the rendering of spatial audio by spatial audio systems in accordance with various embodiments of the invention.

In numerous embodiments, control devices can be used to assist with configuration of spatial audio systems. In many embodiments, spatial audio systems can be used to assist with mapping a space. Turning now to FIG. 41, an example UI for configuration operation in accordance with an embodiment of the invention is illustrated. In numerous embodiments, control devices have depth-sensing capabilities that can assist with mapping a room. In a variety of embodiments, the camera system of a control device can be used to identify individual cells in a space. However, as noted above, it is not a requirement that a control device have an integrated camera.

Figure 42:
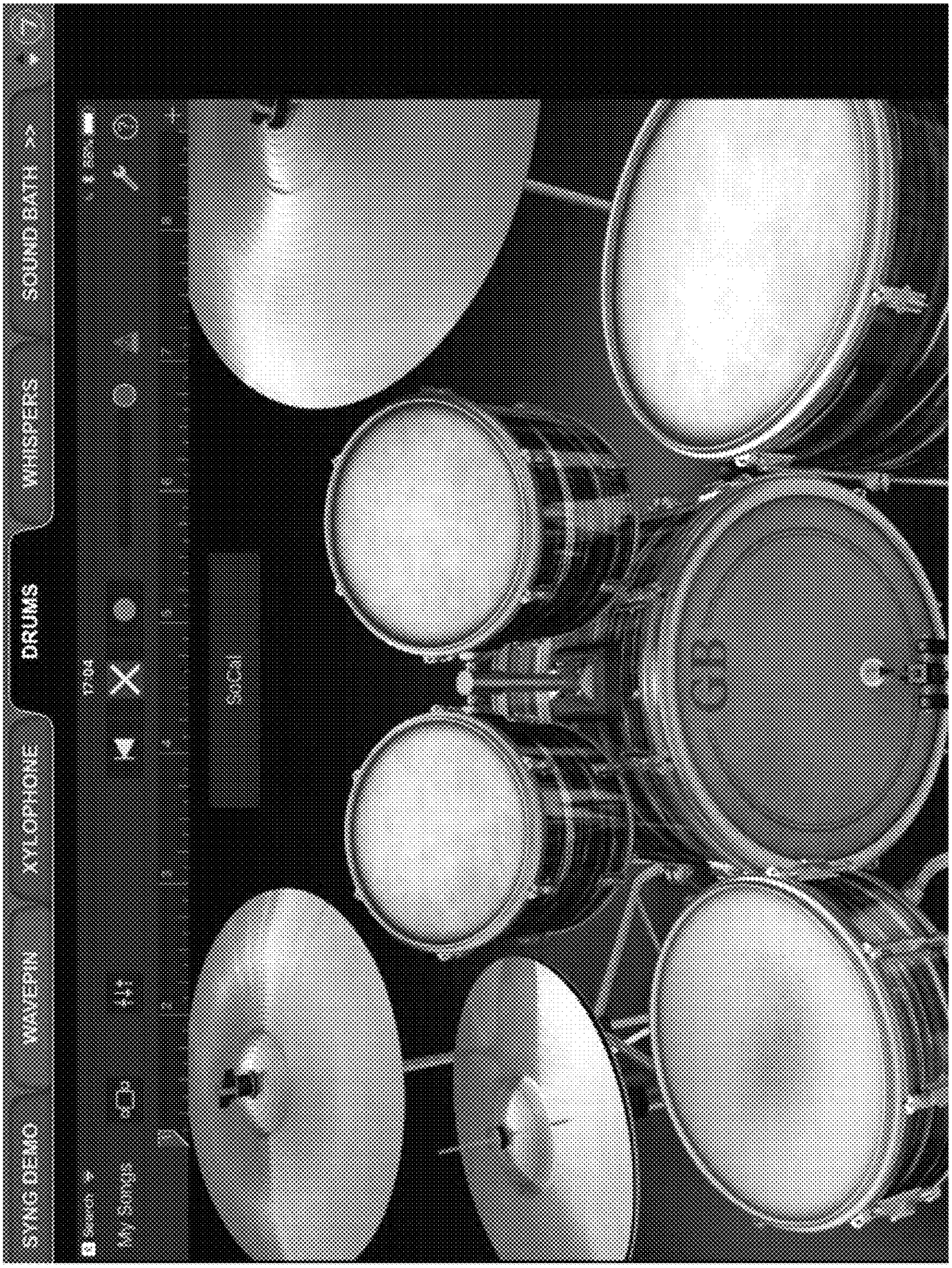
FIG. 42 illustrates an example UI for an integrated digital instrument in accordance with an embodiment of the invention.

In numerous embodiments, spatial audio systems can be used for music production and/or mixing. Spatial audio systems can be connected to digital and/or physical musical instruments and the output of the instrument can be associated with a sound object. Turning now to FIG. 42, an integrated digital instrument in accordance with an embodiment of the invention is illustrated. In the illustrated example, a drum set has been integrated. In a variety of embodiments, different drums in the drum set can be associated with different sound objects. In numerous embodiments, multiple drums in the drum set can be associated with the same sound object. Indeed, more than one instrument can be integrated, and any number of different arbitrary instruments are capable of integration.

Figure 58A:
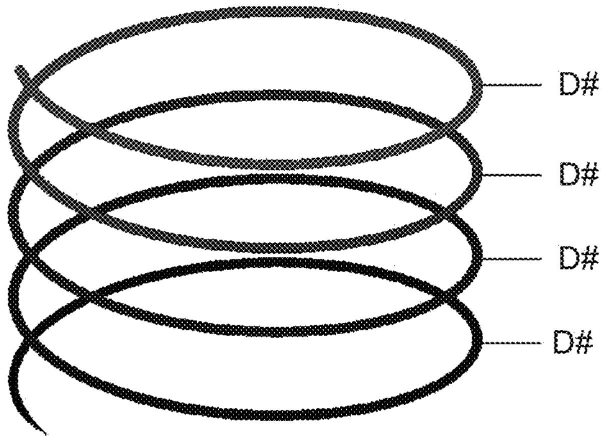
FIGS. 58A and 58B illustrate a visualization helix from a side and top perspective, respectively, in accordance with an embodiment of the invention.
Figure 58B:
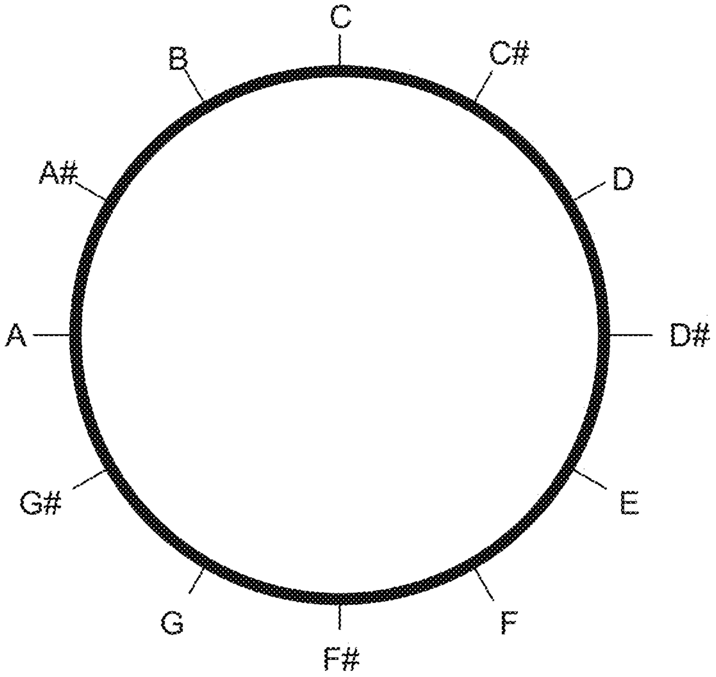
Figure 59:
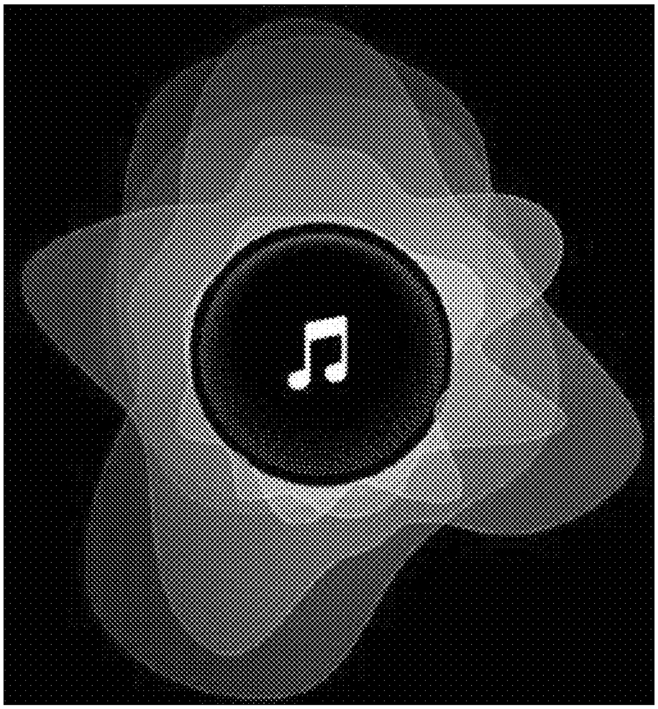
FIG. 59 illustrates a helix based visualization in accordance with an embodiment of the invention.

While different sound objects can be visualized as described above, in many embodiments, it is desirable to have a holistic visualization of what is being played back. In numerous embodiments, audio streams can be visualized by processing the audio signal in such a way as to represent the frequencies present at any given time point in the stream. For example, audio can be processed using a Fourier transform, or by generating a Mel Spectrogram. In many embodiments, primary cells and/or super primary cells are responsible for processing the audio stream that they are responsible for, and passing the results to the device presenting the visualization. The resulting processed audio which describes each frequency and their respective amplitudes at each given time point can be wrapped into a helix, where the same point on each turn of a helix offset by one pitch reflect the same note (A, B, C, D, E, F, G and the like) at sequential octaves. In this way, when viewed from above (i.e. perpendicular to the axis of the helix), the some note in each octave lines up. A helix as described when viewed from the side and from above in accordance with an embodiment of the invention are illustrated in FIGS. 58A and 58B, respectively. When a particular note is played at a given octave, the helix structure can warp based on the amplitude to visualize the note. In numerous embodiments, the warped section can leave a transparent field behind it, where different turns of the helix are represented by different colors, levels of transparency, and/or any other visual indicator as appropriate to the requirements of specific applications of embodiments of the invention. In this way, multiple notes at different octaves can be simultaneously visualized. An example of a visualization using a helix in accordance with an embodiment of the invention is illustrated in FIG. 59.

Figure 60:
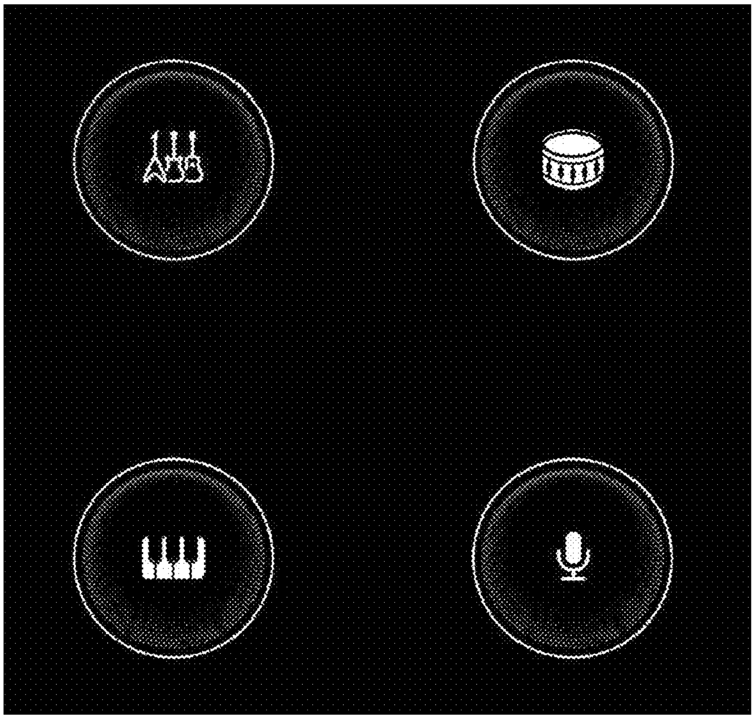
FIG. 60 illustrates four helix based visualizations for different tracks in an audio stream in accordance with an embodiment of the invention.

Further, more than one helix can be generated. For example, each instrument in a band playing a song may have their own visualization helix. Example visualization helices for multiple instruments in a band in accordance with an embodiment of the invention are illustrated in FIG. 60. However, the helix can be used for any number of visualizations depending on the desires of the user. Further, visualizations do not have to be helix based.

Helix based visualizations are not the only types of visualizations that can be utilized. In a variety of embodiments, visualizations can be attached to sound objects and represented spatially within a visualized space reflective of the real world. For example, a "sound space" can be visualized as a rough representation of any physical space containing cells. Sound objects can be placed in the sound space visualization and the sound will be correspondingly rendered by the cells. This can be used, for example, to generate an ambient soundscape just as, but not limited to, a city or jungle. The ambient jungle can be enhanced by placing objects in the sound space corresponding to monkeys in the sound space on the floor of the jungle, or birds in the canopies of trees, which in turn can be rendered in the soundscape. In many embodiments, AI can be attached to placed objects to guide their natural movements. For example, a bird may hunt for bugs that are active in one region of the sound space, or bird seed could be placed to draw birds from the area. Any number of ambient environments and objects can be created using sound spaces. Indeed, sound spaces do not in fact have to be ambient. For example, instruments or functional directional alerts or beacons for guidance can be placed within a sound space and rendered in a soundscape for audio production, home safety, and/or any other application as appropriate to the requirements of specific applications of embodiments of the invention. As can readily be appreciated, sound spaces provide great opportunities for creativity and are not limited in any way to the examples recited herein, but are largely only limited by the imagination and creativity of the designers of the sound space.

In many embodiments, a playback and/or control device can be used to playback video content. In numerous embodiments, video content is accompanied by spatial audio. In many cases, a playback and/or control device might be static, e.g. a television mounted on a wall or otherwise in a static location. As described above, spatial audio systems can render spatial audio relative to the playback and/or control device. However, in a variety of embodiments, playback and/or control devices are mobile and can include (but are not limited to) tablet computers, cell phones, portable game consoles, head mounted displays, and/or any other portable playback and/or control device as appropriate to the requirements of specific applications. In many embodiments, spatial audio systems can adaptively render spatial audio relative to the movement and/or orientation of a portable playback and/or control device. When a playback and/or control device contains an inertial measurement unit, such as, but not limited to, gyroscopes, accelerometers, and/or any other positioning system capable of measuring orientation and/or movement, orientation and/or movement information can be used to track the device in order to modify the rendering of the spatial audio. It should be appreciated that spatial audio systems are not restricted to using gyroscopes, accelerometers, and/or other integrated positioning systems. In many embodiments, positioning systems can further include machine vision based tracking systems, and/or any other tracking system as appropriate to the requirements of specific applications of various embodiments of the invention. In some embodiments, the location of the user can be tracked and used to refine the relative rendering of the spatial audio.

Figure 43:
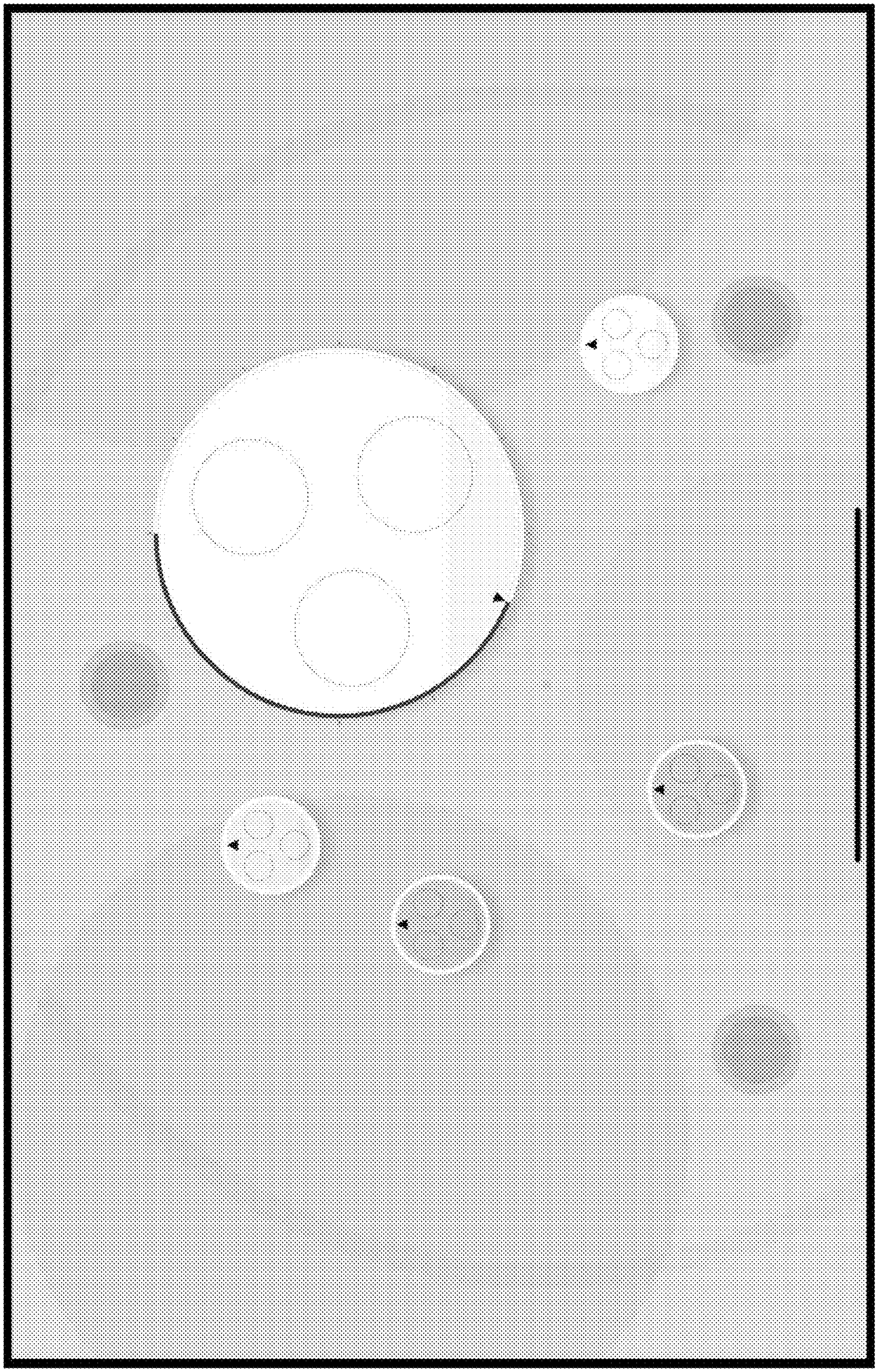
FIG. 43 illustrates an example UI for managing wave pinning in accordance with an embodiment of the invention.

As noted above, spatial audio systems in accordance with certain embodiments of the invention provide user interfaces via mobile devices and/or other computing devices that enable placement of audio objects. In a number of embodiments of the invention, the user interface can enable the coordinated movement of all audio objects or a subset of audio objects in a coordinated manner (rotation around an origin is often referred to as a wave pinning). Turning now to FIG. 43, a UI provided by a mobile device including affordances enabling wave pinning in accordance with an embodiment of the invention is illustrated. As can readily be appreciated, spatial audio systems in accordance with various embodiments of the invention can also support spatial audio rendering in a manner that supports the coordinated translation and/or other forms of movement of multiple spatial audio objects and can provide UIs accordingly.

Figure 44:
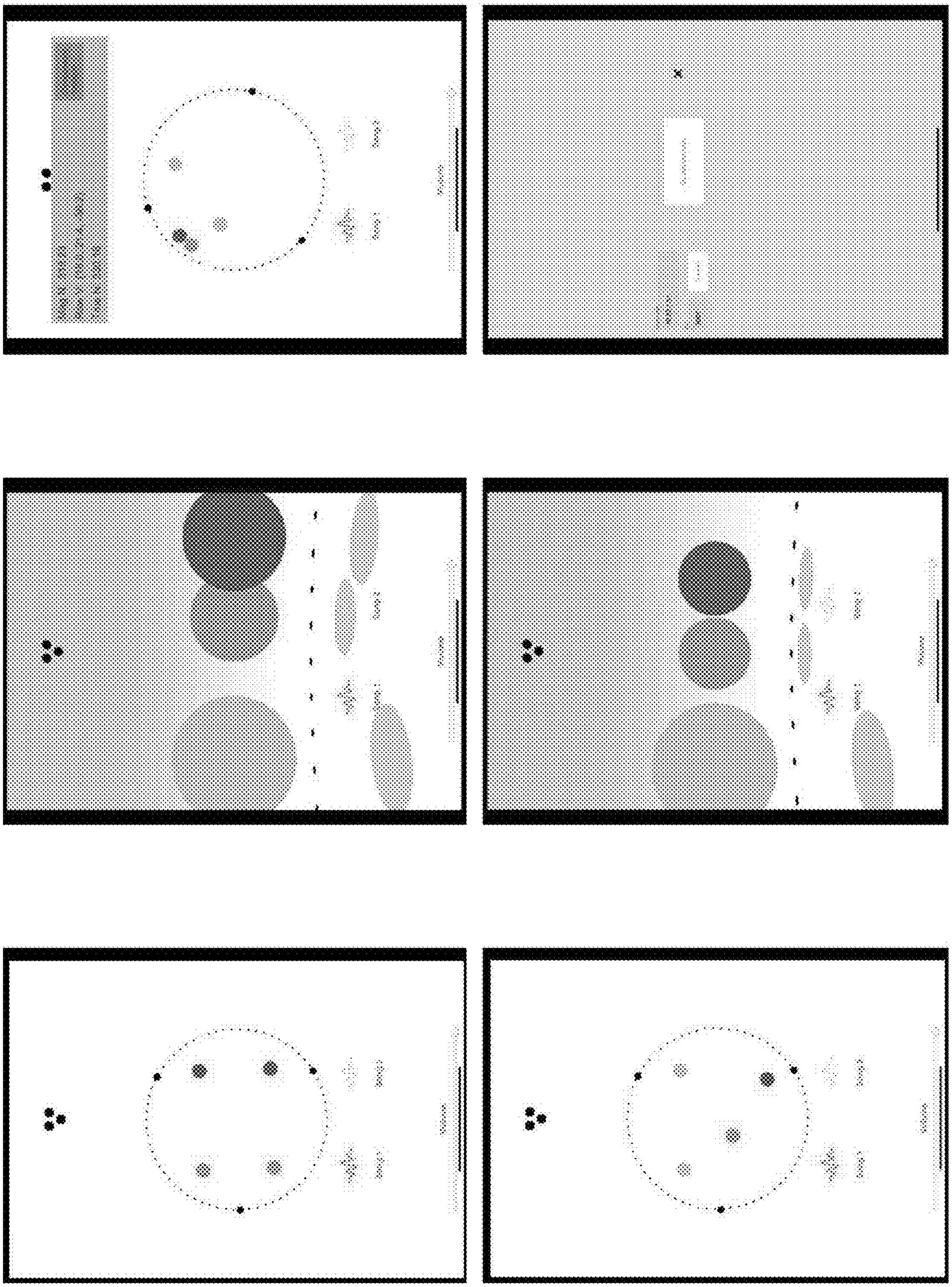
FIG. 44 illustrates a series of UI screens for tracking the movement of sound objects in accordance with an embodiment of the invention.

In addition to enabling placement of multiple audio objects via a UI, spatial audio systems in accordance with many embodiments of the invention can also enable placement of multiple spatial audio objects based upon the tracked movement of one or more users and/or user devices. Turning now to FIG. 44, a series of UI screens are illustrated in which movement of spatial audio objects relative to the locations of three cells is tracked using inertial measurements made by a user device. As noted above, any of a variety of tracking techniques can be utilized to generate telemetry data that can be provided to a spatial audio system to cause audio objects to move with or in response to movements of a user and/or a user device.

While a number of different UIs are described above, these UIs are included for illustrative purposes only and do not in any way constitute the full scope of potential UI configurations. Indeed, an extensive array of UI modalities can be utilized to control the functionality of spatial audio systems configured in accordance with various embodiments of the invention. The specific UIs provided by spatial audio systems will typically depend upon the user input modalities supported by the spatial audio system and/or user devices that communicate with the spatial audio system and/or the capabilities provided by the spatial audio system to control spatial audio reproduction.

Although specific systems and methods for rendering spatial audio are discussed above, many different fabrication methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A spatial audio system comprising:
a primary network connected speaker configured to:
- obtain an audio stream comprising at least one audio signal;
- obtain location data describing a physical location of the primary network connected speaker;
- transforming the at least one audio signal into a spatial representation;
- transform the spatial representation based on a virtual speaker layout;
- generate a separate audio signal for each horn of the primary network connected speaker; and playback the separate audio signals corresponding to the horns of the primary network connected speaker using at least one driver for each horn.

2. The spatial audio system of claim 1, further comprising:

at least one secondary network connected speaker; and the primary network connected speaker is further configured to:

obtain location data describing a physical location of the at least one secondary network connected speaker;

generate a separate audio signal for each horn of the at least one secondary network connected speaker; and transmit the separate audio signals to the at least one secondary network connected speaker associated with the horn for each separate audio signal.

3. The spatial audio system of claim 1, wherein the primary network connected speaker is a super primary network connected speaker, and the super primary network connected speaker is further configured to transmit the audio stream to a second primary network connected speaker.

4. The spatial audio system of claim 1, wherein the primary network connected speaker is configured to establish a wireless network joinable by other network connected speakers.

5. The spatial audio system of claim 1, wherein the primary network connected speaker is controllable by a control device.

6. The spatial audio system of claim 5, wherein the control device is a smart phone.

7. The spatial audio system of claims 1, wherein the primary network connected speaker is configured to:

generating a mel spectrogram of the audio signal; and transmitting the mel spectrogram as metadata to a visualization device for use in visualizing the audio signal as a visualization helix.

8. The spatial audio system of claim 1, wherein the generated separate audio signals can be used to directly drive a driver.

9. The spatial audio system of claim 1, wherein the virtual speaker layout comprises a ring of virtual speakers.

10. The spatial audio system of claim 9, wherein the ring of virtual speakers comprises at least eight virtual speakers.

11. The spatial audio system of claim 9, wherein virtual speakers in the virtual speaker layout are evenly spaced on the circumference of a ring.

12. A method for spatial audio rendering, comprising:

obtaining an audio stream comprising at least one audio signal at a primary network connected speaker;

obtaining location data describing a physical location of the primary network connected speaker;

transforming the at least one audio signal into a spatial representation using the primary network connected speaker;

transforming the spatial representation based on a virtual speaker layout representation using the primary network connected speaker;

generating a separate audio signal for each horn of the primary network connected speaker using the primary network connected speaker; and playing back the separate audio signals corresponding to the horns of the primary network connected speaker using at least one driver for each horn.

13. The method of spatial audio rendering of claim 12, further comprising:

obtaining location data describing a physical location of at least one secondary network connected speaker using the primary network connected speaker;

generating a separate audio signal for each horn of the at least one secondary network connected speaker using the primary network connected speaker; and transmitting the separate audio signals to the at least one secondary network connected speaker associated with the horn for each separate audio signal using the primary network connected speaker.

14. The method of spatial audio rendering of claim 12, wherein the primary network connected speaker is a super primary network connected speaker configured to transmit the audio stream to a second primary network connected speaker.

15. The method of spatial audio rendering of claim 12, further comprising establishing a wireless network joinable by other network connected speakers using the primary network connected speaker.

16. The method of spatial audio rendering of claim 12, wherein the primary network connected speaker is controllable by a control device.

17. The method of spatial audio rendering of claim 12, wherein the generated separate audio signals can be used to directly drive a driver.

18. The method of spatial audio rendering of claim 12, wherein the virtual speaker layout comprises a ring of virtual speakers.

19. The method of spatial audio rendering of claim 18, wherein the ring of virtual speakers comprises at least eight virtual speakers.

20. The method of spatial audio rendering of claim 18, wherein virtual speakers in the virtual speaker layout are evenly spaced on the circumference of a ring.

* * * * *